(12) United States Patent
Sugio et al.

(10) Patent No.: US 12,464,145 B2
(45) Date of Patent: Nov. 4, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Toshiyasu Sugio, Osaka (JP); Noritaka Iguchi, Osaka (JP); Chung Dean Han, Singapore (SG); Chi Wang, Singapore (SG); Pongsak Lasang, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/410,582

(22) Filed: Jan. 11, 2024

(65) Prior Publication Data

US 2024/0155142 A1 May 9, 2024

Related U.S. Application Data

(63) Continuation of application No. 17/390,194, filed on Jul. 30, 2021, now Pat. No. 11,909,992, which is a
(Continued)

(51) Int. Cl.
*H04N 19/30* (2014.01)
*H04N 19/124* (2014.01)
(Continued)

(52) U.S. Cl.
CPC ............ *H04N 19/30* (2014.11); *H04N 19/124* (2014.11); *H04N 19/46* (2014.11); *H04N 19/597* (2014.11)

(58) Field of Classification Search
CPC .. H04N 19/105; H04N 19/119; H04N 19/136; H04N 19/176; H04N 19/463; H04N 19/593; H04N 19/96
See application file for complete search history.

(56) References Cited

U.S. PATENT DOCUMENTS

2014/0375638 A1 12/2014 Tomaru et al.
2015/0139324 A1 5/2015 Lu et al.
(Continued)

FOREIGN PATENT DOCUMENTS

JP 2008-78979 4/2008
WO 2014/002899 1/2014
(Continued)

OTHER PUBLICATIONS

International Search Report (ISR) issued on Apr. 14, 2020 in International (PCT) Application No. PCT/JP2020/004360.
(Continued)

*Primary Examiner* — Jae N Noh
(74) *Attorney, Agent, or Firm* — Wenderoth, Lind & Ponack, L.L.P.

(57) ABSTRACT

A three-dimensional data encoding method includes: calculating coefficient values from pieces of attribute information of three-dimensional points included in point cloud data; quantizing the coefficient values individually to generate quantized values; and generating a bitstream including the quantized values. Each of the coefficient values belongs to any one of layers. In the quantizing, each of the coefficient values is quantized using a quantization parameter for a layer to which the coefficient value belongs among the layers, and the bitstream includes first information and pieces of second information, the first information indicating a reference quantization parameter, the pieces of second
(Continued)

information being for calculating quantization parameters for the layers from the reference quantization parameter.

20 Claims, 117 Drawing Sheets

Related U.S. Application Data continuation of application No. PCT/JP2020/004360, filed on Feb. 5, 2020.

(60) Provisional application No. 62/807,930, filed on Feb. 20, 2019, provisional application No. 62/801,289, filed on Feb. 5, 2019.

(51) Int. Cl.
*H04N 19/46* (2014.01)
*H04N 19/597* (2014.01)

(56) References Cited

U.S. PATENT DOCUMENTS

| | | | |
|---|---|---|---|
| 2016/0127154 A1* | 5/2016 | Ruiz Delgado | H04L 25/0234 370/328 |
| 2017/0155922 A1* | 6/2017 | Yoo | H04N 19/96 |
| 2017/0347100 A1 | 11/2017 | Chou et al. | |
| 2017/0347122 A1 | 11/2017 | Chou et al. | |
| 2020/0175726 A1 | 6/2020 | Kuma et al. | |
| 2021/0058633 A1* | 2/2021 | Pettersson | H04N 19/119 |
| 2021/0264641 A1* | 8/2021 | Iguchi | H04N 19/20 |

FOREIGN PATENT DOCUMENTS

| | | |
|---|---|---|
| WO | 2014/020663 | 2/2014 |
| WO | 2019/012975 | 1/2019 |

OTHER PUBLICATIONS

George P. Gerdan, et al., "Transforming Cartesian coordinates X,Y,Z to Geographical coordinates φ, λ, h", The Australian Surveyor, vol. 44, No. 1, Jun. 1999.

Extended European Search Report issued Mar. 7, 2022 in corresponding European Patent Application No. 20752819.1

Shao, Yiting et al., "Point Cloud Attribute Compression Using Slice-based Layered Structure", ISO/IEC JTCI/SC29/WG11, MPEG2018/m42463, Apr. 2018.

Ainala, Karthik et al., "An improved enhancement layer for octree based point cloud compression with plane projection approximation", Proceedings of SPIE, vol. 9971, Sep. 2016, pp. 99710R-1 to 99710R-9.

Yiting Shao et al., "Hybrid Point Cloud Attribute Compression Using Slice-Based Layered Structure and Block-Based Intra Prediction", Peking University Shenzhen Graduate School, UMKC, Apr. 2018, pp. 1-10.

Office Action issued Jan. 10, 2023 in corresponding Indian Patent Application No. 202147034910.

* cited by examiner

FIRST SPC

GOS INDEX NUMBER (ENCODING ORDER)

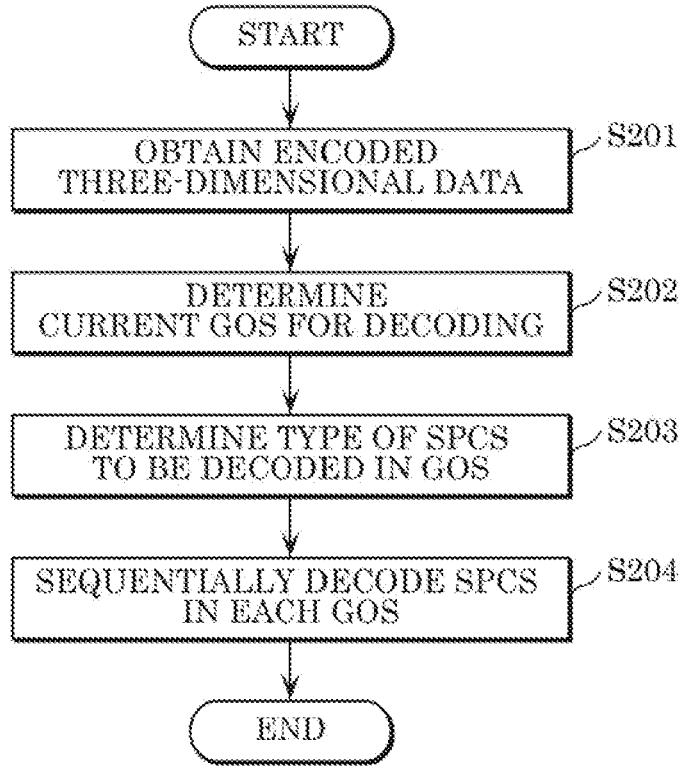

FIG. 41

A  BIT SEQUENCE WHEN SCANNING NODES AND LEAVES BREADTH-FIRST : 10010000 10000001 00000010 leaf1 leaf2 leaf3

B  BIT SEQUENCE WHEN SCANNING NODES AND LEAVES DEPTH-FIRST : 10010000 10000001 leaf1 leaf2 00000010 leaf3

FIG. 46

```
space_header() {
    ...
    for (i=0; i<MaxRefSpc_10;i++) {
        RT_flag_10[i]
        if (RT_flag_10[i]) {
            R_10[i]
            T_10[i]
        }
    }
    ...
    for (i=0; i<MaxRefSpc_11;i++) {
        RT_flag_11[i]
        if (RT_flag_11[i]) {
            R_11[i]
            T_11[i]
        }
    }
    ...
}
```

FIG. 55

| VALUE | BIT |
|---|---|
| 0 | 1 |
| 1 | 010 |
| 2 | 011 |
| 3 | 00100 |
| 4 | 00101 |
| 5 | 00110 |
| 6 | 00111 |
| 7 | 0001000 |
| ... | ... |

FIG. 56

| VALUE | BIT |
|---|---|
| 3 | 00100 |
| 4 | 00101 |
| 5 | 00110 |
| 6 | 00111 |

→ PREFIX  SUFFIX
  00   1   00
       ↑
    TERMINATE
    SYMBOL

FIG. 57

```
attribute_header{
 ...
 NumLoD
 ...
 for (i=0; i<NumLoD; i++) {
  NumOfPoint[i]
 }
 ...
 for (i=0; i<NumLoD-1; i++) {
  Thres_LoD[i]
 }
 ...
 for (i=0; i<NumLoD; i++) {
  NumNeighborPoint[i]
 }
 ...
 for (i=0; i<NumLoD; i++) {
  THd[i]
 }
 ...
 for (i=0; i<NumLoD; i++) {
  QS[i]
 }
 ...
 for (i=0; i<NumLoD; i++) {
  R_TH[i]
 }
 ...
}
```

FIG. 58

```
attribute_data{
 ...
 for (i=0; i<NumLoD; i++) {
  for(j=0; j<NumOfPoint[i]; j++) {
   n-bit code
   if (n-bit code == R_TH[i])
    remaining code
  }
 }
 ...
}
```

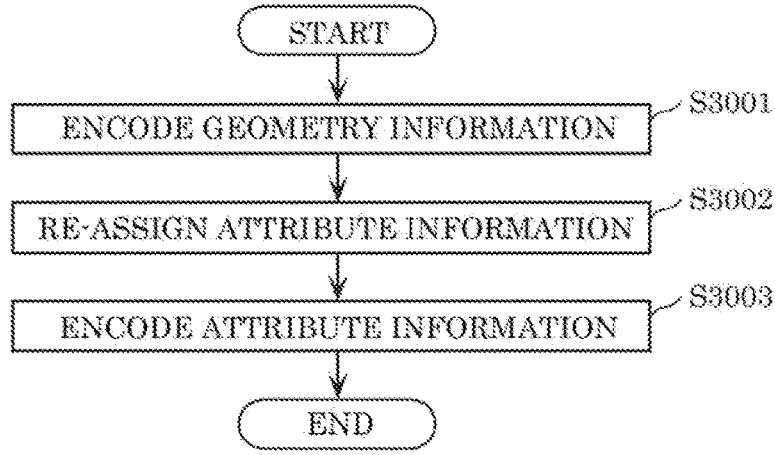
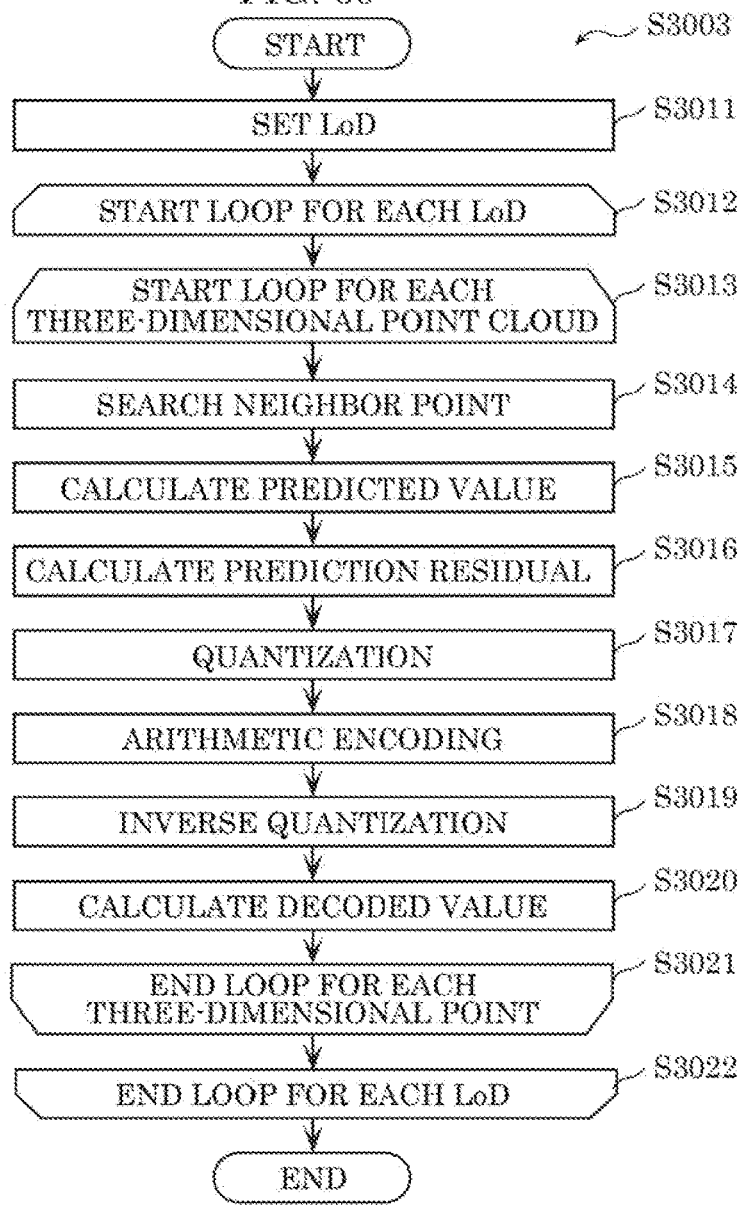

FIG. 61

| VALUE | BIT |
|---|---|
| 3 | 00100 |
| 4 | 00101 |
| 5 | 00110 |
| 6 | 00111 |

PREFIX  SUFFIX
00  1  00
↑
TERMINATE SYMBOL

FIG. 62

| VALUE | BIT |
|---|---|
| 0 | 1 |
| 1 | 010 |
| 2 | 011 |
| 3 | 00100 REVERSE LOOKUP |
| 4 | 00101 |
| 5 | 00110 |
| 6 | 00111 |
| 7 | 0001000 |
| ... | ... |

| PREDICTION MODE | PREDICTED VALUE |
|---|---|
| 0 | AVERAGE VALUE OF a0, a1, a2, b1 |
| 1 | b1 |
| 2 | a2 |
| 3 | a1 |
| 4 | a0 |

FIG. 71

| PREDICTION MODE | PREDICTED VALUE |
|---|---|
| 0 | AVERAGE VALUE OF a0, a1 |
| 1 | a1 |
| 2 | a0 |
| 3 | NOT AVAILABLE |
| 4 | NOT AVAILABLE |

FIG. 72

| PREDICTION MODE | PREDICTED VALUE |
|---|---|
| 0 | AVERAGE VALUE OF a0, a1, a2, b1 (Yave, Uave, Vave) |
| 1 | b1 = (Yb1, Ub1, Vb1) |
| 2 | a2 = (Ya2, Ua2, Va2) |
| 3 | a1 = (Ya1, Ua1, Va1) |
| 4 | a0 = (Ya0, Ua0, Va0) |

FIG. 73

| PREDICTION MODE | PREDICTED VALUE |
|---|---|
| 0 | AVERAGE VALUE OF a0, a1, a2, b1 Rave |
| 1 | b1 = Rb1 |
| 2 | a2 = Ra2 |
| 3 | a1 = Ra1 |
| 4 | a0 = Ra0 |

| ZeroCnt | BINARIZED DATA |
|---|---|
| 0 | 0 |
| 1 | 10 |
| 2 | 110 |
| ... | ... |
| T-1 | 11111...10 |
| T | 11111...11 |

FIG. 79

```
attribute_data {
...
ZeroCnt
for (i=0; i<NumOfPoint; i++) {
 if (layerL >= TH_layer) {
  if (ZeroCnt > 0 ) {
   for (j=0; j<attribute_dimension; j++)
      value[j][i] = 0
   --ZeroCnt
  }
  else {
     for (j=0; j<attribute_dimension; j++)
       value[j][i]
     for(d=1, j=1; j<attribute_dimension; j++)
       if (value[j][i] != value[j-1][i])
         d = 0
     for(j=0; j< attribute_dimension; j++ )
       value[j][i] += d
     ZeroCnt
  }
 }
 else {
  if (ZeroCnt > 0 ) {
   value[0][i] = 0
   --ZeroCnt
  }
  else {
   value[0][i]
   value[0][i] += 1
    ZeroCnt
  }
 }
}
...
}
```

FIG. 80

| FIRST DIMENSIONAL COMPONENT (R COMPONENT, v0) | : 73 50 32 15 0 12 0 0 0 ... 0 |
| SECOND DIMENSIONAL COMPONENT (G COMPONENT, v1) | : 60 20 0 0 0 10 0 0 0 ... 0 |
| THIRD DIMENSIONAL COMPONENT (B COMPONENT, v2) | : 58 10 12 0 0 12 0 0 0 ... 0 |

↓

| 0 | 73 | 60 | 58 | 0 | 50 | 20 | 10 | 0 | 32 | 0 | 12 | ... |
|---|----|----|----|---|----|----|----|---|----|---|----|-----|
|   | v0 | v1 | v2 |   | v0 | v1 | v2 |   | v0 | v1| v2 |     |

| ... | 0 | 15 | 0 | 0 | 1 | 12 | 10 | 12 | N |
|-----|---|----|---|---|---|----|----|----|---|
|     | ZeroCnt | v0 | v1 | v2 | ZeroCnt | v0 | v1 | v2 | ZeroCnt |

<      DEFAULT VALUE      >

```
GPS0{
  gps_idx ..PCC frame number
  sps_idx gps_information()
  QP_value //defalt_value tile_slice_num //0..NO
  divide for(tile_slice_num){
    tile_idx
    slice_idx
    gps_slice_tile_information()
  }
}
```

FIG. 107

```
APS(){
    aps_idx ..PCC frame Number
    gps_idx ..PCC frame Number num_of_attribute
    for(num_of_attribute){
        attribute_type  //color, reflectance
        aps_information()

tile_slice_num  //0..no divide
        for(tile_slice_num){
            tile_idx
            slice_idx
            QP_delta_Attribute_to_Geometry
            if(attribute_type==color){
                QP_delta_Cb_to_Y
                QP_delta_Cr_to_Y
            }
            aps_slice_tile_information()
        }
    }
}
```

FIG. 108

```
Geometry_header(){
    gps_idx
    offset
    QP_delta_data_to_frame
    if(tile){
        tile_type
        tile_idx
    }
    if(slice){
        slice_type
        slice_idx
    }
}
```

FIG. 109

```
Attribute_header(){
   aps_idx
   offset
    attribute_type
   QP_delta_data_to_frame
   if(attribute_type==color){
      QP_delta_Cb_to_frame
      QP_delta_Cr_to_frame
   }
   if(tile){
      tile_type
      tile_idx
   }
   if(slice){
      slice_type
      slice_idx
   }
}
```

FIG. 119

```
APS(){
  aps_idx
  sps_idx
  num_of_attribute
  for(int i=0;i>num_of_attribute ; i++){
    attribute_type //color, reflectance
    aps_information()
    if(attribute_type==color){                          ⎫
      QP_value_Luma                                     ⎪
      QP_delta_Cb_to_Luma                               ⎪
      QP_delta_Cr_to_Luma                               ⎪
      data_QP_delta_present_flag                        ⎬ 6701
    }else if(attribute_type==refrectance){              ⎪
      QP_value                                          ⎪
      data_QP_delta_present_flag                        ⎪
    }else{                                              ⎪
      //No QP value                                     ⎪
    }                                                   ⎭
  }
}
```

```
Attribute_header(){
  aps_idx
  sps_idx
  geom_data_id
  offset
  attribute_type
  if(data_QP_delta_present_flag){                       ⎫
    if(attribute_type==color){                          ⎪
      QP_delta_data_to_frame                            ⎪
      QP_delta_Cb_to_frame                              ⎪
      QP_delta_Cr_to_frame                              ⎬ 6702
    }elseif(attribute_type==refrectance){               ⎪
      QP_delta_data_to_frame                            ⎪
    }else{                                              ⎪
      //No QP value                                     ⎪
    }                                                   ⎭
  }
}
```

FIG. 120

```
APS0{
  aps_idx
  sps_idx aps_information()
    QP_value
    QP_delta1
    QP_delta2
    data_QP_delta_present_flag
  }
}
```

FIG. 121

```
Attribute_header0{
  aps_idx
  sps_idx
  geom_data_id
  offset
  if(data_QP_delta_present_flag){
    QP_delta_data_to_frame
    QP_delta1_to_frame
    QP_delta2_to_frame
  }
}
```

FIG. 137

```
Attribute header information(){
 QPbase
 NumLayer
 for (i=0; i<NumLayer; i++) {
  Delta_Layer[i]
 }
}
```

FIG. 138

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
}
```

FIG. 140

```
Attribute header information(){
  QPbase
  NumLayer
  for (i=0; i<NumLayer; i++) {
    Delta_Layer[i]
  }
  NumADelta
  for (i=0; i<NumADelta; i++) {
    NumPointADelta[i]
    ADelta_QP[i]
  }
}
```

FIG. 141

```
Attribute header information(){
  QPbase
  delta_Layer_present_flag
  if (delta_Layer_present_flag) {
    NumLayer
    for (i=0; i<NumLayer; i++) {
      Delta_Layer[i]
    }
  }
  additional_delta_QP_present_flag
  if (additional_delta_QP_present_flag) {
    NumADelta_minus1
    for (i=0; i<NumADelta; i++) {
      NumPointADelta[i]
      ADelta_QP[i]
    }
  }
}
```

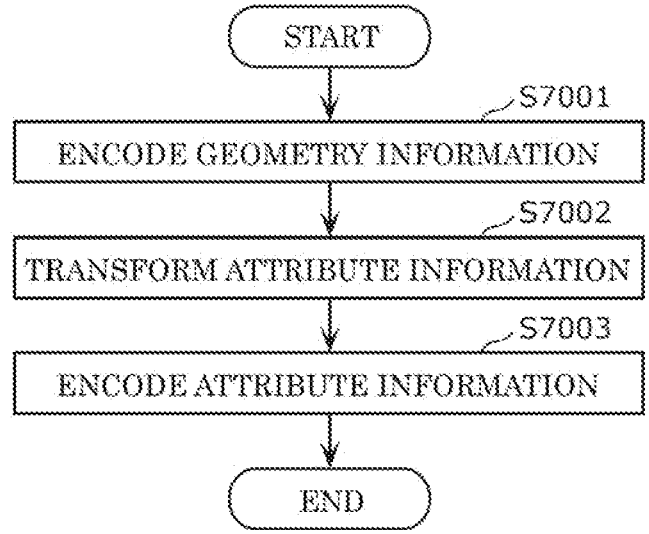

```
Attribute header information(){
 QPbase
 NumLayer
 for (i=0; i<NumLayer; i++) {
  Delta_Layer[i]
 }
 NumADelta
 for (i=0; i<NumADelta; i++) {
  NumPointADelta[i]
  ADelta_QP[i]
 }
}
```

FIG. 151

```
Attribute header information(){
 QPbase
 delta_Layer_present_flag
 if (delta_Layer_present_flag) {
  NumLayer
  for (i=0; i<NumLayer; i++) {
   Delta_Layer[i]
  }
 }
 additional_delta_QP_present_flag
 if (additional_delta_QP_present_flag) {
  NumADelta_minus1
  for (i=0; i<NumADelta; i++) {
   NumPointADelta[i]
   ADelta_QP[i]
  }
 }
}
```

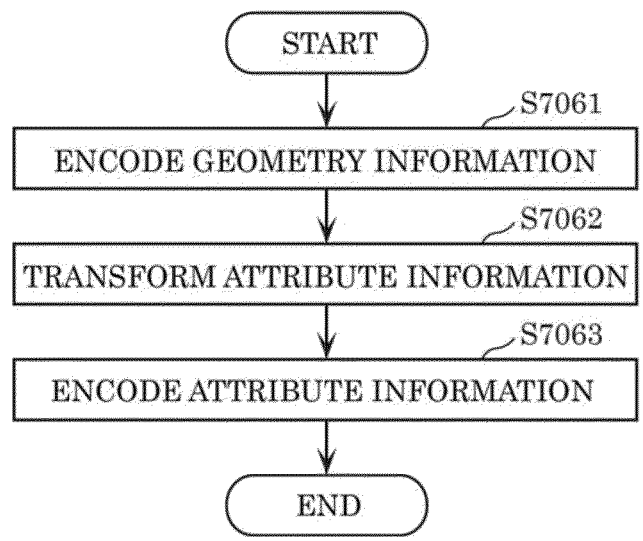

FIG. 152

ASSIGN ONE OF TWO POINTS INCLUDED IN node[0] THAT HAS VALUE CLOSER TO AVERAGE VALUE TO LoD0, AND ASSIGN THE OTHER TO LoD1

ASSIGN ONE POINT INCLUDED IN node[0] TO LoD0

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a continuation of U.S. application Ser. No. 17/390,194, filed Jul. 30, 2021, which is a U.S. continuation application of PCT International Patent Application Number PCT/JP2020/004360 filed on Feb. 5, 2020, claiming the benefit of priority of US Patent Application Nos. 62/801,289 filed on Feb. 5, 2019 and 62/807,930 filed on Feb. 20, 2019, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point group in a three-dimensional space. In the point cloud scheme, the positions and colors of a point group are stored. While point cloud is expected to be a mainstream method of representing three-dimensional data, a massive amount of data of a point group necessitates compression of the amount of three-dimensional data by encoding for accumulation and transmission, as in the case of a two-dimensional moving picture (examples include Moving Picture Experts Group 4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle is known (for example, see International Publication WO 2014/020663).

SUMMARY

There has been a demand for appropriately performing encoding in three-dimensional data encoding.

The present disclosure has an object to provide a three-dimensional data encoding method, a three-dimensional data decoding method, a three-dimensional data encoding device, or a three-dimensional data decoding device that is capable of appropriately performing encoding.

In accordance with an aspect of the present application, a three-dimensional data encoding method includes: calculating coefficient values from pieces of attribute information of three-dimensional points included in point cloud data; quantizing the coefficient values individually to generate quantized values; and generating a bitstream including the quantized values, wherein each of the coefficient values belongs to any one of layers, in the quantizing, each of the coefficient values is quantized using a quantization parameter for a layer to which the coefficient value belongs among the layers, and the bitstream includes first information and pieces of second information, the first information indicating a reference quantization parameter, the pieces of second information being for calculating quantization parameters for the layers from the reference quantization parameter.

In accordance with another aspect of the present application, a three-dimensional data decoding method includes: calculating quantization parameters for layers, using (i) first information indicating a reference quantization parameter and (ii) pieces of second information for calculating the quantization parameters for the layers from the reference quantization parameter, the first information and the pieces of second information being included in a bitstream; inverse-quantizing each of quantized values included in the bitstream, using a quantization parameter for a layer to which the quantized value belongs among the quantization parameters calculated in the calculating, to generate coefficient values; and calculating, from the coefficient values generated in the inverse-quantizing, pieces of attribute information of three-dimensional points included in point cloud data.

The present disclosure can provide a three-dimensional data encoding method, a three-dimensional data decoding method, a three-dimensional data encoding device, or a three-dimensional data decoding device that is capable of appropriately performing encoding.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a flowchart of decoding processes according to Embodiment 1;

FIG. 10 is a diagram showing an example of meta information according to Embodiment 1;

FIG. 41 is a diagram showing an example of bit sequences of the volume according to Embodiment 7;

FIG. 46 is a diagram showing an example syntax of an RT flag and RT information according to Embodiment 7;

FIG. 55 is a diagram illustrating examples of exponential-Golomb codes according to Embodiment 8;

FIG. 56 is a diagram indicating a process on exponential-Golomb codes according to Embodiment 8;

FIG. 57 is a diagram indicating an example of a syntax in attribute header according to Embodiment 8;

FIG. 58 is a diagram indicating an example of a syntax in attribute data according to Embodiment 8;

FIG. 59 is a flowchart of a three-dimensional data encoding process according to Embodiment 8;

FIG. 60 is a flowchart of an attribute information encoding process according to Embodiment 8;

FIG. 61 is a diagram indicating processing on exponential-Golomb codes according to Embodiment 8;

FIG. 62 is a diagram indicating an example of a reverse lookup table indicating relationships between remaining codes and the values thereof according to Embodiment 8;

FIG. 71 is a diagram showing a second example of a table representing predicted values calculated in the prediction modes according to Embodiment 9;

FIG. 72 is a diagram showing a third example of a table representing predicted values calculated in the prediction modes according to Embodiment 9;

FIG. 73 is a diagram showing a fourth example of a table representing predicted values calculated in the prediction modes according to Embodiment 9;

FIG. 79 is a diagram showing a syntax example of the attribute information according to Embodiment 10;

FIG. 80 is a diagram showing an example of a coding coefficient and ZeroCnt according to Embodiment 10;

FIG. 107 is a diagram illustrating a syntax example of APS according to Embodiment 11;

FIG. 108 is a diagram illustrating a syntax example of a header of geometry information according to Embodiment 11;

FIG. 109 is a diagram illustrating a syntax example of a header of attribute information according to Embodiment 11;

FIG. 119 is a diagram showing a first example of a syntax of APS and a syntax of a header of attribute information according to Embodiment 12;

FIG. 120 is a diagram showing a second example of the syntax of APS according to Embodiment 12;

FIG. 121 is a diagram showing a second example of the syntax of the header of attribute information according to Embodiment 12;

FIG. 122 is a diagram showing a relationship between SPS, APS, and the header of attribute information according to Embodiment 12;

FIG. 123 is a flowchart of an encoding process according to Embodiment 12;

FIG. 124 is a flowchart of a decoding process according to Embodiment 12;

FIG. 125 is a block diagram showing a configuration of a three-dimensional data encoding device according to Embodiment 13;

FIG. 126 is a block diagram showing a configuration of a three-dimensional data decoding device according to Embodiment 13;

FIG. 127 is a diagram showing an example of the setting of LoDs according to Embodiment 13;

FIG. 128 is a diagram showing an example of a hierarchical structure of RAHT according to Embodiment 13;

FIG. 129 is a block diagram of a three-dimensional data encoding device according to Embodiment 13;

FIG. 130 is a block diagram of a divider according to Embodiment 13;

Figure 131:
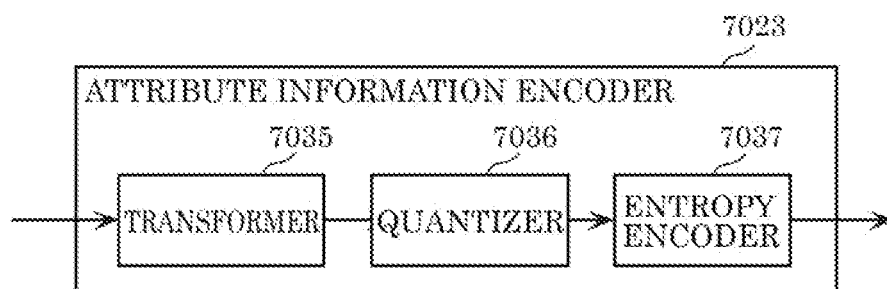
Figure 132:
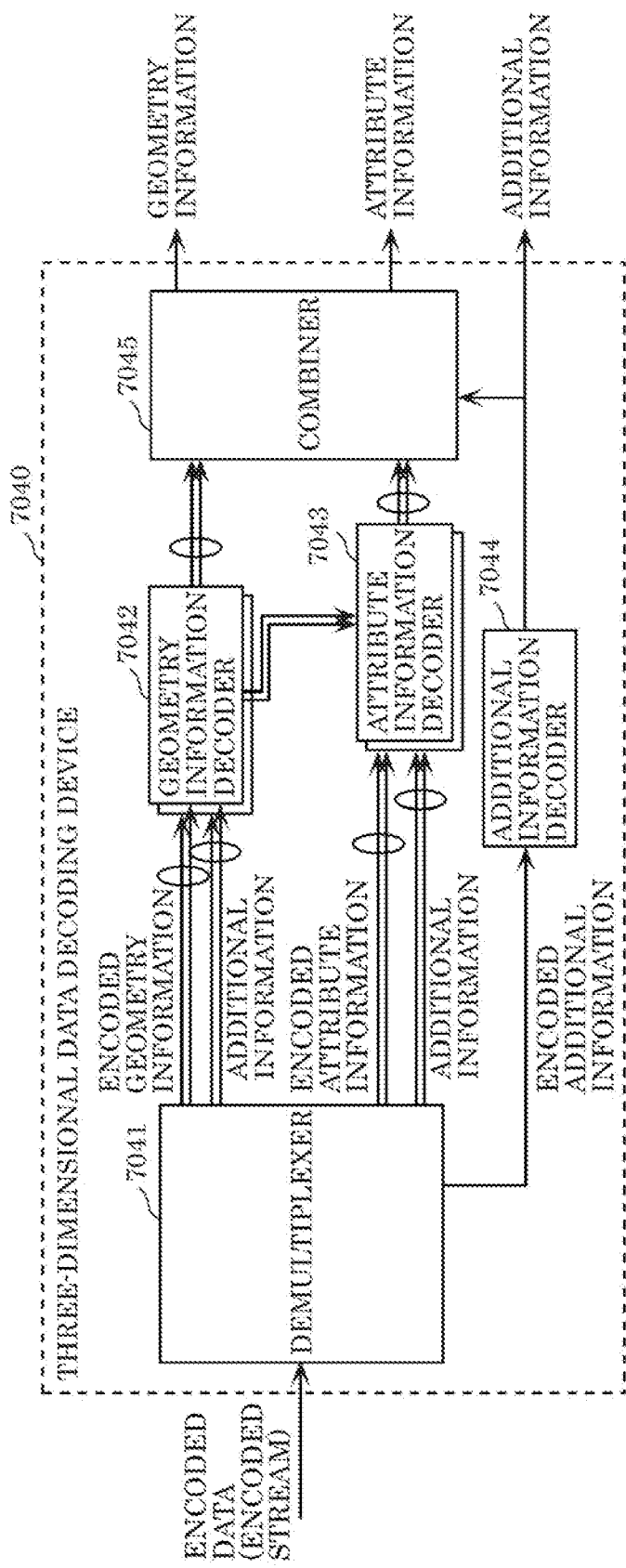
Figure 133:
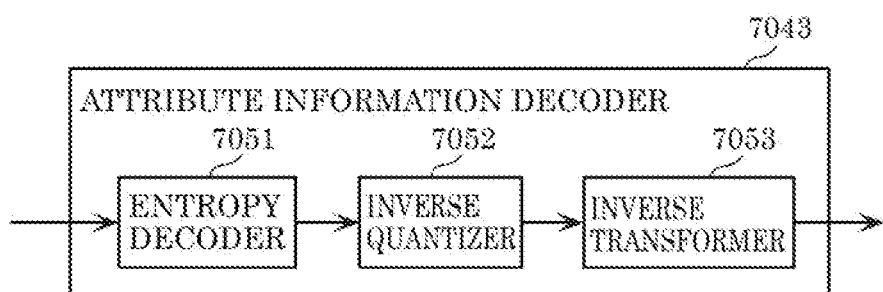
Figure 134:
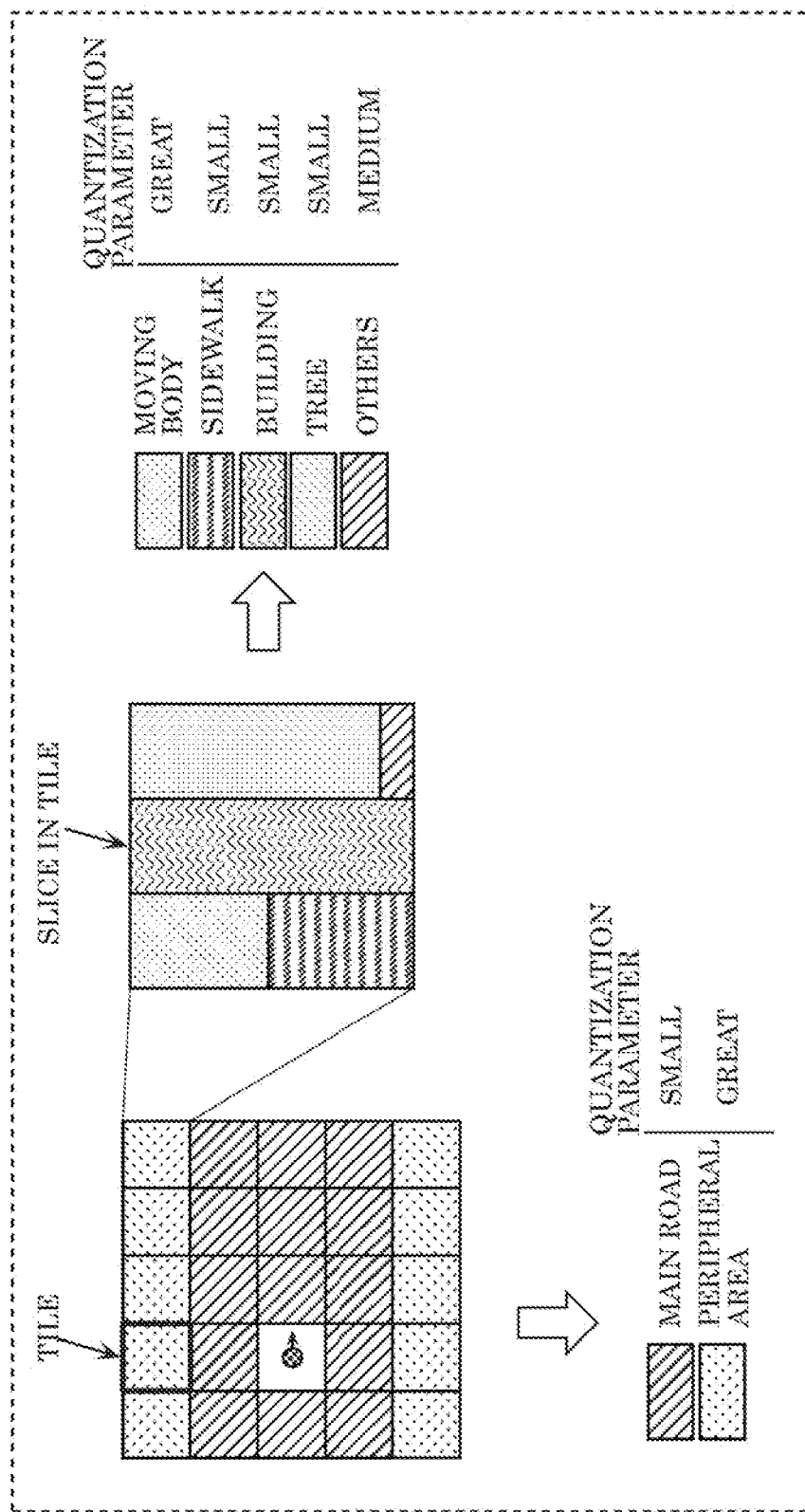
Figure 135:
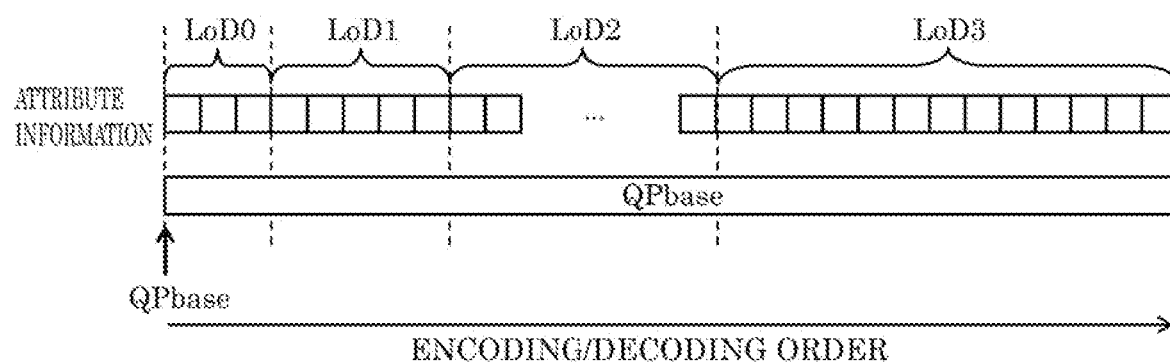
Figure 136:
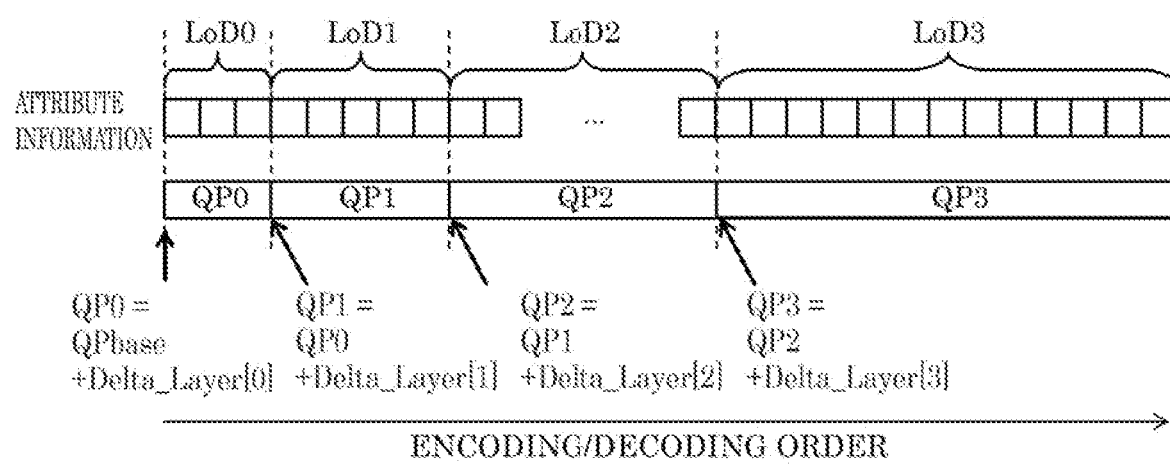
Figure 139:
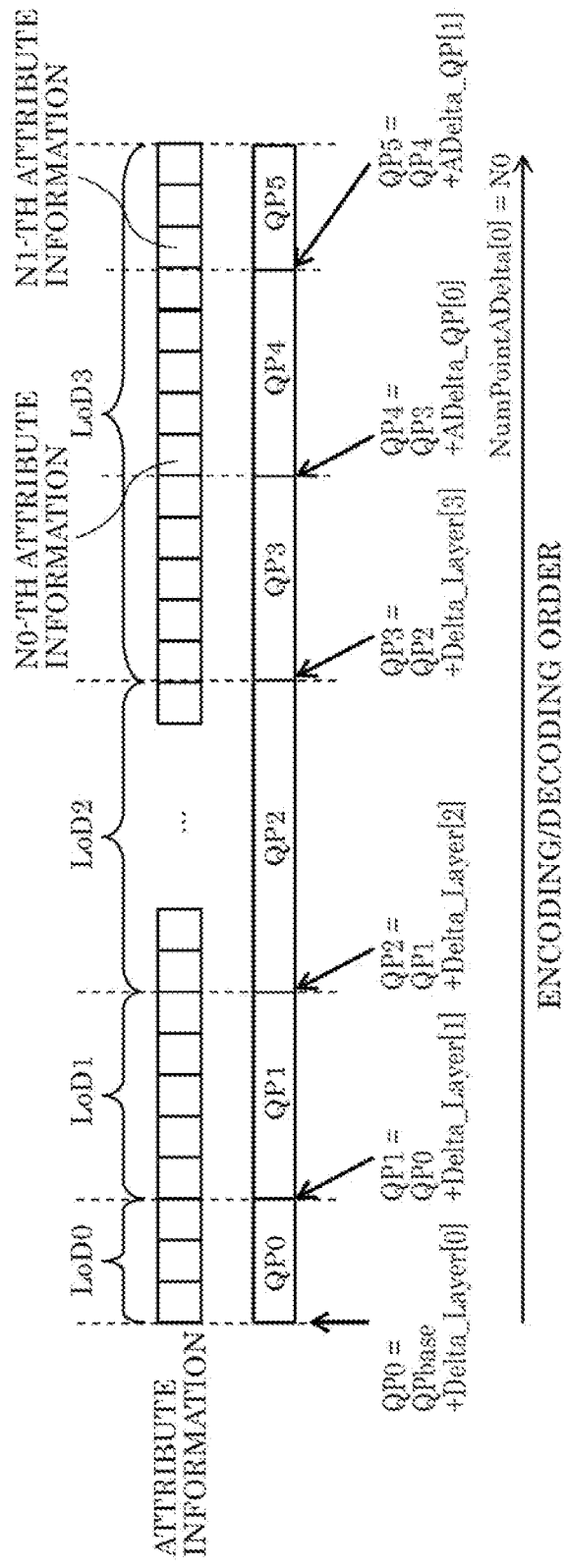
Figure 143:
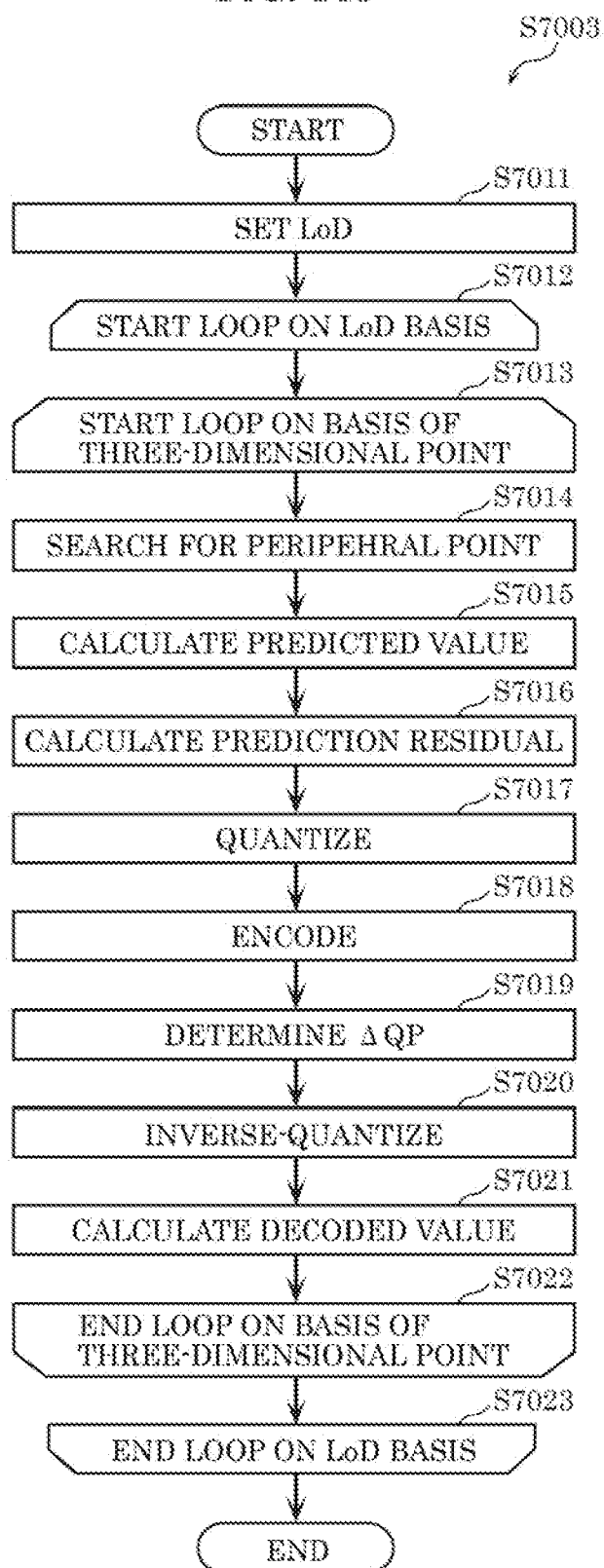
Figure 144:
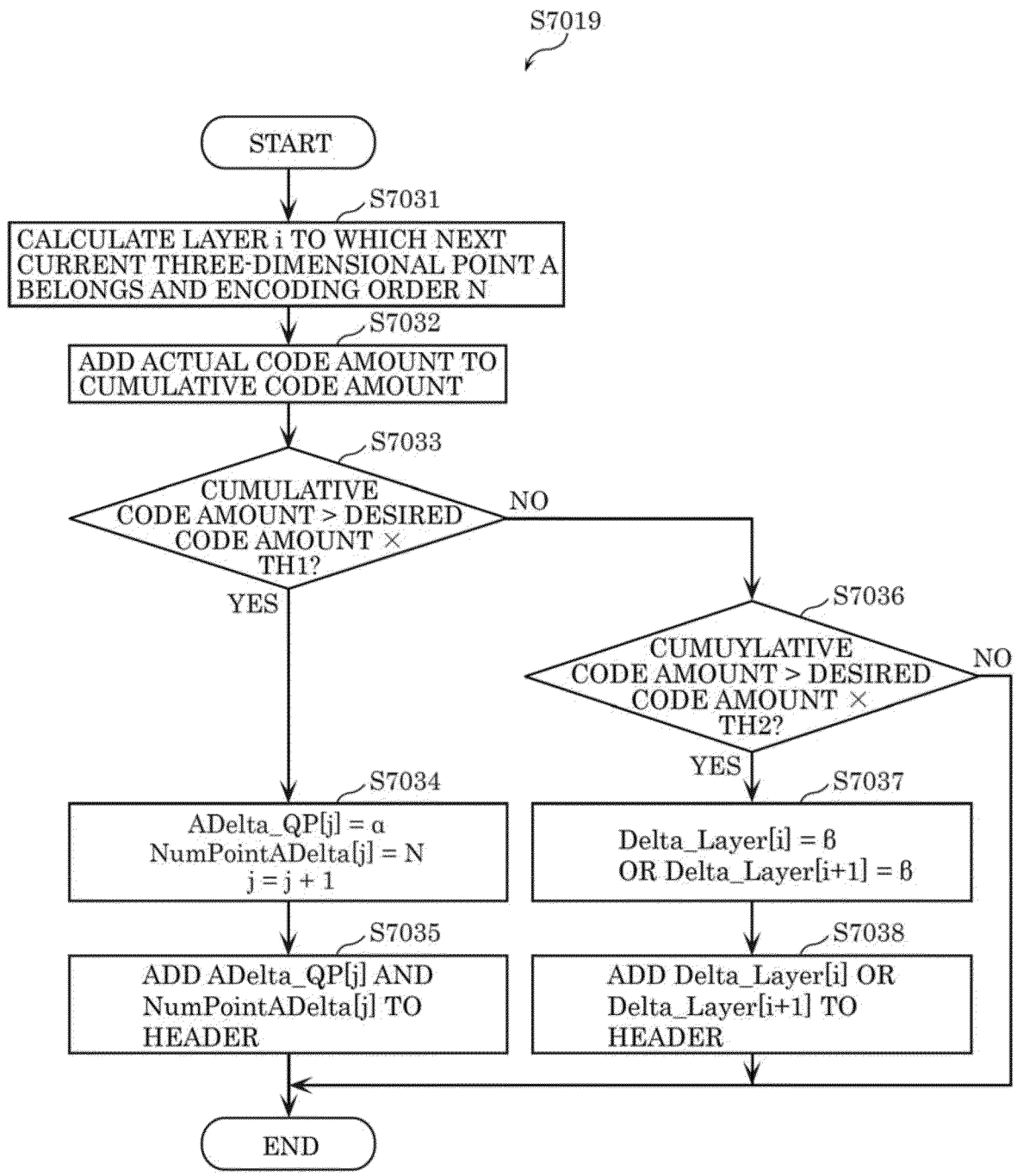
Figure 145:
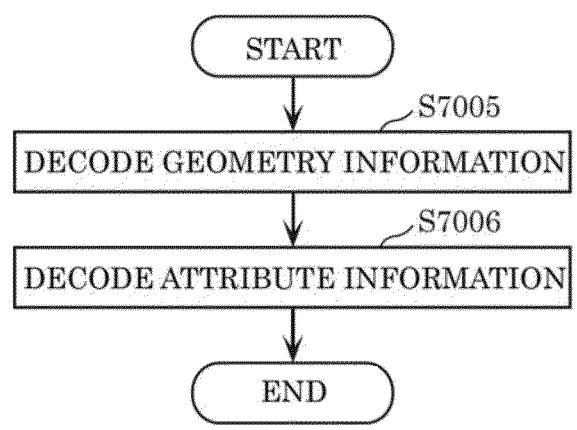
Figure 146:
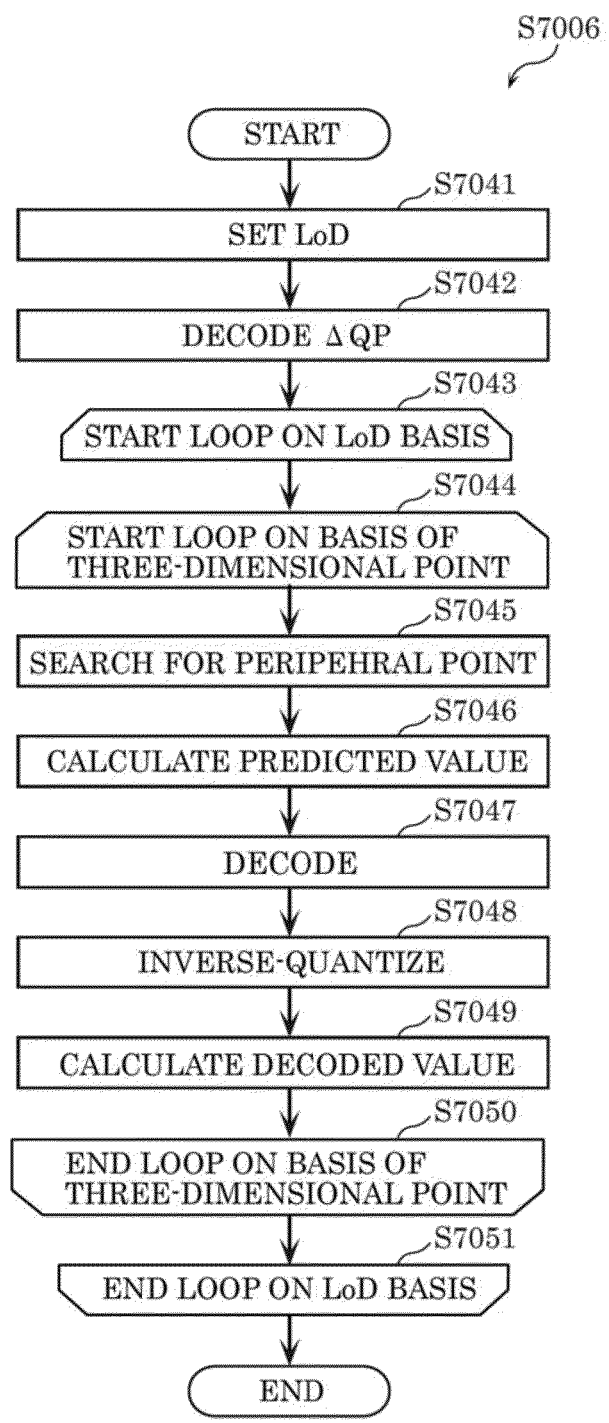
Figure 147:
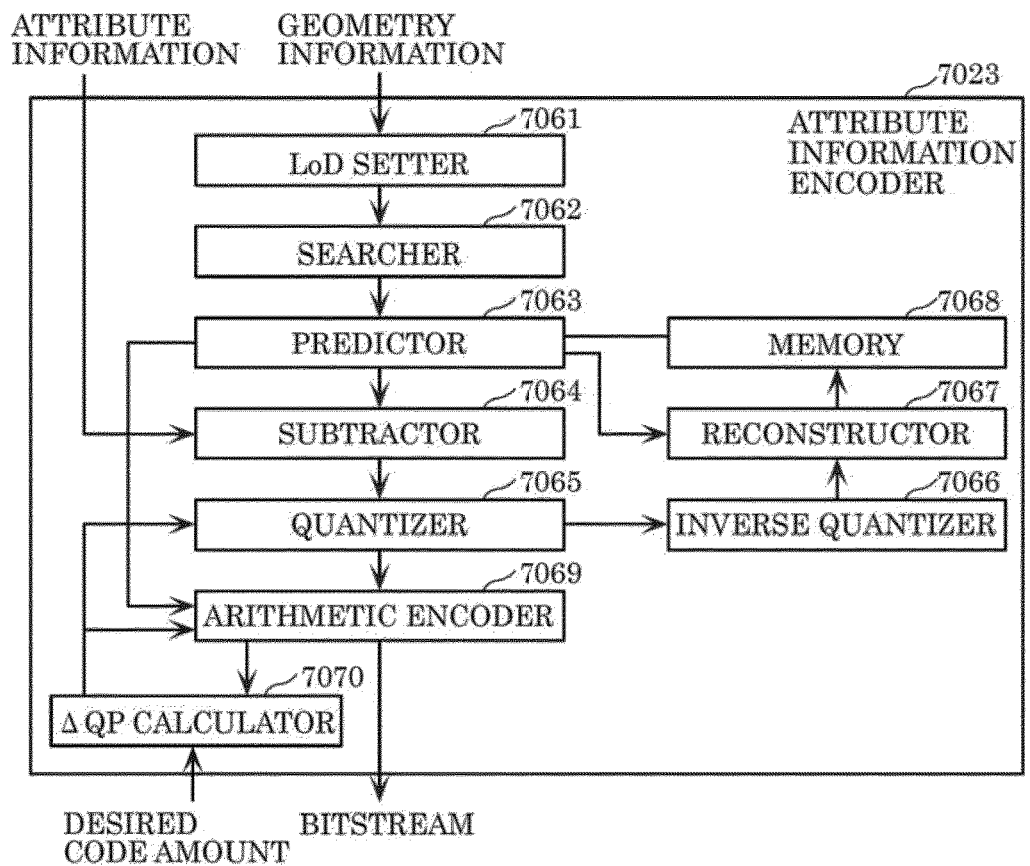
Figure 148:
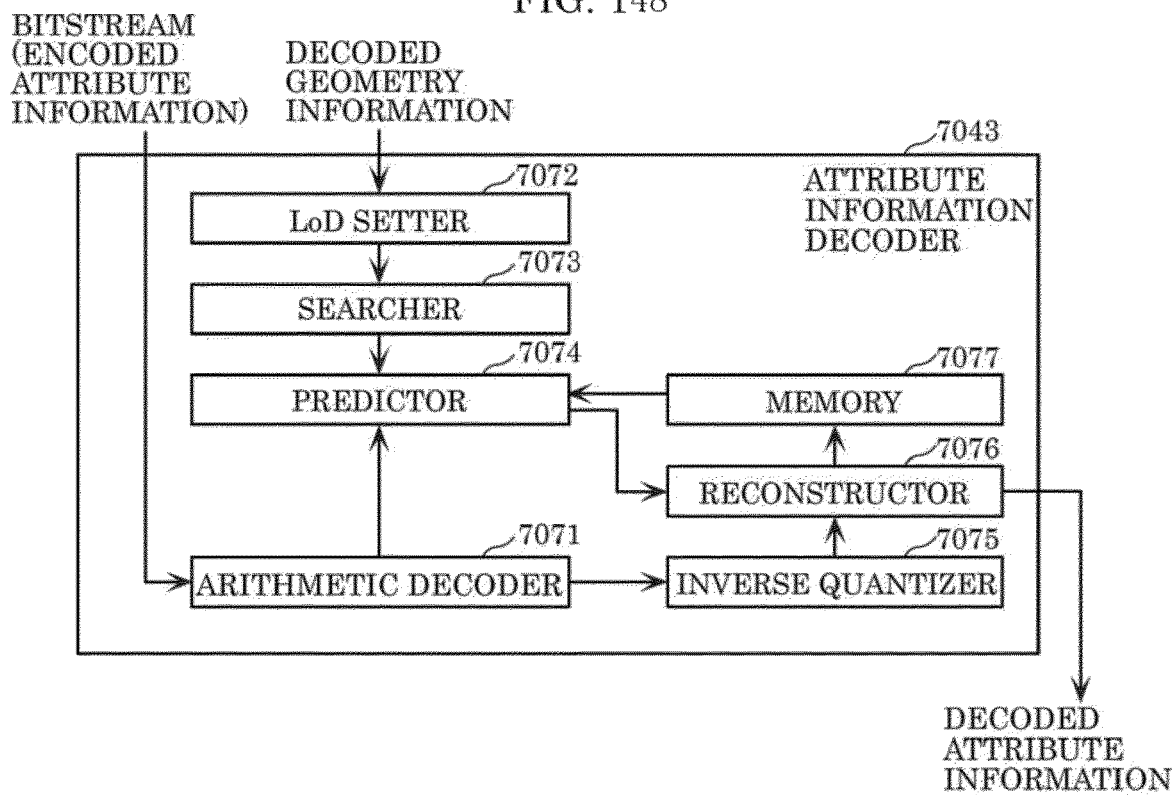
Figure 149:
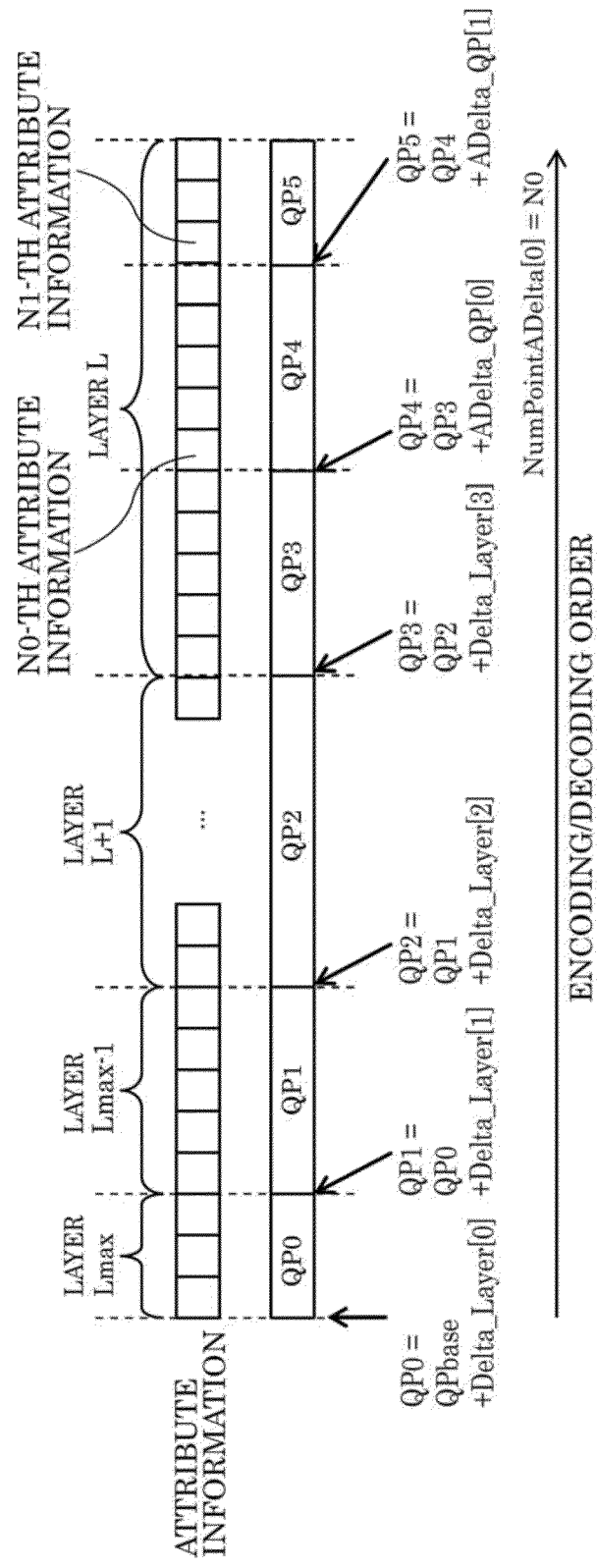
Figure 153:
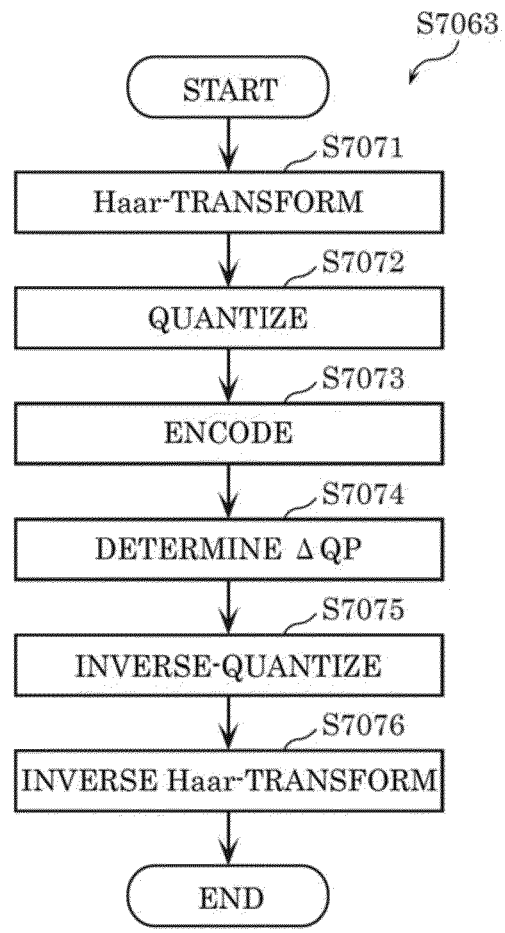
Figure 154:
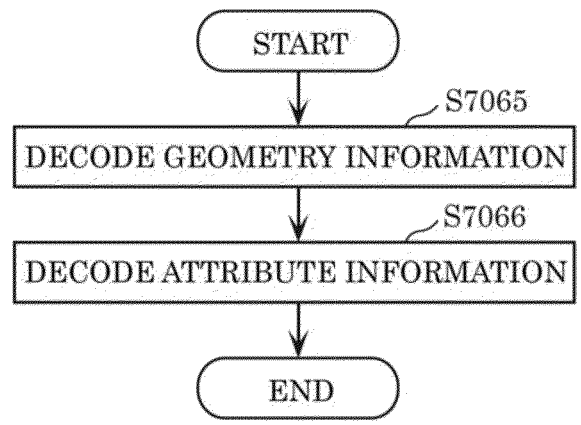
Figure 155:
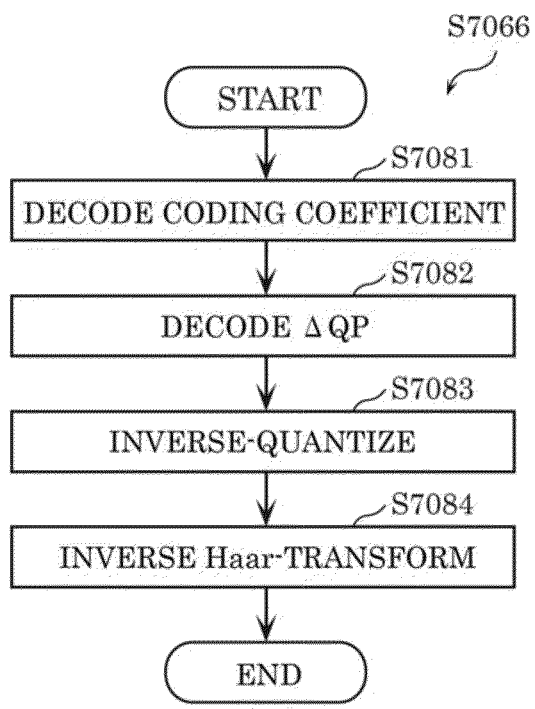
Figure 156:
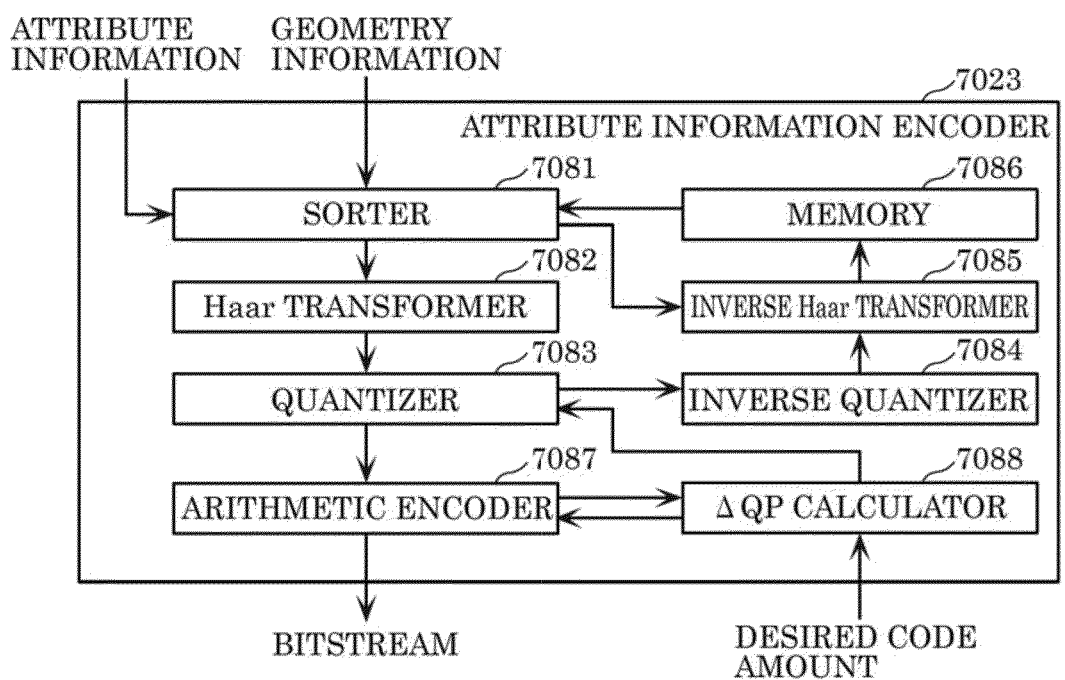
Figures 157, 158:
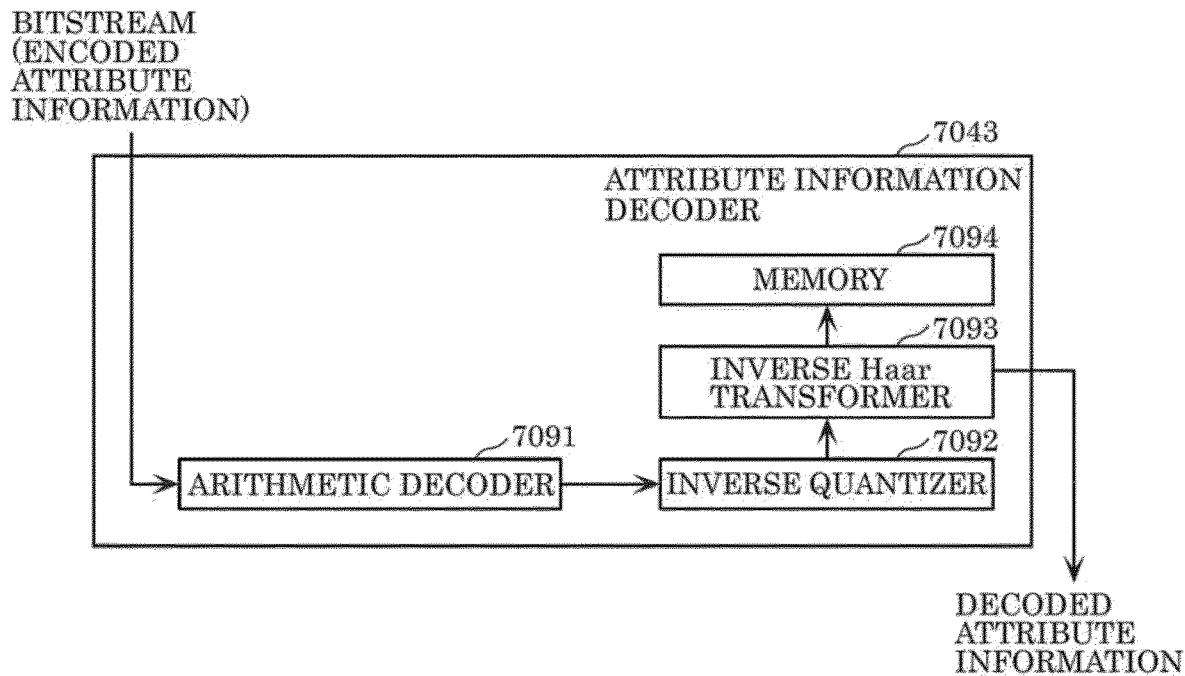
Figure 159:
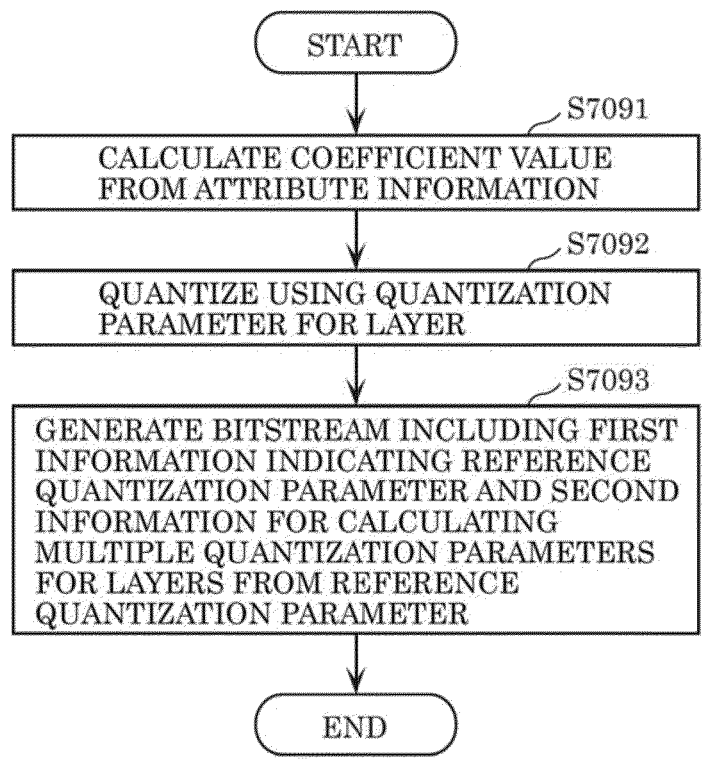
Figure 160:
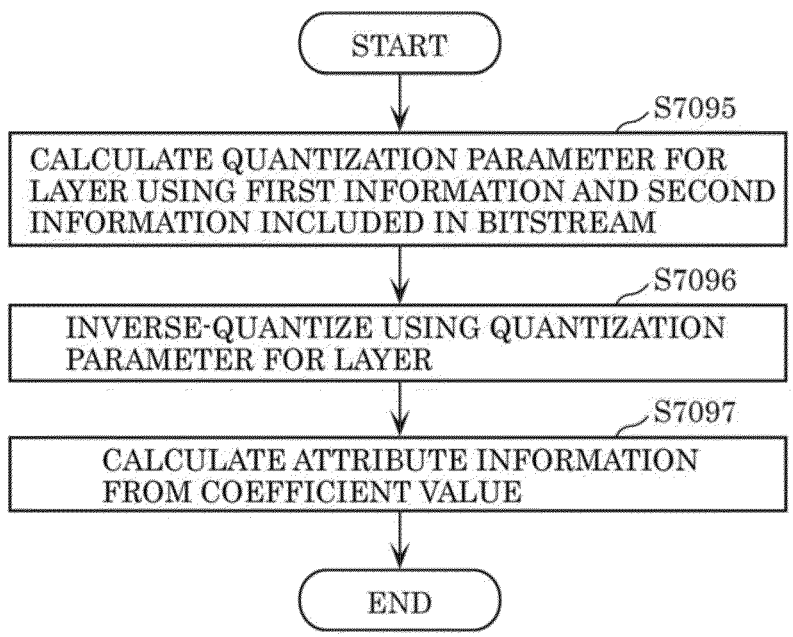
Figure 161:
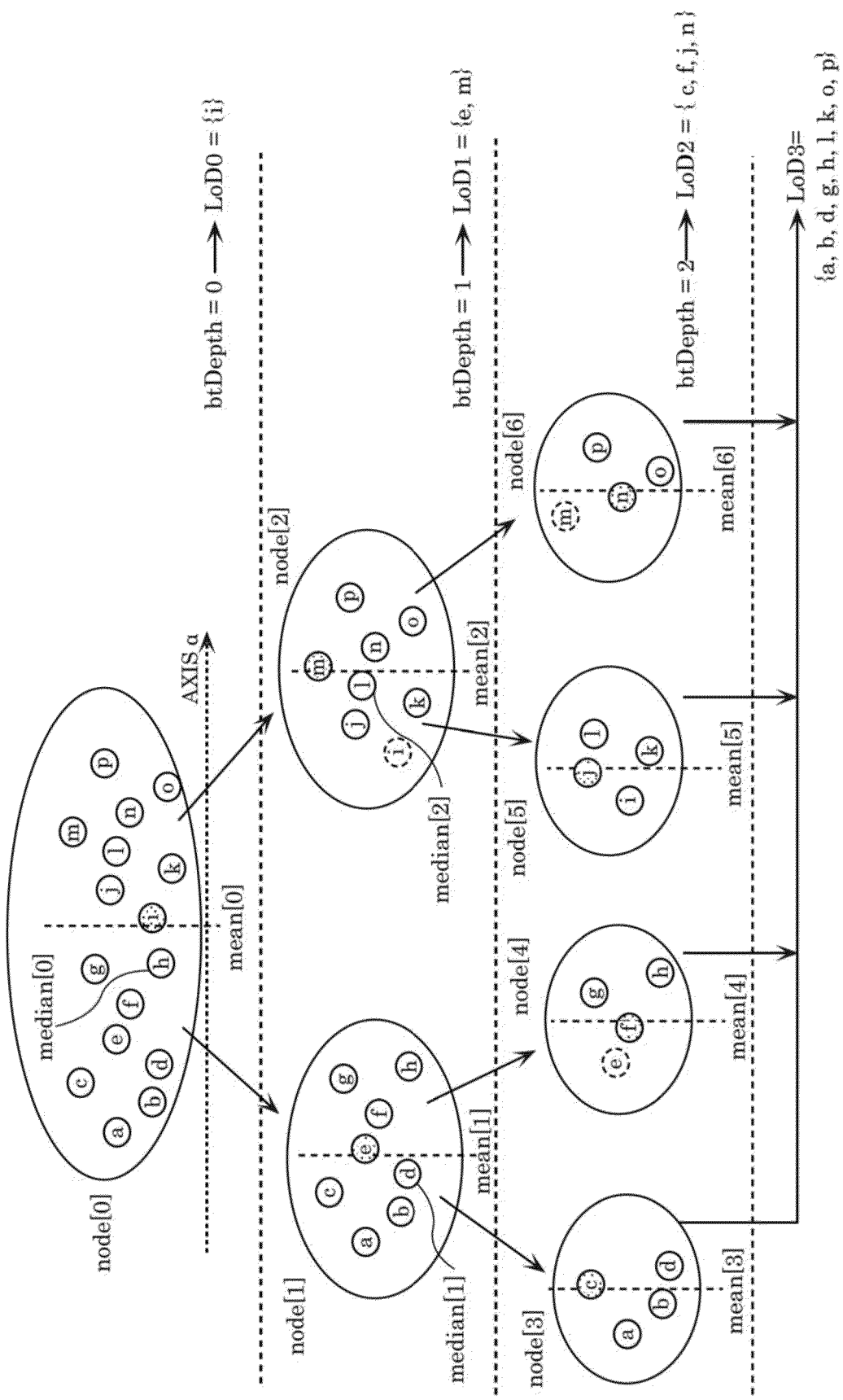
Figure 162:
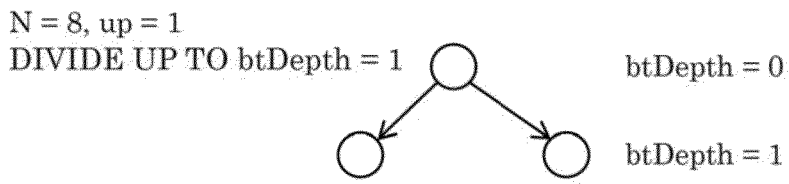
Figure 163:
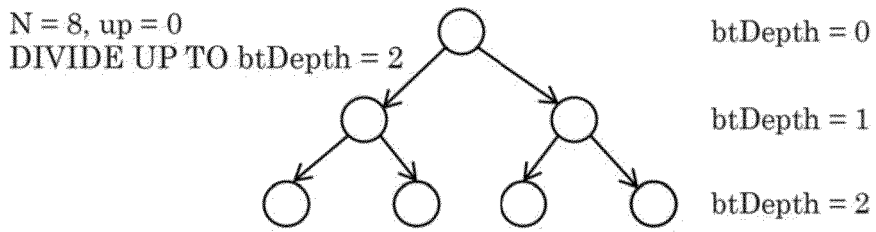
Figure 164:
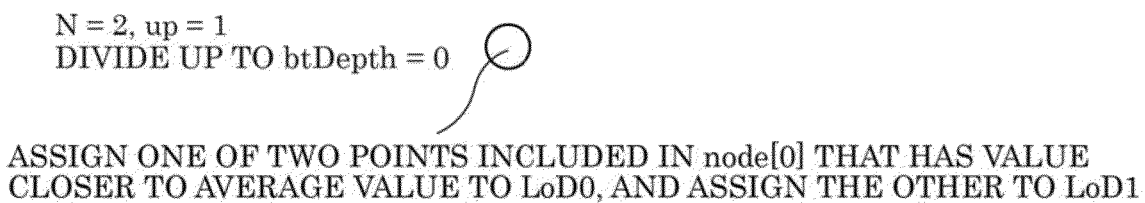
Figure 165:
Figure 166:
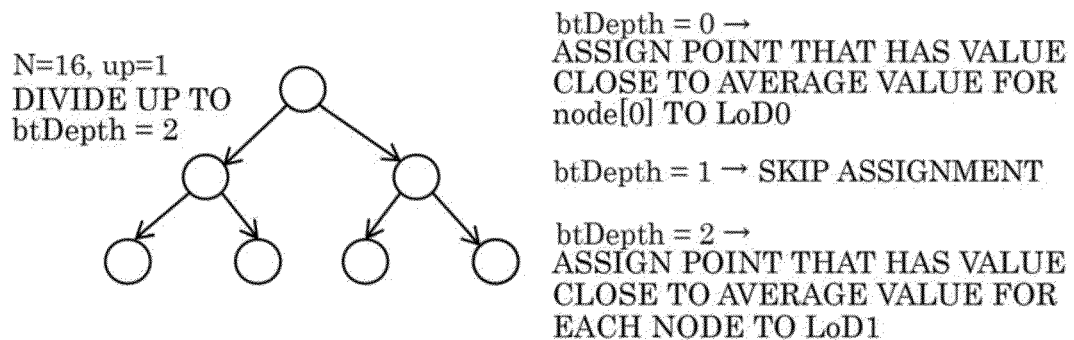
Figure 167:
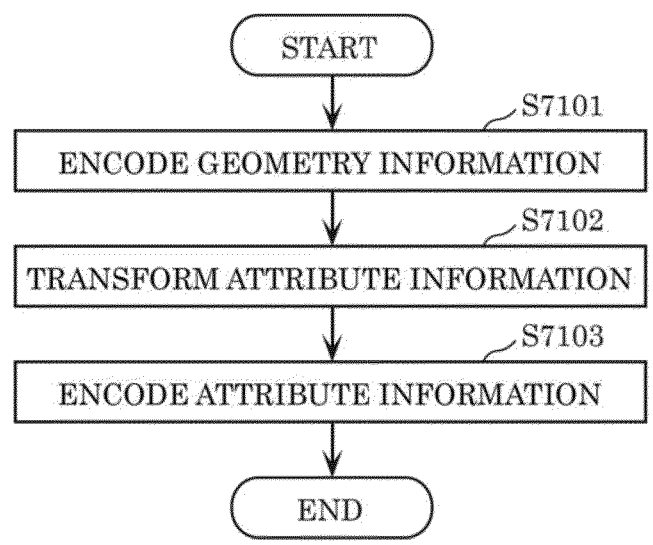
Figure 168:
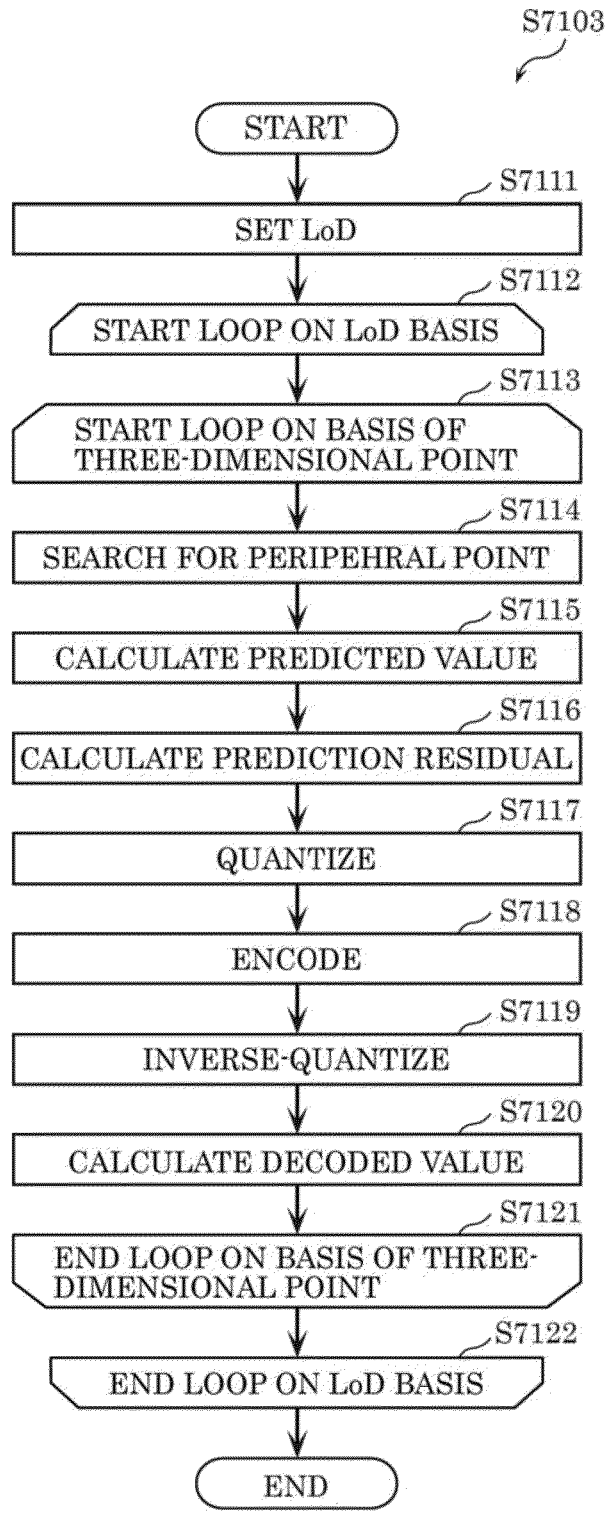
Figure 169:
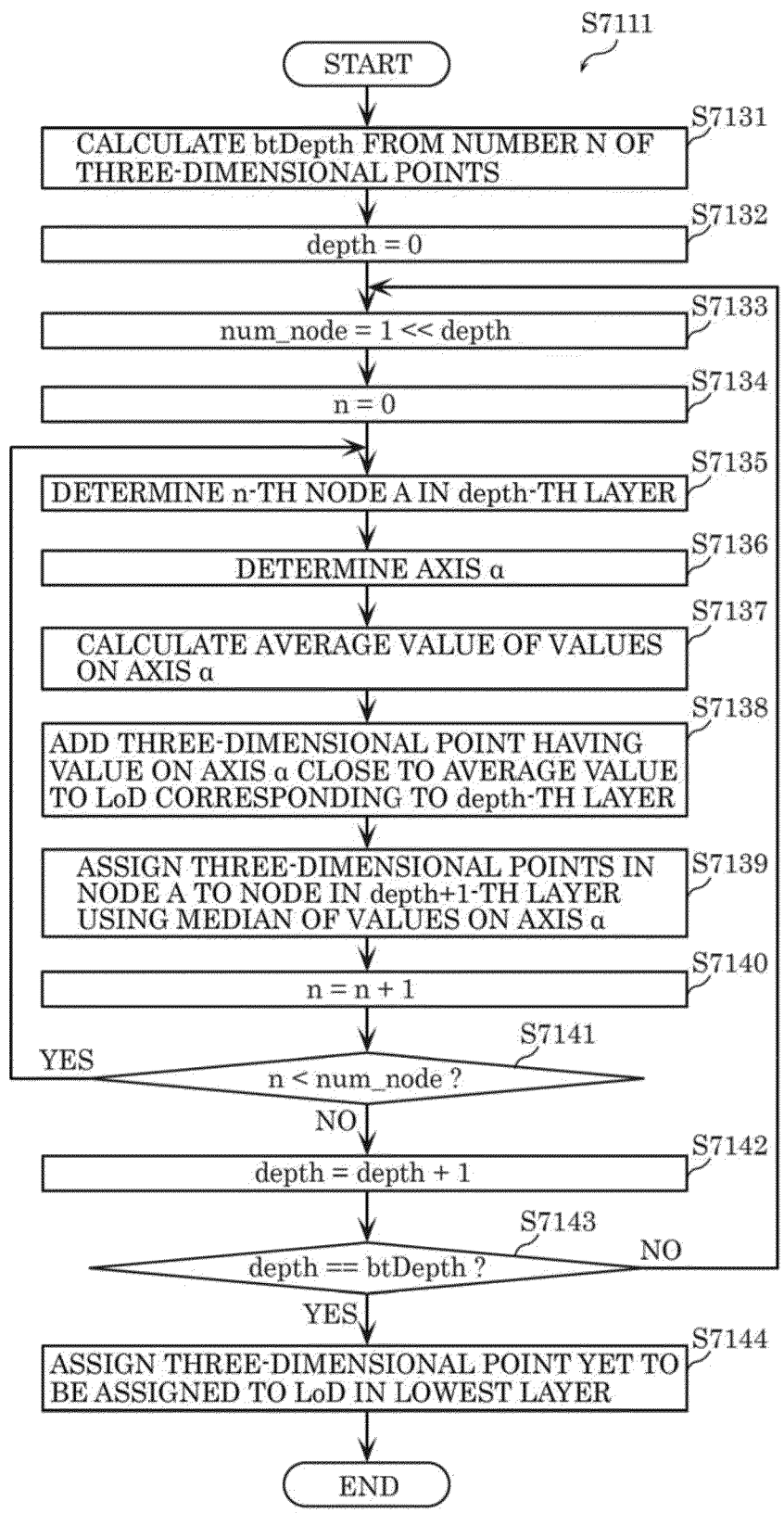
Figure 170:
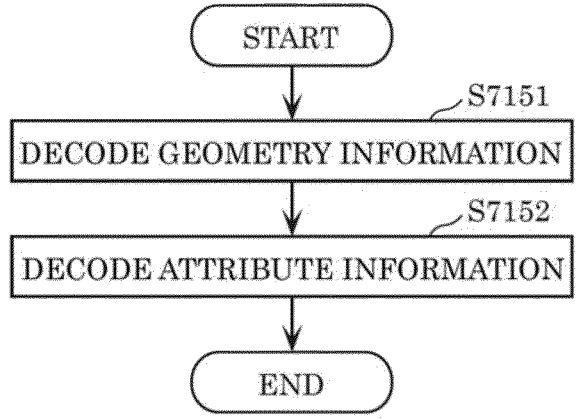
Figure 171:
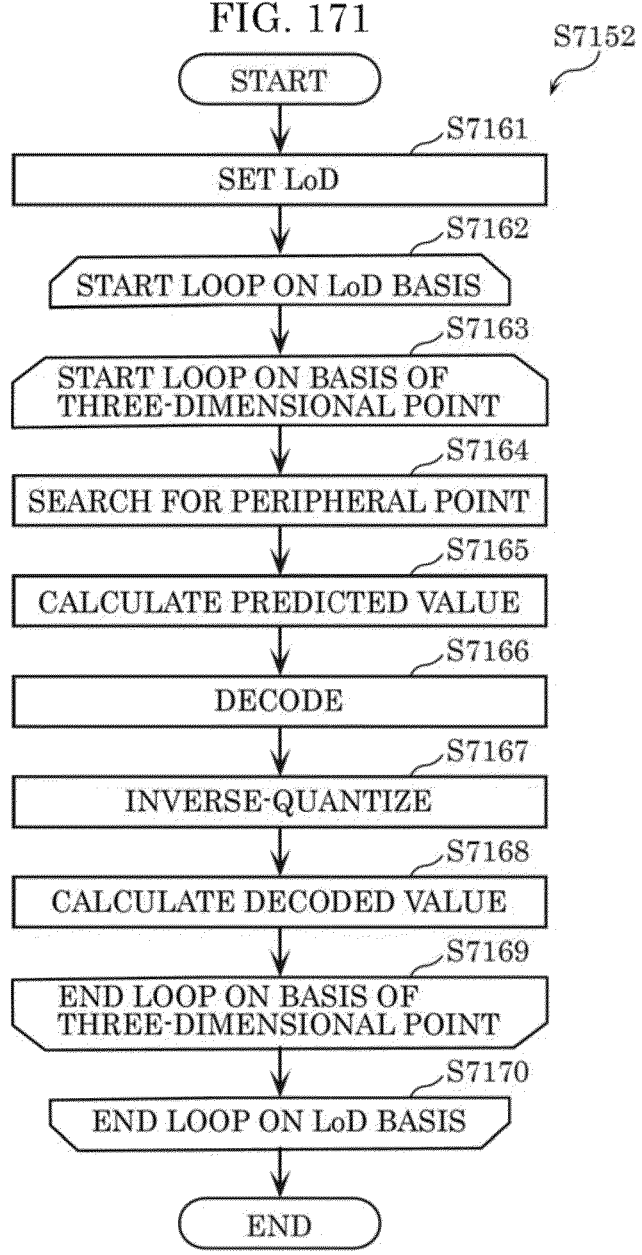
Figure 172:
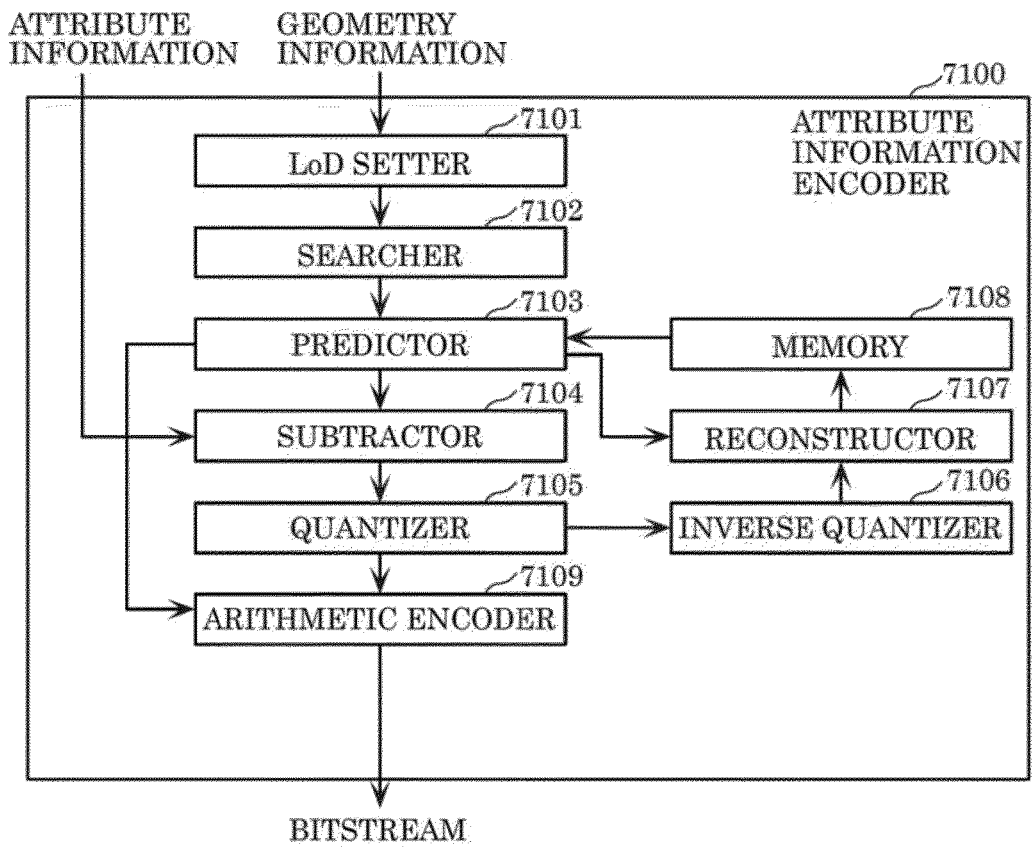
Figure 173:
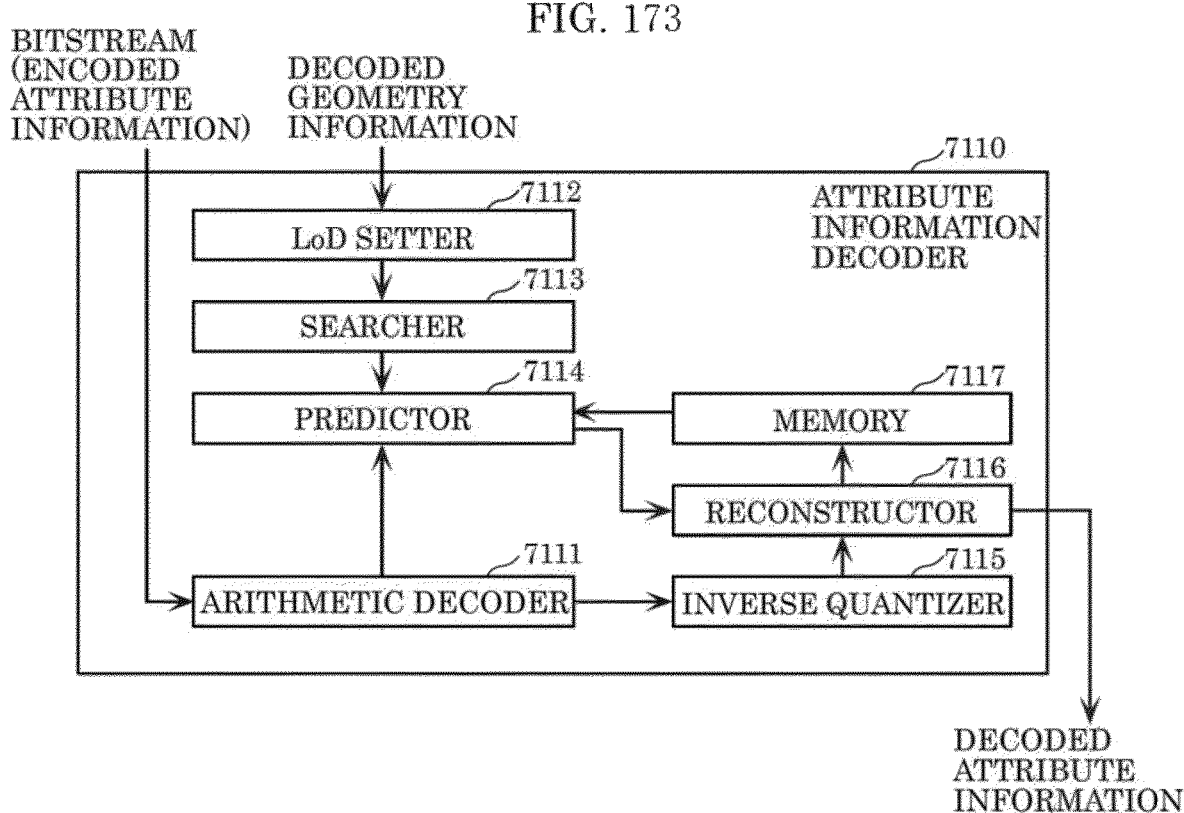

FIG. 131 is a block diagram of an attribute information encoder according to Embodiment 13;

FIG. 132 is a block diagram of a three-dimensional data decoding device according to Embodiment 13;

FIG. 133 is a block diagram of a attribute information decoder according to Embodiment 13;

FIG. 134 is a diagram showing an example of the setting of a quantization parameter in the tile division and the slice division according to Embodiment 13;

FIG. 135 is a diagram showing an example of the setting of a quantization parameter according to Embodiment 13;

FIG. 136 is a diagram showing an example of the setting of a quantization parameter according to Embodiment 13;

FIG. 137 is a diagram showing a syntax example of an attribute information header according to Embodiment 13;

FIG. 138 is a diagram showing a syntax example of an attribute information header according to Embodiment 13;

FIG. 139 is a diagram showing an example of the setting of a quantization parameter according to Embodiment 13;

FIG. 140 is a diagram showing a syntax example of an attribute information header according to Embodiment 13;

FIG. 141 is a diagram showing a syntax example of an attribute information header according to Embodiment 13;

FIG. 142 is a flowchart of a three-dimensional data encoding process according to Embodiment 13;

FIG. 143 is a flowchart of an attribute information encoding process according to Embodiment 13;

FIG. 144 is a flowchart of a ΔQP determination process according to Embodiment 13;

FIG. 145 is a flowchart of a three-dimensional data decoding process according to Embodiment 13;

FIG. 146 is a flowchart of an attribute information decoding process according to Embodiment 13;

FIG. 147 is a block diagram of an attribute information encoder according to Embodiment 13;

FIG. 148 is a block diagram of an attribute information decoder according to Embodiment 13;

FIG. 149 is a diagram showing an example of the setting of a quantization parameter according to Embodiment 13;

FIG. 150 is a diagram showing a syntax example of an attribute information header according to Embodiment 13;

FIG. 151 is a diagram showing a syntax example of an attribute information header according to Embodiment 13;

FIG. 152 is a flowchart of a three-dimensional data encoding process according to Embodiment 13;

FIG. 153 is a flowchart of an attribute information encoding process according to Embodiment 13;

FIG. 154 is a flowchart of a three-dimensional data decoding process according to Embodiment 13;

FIG. 155 is a flowchart of an attribute information decoding process according to Embodiment 13;

FIG. 156 is a block diagram of an attribute information encoder according to Embodiment 13;

FIG. 157 is a block diagram of an attribute information decoder according to Embodiment 13;

FIG. 158 is a diagram showing a syntax example of an attribute information header according to Embodiment 13;

FIG. 159 is a flowchart of a three-dimensional data encoding process according to Embodiment 13;

FIG. 160 is a flowchart of a three-dimensional data decoding process according to Embodiment 13;

FIG. 161 is a diagram showing an example of the generation of LoD layers according to Embodiment 14;

FIG. 162 is a diagram showing an example of the division of layers according to Embodiment 14;

FIG. 163 is a diagram showing an example of the division of layers according to Embodiment 14;

FIG. 164 is a diagram showing an example of the division of layers according to Embodiment 14;

FIG. 165 is a diagram showing an example of the division of layers according to Embodiment 14;

FIG. 166 is a diagram showing an example of the division of layers according to Embodiment 14;

FIG. 167 is a flowchart of a three-dimensional data encoding process according to Embodiment 14;

FIG. 168 is a flowchart of an attribute information encoding process according to Embodiment 14;

FIG. 169 is a flowchart of a LoD setting process according to Embodiment 14;

FIG. 170 is a flowchart of a three-dimensional data decoding process according to Embodiment 14;

FIG. 171 is a flowchart of an attribute information decoding process according to Embodiment 14;

FIG. 172 is a block diagram of an attribute information encoder according to Embodiment 14; and FIG. 173 is a block diagram of an attribute information decoder according to Embodiment 14.

DETAILED DESCRIPTION OF THE EMBODIMENTS

A three-dimensional data encoding method in accordance with an aspect of the present disclosure includes: calculating coefficient values from pieces of attribute information of three-dimensional points included in point cloud data; quantizing the coefficient values individually to generate quantized values; and generating a bitstream including the quantized values, wherein each of the coefficient values belongs to any one of layers, in the quantizing, each of the coefficient values is quantized using a quantization parameter for a layer to which the coefficient value belongs among the layers, and the bitstream includes first information and pieces of second information, the first information indicating a reference quantization parameter, the pieces of second information being for calculating quantization parameters for the layers from the reference quantization parameter.

With such a configuration, according to the three-dimensional data encoding method, the quantization parameter can be changed for each layer, and therefore, the encoding can be properly performed. In addition, according to the three-dimensional data encoding method, the first information that indicates a reference quantization parameter and the second information for calculating a plurality of quantization parameters from the reference quantization parameter are encoded, and therefore, the coding efficiency can be improved.

For example, it is possible that each of the pieces of second information indicates a difference between the reference quantization parameter and a quantization parameter for a corresponding one of the layers among the quantization parameters.

For example, it is also possible that the bitstream further includes a first flag indicating whether or not the pieces of second information are included in the bitstream.

For example, it is further possible that the bitstream further includes third information indicating a total number of the pieces of second information included in the bitstream.

For example, it is still further possible that each of the three-dimensional points is classified into any one of the layers in accordance with geometry information of the three-dimensional point.

For example, it is still further possible that the coefficient values are generated by sorting each of the pieces of attribute information to one of a higher frequency component and a lower frequency component to be classified into the layers.

A three-dimensional data decoding method in accordance with another aspect of the present disclosure includes: calculating quantization parameters for layers, using (i) first information indicating a reference quantization parameter and (ii) pieces of second information for calculating the quantization parameters for the layers from the reference quantization parameter, the first information and the pieces of second information being included in a bitstream; inverse-quantizing each of quantized values included in the bitstream, using a quantization parameter for a layer to which the quantized value belongs among the quantization parameters calculated in the calculating, to generate coefficient values; and calculating, from the coefficient values generated in the inverse-quantizing, pieces of attribute information of three-dimensional points included in point cloud data.

With such a configuration, according to the three-dimensional data decoding method, the quantization parameter can be changed for each layer, and therefore, the decoding can be properly performed. In addition, according to the three-dimensional data decoding method, the bitstream can be properly decoded which is encoded with a coding efficiency improved by using the first information that indicates a reference quantization parameter and the plurality of pieces of second information for calculating a plurality of quantization parameters from the reference quantization parameter.

For example, it is possible that each of the pieces of second information indicates a difference between the reference quantization parameter and a quantization parameter for a corresponding one of the layers among the quantization parameters.

For example, it is also possible that the bitstream further includes a first flag indicating whether or not the pieces of second information are included in the bitstream.

For example, it is further possible that the bitstream further includes third information indicating a total number of the pieces of second information included in the bitstream.

For example, it is still further possible that each of the three-dimensional points is classified into any one of the layers in accordance with geometry information of the three-dimensional point.

For example, it is still further possible that the coefficient values are generated by sorting each of the pieces of attribute information to one of a higher frequency component and a lower frequency component to be classified into the layers.

A three-dimensional data encoding device in accordance with still another aspect of the present disclosure includes: a processor; and memory, wherein using the memory, the processor: calculates coefficient values from pieces of attribute information of three-dimensional points included in point cloud data; quantizes the coefficient values individually to generate quantized values; and generates a bitstream including the quantized values, wherein each of the coefficient values belongs to any one of layers, in the quantizing, each of the coefficient values is quantized using a quantization parameter for a layer to which the coefficient value belongs among the layers, and the bitstream includes first information and pieces of second information, the first information indicating a reference quantization parameter, the pieces of second information being for calculating quantization parameters for the layers from the reference quantization parameter, the quantization parameters each being the quantization parameter.

With such a configuration, the three-dimensional data encoding device can change the quantization parameter for each layer, and therefore can properly perform the encoding. In addition, since the three-dimensional data encoding device encodes the first information that indicates a reference quantization parameter and the plurality of pieces of second information for calculating a plurality of quantization parameters from the reference quantization parameter, the coding efficiency can be improved.

A three-dimensional data decoding device in accordance with still another aspect of the present disclosure includes: a processor; and memory, wherein using the memory, the processor: calculates quantization parameters for layers, using (i) first information indicating a reference quantization parameter and (ii) pieces of second information for calculating the quantization parameters for the layers from the reference quantization parameter, the first information and the pieces of second information being included in a bitstream; inverse-quantizes each of quantized values included in the bitstream, using a quantization parameter for a layer to which the quantized value belongs among the quantization parameters calculated in the calculating, to generate coefficient values; and calculates, from the coefficient values generated in the inverse-quantizing, pieces of attribute information of three-dimensional points included in point cloud data.

With such a configuration, the three-dimensional data decoding device can change the quantization parameter for each layer, and therefore can properly perform the decoding. In addition, the three-dimensional data decoding device can properly decode the bitstream encoded with a coding efficiency improved by using the first information that indicates a reference quantization parameter and the plurality of pieces of second information for calculating a plurality of quantization parameters from the reference quantization parameter.

It is to be noted that these general or specific aspects may be implemented as a system, a method, an integrated circuit, a computer program, or a computer-readable recording medium such as a Compact Disc Read Only Memory (CD-ROM), or may be implemented as any combination of a system, a method, an integrated circuit, a computer program, and a recording medium.

The following describes embodiments with reference to the drawings. It is to be noted that the following embodiments indicate exemplary embodiments of the present disclosure. The numerical values, shapes, materials, constituent elements, the arrangement and connection of the constituent elements, steps, the processing order of the steps, etc. indicated in the following embodiments are mere examples, and thus are not intended to limit the present disclosure. Of the constituent elements described in the following embodiments, constituent elements not recited in any one of the independent claims that indicate the broadest concepts will be described as optional constituent elements.

Embodiment 1

Figure 1:
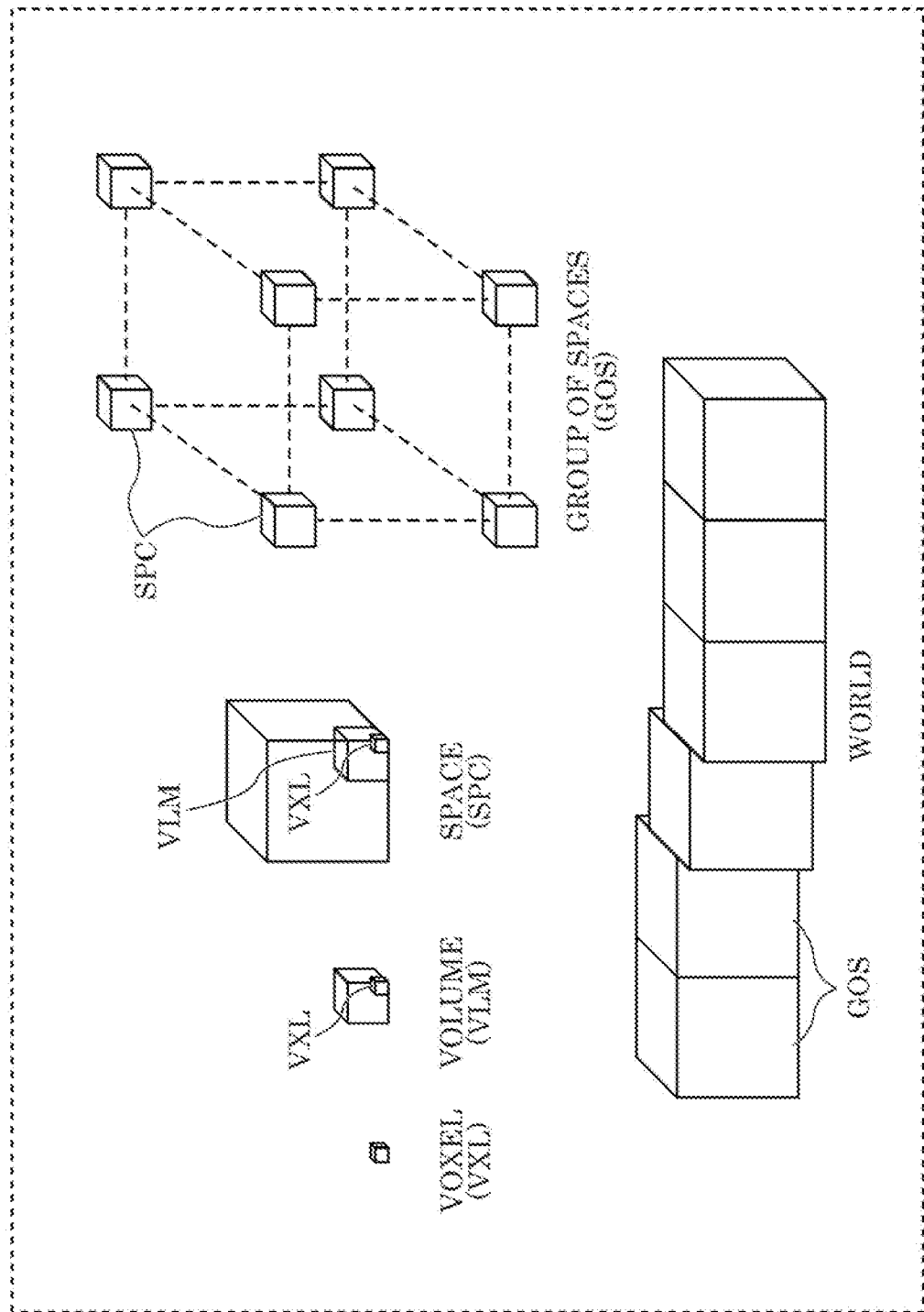
FIG. 1 is a diagram showing the structure of encoded three-dimensional data according to Embodiment 1.

First, the data structure of encoded three-dimensional data (hereinafter also referred to as encoded data) according to the present embodiment will be described. FIG. 1 is a diagram showing the structure of encoded three-dimensional data according to the present embodiment.

In the present embodiment, a three-dimensional space is divided into spaces (SPCs), which correspond to pictures in moving picture encoding, and the three-dimensional data is encoded on a SPC-by-SPC basis. Each SPC is further divided into volumes (VLMs), which correspond to macroblocks, etc. in moving picture encoding, and predictions and transforms are performed on a VLM-by-VLM basis. Each volume includes a plurality of voxels (VXLs), each being a minimum unit in which position coordinates are associated. Note that prediction is a process of generating predictive three-dimensional data analogous to a current processing unit by referring to another processing unit, and encoding a differential between the predictive three-dimensional data and the current processing unit, as in the case of predictions performed on two-dimensional images. Such prediction includes not only spatial prediction in which another prediction unit corresponding to the same time is referred to, but also temporal prediction in which a prediction unit corresponding to a different time is referred to.

When encoding a three-dimensional space represented by point group data such as a point cloud, for example, the three-dimensional data encoding device (hereinafter also referred to as the encoding device) encodes the points in the point group or points included in the respective voxels in a collective manner, in accordance with a voxel size. Finer voxels enable a highly-precise representation of the three-dimensional shape of a point group, while larger voxels enable a rough representation of the three-dimensional shape of a point group.

Note that the following describes the case where three-dimensional data is a point cloud, but three-dimensional data is not limited to a point cloud, and thus three-dimensional data of any format may be employed.

Also note that voxels with a hierarchical structure may be used. In such a case, when the hierarchy includes n levels, whether a sampling point is included in the n−1th level or lower levels (levels below the n-th level) may be sequentially indicated. For example, when only the n-th level is decoded, and the n−1th level or lower levels include a sampling point, the n-th level can be decoded on the assumption that a sampling point is included at the center of a voxel in the n-th level.

Also, the encoding device obtains point group data, using, for example, a distance sensor, a stereo camera, a monocular camera, a gyroscope sensor, or an inertial sensor.

As in the case of moving picture encoding, each SPC is classified into one of at least the three prediction structures that include: intra SPC (I-SPC), which is individually decodable; predictive SPC (P-SPC) capable of only a unidirectional reference; and bidirectional SPC (B-SPC) capable of bidirectional references. Each SPC includes two types of time information: decoding time and display time.

Furthermore, as shown in FIG. 1, a processing unit that includes a plurality of SPCs is a group of spaces (GOS), which is a random access unit. Also, a processing unit that includes a plurality of GOSs is a world (WLD).

The spatial region occupied by each world is associated with an absolute position on earth, by use of, for example, GPS, or latitude and longitude information. Such position information is stored as meta-information. Note that meta-information may be included in encoded data, or may be transmitted separately from the encoded data.

Also, inside a GOS, all SPCs may be three-dimensionally adjacent to one another, or there may be a SPC that is not three-dimensionally adjacent to another SPC.

Note that the following also describes processes such as encoding, decoding, and reference to be performed on three-dimensional data included in processing units such as GOS, SPC, and VLM, simply as performing encoding/to encode, decoding/to decode, referring to, etc. on a processing unit. Also note that three-dimensional data included in a processing unit includes, for example, at least one pair of a spatial position such as three-dimensional coordinates and an attribute value such as color information.

Next, the prediction structures among SPCs in a GOS will be described. A plurality of SPCs in the same GOS or a plurality of VLMs in the same SPC occupy mutually different spaces, while having the same time information (the decoding time and the display time).

A SPC in a GOS that comes first in the decoding order is an I-SPC. GOSs come in two types: closed GOS and open GOS. A closed GOS is a GOS in which all SPCs in the GOS are decodable when decoding starts from the first I-SPC. Meanwhile, an open GOS is a GOS in which a different GOS is referred to in one or more SPCs preceding the first I-SPC in the GOS in the display time, and thus cannot be singly decoded.

Note that in the case of encoded data of map information, for example, a WLD is sometimes decoded in the backward direction, which is opposite to the encoding order, and thus backward reproduction is difficult when GOSs are interdependent. In such a case, a closed GOS is basically used.

Each GOS has a layer structure in height direction, and SPCs are sequentially encoded or decoded from SPCs in the bottom layer.

Figure 2:
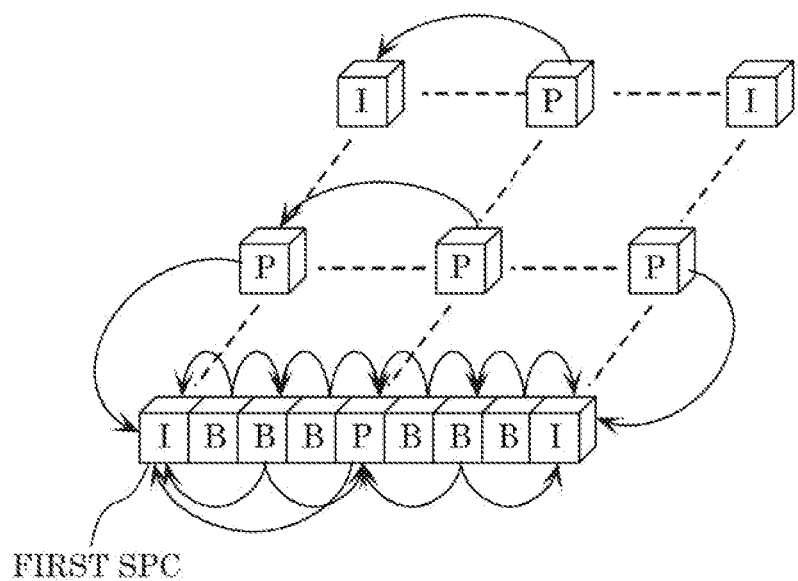
FIG. 2 is a diagram showing an example of prediction structures among SPCs that belong to the lowermost layer in a group of spaces (GOS) according to Embodiment 1.
Figure 3:
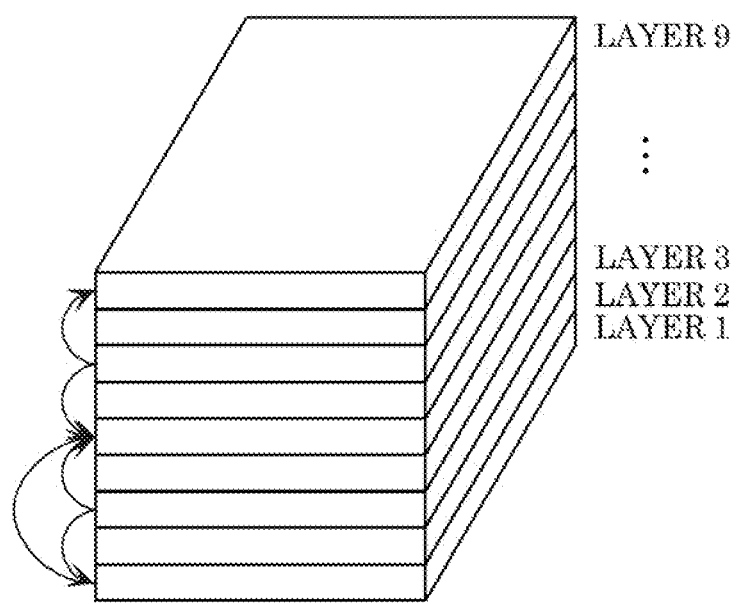
FIG. 3 is a diagram showing an example of prediction structures among layers according to Embodiment 1.

FIG. 2 is a diagram showing an example of prediction structures among SPCs that belong to the lowermost layer in a GOS. FIG. 3 is a diagram showing an example of prediction structures among layers.

A GOS includes at least one I-SPC. Of the objects in a three-dimensional space, such as a person, an animal, a car, a bicycle, a signal, and a building serving as a landmark, a small-sized object is especially effective when encoded as an I-SPC. When decoding a GOS at a low throughput or at a high speed, for example, the three-dimensional data decoding device (hereinafter also referred to as the decoding device) decodes only I-SPC(s) in the GOS.

The encoding device may also change the encoding interval or the appearance frequency of I-SPCs, depending on the degree of sparseness and denseness of the objects in a WLD.

In the structure shown in FIG. 3, the encoding device or the decoding device encodes or decodes a plurality of layers sequentially from the bottom layer (layer 1). This increases the priority of data on the ground and its vicinity, which involve a larger amount of information, when, for example, a self-driving car is concerned.

Regarding encoded data used for a drone, for example, encoding or decoding may be performed sequentially from SPCs in the top layer in a GOS in height direction.

The encoding device or the decoding device may also encode or decode a plurality of layers in a manner that the decoding device can have a rough grasp of a GOS first, and then the resolution is gradually increased. The encoding device or the decoding device may perform encoding or decoding in the order of layers 3, 8, 1, 9 . . . , for example.

Next, the handling of static objects and dynamic objects will be described.

A three-dimensional space includes scenes or still objects such as a building and a road (hereinafter collectively referred to as static objects), and objects with motion such as a car and a person (hereinafter collectively referred to as dynamic objects). Object detection is separately performed by, for example, extracting keypoints from point cloud data, or from video of a camera such as a stereo camera. In this description, an example method of encoding a dynamic object will be described.

A first method is a method in which a static object and a dynamic object are encoded without distinction. A second method is a method in which a distinction is made between a static object and a dynamic object on the basis of identification information.

For example, a GOS is used as an identification unit. In such a case, a distinction is made between a GOS that includes SPCs constituting a static object and a GOS that includes SPCs constituting a dynamic object, on the basis of identification information stored in the encoded data or stored separately from the encoded data.

Alternatively, a SPC may be used as an identification unit. In such a case, a distinction is made between a SPC that includes VLMs constituting a static object and a SPC that includes VLMs constituting a dynamic object, on the basis of the identification information thus described.

Alternatively, a VLM or a VXL may be used as an identification unit. In such a case, a distinction is made between a VLM or a VXL that includes a static object and a VLM or a VXL that includes a dynamic object, on the basis of the identification information thus described.

The encoding device may also encode a dynamic object as at least one VLM or SPC, and may encode a VLM or a SPC including a static object and a SPC including a dynamic object as mutually different GOSs. When the GOS size is variable depending on the size of a dynamic object, the encoding device separately stores the GOS size as meta-information.

The encoding device may also encode a static object and a dynamic object separately from each other, and may superimpose the dynamic object onto a world constituted by static objects. In such a case, the dynamic object is constituted by at least one SPC, and each SPC is associated with at least one SPC constituting the static object onto which the each SPC is to be superimposed. Note that a dynamic object may be represented not by SPC(s) but by at least one VLM or VXL.

The encoding device may also encode a static object and a dynamic object as mutually different streams.

The encoding device may also generate a GOS that includes at least one SPC constituting a dynamic object. The encoding device may further set the size of a GOS including a dynamic object (GOS_M) and the size of a GOS including a static object corresponding to the spatial region of GOS_M at the same size (such that the same spatial region is occupied). This enables superimposition to be performed on a GOS-by-GOS basis.

SPC(s) included in another encoded GOS may be referred to in a P-SPC or a B-SPC constituting a dynamic object. In the case where the position of a dynamic object temporally changes, and the same dynamic object is encoded as an object in a GOS corresponding to a different time, referring to SPC(s) across GOSs is effective in terms of compression rate.

The first method and the second method may be selected in accordance with the intended use of encoded data. When encoded three-dimensional data is used as a map, for example, a dynamic object is desired to be separated, and thus the encoding device uses the second method. Meanwhile, the encoding device uses the first method when the separation of a dynamic object is not required such as in the case where three-dimensional data of an event such as a concert and a sports event is encoded.

The decoding time and the display time of a GOS or a SPC are storable in encoded data or as meta-information. All static objects may have the same time information. In such a case, the decoding device may determine the actual decoding time and display time. Alternatively, a different value may be assigned to each GOS or SPC as the decoding time, and the same value may be assigned as the display time. Furthermore, as in the case of the decoder model in moving picture encoding such as Hypothetical Reference Decoder (HRD) compliant with HEVC, a model may be employed that ensures that a decoder can perform decoding without fail by having a buffer of a predetermined size and by reading a bitstream at a predetermined bit rate in accordance with the decoding times.

Figure 4:
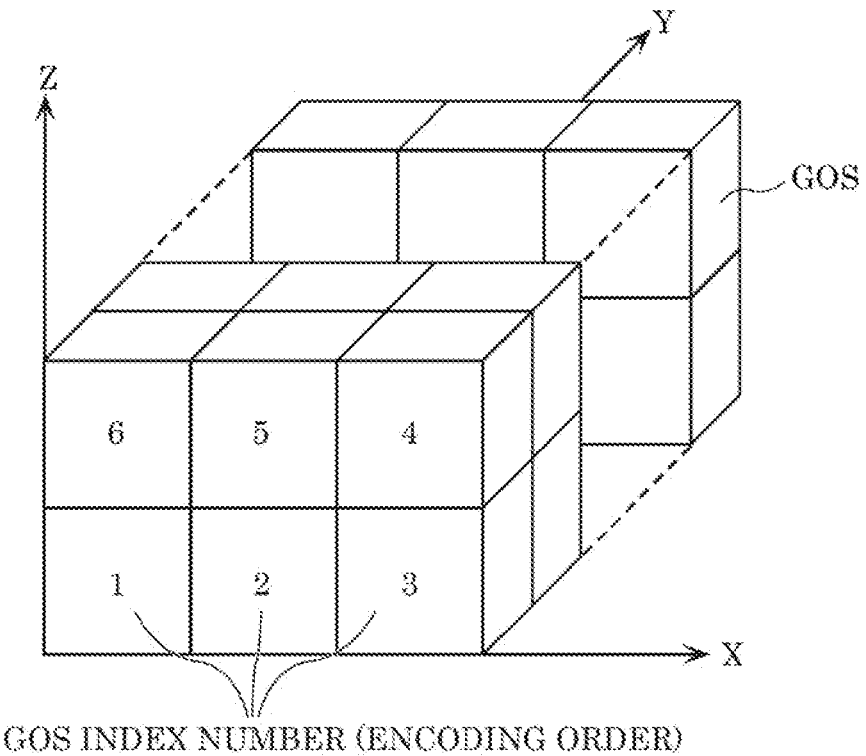
FIG. 4 is a diagram showing an example order of encoding GOSs according to Embodiment 1.

Next, the topology of GOSs in a world will be described. The coordinates of the three-dimensional space in a world are represented by the three coordinate axes (x axis, y axis, and z axis) that are orthogonal to one another. A predetermined rule set for the encoding order of GOSs enables encoding to be performed such that spatially adjacent GOSs are contiguous in the encoded data. In an example shown in FIG. 4, for example, GOSs in the x and z planes are successively encoded. After the completion of encoding all GOSs in certain x and z planes, the value of the y axis is updated. Stated differently, the world expands in the y axis direction as the encoding progresses. The GOS index numbers are set in accordance with the encoding order.

Here, the three-dimensional spaces in the respective worlds are previously associated one-to-one with absolute geographical coordinates such as GPS coordinates or latitude/longitude coordinates. Alternatively, each three-dimensional space may be represented as a position relative to a previously set reference position. The directions of the x axis, the y axis, and the z axis in the three-dimensional space are represented by directional vectors that are determined on the basis of the latitudes and the longitudes, etc. Such directional vectors are stored together with the encoded data as meta-information.

GOSs have a fixed size, and the encoding device stores such size as meta-information. The GOS size may be changed depending on, for example, whether it is an urban area or not, or whether it is inside or outside of a room. Stated differently, the GOS size may be changed in accordance with the amount or the attributes of objects with information values. Alternatively, in the same world, the encoding device may adaptively change the GOS size or the interval between I-SPCs in GOSs in accordance with the object density, etc. For example, the encoding device sets the GOS size to smaller and the interval between I-SPCs in GOSs to shorter, as the object density is higher.

Figure 5:
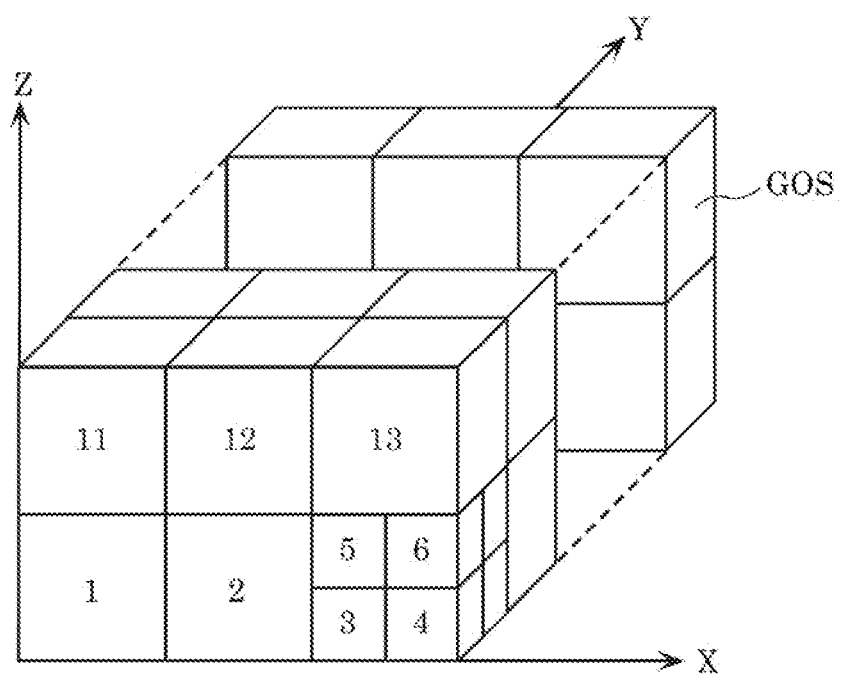
FIG. 5 is a diagram showing an example order of encoding GOSs according to Embodiment 1.

In an example shown in FIG. 5, to enable random access with a finer granularity, a GOS with a high object density is partitioned into the regions of the third to tenth GOSs. Note that the seventh to tenth GOSs are located behind the third to sixth GOSs.

Figure 6:
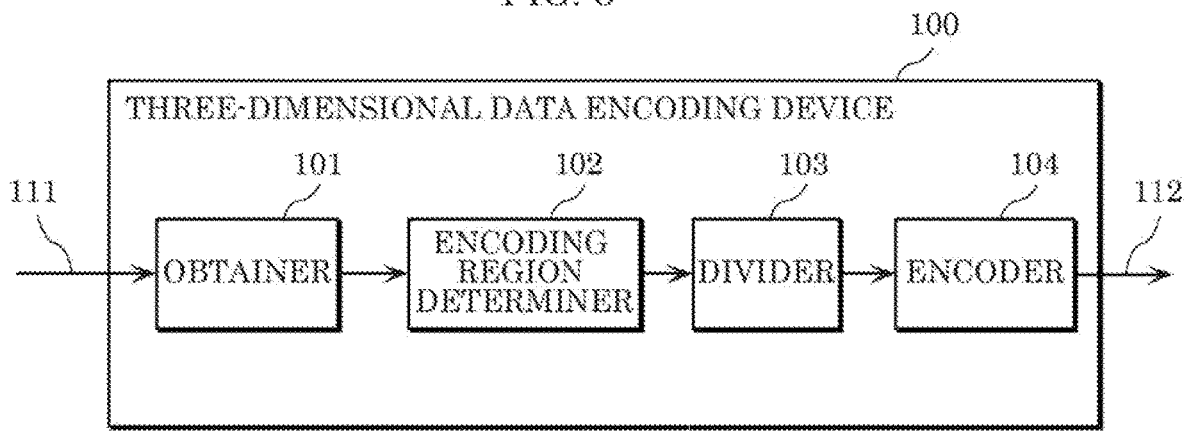
FIG. 6 is a block diagram of a three-dimensional data encoding device according to Embodiment 1.
Figure 7:
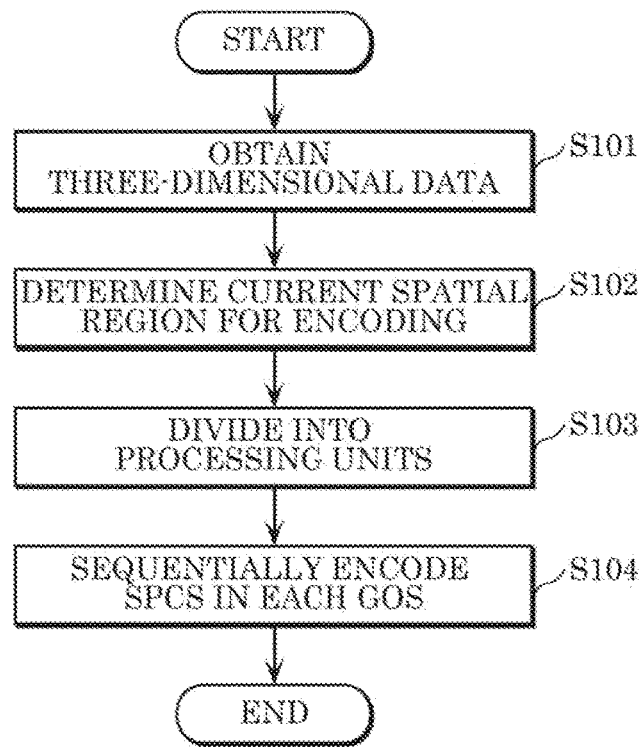
FIG. 7 is a flowchart of encoding processes according to Embodiment 1.

Next, the structure and the operation flow of the three-dimensional data encoding device according to the present embodiment will be described. FIG. 6 is a block diagram of three-dimensional data encoding device 100 according to the present embodiment. FIG. 7 is a flowchart of an example operation performed by three-dimensional data encoding device 100.

Three-dimensional data encoding device 100 shown in FIG. 6 encodes three-dimensional data 111, thereby generating encoded three-dimensional data 112. Such three-dimensional data encoding device 100 includes obtainer 101, encoding region determiner 102, divider 103, and encoder 104.

As shown in FIG. 7, first, obtainer 101 obtains three-dimensional data 111, which is point group data (S101).

Next, encoding region determiner 102 determines a current region for encoding from among spatial regions corresponding to the obtained point group data (S102). For example, in accordance with the position of a user or a vehicle, encoding region determiner 102 determines, as the current region, a spatial region around such position.

Next, divider 103 divides the point group data included in the current region into processing units. The processing units here means units such as GOSs and SPCs described above. The current region here corresponds to, for example, a world described above. More specifically, divider 103 divides the point group data into processing units on the basis of a predetermined GOS size, or the presence/absence/size of a dynamic object (S103). Divider 103 further determines the starting position of the SPC that comes first in the encoding order in each GOS.

Next, encoder 104 sequentially encodes a plurality of SPCs in each GOS, thereby generating encoded three-dimensional data 112 (S104).

Note that although an example is described here in which the current region is divided into GOSs and SPCs, after which each GOS is encoded, the processing steps are not limited to this order. For example, steps may be employed in which the structure of a single GOS is determined, which is followed by the encoding of such GOS, and then the structure of the subsequent GOS is determined.

As thus described, three-dimensional data encoding device 100 encodes three-dimensional data 111, thereby generating encoded three-dimensional data 112. More specifically, three-dimensional data encoding device 100 divides three-dimensional data into first processing units (GOSs), each being a random access unit and being associated with three-dimensional coordinates, divides each of the first processing units (GOSs) into second processing units (SPCs), and divides each of the second processing units (SPCs) into third processing units (VLMs). Each of the third processing units (VLMs) includes at least one voxel (VXL), which is the minimum unit in which position information is associated.

Next, three-dimensional data encoding device 100 encodes each of the first processing units (GOSs), thereby generating encoded three-dimensional data 112. More specifically, three-dimensional data encoding device 100 encodes each of the second processing units (SPCs) in each of the first processing units (GOSs). Three-dimensional data encoding device 100 further encodes each of the third processing units (VLMs) in each of the second processing units (SPCs).

When a current first processing unit (GOS) is a closed GOS, for example, three-dimensional data encoding device 100 encodes a current second processing unit (SPC) included in such current first processing unit (GOS) by referring to another second processing unit (SPC) included in the current first processing unit (GOS). Stated differently, three-dimensional data encoding device 100 refers to no second processing unit (SPC) included in a first processing unit (GOS) that is different from the current first processing unit (GOS).

Meanwhile, when a current first processing unit (GOS) is an open GOS, three-dimensional data encoding device 100 encodes a current second processing unit (SPC) included in such current first processing unit (GOS) by referring to another second processing unit (SPC) included in the current first processing unit (GOS) or a second processing unit (SPC) included in a first processing unit (GOS) that is different from the current first processing unit (GOS).

Also, three-dimensional data encoding device 100 selects, as the type of a current second processing unit (SPC), one of the following: a first type (I-SPC) in which another second processing unit (SPC) is not referred to; a second type (P-SPC) in which another single second processing unit (SPC) is referred to; and a third type in which other two second processing units (SPC) are referred to. Three-dimensional data encoding device 100 encodes the current second processing unit (SPC) in accordance with the selected type.

Figure 8:
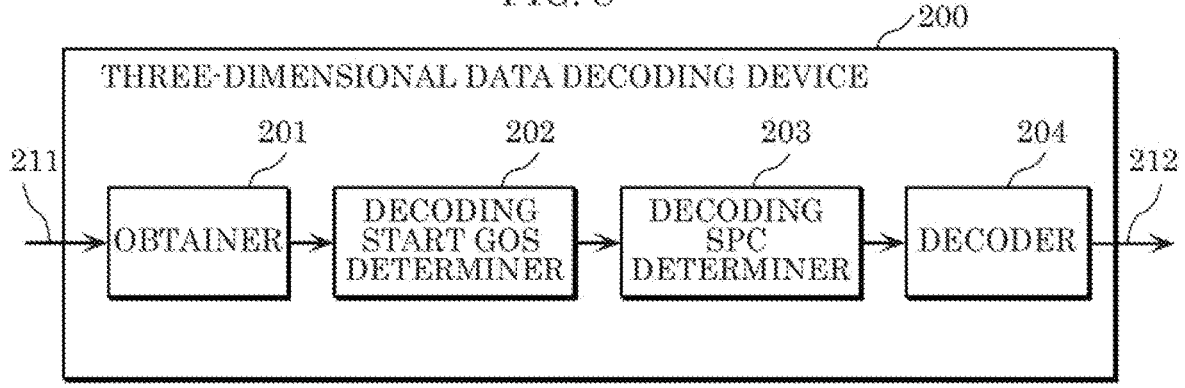
FIG. 8 is a block diagram of a three-dimensional data decoding device according to Embodiment 1.

Next, the structure and the operation flow of the three-dimensional data decoding device according to the present embodiment will be described. FIG. 8 is a block diagram of three-dimensional data decoding device 200 according to the present embodiment. FIG. 9 is a flowchart of an example operation performed by three-dimensional data decoding device 200.

Three-dimensional data decoding device 200 shown in FIG. 8 decodes encoded three-dimensional data 211, thereby generating decoded three-dimensional data 212. Encoded three-dimensional data 211 here is, for example, encoded three-dimensional data 112 generated by three-dimensional data encoding device 100. Such three-dimensional data decoding device 200 includes obtainer 201, decoding start GOS determiner 202, decoding SPC determiner 203, and decoder 204.

First, obtainer 201 obtains encoded three-dimensional data 211 (S201). Next, decoding start GOS determiner 202 determines a current GOS for decoding (S202). More specifically, decoding start GOS determiner 202 refers to meta-information stored in encoded three-dimensional data 211 or stored separately from the encoded three-dimensional data to determine, as the current GOS, a GOS that includes a SPC corresponding to the spatial position, the object, or the time from which decoding is to start.

Next, decoding SPC determiner 203 determines the type(s) (I, P, and/or B) of SPCs to be decoded in the GOS (S203). For example, decoding SPC determiner 203 determines whether to (1) decode only I-SPC(s), (2) to decode I-SPC(s) and P-SPCs, or (3) to decode SPCs of all types. Note that the present step may not be performed, when the type(s) of SPCs to be decoded are previously determined such as when all SPCs are previously determined to be decoded.

Next, decoder 204 obtains an address location within encoded three-dimensional data 211 from which a SPC that comes first in the GOS in the decoding order (the same as the encoding order) starts. Decoder 204 obtains the encoded data of the first SPC from the address location, and sequentially decodes the SPCs from such first SPC (S204). Note that the address location is stored in the meta-information, etc.

Three-dimensional data decoding device 200 decodes decoded three-dimensional data 212 as thus described. More specifically, three-dimensional data decoding device 200 decodes each encoded three-dimensional data 211 of the first processing units (GOSs), each being a random access unit and being associated with three-dimensional coordinates, thereby generating decoded three-dimensional data 212 of the first processing units (GOSs). Even more specifically, three-dimensional data decoding device 200 decodes each of the second processing units (SPCs) in each of the first processing units (GOSs). Three-dimensional data decoding device 200 further decodes each of the third processing units (VLMs) in each of the second processing units (SPCs).

The following describes meta-information for random access. Such meta-information is generated by three-dimensional data encoding device 100, and included in encoded three-dimensional data 112 (211).

In the conventional random access for a two-dimensional moving picture, decoding starts from the first frame in a random access unit that is close to a specified time. Meanwhile, in addition to times, random access to spaces (coordinates, objects, etc.) is assumed to be performed in a world.

To enable random access to at least three elements of coordinates, objects, and times, tables are prepared that associate the respective elements with the GOS index numbers. Furthermore, the GOS index numbers are associated with the addresses of the respective first I-SPCs in the GOSs. FIG. is a diagram showing example tables included in the meta-information. Note that not all the tables shown in FIG. 10 are required to be used, and thus at least one of the tables is used.

The following describes an example in which random access is performed from coordinates as a starting point. To access the coordinates (x2, y2, and z2), the coordinates-GOS table is first referred to, which indicates that the point corresponding to the coordinates (x2, y2, and z2) is included in the second GOS. Next, the GOS-address table is referred to, which indicates that the address of the first I-SPC in the second GOS is addr(2). As such, decoder 204 obtains data from this address to start decoding.

Note that the addresses may either be logical addresses or physical addresses of an HDD or a memory. Alternatively, information that identifies file segments may be used instead of addresses. File segments are, for example, units obtained by segmenting at least one GOS, etc.

When an object spans across a plurality of GOSs, the object-GOS table may show a plurality of GOSs to which such object belongs. When such plurality of GOSs are closed GOSs, the encoding device and the decoding device can perform encoding or decoding in parallel. Meanwhile, when such plurality of GOSs are open GOSs, a higher compression efficiency is achieved by the plurality of GOSs referring to each other.

Example objects include a person, an animal, a car, a bicycle, a signal, and a building serving as a landmark. For example, three-dimensional data encoding device 100 extracts keypoints specific to an object from a three-dimensional point cloud, etc., when encoding a world, and detects the object on the basis of such keypoints to set the detected object as a random access point.

As thus described, three-dimensional data encoding device 100 generates first information indicating a plurality of first processing units (GOSs) and the three-dimensional coordinates associated with the respective first processing units (GOSs). Encoded three-dimensional data 112 (211) includes such first information. The first information further indicates at least one of objects, times, and data storage locations that are associated with the respective first processing units (GOSs).

Three-dimensional data decoding device 200 obtains the first information from encoded three-dimensional data 211. Using such first information, three-dimensional data decoding device 200 identifies encoded three-dimensional data 211 of the first processing unit that corresponds to the specified three-dimensional coordinates, object, or time, and decodes encoded three-dimensional data 211.

The following describes an example of other meta-information. In addition to the meta-information for random access, three-dimensional data encoding device 100 may also generate and store meta-information as described below, and three-dimensional data decoding device 200 may use such meta-information at the time of decoding.

When three-dimensional data is used as map information, for example, a profile is defined in accordance with the intended use, and information indicating such profile may be included in meta-information. For example, a profile is defined for an urban or a suburban area, or for a flying object, and the maximum or minimum size, etc. of a world, a SPC or a VLM, etc. is defined in each profile. For example, more detailed information is required for an urban area than for a suburban area, and thus the minimum VLM size is set to small.

The meta-information may include tag values indicating object types. Each of such tag values is associated with VLMs, SPCs, or GOSs that constitute an object. For example, a tag value may be set for each object type in a manner, for example, that the tag value "0" indicates "person," the tag value "1" indicates "car," and the tag value "2" indicates "signal". Alternatively, when an object type is hard to judge, or such judgment is not required, a tag value may be used that indicates the size or the attribute indicating, for example, whether an object is a dynamic object or a static object.

The meta-information may also include information indicating a range of the spatial region occupied by a world.

The meta-information may also store the SPC or VXL size as header information common to the whole stream of the encoded data or to a plurality of SPCs, such as SPCs in a GOS.

The meta-information may also include identification information on a distance sensor or a camera that has been used to generate a point cloud, or information indicating the positional accuracy of a point group in the point cloud.

The meta-information may also include information indicating whether a world is made only of static objects or includes a dynamic object.

The following describes variations of the present embodiment.

The encoding device or the decoding device may encode or decode two or more mutually different SPCs or GOSs in parallel. GOSs to be encoded or decoded in parallel can be determined on the basis of meta-information, etc. indicating the spatial positions of the GOSs.

When three-dimensional data is used as a spatial map for use by a car or a flying object, etc. in traveling, or for creation of such a spatial map, for example, the encoding device or the decoding device may encode or decode GOSs or SPCs included in a space that is identified on the basis of GPS information, the route information, the zoom magnification, etc.

The decoding device may also start decoding sequentially from a space that is close to the self-location or the traveling route. The encoding device or the decoding device may give a lower priority to a space distant from the self-location or the traveling route than the priority of a nearby space to encode or decode such distant place. To "give a lower priority" means here, for example, to lower the priority in the processing sequence, to decrease the resolution (to apply decimation in the processing), or to lower the image quality (to increase the encoding efficiency by, for example, setting the quantization step to larger).

When decoding encoded data that is hierarchically encoded in a space, the decoding device may decode only the bottom layer in the hierarchy.

The decoding device may also start decoding preferentially from the bottom layer of the hierarchy in accordance with the zoom magnification or the intended use of the map.

For self-location estimation or object recognition, etc. involved in the self-driving of a car or a robot, the encoding device or the decoding device may encode or decode regions at a lower resolution, except for a region that is lower than or at a specified height from the ground (the region to be recognized). The encoding device may also encode point clouds representing the spatial shapes of a room interior and a room exterior separately. For example, the separation of a GOS representing a room interior (interior GOS) and a GOS representing a room exterior (exterior GOS) enables the decoding device to select a GOS to be decoded in accordance with a viewpoint location, when using the encoded data.

The encoding device may also encode an interior GOS and an exterior GOS having close coordinates so that such GOSs come adjacent to each other in an encoded stream. For example, the encoding device associates the identifiers of such GOSs with each other, and stores information indicating the associated identifiers into the meta-information that is stored in the encoded stream or stored separately. This enables the decoding device to refer to the information in the meta-information to identify an interior GOS and an exterior GOS having close coordinates.

The encoding device may also change the GOS size or the SPC size depending on whether a GOS is an interior GOS or an exterior GOS. For example, the encoding device sets the size of an interior GOS to smaller than the size of an exterior GOS. The encoding device may also change the accuracy of extracting keypoints from a point cloud, or the accuracy of detecting objects, for example, depending on whether a GOS is an interior GOS or an exterior GOS.

The encoding device may also add, to encoded data, information by which the decoding device displays objects with a distinction between a dynamic object and a static object. This enables the decoding device to display a dynamic object together with, for example, a red box or letters for explanation. Note that the decoding device may display only a red box or letters for explanation, instead of a dynamic object. The decoding device may also display more particular object types. For example, a red box may be used for a car, and a yellow box may be used for a person.

The encoding device or the decoding device may also determine whether to encode or decode a dynamic object and a static object as a different SPC or GOS, in accordance with, for example, the appearance frequency of dynamic objects or a ratio between static objects and dynamic objects. For example, when the appearance frequency or the ratio of dynamic objects exceeds a threshold, a SPC or a GOS including a mixture of a dynamic object and a static object is accepted, while when the appearance frequency or the ratio of dynamic objects is below a threshold, a SPC or GOS including a mixture of a dynamic object and a static object is unaccepted.

When detecting a dynamic object not from a point cloud but from two-dimensional image information of a camera, the encoding device may separately obtain information for identifying a detection result (box or letters) and the object position, and encode these items of information as part of the encoded three-dimensional data. In such a case, the decoding device superimposes auxiliary information (box or letters) indicating the dynamic object onto a resultant of decoding a static object to display it.

The encoding device may also change the sparseness and denseness of VXLs or VLMs in a SPC in accordance with the degree of complexity of the shape of a static object. For example, the encoding device sets VXLs or VLMs at a higher density as the shape of a static object is more complex. The encoding device may further determine a quantization step, etc. for quantizing spatial positions or color information in accordance with the sparseness and denseness of VXLs or VLMs. For example, the encoding device sets the quantization step to smaller as the density of VXLs or VLMs is higher.

As described above, the encoding device or the decoding device according to the present embodiment encodes or decodes a space on a SPC-by-SPC basis that includes coordinate information.

Furthermore, the encoding device and the decoding device perform encoding or decoding on a volume-by-volume basis in a SPC. Each volume includes a voxel, which is the minimum unit in which position information is associated.

Also, using a table that associates the respective elements of spatial information including coordinates, objects, and times with GOSs or using a table that associates these elements with each other, the encoding device and the decoding device associate any ones of the elements with each other to perform encoding or decoding. The decoding device uses the values of the selected elements to determine the coordinates, and identifies a volume, a voxel, or a SPC from such coordinates to decode a SPC including such volume or voxel, or the identified SPC.

Furthermore, the encoding device determines a volume, a voxel, or a SPC that is selectable in accordance with the elements, through extraction of keypoints and object recognition, and encodes the determined volume, voxel, or SPC, as a volume, a voxel, or a SPC to which random access is possible.

SPCs are classified into three types: I-SPC that is singly encodable or decodable; P-SPC that is encoded or decoded by referring to any one of the processed SPCs; and B-SPC that is encoded or decoded by referring to any two of the processed SPCs.

At least one volume corresponds to a static object or a dynamic object. A SPC including a static object and a SPC including a dynamic object are encoded or decoded as mutually different GOSs. Stated differently, a SPC including a static object and a SPC including a dynamic object are assigned to different GOSs.

Dynamic objects are encoded or decoded on an object-by-object basis, and are associated with at least one SPC including a static object. Stated differently, a plurality of dynamic objects are individually encoded, and the obtained encoded data of the dynamic objects is associated with a SPC including a static object.

The encoding device and the decoding device give an increased priority to I-SPC(s) in a GOS to perform encoding or decoding. For example, the encoding device performs encoding in a manner that prevents the degradation of I-SPCs (in a manner that enables the original three-dimensional data to be reproduced with a higher fidelity after decoded). The decoding device decodes, for example, only I-SPCs.

The encoding device may change the frequency of using I-SPCs depending on the sparseness and denseness or the number (amount) of the objects in a world to perform encoding. Stated differently, the encoding device changes the frequency of selecting I-SPCs depending on the number or the sparseness and denseness of the objects included in the three-dimensional data. For example, the encoding device uses I-SPCs at a higher frequency as the density of the objects in a world is higher.

The encoding device also sets random access points on a GOS-by-GOS basis, and stores information indicating the spatial regions corresponding to the GOSs into the header information.

The encoding device uses, for example, a default value as the spatial size of a GOS. Note that the encoding device may change the GOS size depending on the number (amount) or the sparseness and denseness of objects or dynamic objects. For example, the encoding device sets the spatial size of a GOS to smaller as the density of objects or dynamic objects is higher or the number of objects or dynamic objects is greater.

Also, each SPC or volume includes a keypoint group that is derived by use of information obtained by a sensor such as a depth sensor, a gyroscope sensor, or a camera sensor. The coordinates of the keypoints are set at the central positions of the respective voxels. Furthermore, finer voxels enable highly accurate position information.

The keypoint group is derived by use of a plurality of pictures. A plurality of pictures include at least two types of time information: the actual time information and the same time information common to a plurality of pictures that are associated with SPCs (for example, the encoding time used for rate control, etc.).

Also, encoding or decoding is performed on a GOS-by-GOS basis that includes at least one SPC.

The encoding device and the decoding device predict P-SPCs or B-SPCs in a current GOS by referring to SPCs in a processed GOS.

Alternatively, the encoding device and the decoding device predict P-SPCs or B-SPCs in a current GOS, using the processed SPCs in the current GOS, without referring to a different GOS.

Furthermore, the encoding device and the decoding device transmit or receive an encoded stream on a world-by-world basis that includes at least one GOS.

Also, a GOS has a layer structure in one direction at least in a world, and the encoding device and the decoding device start encoding or decoding from the bottom layer. For example, a random accessible GOS belongs to the lowermost layer. A GOS that belongs to the same layer or a lower layer is referred to in a GOS that belongs to an upper layer. Stated differently, a GOS is spatially divided in a predetermined direction in advance to have a plurality of layers, each including at least one SPC. The encoding device and the decoding device encode or decode each SPC by referring to a SPC included in the same layer as the each SPC or a SPC included in a layer lower than that of the each SPC.

Also, the encoding device and the decoding device successively encode or decode GOSs on a world-by-world basis that includes such GOSs. In so doing, the encoding device and the decoding device write or read out information indicating the order (direction) of encoding or decoding as metadata. Stated differently, the encoded data includes information indicating the order of encoding a plurality of GOSs.

The encoding device and the decoding device also encode or decode mutually different two or more SPCs or GOSs in parallel.

Furthermore, the encoding device and the decoding device encode or decode the spatial information (coordinates, size, etc.) on a SPC or a GOS.

The encoding device and the decoding device encode or decode SPCs or GOSs included in an identified space that is identified on the basis of external information on the self-location or/and region size, such as GPS information, route information, or magnification.

The encoding device or the decoding device gives a lower priority to a space distant from the self-location than the priority of a nearby space to perform encoding or decoding.

The encoding device sets a direction at one of the directions in a world, in accordance with the magnification or the intended use, to encode a GOS having a layer structure in such direction. Also, the decoding device decodes a GOS having a layer structure in one of the directions in a world that has been set in accordance with the magnification or the intended use, preferentially from the bottom layer.

The encoding device changes the accuracy of extracting keypoints, the accuracy of recognizing objects, or the size of spatial regions, etc. included in a SPC, depending on whether an object is an interior object or an exterior object. Note that the encoding device and the decoding device encode or decode an interior GOS and an exterior GOS having close coordinates in a manner that these GOSs come adjacent to each other in a world, and associate their identifiers with each other for encoding and decoding.

Embodiment 2

When using encoded data of a point cloud in an actual device or service, it is desirable that necessary information be transmitted/received in accordance with the intended use to reduce the network bandwidth. However, there has been no such functionality in the structure of encoding three-dimensional data, nor an encoding method therefor.

The present embodiment describes a three-dimensional data encoding method and a three-dimensional data encoding device for providing the functionality of transmitting/receiving only necessary information in encoded data of a three-dimensional point cloud in accordance with the intended use, as well as a three-dimensional data decoding method and a three-dimensional data decoding device for decoding such encoded data.

Figure 11:
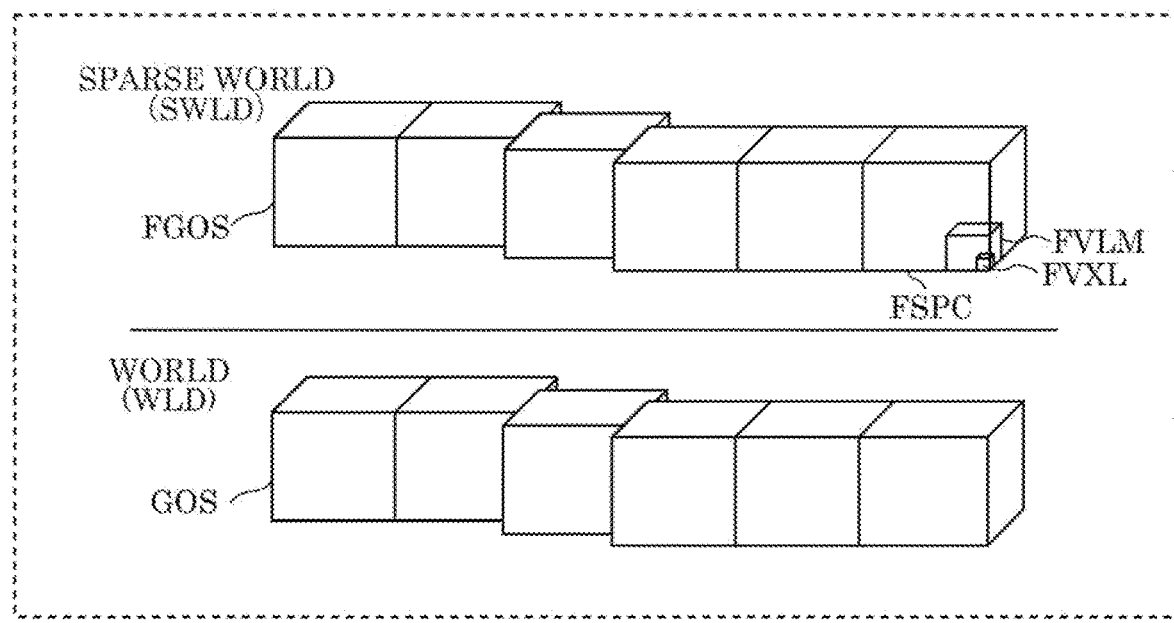
FIG. 11 is a diagram showing an example structure of a sparse world (SWLD) according to Embodiment 2.

A voxel (VXL) with a feature greater than or equal to a given amount is defined as a feature voxel (FVXL), and a world (WLD) constituted by FVXLs is defined as a sparse world (SWLD). FIG. 11 is a diagram showing example structures of a sparse world and a world. A SWLD includes: FGOSs, each being a GOS constituted by FVXLs; FSPCs, each being a SPC constituted by FVXLs; and FVLMs, each being a VLM constituted by FVXLs. The data structure and prediction structure of a FGOS, a FSPC, and a FVLM may be the same as those of a GOS, a SPC, and a VLM.

A feature represents the three-dimensional position information on a VXL or the visible-light information on the position of a VXL. A large number of features are detected especially at a corner, an edge, etc. of a three-dimensional object. More specifically, such a feature is a three-dimensional feature or a visible-light feature as described below, but may be any feature that represents the position, luminance, or color information, etc. on a VXL.

Used as three-dimensional features are signature of histograms of orientations (SHOT) features, point feature histograms (PFH) features, or point pair feature (PPF) features.

SHOT features are obtained by dividing the periphery of a VXL, and calculating an inner product of the reference point and the normal vector of each divided region to represent the calculation result as a histogram. SHOT features are characterized by a large number of dimensions and high-level feature representation.

PFH features are obtained by selecting a large number of two point pairs in the vicinity of a VXL, and calculating the normal vector, etc. from each two point pair to represent the calculation result as a histogram. PFH features are histogram features, and thus are characterized by robustness against a certain extent of disturbance and also high-level feature representation.

PPF features are obtained by using a normal vector, etc. for each two points of VXLs. PPF features, for which all VXLs are used, has robustness against occlusion.

Used as visible-light features are scale-invariant feature transform (SIFT), speeded up robust features (SURF), or histogram of oriented gradients (HOG), etc. that use information on an image such as luminance gradient information.

A SWLD is generated by calculating the above-described features of the respective VXLs in a WLD to extract FVXLs. Here, the SWLD may be updated every time the WLD is updated, or may be regularly updated after the elapse of a certain period of time, regardless of the timing at which the WLD is updated.

A SWLD may be generated for each type of features. For example, different SWLDs may be generated for the respective types of features, such as SWLD1 based on SHOT features and SWLD2 based on SIFT features so that SWLDs are selectively used in accordance with the intended use. Also, the calculated feature of each FVXL may be held in each FVXL as feature information.

Next, the usage of a sparse world (SWLD) will be described. A SWLD includes only feature voxels (FVXLs), and thus its data size is smaller in general than that of a WLD that includes all VXLs.

In an application that utilizes features for a certain purpose, the use of information on a SWLD instead of a WLD reduces the time required to read data from a hard disk, as well as the bandwidth and the time required for data transfer over a network. For example, a WLD and a SWLD are held in a server as map information so that map information to be sent is selected between the WLD and the SWLD in accordance with a request from a client. This reduces the network bandwidth and the time required for data transfer. More specific examples will be described below.

Figure 12:
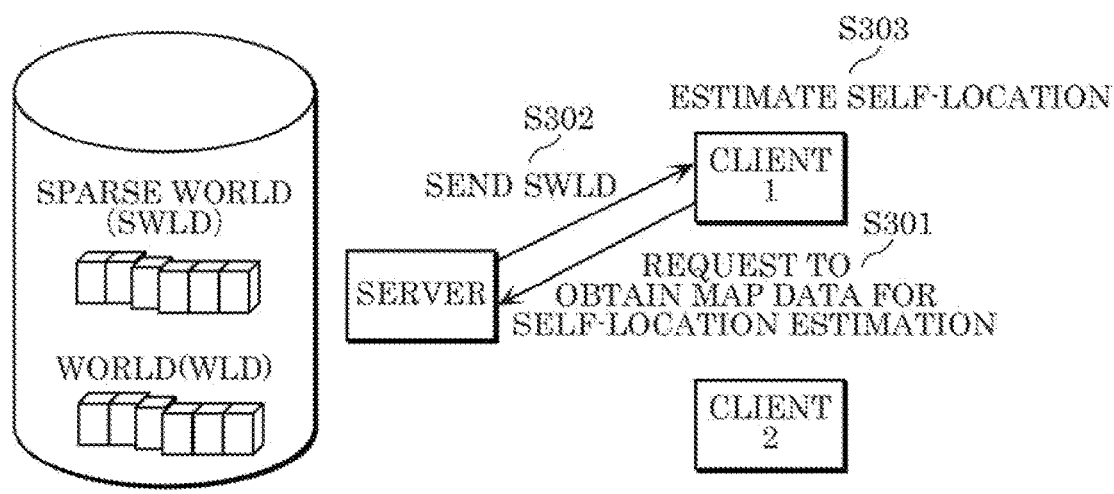
FIG. 12 is a diagram showing example operations performed by a server and a client according to Embodiment 2.
Figure 13:
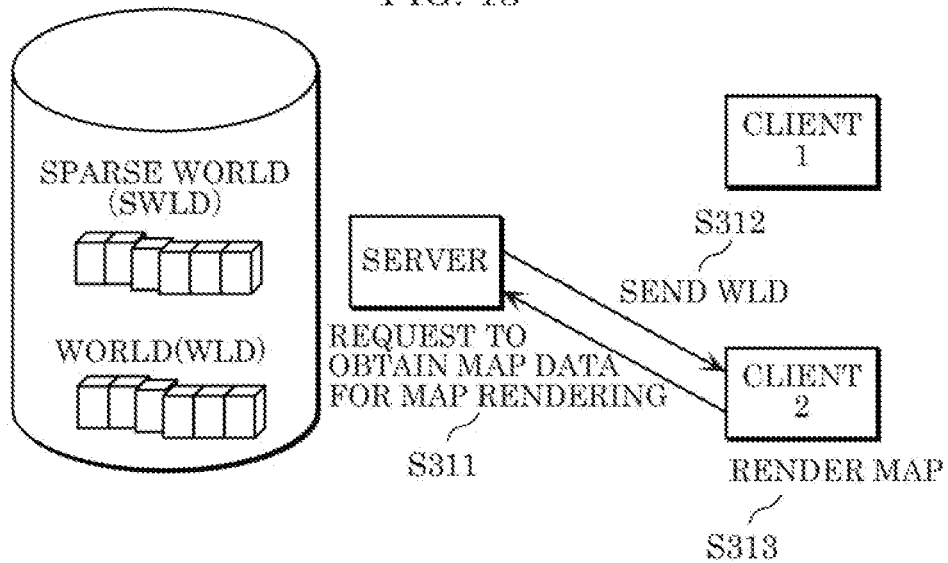
FIG. 13 is a diagram showing example operations performed by the server and a client according to Embodiment 2.

FIG. 12 and FIG. 13 are diagrams showing usage examples of a SWLD and a WLD. As FIG. 12 shows, when client 1, which is a vehicle-mounted device, requires map information to use it for self-location determination, client 1 sends to a server a request for obtaining map data for self-location estimation (S301). The server sends to client 1 the SWLD in response to the obtainment request (S302). Client 1 uses the received SWLD to determine the self-location (S303). In so doing, client 1 obtains VXL information on the periphery of client 1 through various means including a distance sensor such as a rangefinder, as well as a stereo camera and a combination of a plurality of monocular cameras. Client 1 then estimates the self-location information from the obtained VXL information and the SWLD. Here, the self-location information includes three-dimensional position information, orientation, etc. of client 1.

As FIG. 13 shows, when client 2, which is a vehicle-mounted device, requires map information to use it for rendering a map such as a three-dimensional map, client 2 sends to the server a request for obtaining map data for map rendering (S311). The server sends to client 2 the WLD in response to the obtainment request (S312). Client 2 uses the received WLD to render a map (S313). In so doing, client 2 uses, for example, image client 2 has captured by a visible-light camera, etc. and the WLD obtained from the server to create a rendering image, and renders such created image onto a screen of a car navigation system, etc.

As described above, the server sends to a client a SWLD when the features of the respective VXLs are mainly required such as in the case of self-location estimation, and sends to a client a WLD when detailed VXL information is required such as in the case of map rendering. This allows for an efficient sending/receiving of map data.

Note that a client may self-judge which one of a SWLD and a WLD is necessary, and request the server to send a SWLD or a WLD. Also, the server may judge which one of a SWLD and a WLD to send in accordance with the status of the client or a network.

Next, a method will be described of switching the sending/receiving between a sparse world (SWLD) and a world (WLD).

Figure 14:
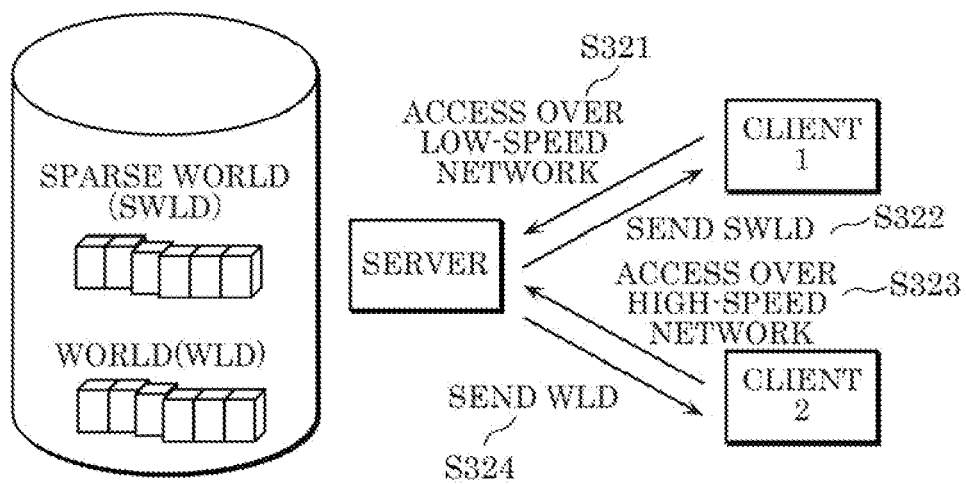
FIG. 14 is a diagram showing example operations performed by the server and the clients according to Embodiment 2.

Whether to receive a WLD or a SWLD may be switched in accordance with the network bandwidth. FIG. 14 is a diagram showing an example operation in such case. For example, when a low-speed network is used that limits the usable network bandwidth, such as in a Long-Term Evolution (LTE) environment, a client accesses the server over a low-speed network (S321), and obtains the SWLD from the server as map information (S322). Meanwhile, when a high-speed network is used that has an adequately broad network bandwidth, such as in a WiFi environment, a client accesses the server over a high-speed network (S323), and obtains the WLD from the server (S324). This enables the client to obtain appropriate map information in accordance with the network bandwidth such client is using.

More specifically, a client receives the SWLD over an LTE network when in outdoors, and obtains the WLD over a WiFi network when in indoors such as in a facility. This enables the client to obtain more detailed map information on indoor environment.

As described above, a client may request for a WLD or a SWLD in accordance with the bandwidth of a network such client is using. Alternatively, the client may send to the server information indicating the bandwidth of a network such client is using, and the server may send to the client data (the WLD or the SWLD) suitable for such client in accordance with the information. Alternatively, the server may identify the network bandwidth the client is using, and send to the client data (the WLD or the SWLD) suitable for such client.

Figure 15:
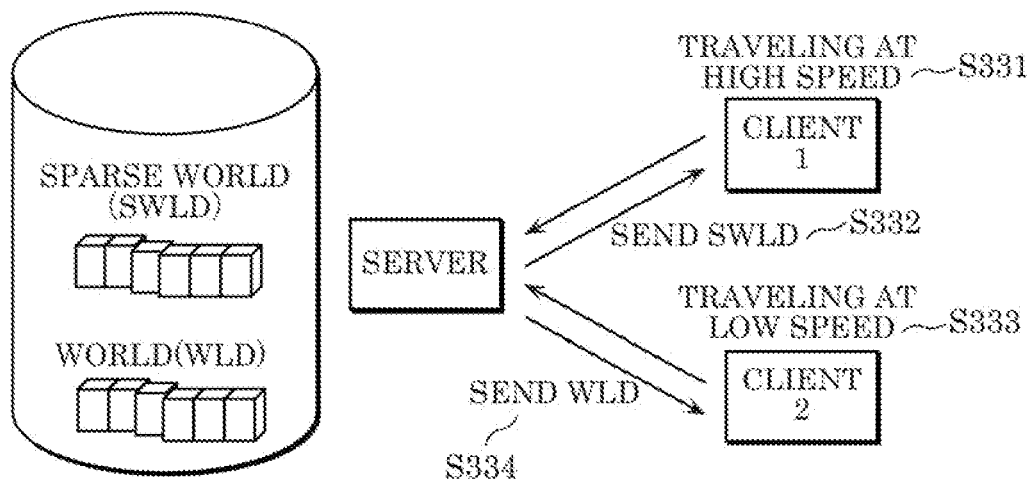
FIG. 15 is a diagram showing example operations performed by the server and the clients according to Embodiment 2.

Also, whether to receive a WLD or a SWLD may be switched in accordance with the speed of traveling. FIG. 15 is a diagram showing an example operation in such case. For example, when traveling at a high speed (S331), a client receives the SWLD from the server (S332). Meanwhile, when traveling at a low speed (S333), the client receives the WLD from the server (S334). This enables the client to obtain map information suitable to the speed, while reducing the network bandwidth. More specifically, when traveling on an expressway, the client receives the SWLD with a small data amount, which enables the update of rough map information at an appropriate speed. Meanwhile, when traveling on a general road, the client receives the WLD, which enables the obtainment of more detailed map information.

As described above, the client may request the server for a WLD or a SWLD in accordance with the traveling speed of such client. Alternatively, the client may send to the server information indicating the traveling speed of such client, and the server may send to the client data (the WLD or the SWLD) suitable to such client in accordance with the information. Alternatively, the server may identify the traveling speed of the client to send data (the WLD or the SWLD) suitable to such client.

Also, the client may obtain, from the server, a SWLD first, from which the client may obtain a WLD of an important region. For example, when obtaining map information, the client first obtains a SWLD for rough map information, from which the client narrows to a region in which features such as buildings, signals, or persons appear at high frequency so that the client can later obtain a WLD of such narrowed region. This enables the client to obtain detailed information on a necessary region, while reducing the amount of data received from the server.

The server may also create from a WLD different SWLDs for the respective objects, and the client may receive SWLDs in accordance with the intended use. This reduces the network bandwidth. For example, the server recognizes persons or cars in a WLD in advance, and creates a SWLD of persons and a SWLD of cars. The client, when wishing to obtain information on persons around the client, receives the SWLD of persons, and when wising to obtain information on cars, receives the SWLD of cars. Such types of SWLDs may be distinguished by information (flag, or type, etc.) added to the header, etc.

Figure 16:
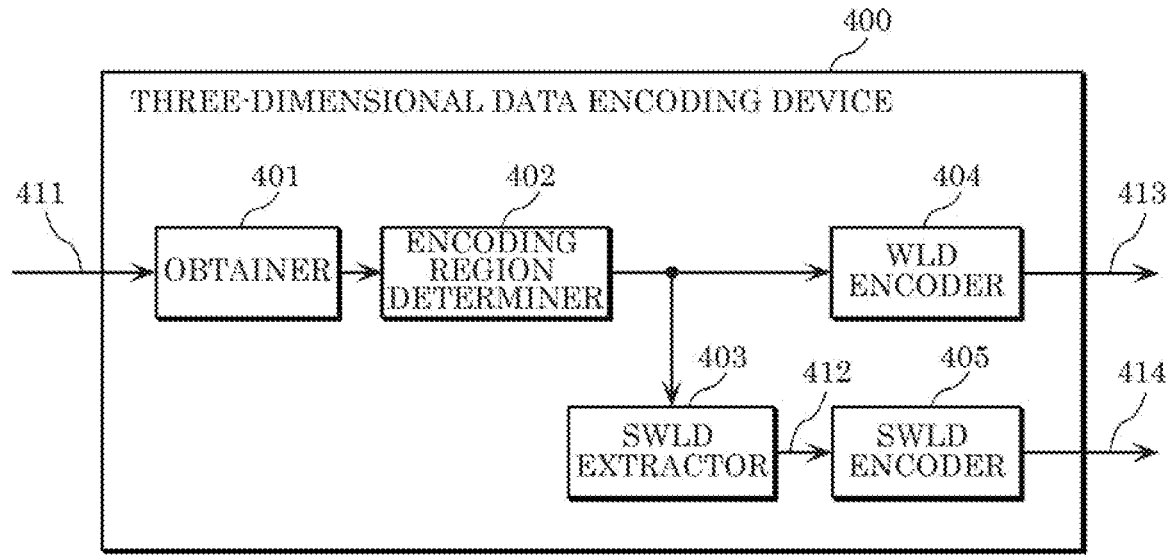
FIG. 16 is a block diagram of a three-dimensional data encoding device according to Embodiment 2.
Figure 17:
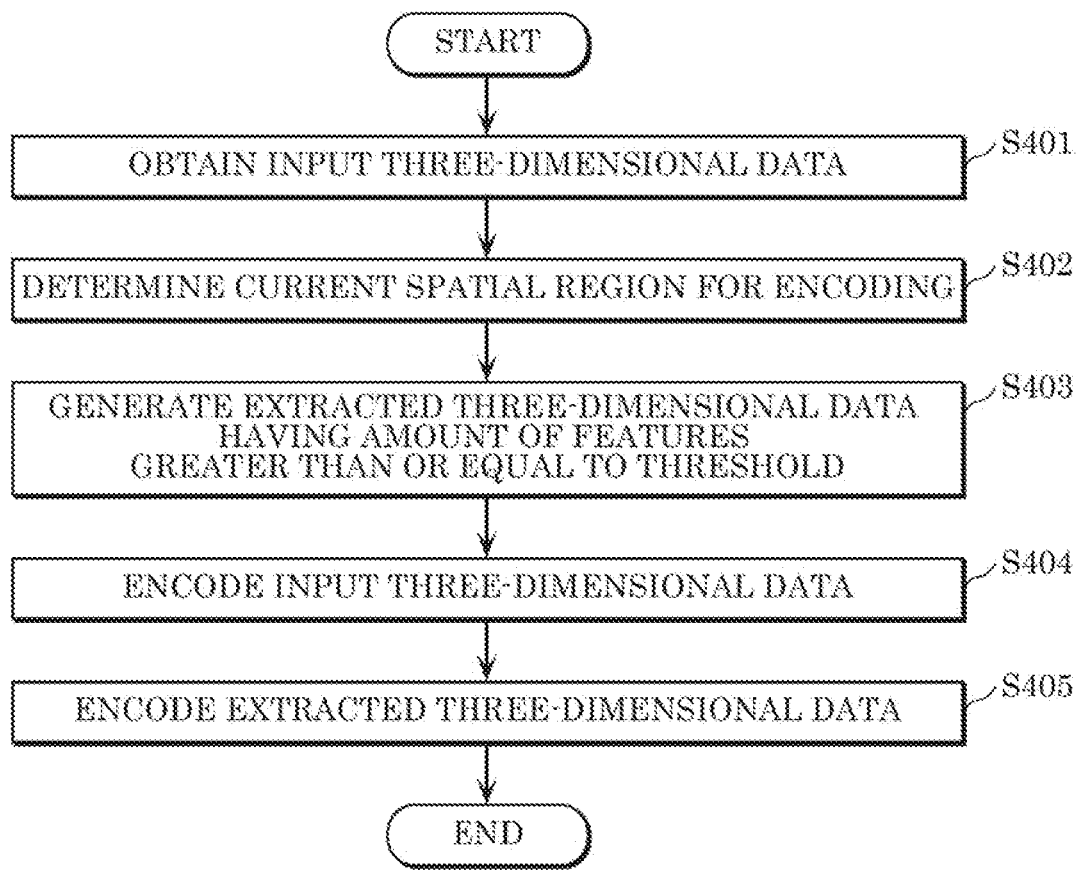
FIG. 17 is a flowchart of encoding processes according to Embodiment 2.

Next, the structure and the operation flow of the three-dimensional data encoding device (e.g., a server) according to the present embodiment will be described. FIG. 16 is a block diagram of three-dimensional data encoding device 400 according to the present embodiment. FIG. 17 is a flowchart of three-dimensional data encoding processes performed by three-dimensional data encoding device 400.

Three-dimensional data encoding device 400 shown in FIG. 16 encodes input three-dimensional data 411, thereby generating encoded three-dimensional data 413 and encoded three-dimensional data 414, each being an encoded stream. Here, encoded three-dimensional data 413 is encoded three-dimensional data corresponding to a WLD, and encoded three-dimensional data 414 is encoded three-dimensional data corresponding to a SWLD. Such three-dimensional data encoding device 400 includes, obtainer 401, encoding region determiner 402, SWLD extractor 403, WLD encoder 404, and SWLD encoder 405.

First, as FIG. 17 shows, obtainer 401 obtains input three-dimensional data 411, which is point group data in a three-dimensional space (S401).

Next, encoding region determiner 402 determines a current spatial region for encoding on the basis of a spatial region in which the point cloud data is present (S402).

Next, SWLD extractor 403 defines the current spatial region as a WLD, and calculates the feature from each VXL included in the WLD. Then, SWLD extractor 403 extracts VXLs having an amount of features greater than or equal to a predetermined threshold, defines the extracted VXLs as FVXLs, and adds such FVXLs to a SWLD, thereby generating extracted three-dimensional data 412 (S403). Stated differently, extracted three-dimensional data 412 having an amount of features greater than or equal to the threshold is extracted from input three-dimensional data 411.

Next, WLD encoder 404 encodes input three-dimensional data 411 corresponding to the WLD, thereby generating encoded three-dimensional data 413 corresponding to the WLD (S404). In so doing, WLD encoder 404 adds to the header of encoded three-dimensional data 413 information that distinguishes that such encoded three-dimensional data 413 is a stream including a WLD.

SWLD encoder 405 encodes extracted three-dimensional data 412 corresponding to the SWLD, thereby generating encoded three-dimensional data 414 corresponding to the SWLD (S405). In so doing, SWLD encoder 405 adds to the header of encoded three-dimensional data 414 information that distinguishes that such encoded three-dimensional data 414 is a stream including a SWLD.

Note that the process of generating encoded three-dimensional data 413 and the process of generating encoded three-dimensional data 414 may be performed in the reverse order. Also note that a part or all of these processes may be performed in parallel.

A parameter "world type" is defined, for example, as information added to each header of encoded three-dimensional data 413 and encoded three-dimensional data 414. world type=0 indicates that a stream includes a WLD, and world type=1 indicates that a stream includes a SWLD. An increased number of values may be further assigned to define a larger number of types, e.g., world type=2. Also, one of encoded three-dimensional data 413 and encoded three-dimensional data 414 may include a specified flag. For example, encoded three-dimensional data 414 may be assigned with a flag indicating that such stream includes a SWLD. In such a case, the decoding device can distinguish whether such stream is a stream including a WLD or a stream including a SWLD in accordance with the presence/absence of the flag.

Also, an encoding method used by WLD encoder 404 to encode a WLD may be different from an encoding method used by SWLD encoder 405 to encode a SWLD.

For example, data of a SWLD is decimated, and thus can have a lower correlation with the neighboring data than that of a WLD. For this reason, of intra prediction and inter prediction, inter prediction may be more preferentially performed in an encoding method used for a SWLD than in an encoding method used for a WLD.

Also, an encoding method used for a SWLD and an encoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Also, SWLD encoder 405 performs encoding in a manner that encoded three-dimensional data 414 of a SWLD has a smaller data size than the data size of encoded three-dimensional data 413 of a WLD. A SWLD can have a lower inter-data correlation, for example, than that of a WLD as described above. This can lead to a decreased encoding efficiency, and thus to encoded three-dimensional data 414 having a larger data size than the data size of encoded three-dimensional data 413 of a WLD. When the data size of the resulting encoded three-dimensional data 414 is larger than the data size of encoded three-dimensional data 413 of a WLD, SWLD encoder 405 performs encoding again to re-generate encoded three-dimensional data 414 having a reduced data size.

For example, SWLD extractor 403 re-generates extracted three-dimensional data 412 having a reduced number of keypoints to be extracted, and SWLD encoder 405 encodes such extracted three-dimensional data 412. Alternatively, SWLD encoder 405 may perform more coarse quantization. More coarse quantization is achieved, for example, by rounding the data in the lowermost level in an octree structure described below. When failing to decrease the data size of encoded three-dimensional data 414 of the SWLD to smaller than the data size of encoded three-dimensional data 413 of the WLD, SWLD encoder 405 may not generate encoded three-dimensional data 414 of the SWLD. Alternatively, encoded three-dimensional data 413 of the WLD may be copied as encoded three-dimensional data 414 of the SWLD. Stated differently, encoded three-dimensional data 413 of the WLD may be used as it is as encoded three-dimensional data 414 of the SWLD.

Figure 18:
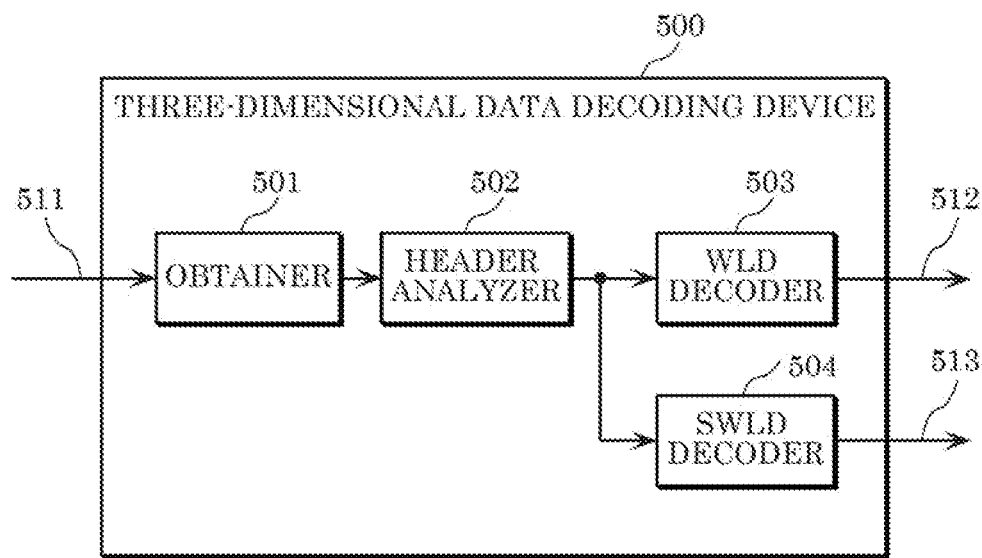
FIG. 18 is a block diagram of a three-dimensional data decoding device according to Embodiment 2.
Figure 19:
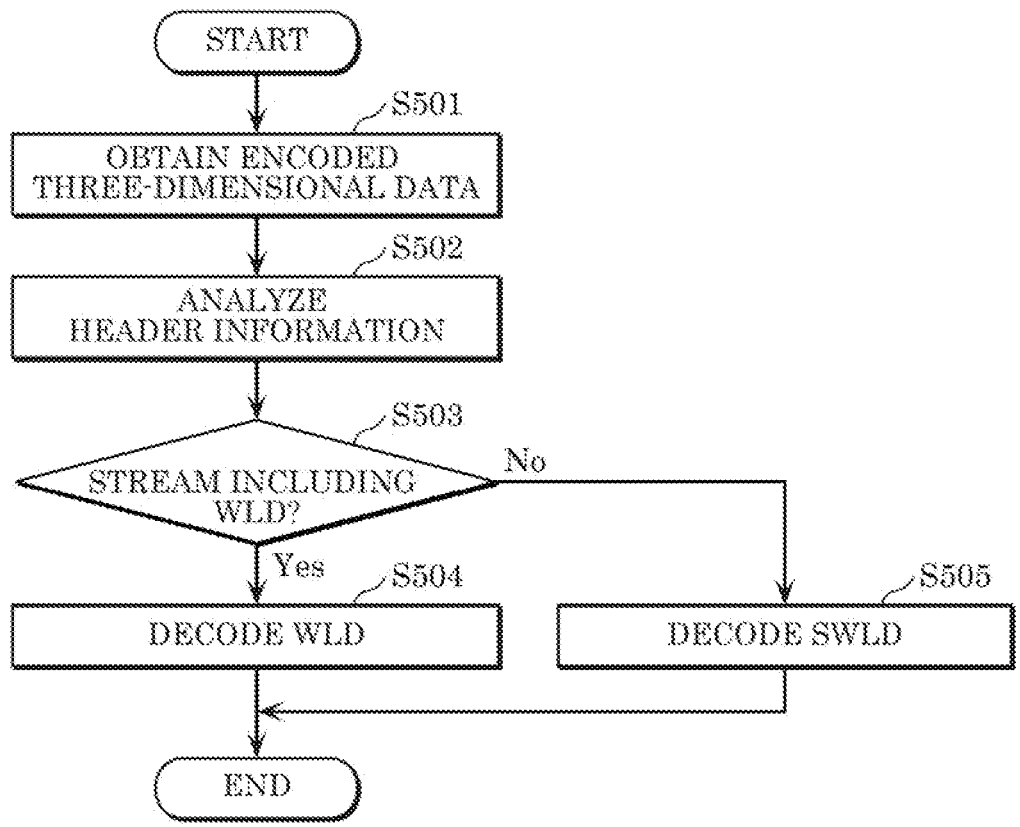
FIG. 19 is a flowchart of decoding processes according to Embodiment 2.

Next, the structure and the operation flow of the three-dimensional data decoding device (e.g., a client) according to the present embodiment will be described. FIG. 18 is a block diagram of three-dimensional data decoding device 500 according to the present embodiment. FIG. 19 is a flowchart of three-dimensional data decoding processes performed by three-dimensional data decoding device 500.

Three-dimensional data decoding device 500 shown in FIG. 18 decodes encoded three-dimensional data 511, thereby generating decoded three-dimensional data 512 or decoded three-dimensional data 513. Encoded three-dimensional data 511 here is, for example, encoded three-dimensional data 413 or encoded three-dimensional data 414 generated by three-dimensional data encoding device 400.

Such three-dimensional data decoding device 500 includes obtainer 501, header analyzer 502, WLD decoder 503, and SWLD decoder 504.

First, as FIG. 19 shows, obtainer 501 obtains encoded three-dimensional data 511 (S501). Next, header analyzer 502 analyzes the header of encoded three-dimensional data 511 to identify whether encoded three-dimensional data 511 is a stream including a WLD or a stream including a SWLD (S502). For example, the above-described parameter world type is referred to in making such identification.

When encoded three-dimensional data 511 is a stream including a WLD (Yes in S503), WLD decoder 503 decodes encoded three-dimensional data 511, thereby generating decoded three-dimensional data 512 of the WLD (S504). Meanwhile, when encoded three-dimensional data 511 is a stream including a SWLD (No in S503), SWLD decoder 504 decodes encoded three-dimensional data 511, thereby generating decoded three-dimensional data 513 of the SWLD (S505).

Also, as in the case of the encoding device, a decoding method used by WLD decoder 503 to decode a WLD may be different from a decoding method used by SWLD decoder 504 to decode a SWLD. For example, of intra prediction and inter prediction, inter prediction may be more preferentially performed in a decoding method used for a SWLD than in a decoding method used for a WLD.

Also, a decoding method used for a SWLD and a decoding method used for a WLD may represent three-dimensional positions differently. For example, three-dimensional coordinates may be used to represent the three-dimensional positions of FVXLs in a SWLD and an octree described below may be used to represent three-dimensional positions in a WLD, and vice versa.

Figure 20:
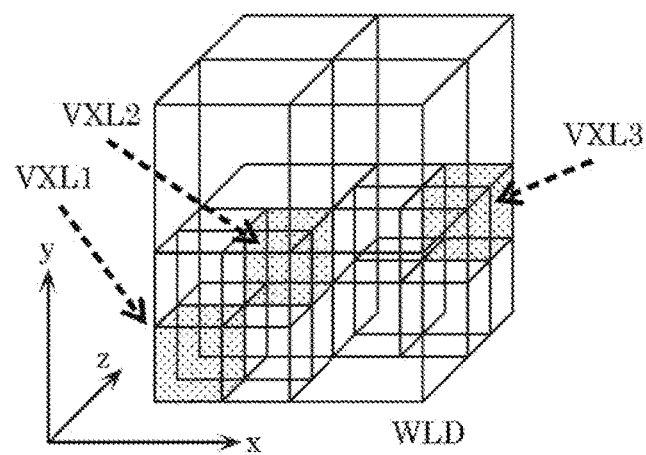
FIG. 20 is a diagram showing an example structure of a world (WLD) according to Embodiment 2.
Figure 21:
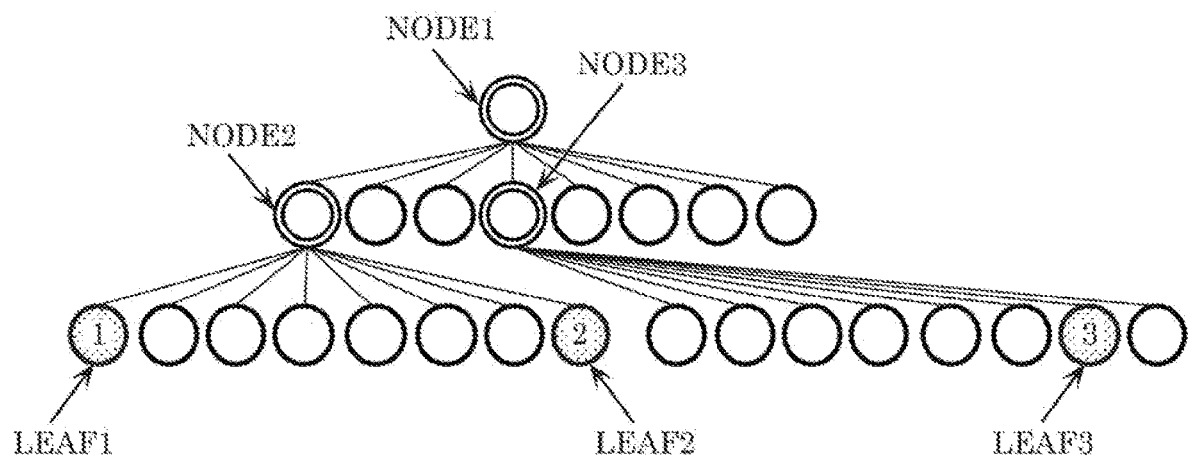
FIG. 21 is a diagram showing an example octree structure of the WLD according to Embodiment 2.

Next, an octree representation will be described, which is a method of representing three-dimensional positions. VXL data included in three-dimensional data is converted into an octree structure before encoded. FIG. 20 is a diagram showing example VXLs in a WLD. FIG. 21 is a diagram showing an octree structure of the WLD shown in FIG. 20. An example shown in FIG. 20 illustrates three VXLs 1 to 3 that include point groups (hereinafter referred to as effective VXLs). As FIG. 21 shows, the octree structure is made of nodes and leaves. Each node has a maximum of eight nodes or leaves. Each leaf has VXL information. Here, of the leaves shown in FIG. 21, leaf 1, leaf 2, and leaf 3 represent VXL1, VXL2, and VXL3 shown in FIG. 20, respectively.

More specifically, each node and each leaf correspond to a three-dimensional position. Node 1 corresponds to the entire block shown in FIG. 20. The block that corresponds to node 1 is divided into eight blocks. Of these eight blocks, blocks including effective VXLs are set as nodes, while the other blocks are set as leaves. Each block that corresponds to a node is further divided into eight nodes or leaves. These processes are repeated by the number of times that is equal to the number of levels in the octree structure. All blocks in the lowermost level are set as leaves.

Figure 22:
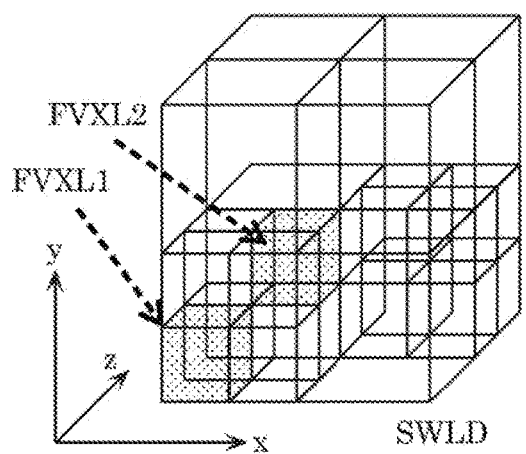
FIG. 22 is a diagram showing an example structure of a SWLD according to Embodiment 2.
Figure 23:
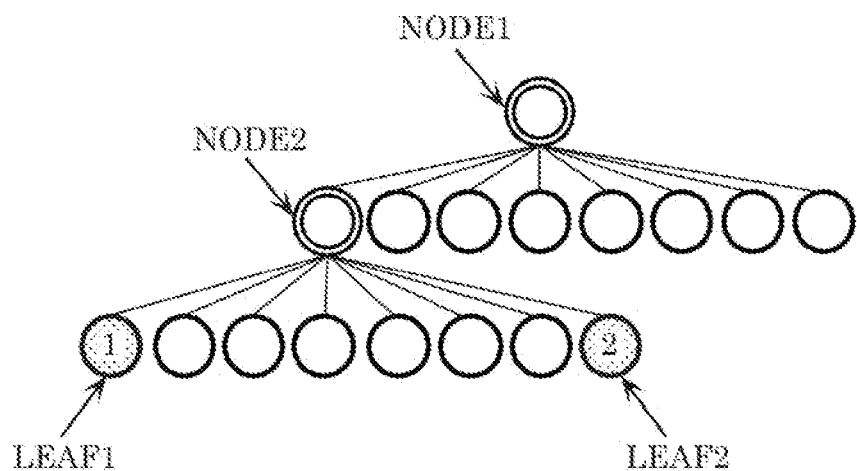
FIG. 23 is a diagram showing an example octree structure of the SWLD according to Embodiment 2.

FIG. 22 is a diagram showing an example SWLD generated from the WLD shown in FIG. 20. VXL1 and VXL2 shown in FIG. 20 are judged as FVXL1 and FVXL2 as a result of feature extraction, and thus are added to the SWLD. Meanwhile, VXL3 is not judged as a FVXL, and thus is not added to the SWLD. FIG. 23 is a diagram showing an octree structure of the SWLD shown in FIG. 22. In the octree structure shown in FIG. 23, leaf 3 corresponding to VXL3 shown in FIG. 21 is deleted. Consequently, node 3 shown in FIG. 21 has lost an effective VXL, and has changed to a leaf. As described above, a SWLD has a smaller number of leaves in general than a WLD does, and thus the encoded three-dimensional data of the SWLD is smaller than the encoded three-dimensional data of the WLD.

The following describes variations of the present embodiment.

For self-location estimation, for example, a client, being a vehicle-mounted device, etc., may receive a SWLD from the server to use such SWLD to estimate the self-location. Meanwhile, for obstacle detection, the client may detect obstacles by use of three-dimensional information on the periphery obtained by such client through various means including a distance sensor such as a rangefinder, as well as a stereo camera and a combination of a plurality of monocular cameras.

In general, a SWLD is less likely to include VXL data on a flat region. As such, the server may hold a subsample world (subWLD) obtained by subsampling a WLD for detection of static obstacles, and send to the client the SWLD and the subWLD. This enables the client to perform self-location estimation and obstacle detection on the client's part, while reducing the network bandwidth.

When the client renders three-dimensional map data at a high speed, map information having a mesh structure is more useful in some cases. As such, the server may generate a mesh from a WLD to hold it beforehand as a mesh world (MWLD). For example, when wishing to perform coarse three-dimensional rendering, the client receives a MWLD, and when wishing to perform detailed three-dimensional rendering, the client receives a WLD. This reduces the network bandwidth.

In the above description, the server sets, as FVXLs, VXLs having an amount of features greater than or equal to the threshold, but the server may calculate FVXLs by a different method. For example, the server may judge that a VXL, a VLM, a SPC, or a GOS that constitutes a signal, or an intersection, etc. as necessary for self-location estimation, driving assist, or self-driving, etc., and incorporate such VXL, VLM, SPC, or GOS into a SWLD as a FVXL, a FVLM, a FSPC, or a FGOS. Such judgment may be made manually. Also, FVXLs, etc. that have been set on the basis of an amount of features may be added to FVXLs, etc. obtained by the above method. Stated differently, SWLD extractor 403 may further extract, from input three-dimensional data 411, data corresponding to an object having a predetermined attribute as extracted three-dimensional data 412.

Also, that a VXL, a VLM, a SPC, or a GOS is necessary for such intended usage may be labeled separately from the features. The server may separately hold, as an upper layer of a SWLD (e.g., a lane world), FVXLs of a signal or an intersection, etc. necessary for self-location estimation, driving assist, or self-driving, etc.

The server may also add an attribute to VXLs in a WLD on a random access basis or on a predetermined unit basis. An attribute, for example, includes information indicating whether VXLs are necessary for self-location estimation, or information indicating whether VXLs are important as traffic information such as a signal, or an intersection, etc. An attribute may also include a correspondence between VXLs and features (intersection, or road, etc.) in lane information (geographic data files (GDF), etc.).

A method as described below may be used to update a WLD or a SWLD.

Update information indicating changes, etc. in a person, a roadwork, or a tree line (for trucks) is uploaded to the server as point groups or meta data. The server updates a WLD on the basis of such uploaded information, and then updates a SWLD by use of the updated WLD.

The client, when detecting a mismatch between the three-dimensional information such client has generated at the time of self-location estimation and the three-dimensional information received from the server, may send to the server the three-dimensional information such client has generated, together with an update notification. In such a case, the server updates the SWLD by use of the WLD. When the SWLD is not to be updated, the server judges that the WLD itself is old.

In the above description, information that distinguishes whether an encoded stream is that of a WLD or a SWLD is added as header information of the encoded stream. However, when there are many types of worlds such as a mesh world and a lane world, information that distinguishes these types of the worlds may be added to header information. Also, when there are many SWLDs with different amounts of features, information that distinguishes the respective SWLDs may be added to header information.

In the above description, a SWLD is constituted by FVXLs, but a SWLD may include VXLs that have not been judged as FVXLs. For example, a SWLD may include an adjacent VXL used to calculate the feature of a FVXL. This enables the client to calculate the feature of a FVXL when receiving a SWLD, even in the case where feature information is not added to each FVXL of the SWLD. In such a case, the SWLD may include information that distinguishes whether each VXL is a FVXL or a VXL.

As described above, three-dimensional data encoding device 400 extracts, from input three-dimensional data 411 (first three-dimensional data), extracted three-dimensional data 412 (second three-dimensional data) having an amount of a feature greater than or equal to a threshold, and encodes extracted three-dimensional data 412 to generate encoded three-dimensional data 414 (first encoded three-dimensional data).

This three-dimensional data encoding device 400 generates encoded three-dimensional data 414 that is obtained by encoding data having an amount of a feature greater than or equal to the threshold. This reduces the amount of data compared to the case where input three-dimensional data 411 is encoded as it is. Three-dimensional data encoding device 400 is thus capable of reducing the amount of data to be transmitted.

Three-dimensional data encoding device 400 further encodes input three-dimensional data 411 to generate encoded three-dimensional data 413 (second encoded three-dimensional data).

This three-dimensional data encoding device 400 enables selective transmission of encoded three-dimensional data 413 and encoded three-dimensional data 414, in accordance, for example, with the intended use, etc.

Also, extracted three-dimensional data 412 is encoded by a first encoding method, and input three-dimensional data 411 is encoded by a second encoding method different from the first encoding method.

This three-dimensional data encoding device 400 enables the use of an encoding method suitable for each of input three-dimensional data 411 and extracted three-dimensional data 412.

Also, of intra prediction and inter prediction, the inter prediction is more preferentially performed in the first encoding method than in the second encoding method.

This three-dimensional data encoding device 400 enables inter prediction to be more preferentially performed on extracted three-dimensional data 412 in which adjacent data items are likely to have low correlation.

Also, the first encoding method and the second encoding method represent three-dimensional positions differently. For example, the second encoding method represents three-dimensional positions by octree, and the first encoding method represents three-dimensional positions by three-dimensional coordinates.

This three-dimensional data encoding device 400 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Stated differently, such identifier indicates whether the encoded three-dimensional data is encoded three-dimensional data 413 of a WLD or encoded three-dimensional data 414 of a SWLD.

This enables the decoding device to readily judge whether the obtained encoded three-dimensional data is encoded three-dimensional data 413 or encoded three-dimensional data 414.

Also, three-dimensional data encoding device 400 encodes extracted three-dimensional data 412 in a manner that encoded three-dimensional data 414 has a smaller data amount than a data amount of encoded three-dimensional data 413.

This three-dimensional data encoding device 400 enables encoded three-dimensional data 414 to have a smaller data amount than the data amount of encoded three-dimensional data 413.

Also, three-dimensional data encoding device 400 further extracts data corresponding to an object having a predetermined attribute from input three-dimensional data 411 as extracted three-dimensional data 412. The object having a predetermined attribute is, for example, an object necessary for self-location estimation, driving assist, or self-driving, etc., or more specifically, a signal, an intersection, etc.

This three-dimensional data encoding device 400 is capable of generating encoded three-dimensional data 414 that includes data required by the decoding device.

Also, three-dimensional data encoding device 400 (server) further sends, to a client, one of encoded three-dimensional data 413 and encoded three-dimensional data 414 in accordance with a status of the client.

This three-dimensional data encoding device 400 is capable of sending appropriate data in accordance with the status of the client.

Also, the status of the client includes one of a communication condition (e.g., network bandwidth) of the client and a traveling speed of the client.

Also, three-dimensional data encoding device 400 further sends, to a client, one of encoded three-dimensional data 413 and encoded three-dimensional data 414 in accordance with a request from the client.

This three-dimensional data encoding device 400 is capable of sending appropriate data in accordance with the request from the client.

Also, three-dimensional data decoding device 500 according to the present embodiment decodes encoded three-dimensional data 413 or encoded three-dimensional data 414 generated by three-dimensional data encoding device 400 described above.

Stated differently, three-dimensional data decoding device 500 decodes, by a first decoding method, encoded three-dimensional data 414 obtained by encoding extracted three-dimensional data 412 having an amount of a feature greater than or equal to a threshold, extracted three-dimensional data 412 having been extracted from input three-dimensional data 411. Three-dimensional data decoding device 500 also decodes, by a second decoding method, encoded three-dimensional data 413 obtained by encoding input three-dimensional data 411, the second decoding method being different from the first decoding method.

This three-dimensional data decoding device 500 enables selective reception of encoded three-dimensional data 414 obtained by encoding data having an amount of a feature greater than or equal to the threshold and encoded three-dimensional data 413, in accordance, for example, with the intended use, etc. Three-dimensional data decoding device 500 is thus capable of reducing the amount of data to be transmitted. Such three-dimensional data decoding device 500 further enables the use of a decoding method suitable for each of input three-dimensional data 411 and extracted three-dimensional data 412.

Also, of intra prediction and inter prediction, the inter prediction is more preferentially performed in the first decoding method than in the second decoding method.

This three-dimensional data decoding device 500 enables inter prediction to be more preferentially performed on the extracted three-dimensional data in which adjacent data items are likely to have low correlation.

Also, the first decoding method and the second decoding method represent three-dimensional positions differently. For example, the second decoding method represents three-dimensional positions by octree, and the first decoding method represents three-dimensional positions by three-dimensional coordinates.

This three-dimensional data decoding device 500 enables the use of a more suitable method to represent the three-dimensional positions of three-dimensional data in consideration of the difference in the number of data items (the number of VXLs or FVXLs) included.

Also, at least one of encoded three-dimensional data 413 and encoded three-dimensional data 414 includes an identifier indicating whether the encoded three-dimensional data is encoded three-dimensional data obtained by encoding input three-dimensional data 411 or encoded three-dimensional data obtained by encoding part of input three-dimensional data 411. Three-dimensional data decoding device 500 refers to such identifier in identifying between encoded three-dimensional data 413 and encoded three-dimensional data 414.

This three-dimensional data decoding device 500 is capable of readily judging whether the obtained encoded three-dimensional data is encoded three-dimensional data 413 or encoded three-dimensional data 414.

Three-dimensional data decoding device 500 further notifies a server of a status of the client (three-dimensional data decoding device 500). Three-dimensional data decoding device 500 receives one of encoded three-dimensional data 413 and encoded three-dimensional data 414 from the server, in accordance with the status of the client.

This three-dimensional data decoding device 500 is capable of receiving appropriate data in accordance with the status of the client.

Also, the status of the client includes one of a communication condition (e.g., network bandwidth) of the client and a traveling speed of the client.

Three-dimensional data decoding device 500 further makes a request of the server for one of encoded three-dimensional data 413 and encoded three-dimensional data 414, and receives one of encoded three-dimensional data 413 and encoded three-dimensional data 414 from the server, in accordance with the request.

This three-dimensional data decoding device 500 is capable of receiving appropriate data in accordance with the intended use.

Embodiment 3

The present embodiment will describe a method of transmitting/receiving three-dimensional data between vehicles. For example, the three-dimensional data is transmitted/received between the own vehicle and the nearby vehicle.

Figure 24:
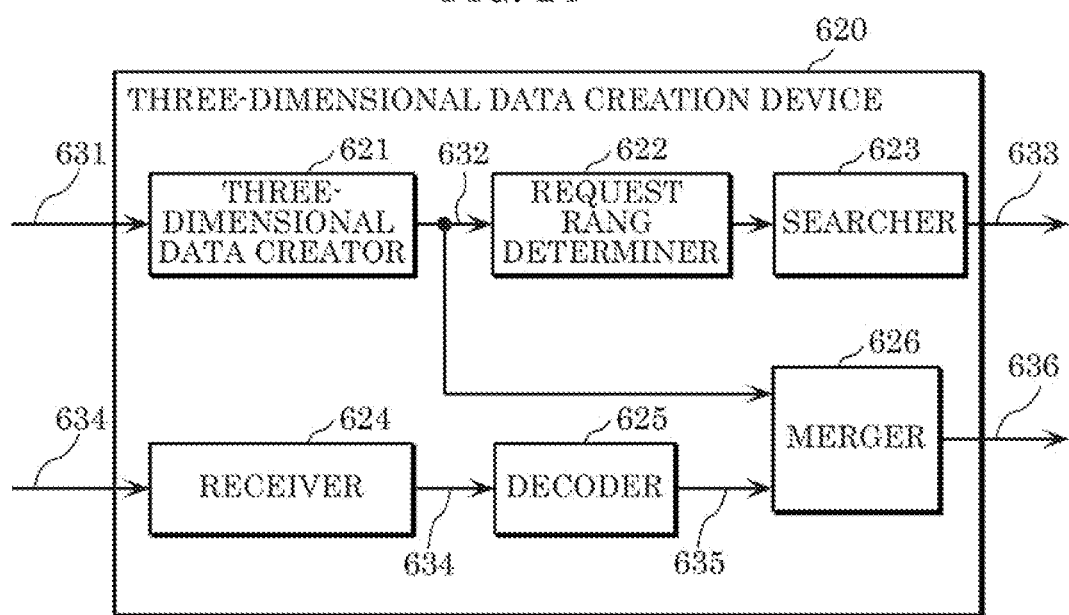
FIG. 24 is a block diagram of a three-dimensional data creation device according to Embodiment 3.

FIG. 24 is a block diagram of three-dimensional data creation device 620 according to the present embodiment. Such three-dimensional data creation device 620, which is included, for example, in the own vehicle, mergers first three-dimensional data 632 created by three-dimensional data creation device 620 with the received second three-dimensional data 635, thereby creating third three-dimensional data 636 having a higher density.

Such three-dimensional data creation device 620 includes three-dimensional data creator 621, request range determiner 622, searcher 623, receiver 624, decoder 625, and merger 626.

First, three-dimensional data creator 621 creates first three-dimensional data 632 by use of sensor information 631 detected by the sensor included in the own vehicle. Next, request range determiner 622 determines a request range, which is the range of a three-dimensional space, the data on which is insufficient in the created first three-dimensional data 632.

Next, searcher 623 searches for the nearby vehicle having the three-dimensional data of the request range, and sends request range information 633 indicating the request range to nearby vehicle 601 having been searched out (S623). Next, receiver 624 receives encoded three-dimensional data 634, which is an encoded stream of the request range, from nearby vehicle 601 (S624). Note that searcher 623 may indiscriminately send requests to all vehicles included in a specified range to receive encoded three-dimensional data 634 from a vehicle that has responded to the request. Searcher 623 may send a request not only to vehicles but also to an object such as a signal and a sign, and receive encoded three-dimensional data 634 from the object.

Next, decoder 625 decodes the received encoded three-dimensional data 634, thereby obtaining second three-dimensional data 635. Next, merger 626 merges first three-dimensional data 632 with second three-dimensional data 635, thereby creating three-dimensional data 636 having a higher density.

Figure 25:
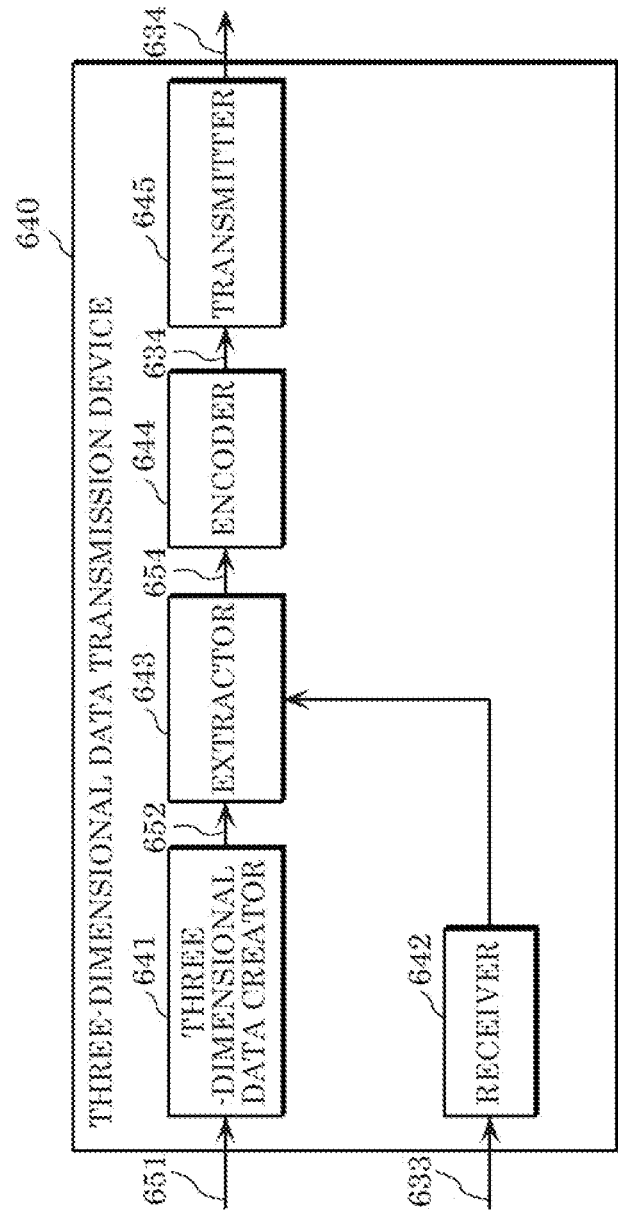
FIG. 25 is a block diagram of a three-dimensional data transmission device according to Embodiment 3.

Next, the structure and operations of three-dimensional data transmission device 640 according to the present embodiment will be described. FIG. 25 is a block diagram of three-dimensional data transmission device 640.

Three-dimensional data transmission device 640 is included, for example, in the above-described nearby vehicle. Three-dimensional data transmission device 640 processes fifth three-dimensional data 652 created by the nearby vehicle into sixth three-dimensional data 654 requested by the own vehicle, encodes sixth three-dimensional data 654 to generate encoded three-dimensional data 634, and sends encoded three-dimensional data 634 to the own vehicle.

Three-dimensional data transmission device 640 includes three-dimensional data creator 641, receiver 642, extractor 643, encoder 644, and transmitter 645.

First, three-dimensional data creator 641 creates fifth three-dimensional data 652 by use of sensor information 651 detected by the sensor included in the nearby vehicle. Next, receiver 642 receives request range information 633 from the own vehicle.

Next, extractor 643 extracts from fifth three-dimensional data 652 the three-dimensional data of the request range indicated by request range information 633, thereby processing fifth three-dimensional data 652 into sixth three-dimensional data 654. Next, encoder 644 encodes sixth three-dimensional data 654 to generate encoded three-dimensional data 643, which is an encoded stream. Then, transmitter 645 sends encoded three-dimensional data 634 to the own vehicle.

Note that although an example case is described here in which the own vehicle includes three-dimensional data creation device 620 and the nearby vehicle includes three-dimensional data transmission device 640, each of the vehicles may include the functionality of both three-dimensional data creation device 620 and three-dimensional data transmission device 640.

Embodiment 4

The present embodiment describes operations performed in abnormal cases when self-location estimation is performed on the basis of a three-dimensional map.

A three-dimensional map is expected to find its expanded use in self-driving of a vehicle and autonomous movement, etc. of a mobile object such as a robot and a flying object (e.g., a drone). Example means for enabling such autonomous movement include a method in which a mobile object travels in accordance with a three-dimensional map, while estimating its self-location on the map (self-location estimation).

The self-location estimation is enabled by matching a three-dimensional map with three-dimensional information on the surrounding of the own vehicle (hereinafter referred to as self-detected three-dimensional data) obtained by a sensor equipped in the own vehicle, such as a rangefinder (e.g., a LiDAR) and a stereo camera to estimate the location of the own vehicle on the three-dimensional map.

As in the case of an HD map suggested by HERE Technologies, for example, a three-dimensional map may include not only a three-dimensional point cloud, but also two-dimensional map data such as information on the shapes of roads and intersections, or information that changes in real-time such as information on a traffic jam and an accident. A three-dimensional map includes a plurality of layers such as layers of three-dimensional data, two-dimensional data, and meta-data that changes in real-time, from among which the device can obtain or refer to only necessary data.

Point cloud data may be a SWLD as described above, or may include point group data that is different from keypoints. The transmission/reception of point cloud data is basically carried out in one or more random access units.

A method described below is used as a method of matching a three-dimensional map with self-detected three-dimensional data. For example, the device compares the shapes of the point groups in each other's point clouds, and determines that portions having a high degree of similarity among keypoints correspond to the same position. When the three-dimensional map is formed by a SWLD, the device also performs matching by comparing the keypoints that form the SWLD with three-dimensional keypoints extracted from the self-detected three-dimensional data.

Here, to enable highly accurate self-location estimation, the following needs to be satisfied: (A) the three-dimensional map and the self-detected three-dimensional data have been already obtained; and (B) their accuracies satisfy a predetermined requirement. However, one of (A) and (B) cannot be satisfied in abnormal cases such as ones described below.

1. A three-dimensional map is unobtainable over communication.
2. A three-dimensional map is not present, or a three-dimensional map having been obtained is corrupt.
3. A sensor of the own vehicle has trouble, or the accuracy of the generated self-detected three-dimensional data is inadequate due to bad weather.

The following describes operations to cope with such abnormal cases. The following description illustrates an example case of a vehicle, but the method described below is applicable to mobile objects on the whole that are capable of autonomous movement, such as a robot and a drone.

Figure 26:
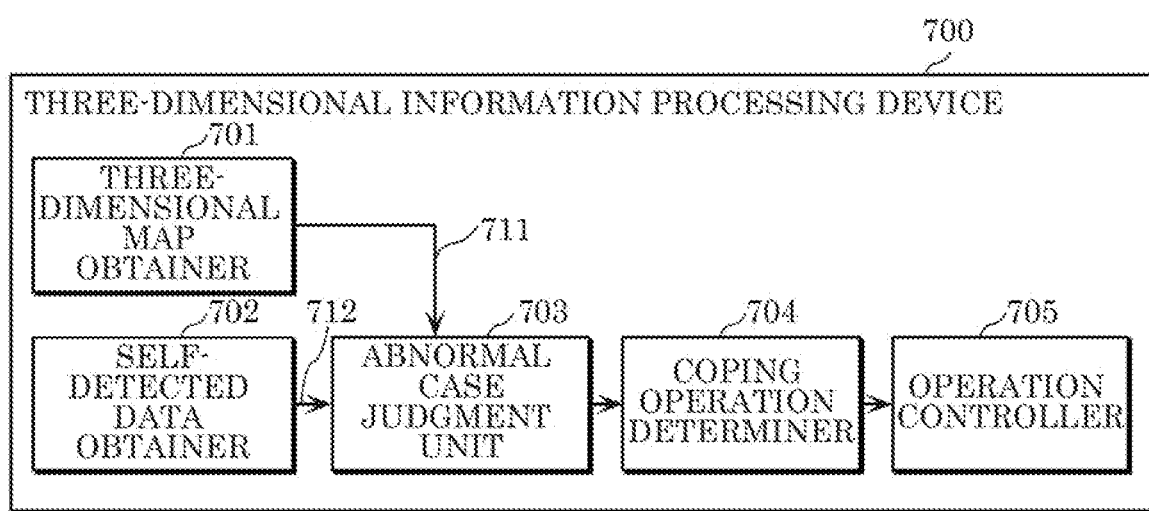
FIG. 26 is a block diagram of a three-dimensional information processing device according to Embodiment 4.

The following describes the structure of the three-dimensional information processing device and its operation according to the present embodiment capable of coping with abnormal cases regarding a three-dimensional map or self-detected three-dimensional data. FIG. 26 is a block diagram of an example structure of three-dimensional information processing device 700 according to the present embodiment.

Three-dimensional information processing device 700 is equipped, for example, in a mobile object such as a car. As shown in FIG. 26, three-dimensional information processing device 700 includes three-dimensional map obtainer 701, self-detected data obtainer 702, abnormal case judgment unit 703, coping operation determiner 704, and operation controller 705.

Note that three-dimensional information processing device 700 may include a non-illustrated two-dimensional or one-dimensional sensor that detects a structural object or a mobile object around the own vehicle, such as a camera capable of obtaining two-dimensional images and a sensor for one-dimensional data utilizing ultrasonic or laser. Three-dimensional information processing device 700 may also include a non-illustrated communication unit that obtains a three-dimensional map over a mobile communication network, such as 4G and 5G, or via inter-vehicle communication or road-to-vehicle communication.

Three-dimensional map obtainer 701 obtains three-dimensional map 711 of the surroundings of the traveling route. For example, three-dimensional map obtainer 701 obtains three-dimensional map 711 over a mobile communication network, or via inter-vehicle communication or road-to-vehicle communication.

Next, self-detected data obtainer 702 obtains self-detected three-dimensional data 712 on the basis of sensor information. For example, self-detected data obtainer 702 generates self-detected three-dimensional data 712 on the basis of the sensor information obtained by a sensor equipped in the own vehicle.

Next, abnormal case judgment unit 703 conducts a predetermined check of at least one of obtained three-dimensional map 711 and self-detected three-dimensional data 712 to detect an abnormal case. Stated differently, abnormal case judgment unit 703 judges whether at least one of obtained three-dimensional map 711 and self-detected three-dimensional data 712 is abnormal.

When the abnormal case is detected, coping operation determiner 704 determines a coping operation to cope with such abnormal case. Next, operation controller 705 controls the operation of each of the processing units necessary to perform the coping operation.

Meanwhile, when no abnormal case is detected, three-dimensional information processing device 700 terminates the process.

Also, three-dimensional information processing device 700 estimates the location of the vehicle equipped with three-dimensional information processing device 700, using three-dimensional map 711 and self-detected three-dimensional data 712. Next, three-dimensional information processing device 700 performs the automatic operation of the vehicle by use of the estimated location of the vehicle.

As described above, three-dimensional information processing device 700 obtains, via a communication channel, map data (three-dimensional map 711) that includes first three-dimensional position information. The first three-dimensional position information includes, for example, a plurality of random access units, each of which is an assembly of at least one subspace and is individually decodable, the at least one subspace having three-dimensional coordinates information and serving as a unit in which each of the plurality of random access units is encoded. The first three-dimensional position information is, for example, data (SWLD) obtained by encoding keypoints, each of which has an amount of a three-dimensional feature greater than or equal to a predetermined threshold.

Three-dimensional information processing device 700 also generates second three-dimensional position information (self-detected three-dimensional data 712) from information detected by a sensor. Three-dimensional information processing device 700 then judges whether one of the first three-dimensional position information and the second three-dimensional position information is abnormal by performing, on one of the first three-dimensional position information and the second three-dimensional position information, a process of judging whether an abnormality is present.

Three-dimensional information processing device 700 determines a coping operation to cope with the abnormality when one of the first three-dimensional position information and the second three-dimensional position information is judged to be abnormal. Three-dimensional information processing device 700 then executes a control that is required to perform the coping operation.

This structure enables three-dimensional information processing device 700 to detect an abnormality regarding one of the first three-dimensional position information and the second three-dimensional position information, and to perform a coping operation therefor.

Embodiment 5

The present embodiment describes a method, etc. of transmitting three-dimensional data to a following vehicle.

Figure 27:
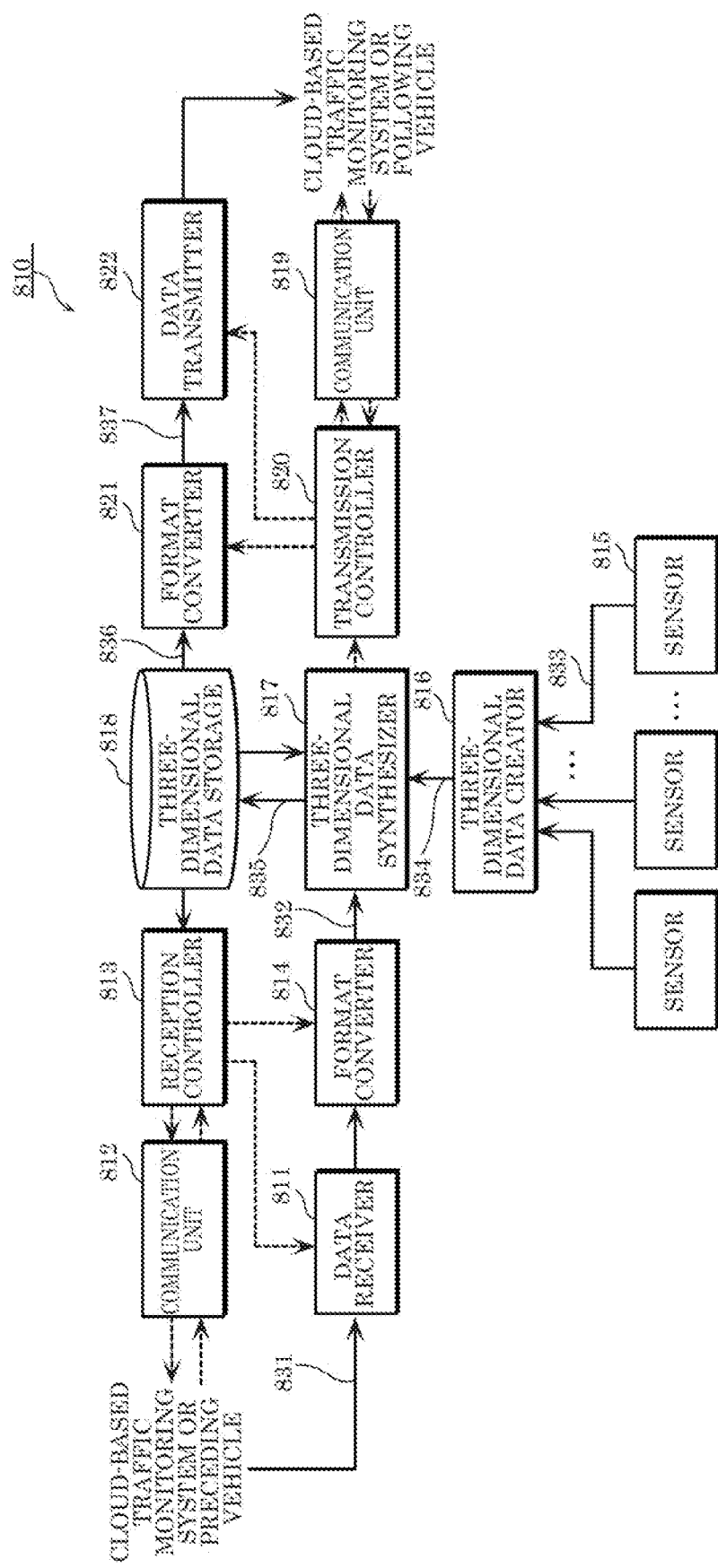
FIG. 27 is a block diagram of a three-dimensional data creation device according to Embodiment 5.

FIG. 27 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Embodiment 6

In embodiment 5, an example is described in which a client device of a vehicle or the like transmits three-dimensional data to another vehicle or a server such as a cloud-based traffic monitoring system. In the present embodiment, a client device transmits sensor information obtained through a sensor to a server or a client device.

Figure 28:
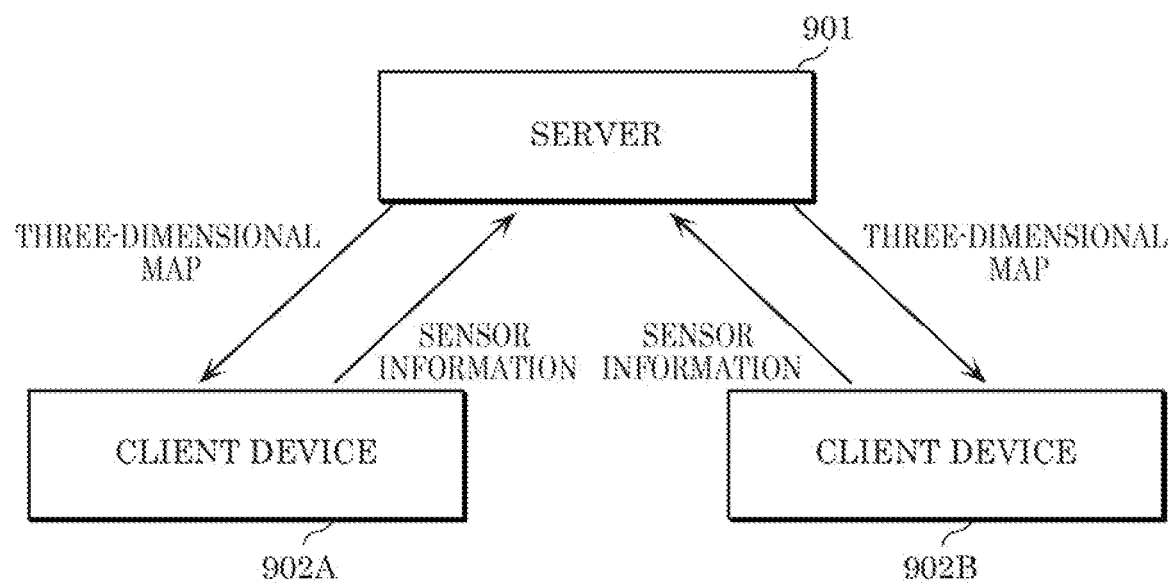
FIG. 28 is a diagram showing a structure of a system according to Embodiment 6.

A structure of a system according to the present embodiment will first be described. FIG. 28 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 29:
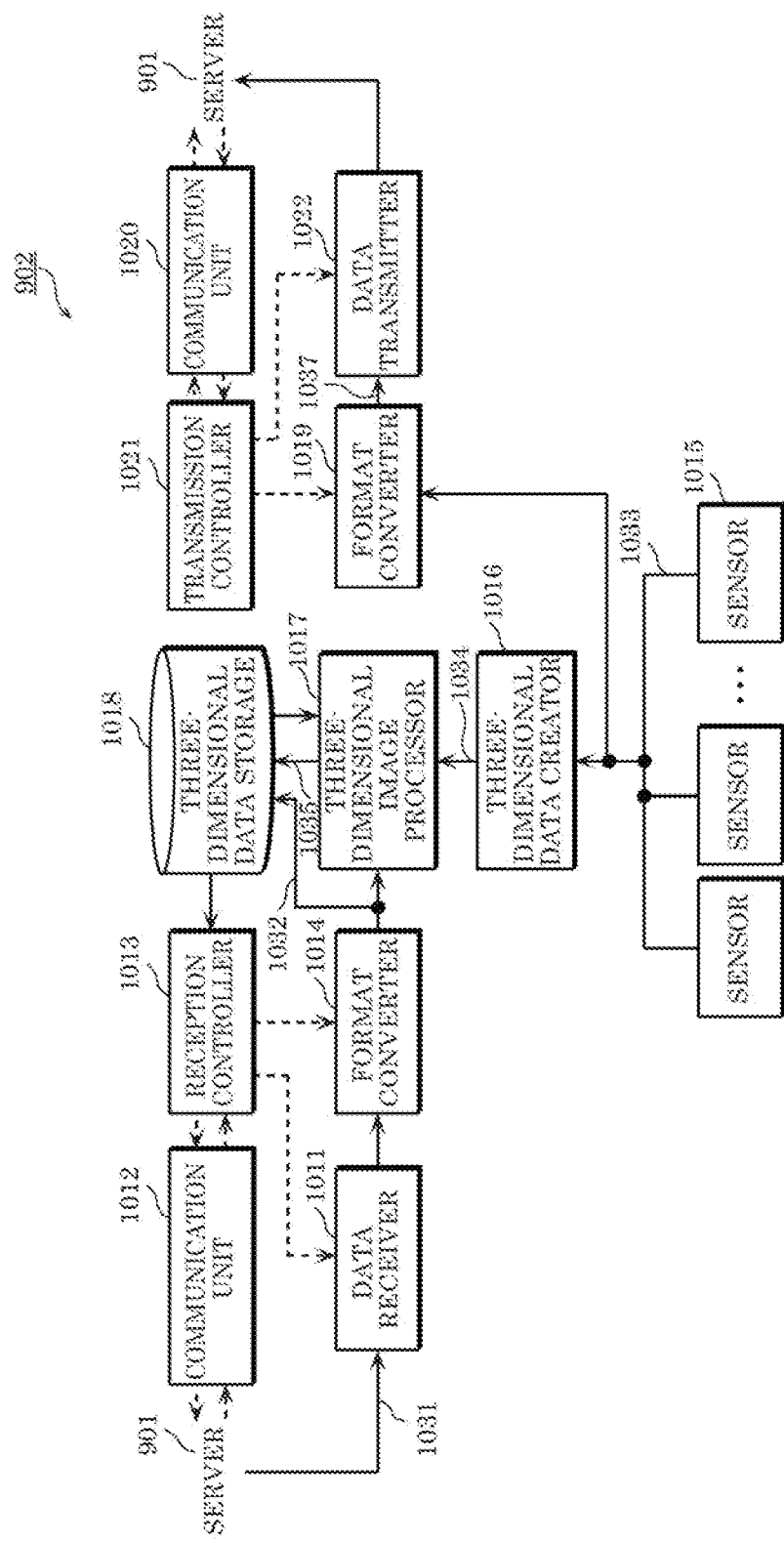
FIG. 29 is a block diagram of a client device according to Embodiment 6.

FIG. 29 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g. transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 815 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 30:
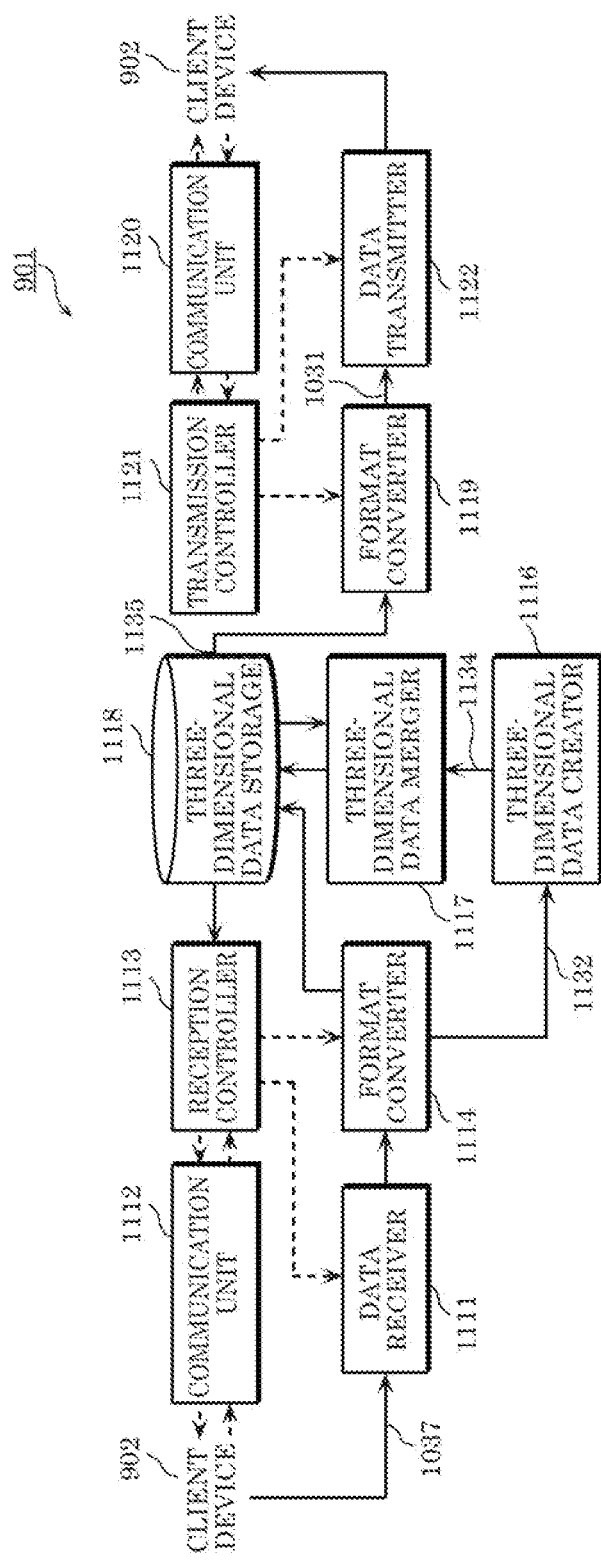
FIG. 30 is a block diagram of a server according to Embodiment 6.

A structure of server 901 will be described next. FIG. 30 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g. transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901. Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 31:
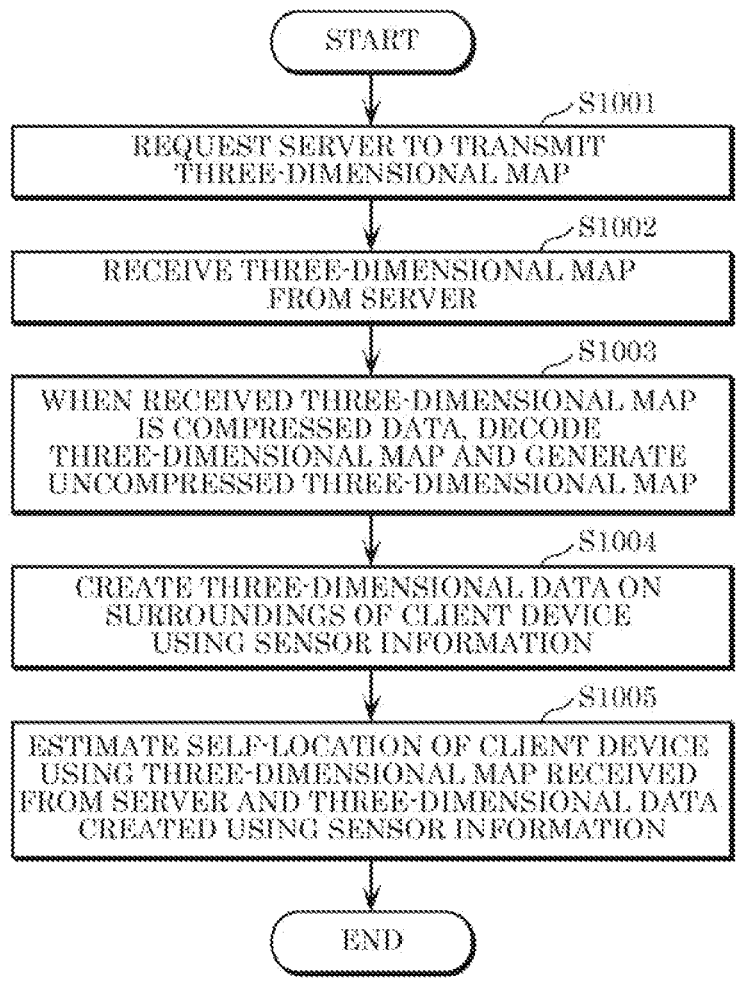
FIG. 31 is a flowchart of a three-dimensional data creation process performed by the client device according to Embodiment 6.

An operational flow of client device 902 will be described next. FIG. 31 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 32:
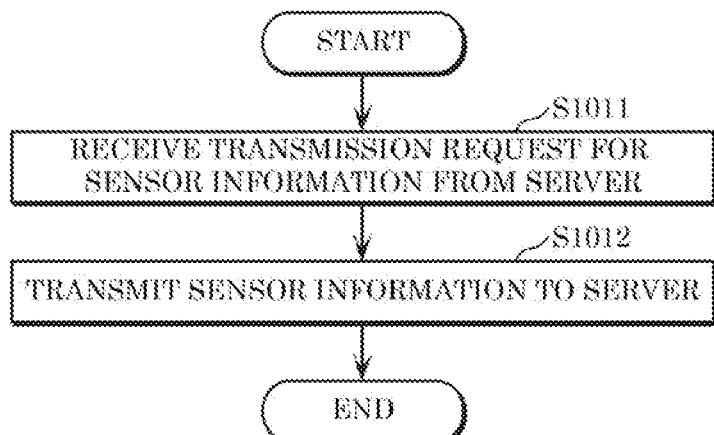
FIG. 32 is a flowchart of a sensor information transmission process performed by the client device according to Embodiment 6.

FIG. 32 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 33:
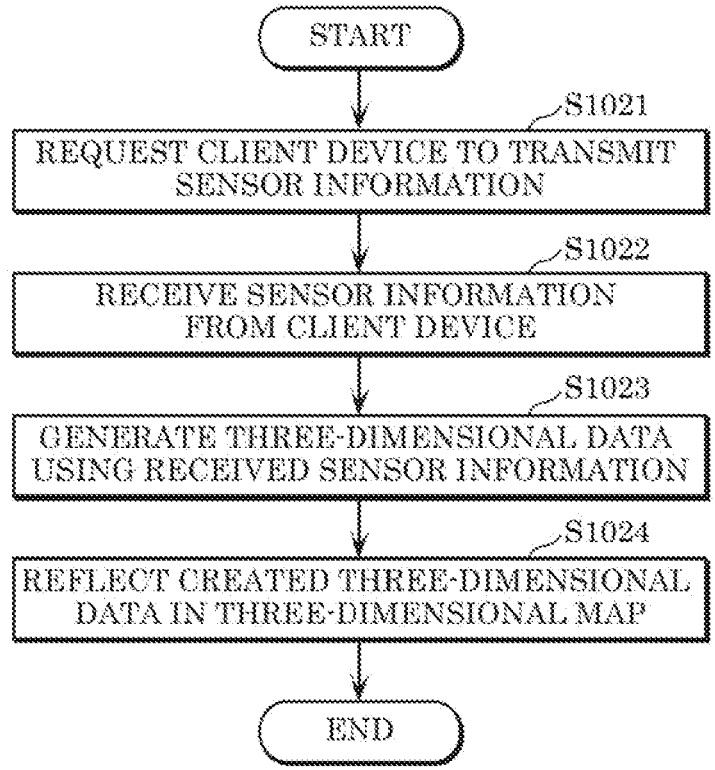
FIG. 33 is a flowchart of a three-dimensional data creation process performed by the server according to Embodiment 6.

An operational flow of server 901 will be described next. FIG. 33 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 34:
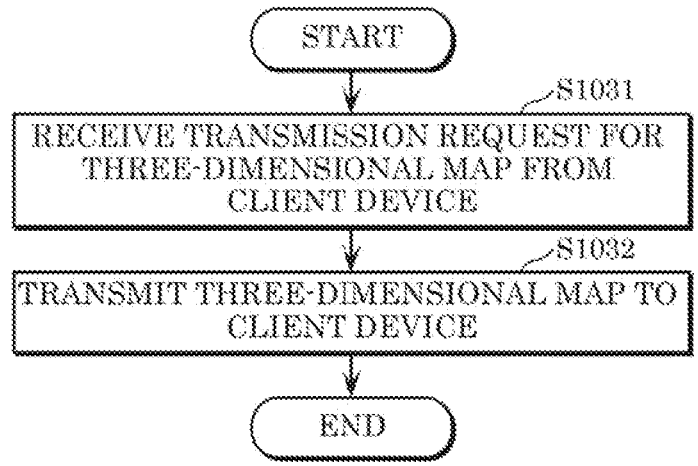
FIG. 34 is a flowchart of a three-dimensional map transmission process performed by the server according to Embodiment 6.

FIG. 34 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

Hereinafter, variations of the present embodiment will be described.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 35:
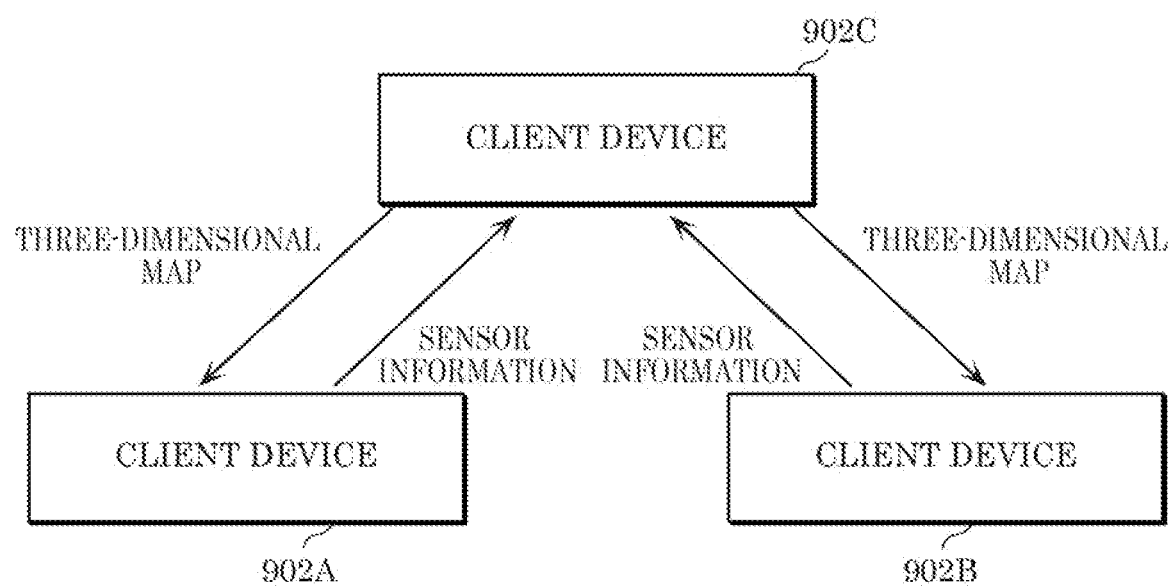
FIG. 35 is a diagram showing a structure of a variation of the system according to Embodiment 6.

Server 901 is not limited to only being a server such as a cloud-based traffic monitoring system, and may also be another (vehicle-mounted) client device. FIG. 35 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 36:
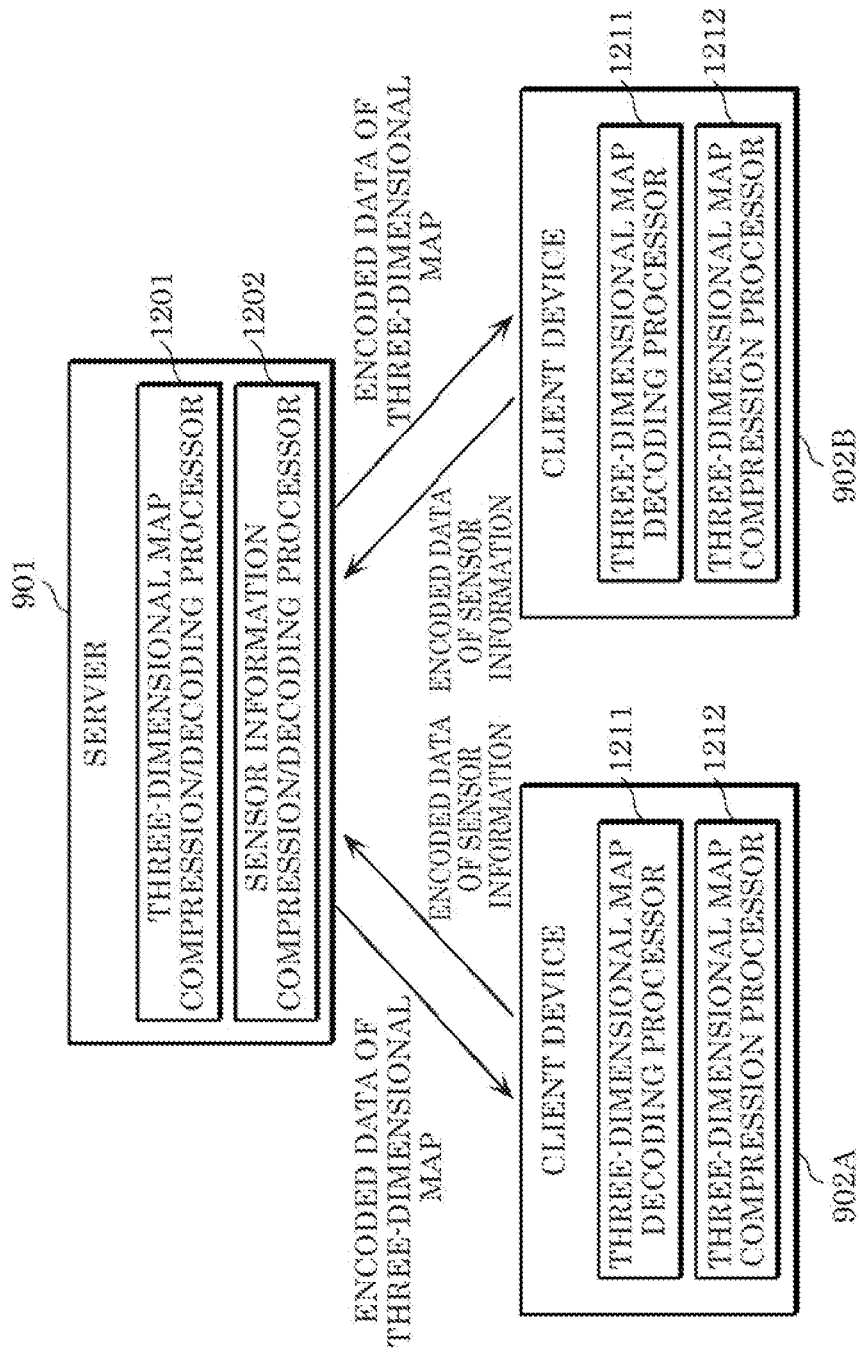
FIG. 36 is a diagram showing a structure of the server and client devices according to Embodiment 6.

FIG. 36 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another mobile object.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1034 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another mobile object 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Embodiment 7

In the present embodiment, three-dimensional data encoding and decoding methods using an inter prediction process will be described.

Figure 37:
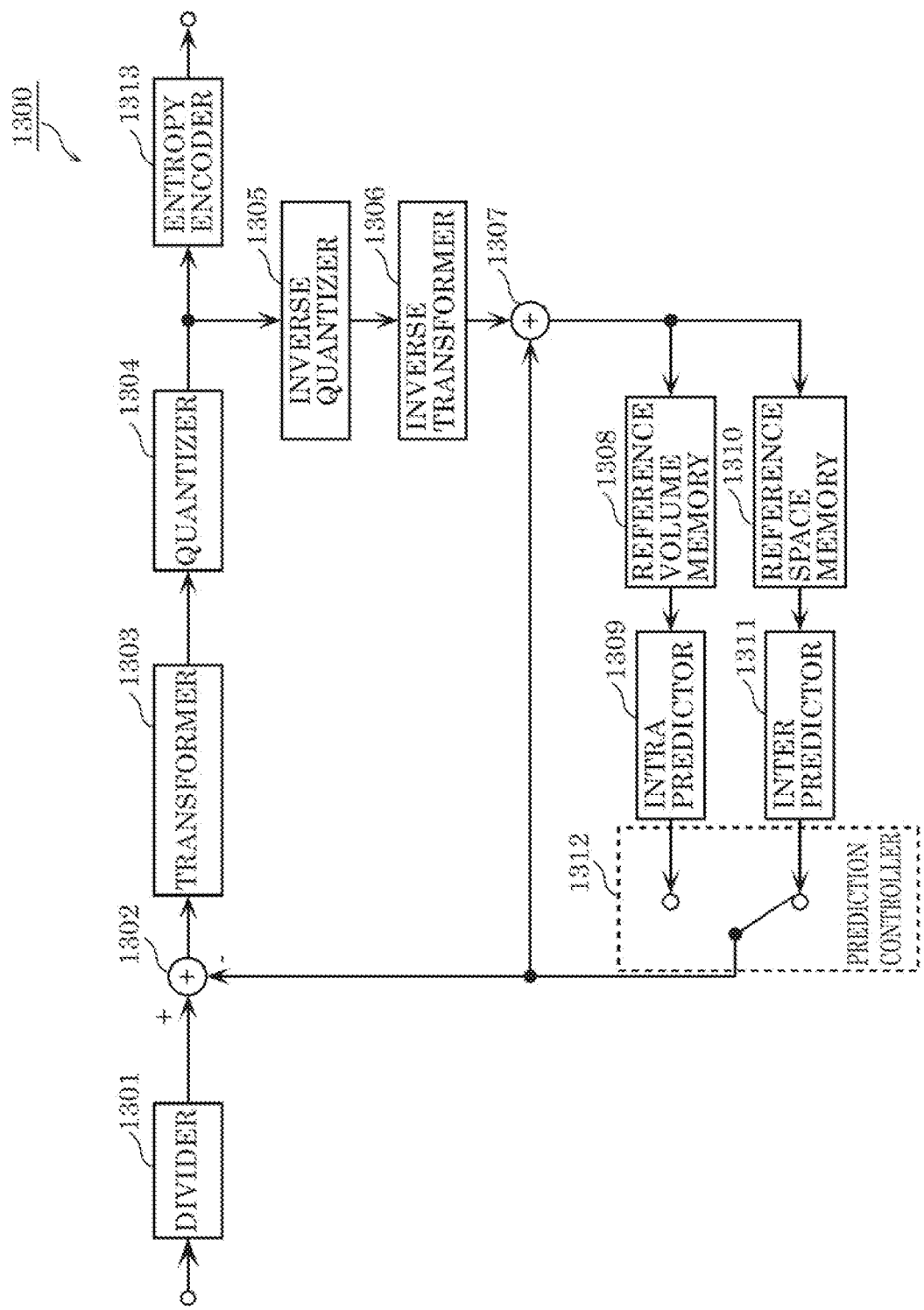
FIG. 37 is a block diagram of a three-dimensional data encoding device according to Embodiment 7.

FIG. 37 is a block diagram of three-dimensional data encoding device 1300 according to the present embodiment. This three-dimensional data encoding device 1300 generates an encoded bitstream (hereinafter, also simply referred to as bitstream) that is an encoded signal, by encoding three-dimensional data. As illustrated in FIG. 37, three-dimensional data encoding device 1300 includes divider 1301, subtractor 1302, transformer 1303, quantizer 1304, inverse quantizer 1305, inverse transformer 1306, adder 1307, reference volume memory 1308, intra predictor 1309, reference space memory 1310, inter predictor 1311, prediction controller 1312, and entropy encoder 1313.

Divider 1301 divides a plurality of volumes (VLMs) that are encoding units of each space (SPC) included in the three-dimensional data. Divider 1301 makes an octree representation (make into an octree) of voxels in each volume. Note that divider 1301 may make the spaces into an octree representation with the spaces having the same size as the volumes. Divider 1301 may also append information (depth information, etc.) necessary for making the octree representation to a header and the like of a bitstream.

Figure 38:
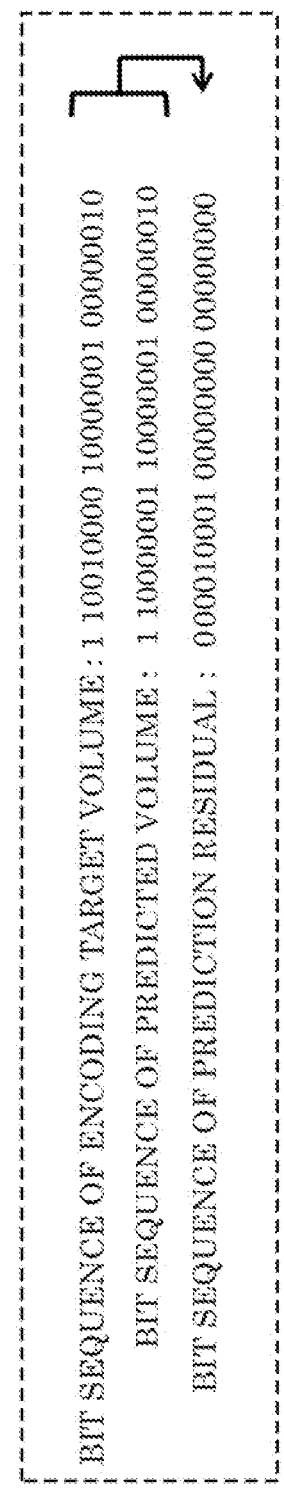
FIG. 38 is a diagram showing an example of a prediction residual according to Embodiment 7.

Subtractor 1302 calculates a difference between a volume (encoding target volume) outputted by divider 1301 and a predicted volume generated through intra prediction or inter prediction, which will be described later, and outputs the calculated difference to transformer 1303 as a prediction residual. FIG. 38 is a diagram showing an example calculation of the prediction residual. Note that bit sequences of the encoding target volume and the predicted volume shown here are, for example, position information indicating positions of three-dimensional points included in the volumes.

Figure 39:
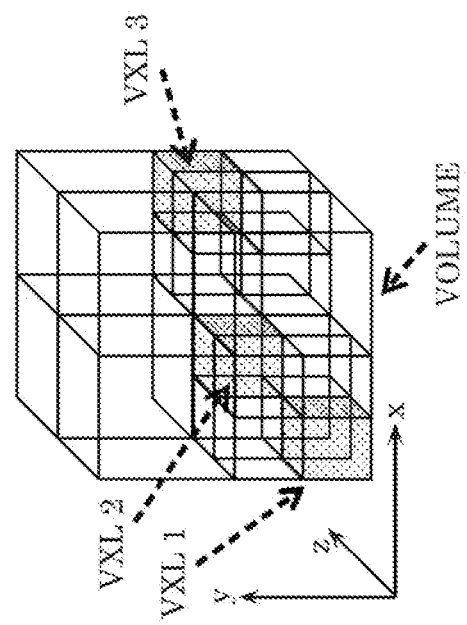
FIG. 39 is a diagram showing an example of a volume according to Embodiment 7.
Figure 40:
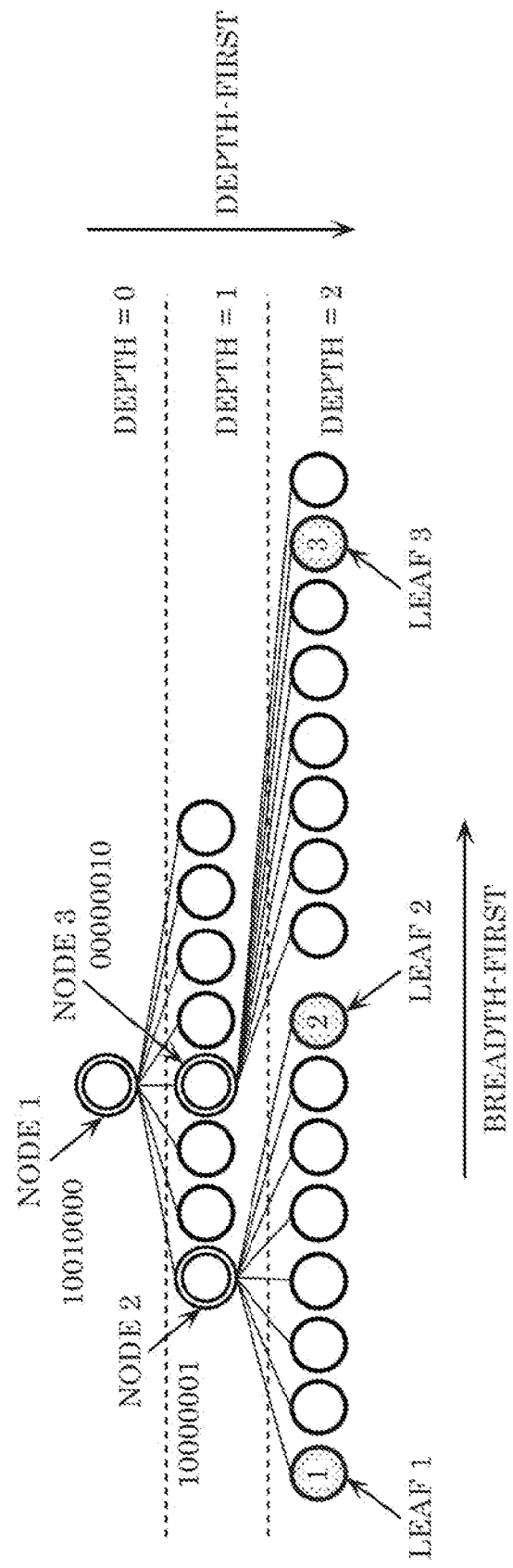
FIG. 40 is a diagram showing an example of an octree representation of the volume according to Embodiment 7.

Hereinafter, a scan order of an octree representation and voxels will be described. A volume is encoded after being converted into an octree structure (made into an octree). The octree structure includes nodes and leaves. Each node has eight nodes or leaves, and each leaf has voxel (VXL) information. FIG. 39 is a diagram showing an example structure of a volume including voxels. FIG. 40 is a diagram showing an example of the volume shown in FIG. 39 having been converted into the octree structure. Among the leaves shown in FIG. 40, leaves 1, 2, and 3 respectively represent VXL 1, VXL 2, and VXL 3, and represent VXLs including a point group (hereinafter, active VXLs).

An octree is represented by, for example, binary sequences of 1s and 0s. For example, when giving the nodes or the active VXLs a value of 1 and everything else a value of 0, each node and leaf is assigned with the binary sequence shown in FIG. 40. Thus, this binary sequence is scanned in accordance with a breadth-first or a depth-first scan order. For example, when scanning breadth-first, the binary sequence shown in A of FIG. 41 is obtained. When scanning depth-first, the binary sequence shown in B of FIG. 41 is obtained. The binary sequences obtained through this scanning are encoded through entropy encoding, which reduces an amount of information.

Depth information in the octree representation will be described next. Depth in the octree representation is used in order to control up to how fine a granularity point cloud information included in a volume is stored. Upon setting a great depth, it is possible to reproduce the point cloud information to a more precise level, but an amount of data for representing the nodes and leaves increases. Upon setting a small depth, however, the amount of data decreases, but some information that the point cloud information originally held is lost, since pieces of point cloud information including different positions and different colors are now considered as pieces of point cloud information including the same position and the same color.

Figure 42:
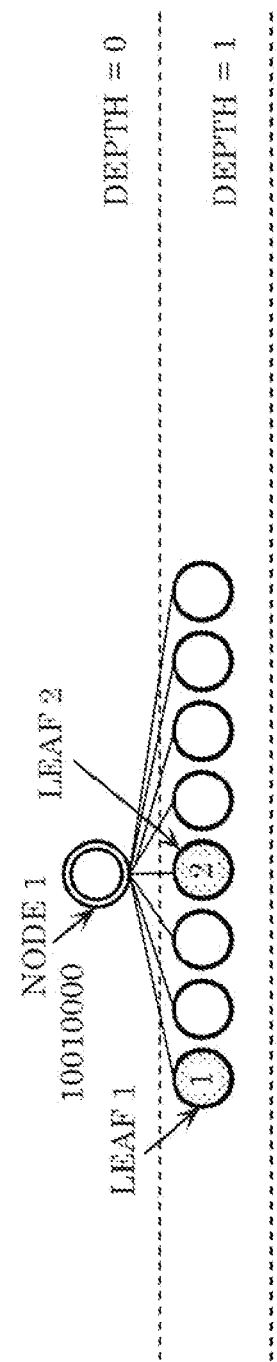
FIG. 42 is a diagram showing an example of an octree representation of a volume according to Embodiment 7.

For example, FIG. 42 is a diagram showing an example in which the octree with a depth of 2 shown in FIG. 40 is represented with a depth of 1. The octree shown in FIG. 42 has a lower amount of data than the octree shown in FIG. 40. In other words, the binarized octree shown in FIG. 42 has a lower bit count than the octree shown in FIG. 40. Leaf 1 and leaf 2 shown in FIG. 40 are represented by leaf 1 shown in FIG. 41. In other words, the information on leaf 1 and leaf 2 being in different positions is lost.

Figure 43:
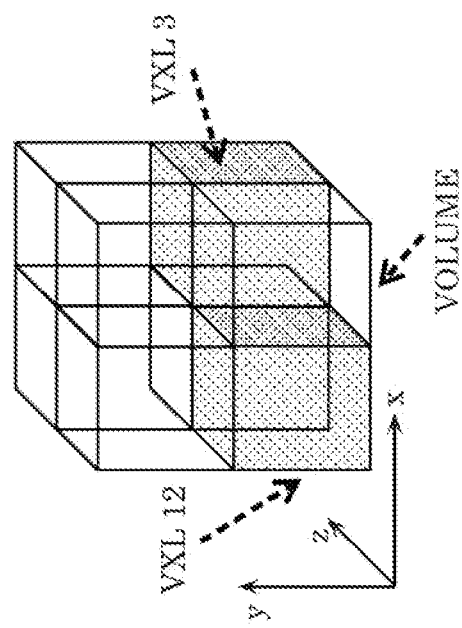
FIG. 43 is a diagram showing an example of the volume according to Embodiment 7.

FIG. 43 is a diagram showing a volume corresponding to the octree shown in FIG. 42. VXL 1 and VXL 2 shown in FIG. 39 correspond to VXL 12 shown in FIG. 43. In this case, three-dimensional data encoding device 1300 generates color information of VXL 12 shown in FIG. 43 using color information of VXL 1 and VXL 2 shown in FIG. 39. For example, three-dimensional data encoding device 1300 calculates an average value, a median, a weighted average value, or the like of the color information of VXL 1 and VXL 2 as the color information of VXL 12. In this manner, three-dimensional data encoding device 1300 may control a reduction of the amount of data by changing the depth of the octree.

Three-dimensional data encoding device 1300 may set the depth information of the octree to units of worlds, units of spaces, or units of volumes. In this case, three-dimensional data encoding device 1300 may append the depth information to header information of the world, header information of the space, or header information of the volume. In all worlds, spaces, and volumes associated with different times, the same value may be used as the depth information. In this case, three-dimensional data encoding device 1300 may append the depth information to header information managing the worlds associated with all times.

When the color information is included in the voxels, transformer 1303 applies frequency transformation, e.g. orthogonal transformation, to a prediction residual of the color information of the voxels in the volume. For example, transformer 1303 creates a one-dimensional array by scanning the prediction residual in a certain scan order. Subsequently, transformer 1303 transforms the one-dimensional array to a frequency domain by applying one-dimensional orthogonal transformation to the created one-dimensional array. With this, when a value of the prediction residual in the volume is similar, a value of a low-frequency component increases and a value of a high-frequency component decreases. As such, it is possible to more efficiently reduce an code amount in quantizer 1304.

Transformer 1303 does not need to use orthogonal transformation in one dimension, but may also use orthogonal transformation in two or more dimensions. For example, transformer 1303 maps the prediction residual to a two-dimensional array in a certain scan order, and applies two-dimensional orthogonal transformation to the obtained two-dimensional array. Transformer 1303 may select an orthogonal transformation method to be used from a plurality of orthogonal transformation methods. In this case, three-dimensional data encoding device 1300 appends, to the bitstream, information indicating which orthogonal transformation method is used. Transformer 1303 may select an orthogonal transformation method to be used from a plurality of orthogonal transformation methods in different dimensions. In this case, three-dimensional data encoding device 1300 appends, to the bitstream, in how many dimensions the orthogonal transformation method is used.

For example, transformer 1303 matches the scan order of the prediction residual to a scan order (breadth-first, depth-first, or the like) in the octree in the volume. This makes it possible to reduce overhead, since information indicating the scan order of the prediction residual does not need to be appended to the bitstream. Transformer 1303 may apply a scan order different from the scan order of the octree. In this case, three-dimensional data encoding device 1300 appends, to the bitstream, information indicating the scan order of the prediction residual. This enables three-dimensional data encoding device 1300 to efficiently encode the prediction residual. Three-dimensional data encoding device 1300 may append, to the bitstream, information (flag, etc.) indicating whether to apply the scan order of the octree, and may also append, to the bitstream, information indicating the scan order of the prediction residual when the scan order of the octree is not applied.

Transformer 1303 does not only transform the prediction residual of the color information, and may also transform other attribute information included in the voxels. For example, transformer 1303 may transform and encode information, such as reflectance information, obtained when obtaining a point cloud through LiDAR and the like.

Transformer 1303 may skip these processes when the spaces do not include attribute information such as color information. Three-dimensional data encoding device 1300 may append, to the bitstream, information (flag) indicating whether to skip the processes of transformer 1303.

Quantizer 1304 generates a quantized coefficient by performing quantization using a quantization control parameter on a frequency component of the prediction residual generated by transformer 1303. With this, the amount of information is further reduced. The generated quantized coefficient is outputted to entropy encoder 1313. Quantizer 1304 may control the quantization control parameter in units of worlds, units of spaces, or units of volumes. In this case, three-dimensional data encoding device 1300 appends the quantization control parameter to each header information and the like. Quantizer 1304 may perform quantization control by changing a weight per frequency component of the prediction residual. For example, quantizer 1304 may precisely quantize a low-frequency component and roughly quantize a high-frequency component. In this case, three-dimensional data encoding device 1300 may append, to a header, a parameter expressing a weight of each frequency component.

Quantizer 1304 may skip these processes when the spaces do not include attribute information such as color information. Three-dimensional data encoding device 1300 may append, to the bitstream, information (flag) indicating whether to skip the processes of quantizer 1304.

Inverse quantizer 1305 generates an inverse quantized coefficient of the prediction residual by performing inverse quantization on the quantized coefficient generated by quantizer 1304 using the quantization control parameter, and outputs the generated inverse quantized coefficient to inverse transformer 1306.

Inverse transformer 1306 generates an inverse transformation-applied prediction residual by applying inverse transformation on the inverse quantized coefficient generated by inverse quantizer 1305. This inverse transformation-applied prediction residual does not need to completely coincide with the prediction residual outputted by transformer 1303, since the inverse transformation-applied prediction residual is a prediction residual that is generated after the quantization.

Adder 1307 adds, to generate a reconstructed volume, (i) the inverse transformation-applied prediction residual generated by inverse transformer 1306 to (ii) a predicted volume that is generated through intra prediction or intra prediction, which will be described later, and is used to generate a pre-quantized prediction residual. This reconstructed volume is stored in reference volume memory 1308 or reference space memory 1310.

Intra predictor 1309 generates a predicted volume of an encoding target volume using attribute information of a neighboring volume stored in reference volume memory 1308. The attribute information includes color information or a reflectance of the voxels. Intra predictor 1309 generates a predicted value of color information or a reflectance of the encoding target volume.

Figure 44:
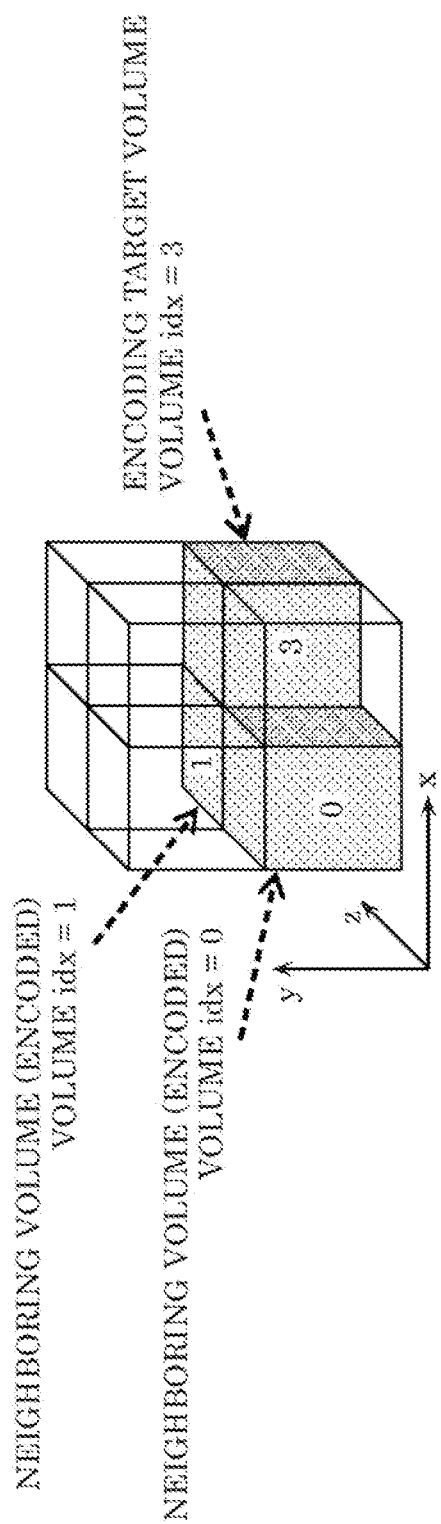
FIG. 44 is a diagram for describing an intra prediction process according to Embodiment 7.

FIG. 44 is a diagram for describing an operation of intra predictor 1309. For example, intra predictor 1309 generates the predicted volume of the encoding target volume (volume idx=3) shown in FIG. 44, using a neighboring volume (volume idx=0). Volume idx here is identifier information that is appended to a volume in a space, and a different value is assigned to each volume. An order of assigning volume idx may be the same as an encoding order, and may also be different from the encoding order. For example, intra predictor 1309 uses an average value of color information of voxels included in volume idx=0, which is a neighboring volume, as the predicted value of the color information of the encoding target volume shown in FIG. 44. In this case, a prediction residual is generated by deducting the predicted value of the color information from the color information of each voxel included in the encoding target volume. The following processes are performed by transformer 1303 and subsequent processors with respect to this prediction residual. In this case, three-dimensional data encoding device 1300 appends, to the bitstream, neighboring volume information and prediction mode information. The neighboring volume information here is information indicating a neighboring volume used in the prediction, and indicates, for example, volume idx of the neighboring volume used in the prediction. The prediction mode information here indicates a mode used to generate the predicted volume. The mode is, for example, an average value mode in which the predicted value is generated using an average value of the voxels in the neighboring volume, or a median mode in which the predicted value is generated using the median of the voxels in the neighboring volume.

Intra predictor 1309 may generate the predicted volume using a plurality of neighboring volumes. For example, in the structure shown in FIG. 44, intra predictor 1309 generates predicted volume 0 using a volume with volume idx=0, and generates predicted volume 1 using a volume with volume idx=1. Intra predictor 1309 then generates an average of predicted volume 0 and predicted volume 1 as a final predicted volume. In this case, three-dimensional data encoding device 1300 may append, to the bitstream, a plurality of volumes idx of a plurality of volumes used to generate the predicted volume.

Figure 45:
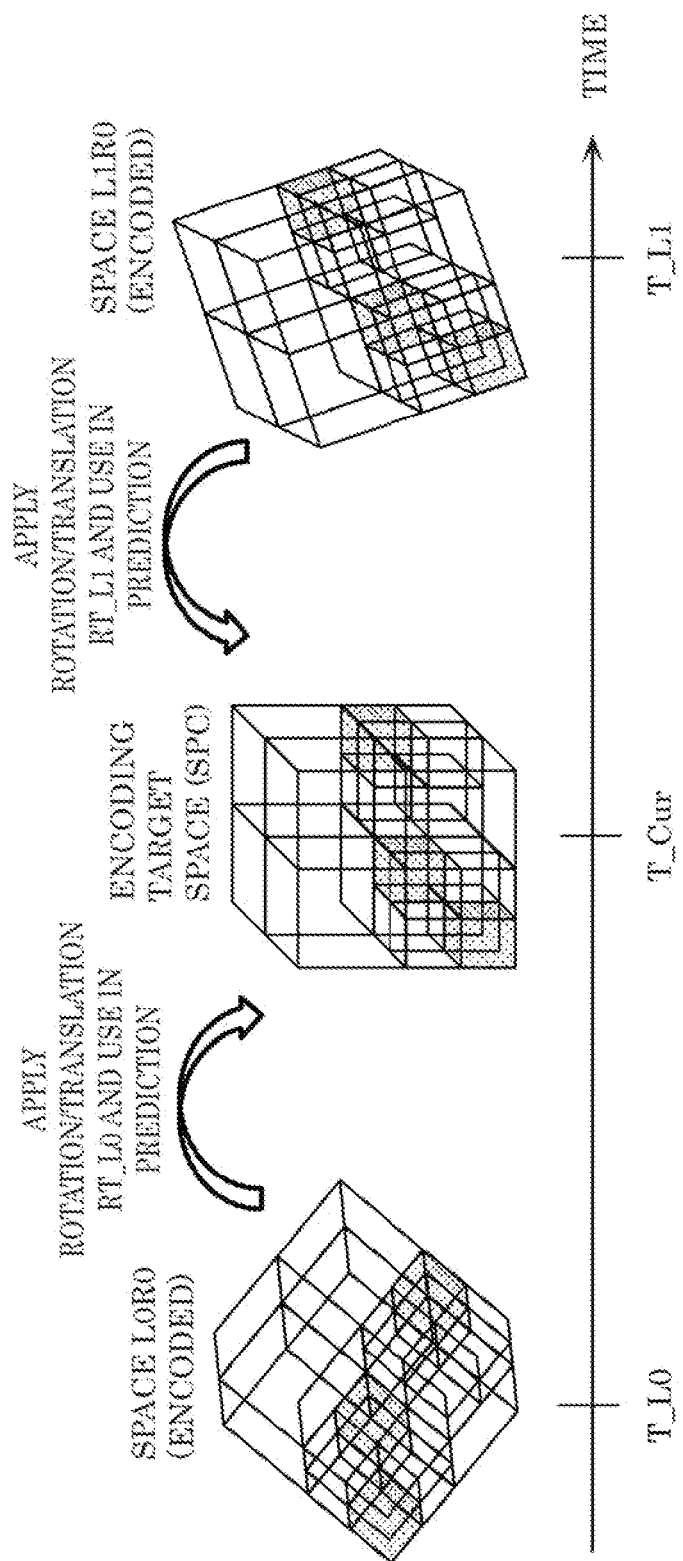
FIG. 45 is a diagram for describing a rotation and translation process according to Embodiment 7.

FIG. 45 is a diagram schematically showing the inter prediction process according to the present embodiment. Inter predictor 1311 encodes (inter predicts) a space (SPC) associated with certain time T_Cur using an encoded space associated with different time T_LX. In this case, inter predictor 1311 performs an encoding process by applying a rotation and translation process to the encoded space associated with different time T_LX.

Three-dimensional data encoding device 1300 appends, to the bitstream, RT information relating to a rotation and translation process suited to the space associated with different time T_LX. Different time T_LX is, for example, time T_L0 before certain time T_Cur. At this point, three-dimensional data encoding device 1300 may append, to the bitstream, RT information RT_L0 relating to a rotation and translation process suited to a space associated with time T_L0.

Alternatively, different time T_LX is, for example, time T_L1 after certain time T_Cur. At this point, three-dimensional data encoding device 1300 may append, to the bitstream, RT information RT_L1 relating to a rotation and translation process suited to a space associated with time T_L1.

Alternatively, inter predictor 1311 encodes (bidirectional prediction) with reference to the spaces associated with time T_L0 and time T_L1 that differ from each other. In this case, three-dimensional data encoding device 1300 may append, to the bitstream, both RT information RT_L0 and RT information RT_L1 relating to the rotation and translation process suited to the spaces thereof.

Note that T_L0 has been described as being before T_Cur and T_L1 as being after T_Cur, but are not necessarily limited thereto. For example, T_L0 and T_L1 may both be before T_Cur. T_L0 and T_L1 may also both be after T_Cur.

Three-dimensional data encoding device 1300 may append, to the bitstream, RT information relating to a rotation and translation process suited to spaces associated with different times, when encoding with reference to each of the spaces. For example, three-dimensional data encoding device 1300 manages a plurality of encoded spaces to be referred to, using two reference lists (list L0 and list L1). When a first reference space in list L0 is L0R0, a second reference space in list L0 is L0R1, a first reference space in list L1 is L1R0, and a second reference space in list L1 is L1R1, three-dimensional data encoding device 1300 appends, to the bitstream, RT information RT L0R0 of L0R0, RT information RT L0R1 of L0R1, RT information RT_L1R0 of L1R0, and RT information RT_L1R1 of L1R1. For example, three-dimensional data encoding device 1300 appends these pieces of RT information to a header and the like of the bitstream.

Three-dimensional data encoding device 1300 determines whether to apply rotation and translation per reference space, when encoding with reference to reference spaces associated with different times. In this case, three-dimensional data encoding device 1300 may append, to header information and the like of the bitstream, information (RT flag, etc.) indicating whether rotation and translation are applied per reference space. For example, three-dimensional data encoding device 1300 calculates the RT information and an Iterative Closest Point (ICP) error value, using an ICP algorithm per reference space to be referred to from the encoding target space. Three-dimensional data encoding device 1300 determines that rotation and translation do not need to be performed and sets the RT flag to OFF, when the ICP error value is lower than or equal to a predetermined fixed value. In contrast, three-dimensional data encoding device 1300 sets the RT flag to ON and appends the RT information to the bitstream, when the ICP error value exceeds the above fixed value.

FIG. 46 is a diagram showing an example syntax to be appended to a header of the RT information and the RT flag. Note that a bit count assigned to each syntax may be decided based on a range of this syntax. For example, when eight reference spaces are included in reference list L0, 3 bits may be assigned to MaxRefSpc_l0. The bit count to be assigned may be variable in accordance with a value each syntax can be, and may also be fixed regardless of the value each syntax can be. When the bit count to be assigned is fixed, three-dimensional data encoding device 1300 may append this fixed bit count to other header information.

MaxRefSpc_l0 shown in FIG. 46 indicates a number of reference spaces included in reference list L0. RT_flag_l0[i] is an RT flag of reference space i in reference list L0. When RT_flag_l0[i] is 1, rotation and translation are applied to reference space i. When RT_flag_l0[i] is 0, rotation and translation are not applied to reference space i.

R_l0[i] and T_l0[i] are RT information of reference space i in reference list L0. R_l0[i] is rotation information of reference space i in reference list L0. The rotation information indicates contents of the applied rotation process, and is, for example, a rotation matrix or a quaternion. T_l0[i] is translation information of reference space i in reference list L0. The translation information indicates contents of the applied translation process, and is, for example, a translation vector.

MaxRefSpc_l1 indicates a number of reference spaces included in reference list L1. RT_flag_l1[i] is an RT flag of reference space i in reference list L1. When RT_flag_l1[i] is 1, rotation and translation are applied to reference space i. When RT_flag_l1[i] is 0, rotation and translation are not applied to reference space i.

R_l1[i] and T_l1[i] are RT information of reference space i in reference list L1. R_l1[i] is rotation information of reference space i in reference list L1. The rotation information indicates contents of the applied rotation process, and is, for example, a rotation matrix or a quaternion. T_l1[i] is translation information of reference space i in reference list L1. The translation information indicates contents of the applied translation process, and is, for example, a translation vector.

Inter predictor 1311 generates the predicted volume of the encoding target volume using information on an encoded reference space stored in reference space memory 1310. As stated above, before generating the predicted volume of the encoding target volume, inter predictor 1311 calculates RT information at an encoding target space and a reference space using an ICP algorithm, in order to approach an overall positional relationship between the encoding target space and the reference space. Inter predictor 1311 then obtains reference space B by applying a rotation and translation process to the reference space using the calculated RT information. Subsequently, inter predictor 1311 generates the predicted volume of the encoding target volume in the encoding target space using information in reference space B. Three-dimensional data encoding device 1300 appends, to header information and the like of the encoding target space, the RT information used to obtain reference space B.

In this manner, inter predictor 1311 is capable of improving precision of the predicted volume by generating the predicted volume using the information of the reference space, after approaching the overall positional relationship between the encoding target space and the reference space, by applying a rotation and translation process to the reference space. It is possible to reduce the code amount since it is possible to limit the prediction residual. Note that an example has been described in which ICP is performed using the encoding target space and the reference space, but is not necessarily limited thereto. For example, inter predictor 1311 may calculate the RT information by performing ICP using at least one of (i) an encoding target space in which a voxel or point cloud count is pruned, or (ii) a reference space in which a voxel or point cloud count is pruned, in order to reduce the processing amount.

When the ICP error value obtained as a result of the ICP is smaller than a predetermined first threshold, i.e., when for example the positional relationship between the encoding target space and the reference space is similar, inter predictor 1311 determines that a rotation and translation process is not necessary, and the rotation and translation process does not need to be performed. In this case, three-dimensional data encoding device 1300 may control the overhead by not appending the RT information to the bitstream.

When the ICP error value is greater than a predetermined second threshold, inter predictor 1311 determines that a shape change between the spaces is large, and intra prediction may be applied on all volumes of the encoding target space. Hereinafter, spaces to which intra prediction is applied will be referred to as intra spaces. The second threshold is greater than the above first threshold. The present embodiment is not limited to ICP, and any type of method may be used as long as the method calculates the RT information using two voxel sets or two point cloud sets.

Figure 47:
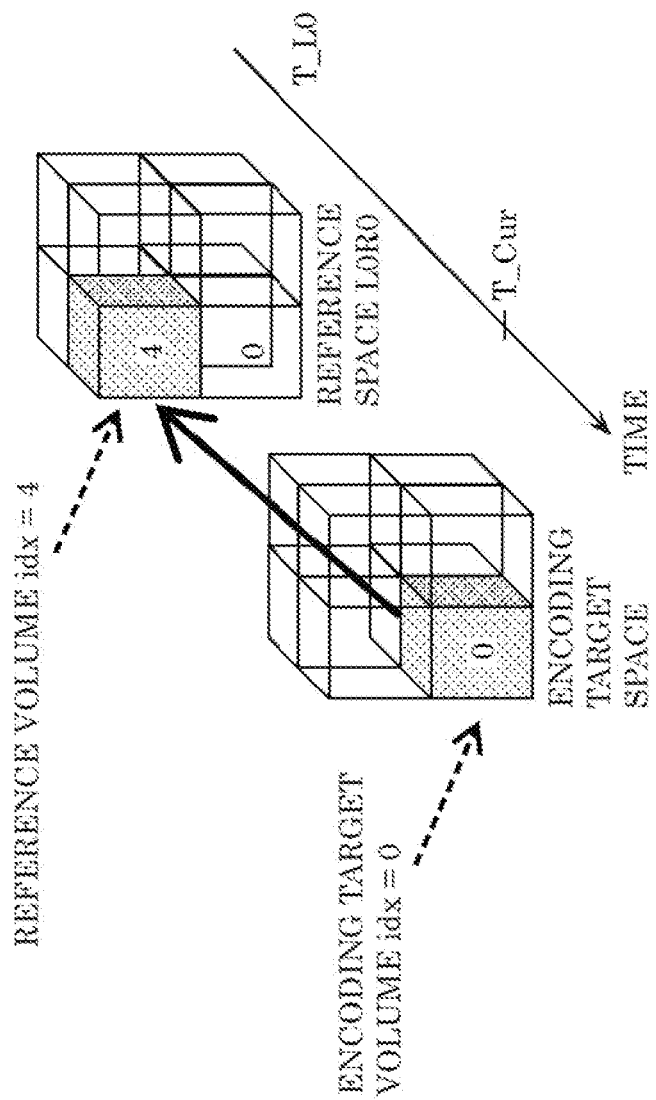
FIG. 47 is a diagram for describing an inter prediction process according to Embodiment 7.

When attribute information, e.g. shape or color information, is included in the three-dimensional data, inter predictor 1311 searches, for example, a volume whose attribute information, e.g. shape or color information, is the most similar to the encoding target volume in the reference space, as the predicted volume of the encoding target volume in the encoding target space. This reference space is, for example, a reference space on which the above rotation and translation process has been performed. Inter predictor 1311 generates the predicted volume using the volume (reference volume) obtained through the search. FIG. 47 is a diagram for describing a generating operation of the predicted volume. When encoding the encoding target volume (volume idx=0) shown in FIG. 47 using inter prediction, inter predictor 1311 searches a volume with a smallest prediction residual, which is the difference between the encoding target volume and the reference volume, while sequentially scanning the reference volume in the reference space. Inter predictor 1311 selects the volume with the smallest prediction residual as the predicted volume. The prediction residuals of the encoding target volume and the predicted volume are encoded through the processes performed by transformer 1303 and subsequent processors. The prediction residual here is a difference between the attribute information of the encoding target volume and the attribute information of the predicted volume. Three-dimensional data encoding device 1300 appends, to the header and the like of the bitstream, volume idx of the reference volume in the reference space, as the predicted volume.

In the example shown in FIG. 47, the reference volume with volume idx=4 of reference space L0R0 is selected as the predicted volume of the encoding target volume. The prediction residuals of the encoding target volume and the reference volume, and reference volume idx=4 are then encoded and appended to the bitstream.

Note that an example has been described in which the predicted volume of the attribute information is generated, but the same process may be applied to the predicted volume of the position information.

Prediction controller 1312 controls whether to encode the encoding target volume using intra prediction or inter prediction. A mode including intra prediction and inter prediction is referred to here as a prediction mode. For example, prediction controller 1312 calculates the prediction residual when the encoding target volume is predicted using intra prediction and the prediction residual when the encoding target volume is predicted using inter prediction as evaluation values, and selects the prediction mode whose evaluation value is smaller. Note that prediction controller 1312 may calculate an actual code amount by applying orthogonal transformation, quantization, and entropy encoding to the prediction residual of the intra prediction and the prediction residual of the inter prediction, and select a prediction mode using the calculated code amount as the evaluation value. Overhead information (reference volume idx information, etc.) aside from the prediction residual may be added to the evaluation value. Prediction controller 1312 may continuously select intra prediction when it has been decided in advance to encode the encoding target space using intra space.

Entropy encoder 1313 generates an encoded signal (encoded bitstream) by variable-length encoding the quantized coefficient, which is an input from quantizer 1304. To be specific, entropy encoder 1313, for example, binarizes the quantized coefficient and arithmetically encodes the obtained binary signal.

Figure 48:
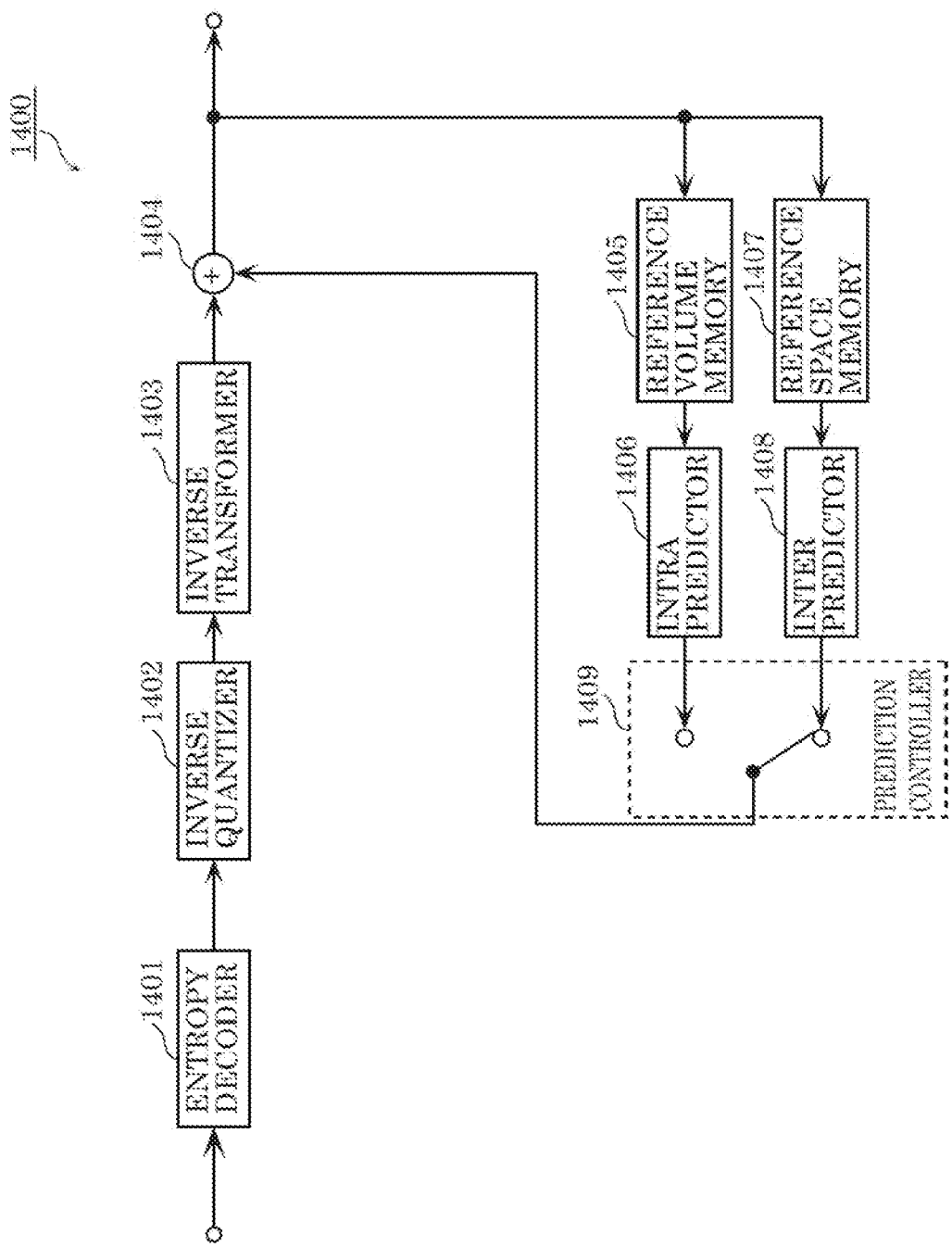
FIG. 48 is a block diagram of a three-dimensional data decoding device according to Embodiment 7.

A three-dimensional data decoding device that decodes the encoded signal generated by three-dimensional data encoding device 1300 will be described next. FIG. 48 is a block diagram of three-dimensional data decoding device 1400 according to the present embodiment. This three-dimensional data decoding device 1400 includes entropy decoder 1401, inverse quantizer 1402, inverse transformer 1403, adder 1404, reference volume memory 1405, intra predictor 1406, reference space memory 1407, inter predictor 1408, and prediction controller 1409.

Entropy decoder 1401 variable-length decodes the encoded signal (encoded bitstream). For example, entropy decoder 1401 generates a binary signal by arithmetically decoding the encoded signal, and generates a quantized coefficient using the generated binary signal.

Inverse quantizer 1402 generates an inverse quantized coefficient by inverse quantizing the quantized coefficient inputted from entropy decoder 1401, using a quantization parameter appended to the bitstream and the like.

Inverse transformer 1403 generates a prediction residual by inverse transforming the inverse quantized coefficient inputted from inverse quantizer 1402. For example, inverse transformer 1403 generates the prediction residual by inverse orthogonally transforming the inverse quantized coefficient, based on information appended to the bitstream.

Adder 1404 adds, to generate a reconstructed volume, (i) the prediction residual generated by inverse transformer 1403 to (ii) a predicted volume generated through intra prediction or intra prediction. This reconstructed volume is outputted as decoded three-dimensional data and is stored in reference volume memory 1405 or reference space memory 1407.

Intra predictor 1406 generates a predicted volume through intra prediction using a reference volume in reference volume memory 1405 and information appended to the bitstream. To be specific, intra predictor 1406 obtains neighboring volume information (e.g. volume idx) appended to the bitstream and prediction mode information, and generates the predicted volume through a mode indicated by the prediction mode information, using a neighboring volume indicated in the neighboring volume information. Note that the specifics of these processes are the same as the above-mentioned processes performed by intra predictor 1309, except for which information appended to the bitstream is used.

Inter predictor 1408 generates a predicted volume through inter prediction using a reference space in reference space memory 1407 and information appended to the bitstream. To be specific, inter predictor 1408 applies a rotation and translation process to the reference space using the RT information per reference space appended to the bitstream, and generates the predicted volume using the rotated and translated reference space. Note that when an RT flag is present in the bitstream per reference space, inter predictor 1408 applies a rotation and translation process to the reference space in accordance with the RT flag. Note that the specifics of these processes are the same as the above-mentioned processes performed by inter predictor 1311, except for which information appended to the bitstream is used.

Prediction controller 1409 controls whether to decode a decoding target volume using intra prediction or inter prediction. For example, prediction controller 1409 selects intra prediction or inter prediction in accordance with information that is appended to the bitstream and indicates the prediction mode to be used. Note that prediction controller 1409 may continuously select intra prediction when it has been decided in advance to decode the decoding target space using intra space.

Hereinafter, variations of the present embodiment will be described. In the present embodiment, an example has been described in which rotation and translation is applied in units of spaces, but rotation and translation may also be applied in smaller units. For example, three-dimensional data encoding device 1300 may divide a space into subspaces, and apply rotation and translation in units of subspaces. In this case, three-dimensional data encoding device 1300 generates RT information per subspace, and appends the generated RT information to a header and the like of the bitstream. Three-dimensional data encoding device 1300 may apply rotation and translation in units of volumes, which is an encoding unit. In this case, three-dimensional data encoding device 1300 generates RT information in units of encoded volumes, and appends the generated RT information to a header and the like of the bitstream. The above may also be combined. In other words, three-dimensional data encoding device 1300 may apply rotation and translation in large units and subsequently apply rotation and translation in small units. For example, three-dimensional data encoding device 1300 may apply rotation and translation in units of spaces, and may also apply different rotations and translations to each of a plurality of volumes included in the obtained spaces.

In the present embodiment, an example has been described in which rotation and translation is applied to the reference space, but is not necessarily limited thereto. For example, three-dimensional data encoding device 1300 may apply a scaling process and change a size of the three-dimensional data. Three-dimensional data encoding device 1300 may also apply one or two of the rotation, translation, and scaling. When applying the processes in multiple stages and different units as stated above, a type of the processes applied in each unit may differ. For example, rotation and translation may be applied in units of spaces, and translation may be applied in units of volumes.

Note that these variations are also applicable to three-dimensional data decoding device 1400.

As stated above, three-dimensional data encoding device 1300 according to the present embodiment performs the following processes. FIG. 48 is a flowchart of the inter prediction process performed by three-dimensional data encoding device 1300.

Three-dimensional data encoding device 1300 generates predicted position information (e.g. predicted volume) using position information on three-dimensional points included in three-dimensional reference data (e.g. reference space) associated with a time different from a time associated with current three-dimensional data (e.g. encoding target space) (S1301). To be specific, three-dimensional data encoding device 1300 generates the predicted position information by applying a rotation and translation process to the position information on the three-dimensional points included in the three-dimensional reference data.

Note that three-dimensional data encoding device 1300 may perform a rotation and translation process using a first unit (e.g. spaces), and may perform the generating of the predicted position information using a second unit (e.g. volumes) that is smaller than the first unit. For example, three-dimensional data encoding device 1300 searches a volume among a plurality of volumes included in the rotated and translated reference space, whose position information differs the least from the position information of the encoding target volume included in the encoding target space. Note that three-dimensional data encoding device 1300 may perform the rotation and translation process, and the generating of the predicted position information in the same unit.

Three-dimensional data encoding device 1300 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 41, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

As illustrated in FIG. 46, three-dimensional data encoding device 1300 encodes an RT flag that indicates whether to apply the rotation and translation process to the position information on the three-dimensional points included in the three-dimensional reference data. In other words, three-dimensional data encoding device 1300 generates the encoded signal (encoded bitstream) including the RT flag. Three-dimensional data encoding device 1300 encodes RT information that indicates contents of the rotation and translation process. In other words, three-dimensional data encoding device 1300 generates the encoded signal (encoded bitstream) including the RT information. Note that three-dimensional data encoding device 1300 may encode the RT information when the RT flag indicates to apply the rotation and translation process, and does not need to encode the RT information when the RT flag indicates not to apply the rotation and translation process.

The three-dimensional data includes, for example, the position information on the three-dimensional points and the attribute information (color information, etc.) of each three-dimensional point. Three-dimensional data encoding device 1300 generates predicted attribute information using the attribute information of the three-dimensional points included in the three-dimensional reference data (S1302).

Three-dimensional data encoding device 1300 next encodes the position information on the three-dimensional points included in the current three-dimensional data, using the predicted position information. For example, as illustrated in FIG. 38, three-dimensional data encoding device 1300 calculates differential position information, the differential position information being a difference between the predicted position information and the position information on the three-dimensional points included in the current three-dimensional data (S1303).

Three-dimensional data encoding device 1300 encodes the attribute information of the three-dimensional points included in the current three-dimensional data, using the predicted attribute information. For example, three-dimensional data encoding device 1300 calculates differential attribute information, the differential attribute information being a difference between the predicted attribute information and the attribute information on the three-dimensional points included in the current three-dimensional data (S1304). Three-dimensional data encoding device 1300 next performs transformation and quantization on the calculated differential attribute information (S1305).

Lastly, three-dimensional data encoding device 1300 encodes (e.g. entropy encodes) the differential position information and the quantized differential attribute information (S1036). In other words, three-dimensional data encoding device 1300 generates the encoded signal (encoded bitstream) including the differential position information and the differential attribute information.

Note that when the attribute information is not included in the three-dimensional data, three-dimensional data encoding device 1300 does not need to perform steps S1302, S1304, and S1305. Three-dimensional data encoding device 1300 may also perform only one of the encoding of the position information on the three-dimensional points and the encoding of the attribute information of the three-dimensional points.

Figure 49:
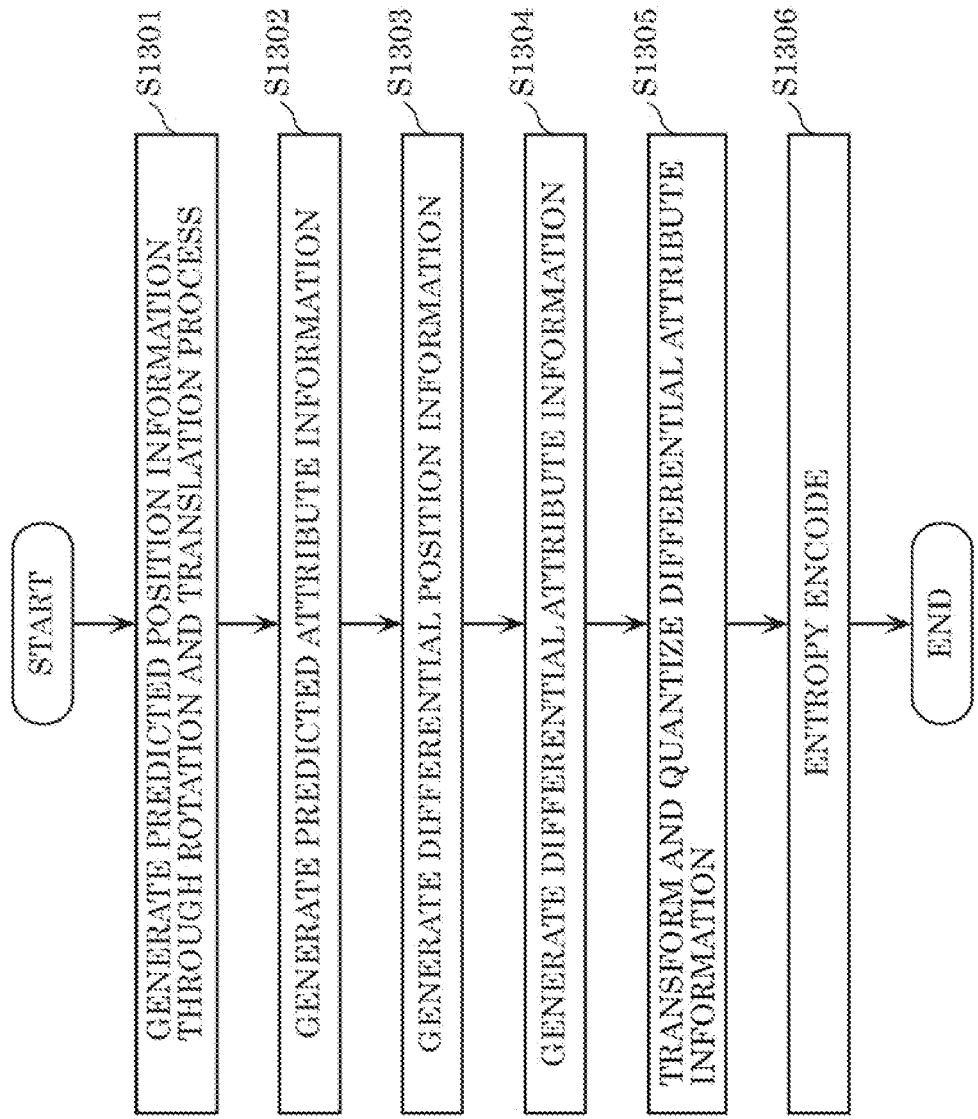
FIG. 49 is a flowchart of a three-dimensional data encoding process performed by the three-dimensional data encoding device according to Embodiment 7.

An order of the processes shown in FIG. 49 is merely an example and is not limited thereto. For example, since the processes with respect to the position information (S1301 and S1303) and the processes with respect to the attribute information (S1302, S1304, and S1305) are separate from one another, they may be performed in an order of choice, and a portion thereof may also be performed in parallel.

With the above, three-dimensional data encoding device 1300 according to the present embodiment generates predicted position information using position information on three-dimensional points included in three-dimensional reference data associated with a time different from a time associated with current three-dimensional data; and encodes differential position information, which is a difference between the predicted position information and the position information on the three-dimensional points included in the current three-dimensional data. This makes it possible to improve encoding efficiency since it is possible to reduce the amount of data of the encoded signal.

Three-dimensional data encoding device 1300 according to the present embodiment generates predicted attribute information using attribute information on three-dimensional points included in three-dimensional reference data; and encodes differential attribute information, which is a difference between the predicted attribute information and the attribute information on the three-dimensional points included in the current three-dimensional data. This makes it possible to improve encoding efficiency since it is possible to reduce the amount of data of the encoded signal.

For example, three-dimensional data encoding device 1300 includes a processor and memory. The processor uses the memory to perform the above processes.

FIG. 48 is a flowchart of the inter prediction process performed by three-dimensional data decoding device 1400.

Three-dimensional data decoding device 1400 decodes (e.g. entropy decodes) the differential position information and the differential attribute information from the encoded signal (encoded bitstream) (S1401).

Three-dimensional data decoding device 1400 decodes, from the encoded signal, an RT flag that indicates whether to apply the rotation and translation process to the position information on the three-dimensional points included in the three-dimensional reference data. Three-dimensional data decoding device 1400 encodes RT information that indicates contents of the rotation and translation process. Note that three-dimensional data decoding device 1400 may decode the RT information when the RT flag indicates to apply the rotation and translation process, and does not need to decode the RT information when the RT flag indicates not to apply the rotation and translation process.

Three-dimensional data decoding device 1400 next performs inverse transformation and inverse quantization on the decoded differential attribute information (S1402).

Three-dimensional data decoding device 1400 next generates predicted position information (e.g. predicted volume) using the position information on the three-dimensional points included in the three-dimensional reference data (e.g. reference space) associated with a time different from a time associated with the current three-dimensional data (e.g. decoding target space) (S1403). To be specific, three-dimensional data decoding device 1400 generates the predicted position information by applying a rotation and translation process to the position information on the three-dimensional points included in the three-dimensional reference data.

More specifically, when the RT flag indicates to apply the rotation and translation process, three-dimensional data decoding device 1400 applies the rotation and translation process on the position information on the three-dimensional points included in the three-dimensional reference data indicated in the RT information. In contrast, when the RT flag indicates not to apply the rotation and translation process, three-dimensional data decoding device 1400 does not apply the rotation and translation process on the position information on the three-dimensional points included in the three-dimensional reference data.

Note that three-dimensional data decoding device 1400 may perform the rotation and translation process using a first unit (e.g. spaces), and may perform the generating of the predicted position information using a second unit (e.g. volumes) that is smaller than the first unit. Note that three-dimensional data decoding device 1400 may perform the rotation and translation process, and the generating of the predicted position information in the same unit.

Three-dimensional data decoding device 1400 may generate the predicted position information by applying (i) a first rotation and translation process to the position information on the three-dimensional points included in the three-dimensional reference data, and (ii) a second rotation and translation process to the position information on the three-dimensional points obtained through the first rotation and translation process, the first rotation and translation process using a first unit (e.g. spaces) and the second rotation and translation process using a second unit (e.g. volumes) that is smaller than the first unit.

For example, as illustrated in FIG. 41, the position information on the three-dimensional points and the predicted position information is represented using an octree structure. For example, the position information on the three-dimensional points and the predicted position information is expressed in a scan order that prioritizes a breadth over a depth in the octree structure. For example, the position information on the three-dimensional points and the predicted position information is expressed in a scan order that prioritizes a depth over a breadth in the octree structure.

Three-dimensional data decoding device 1400 generates predicted attribute information using the attribute information of the three-dimensional points included in the three-dimensional reference data (S1404).

Three-dimensional data decoding device 1400 next restores the position information on the three-dimensional points included in the current three-dimensional data, by decoding encoded position information included in an encoded signal, using the predicted position information. The encoded position information here is the differential position information. Three-dimensional data decoding device 1400 restores the position information on the three-dimensional points included in the current three-dimensional data, by adding the differential position information to the predicted position information (S1405).

Three-dimensional data decoding device 1400 restores the attribute information of the three-dimensional points included in the current three-dimensional data, by decoding encoded attribute information included in an encoded signal, using the predicted attribute information. The encoded attribute information here is the differential position information. Three-dimensional data decoding device 1400 restores the attribute information on the three-dimensional points included in the current three-dimensional data, by adding the differential attribute information to the predicted attribute information (S1406).

Note that when the attribute information is not included in the three-dimensional data, three-dimensional data decoding device 1400 does not need to perform steps S1402, S1404, and S1406. Three-dimensional data decoding device 1400 may also perform only one of the decoding of the position information on the three-dimensional points and the decoding of the attribute information of the three-dimensional points.

Figure 50:
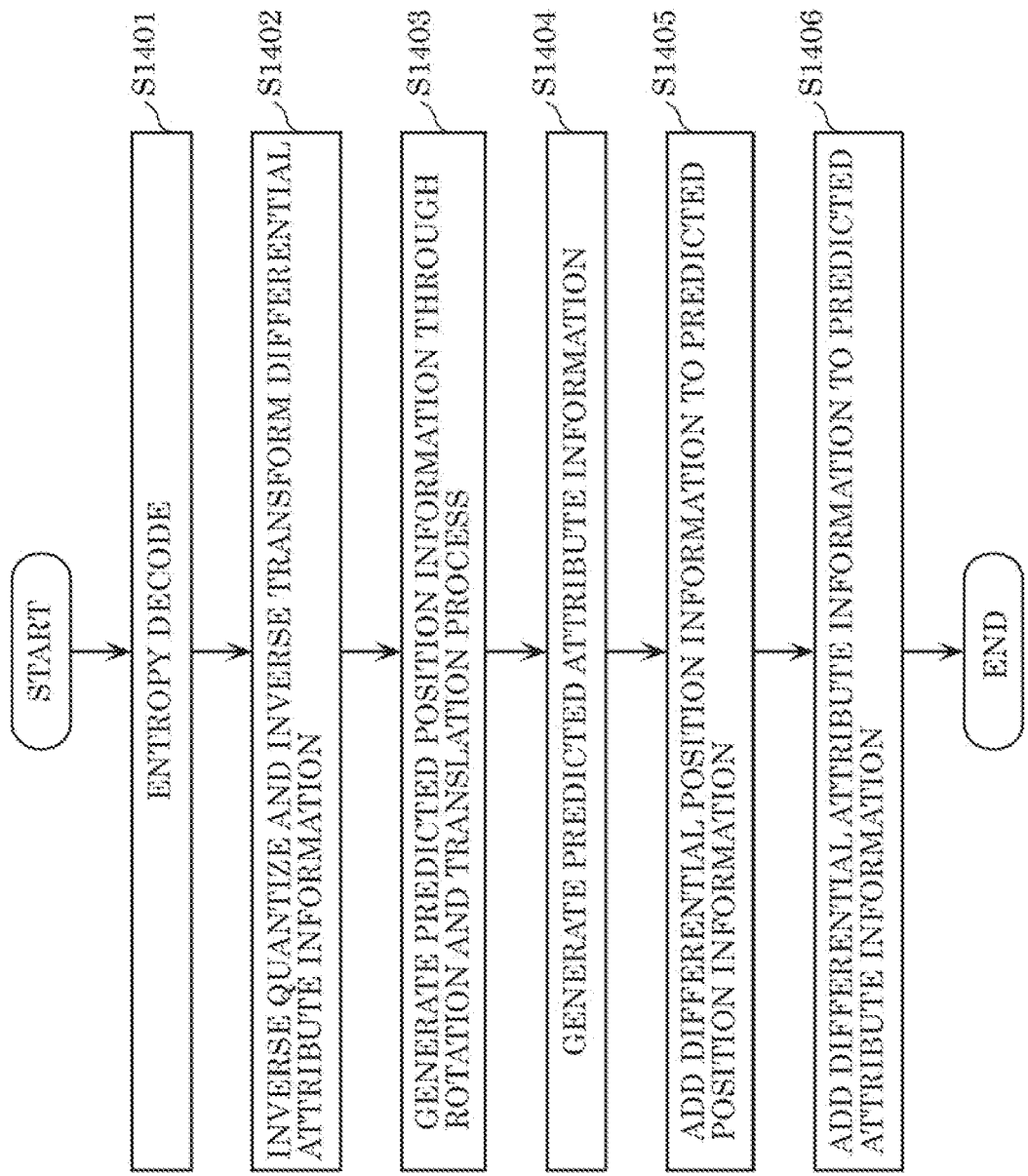
FIG. 50 is a flowchart of a three-dimensional data decoding process performed by the three-dimensional data decoding device according to Embodiment 7.

An order of the processes shown in FIG. 50 is merely an example and is not limited thereto. For example, since the processes with respect to the position information (S1403 and S1405) and the processes with respect to the attribute information (S1402, S1404, and S1406) are separate from one another, they may be performed in an order of choice, and a portion thereof may also be performed in parallel.

Embodiment 8

Information of a three-dimensional point cloud includes geometry information (geometry) and attribute information (attribute). Geometry information includes coordinates (x-coordinate, y-coordinate, z-coordinate) with respect to a certain point. When geometry information is encoded, a method of representing the position of each of three-dimensional points in octree representation and encoding the octree information to reduce a code amount is used instead of directly encoding the coordinates of the three-dimensional point.

On the other hand, attribute information includes information indicating, for example, color information (RGB, YUV, etc.) of each three-dimensional point, a reflectance, and a normal vector. For example, a three-dimensional data encoding device is capable of encoding attribute information using an encoding method different from a method used to encode geometry information.

In the present embodiment, a method of encoding attribute information is explained. It is to be noted that, in the present embodiment, the method is explained based on an example case using integer values as values of attribute information. For example, when each of RGB or YUV color components is of an 8-bit accuracy, the color component is an integer value in a range from 0 to 255. When a reflectance value is of 10-bit accuracy, the reflectance value is an integer in a range from 0 to 1023. It is to be noted that, when the bit accuracy of attribute information is a decimal accuracy, the three-dimensional data encoding device may multiply the value by a scale value to round it to an integer value so that the value of the attribute information becomes an integer value. It is to be noted that the three-dimensional data encoding device may add the scale value to, for example, a header of a bitstream.

As a method of encoding attribute information of a three-dimensional point, it is conceivable to calculate a predicted value of the attribute information of the three-dimensional point and encode a difference (prediction residual) between the original value of the attribute information and the predicted value. For example, when the value of attribute information at three-dimensional point p is Ap and a predicted value is Pp, the three-dimensional data encoding device encodes differential absolute value Diffp=|Ap−Pp|. In this case, when highly-accurate predicted value Pp can be generated, differential absolute value Diffp is small. Thus, for example, it is possible to reduce the code amount by entropy encoding differential absolute value Diffp using a coding table that reduces an occurrence bit count more when differential absolute value Diffp is smaller.

As a method of generating a prediction value of attribute information, it is conceivable to use attribute information of a reference three-dimensional point that is another three-dimensional point which neighbors a current three-dimensional point to be encoded. Here, a reference three-dimensional point is a three-dimensional point in a range of a predetermined distance from the current three-dimensional point. For example, when there are current three-dimensional point p=(x1, y1, z1) and three-dimensional point q=(x2, y2, z2), the three-dimensional data encoding device calculates Euclidean distance d (p, q) between three-dimensional point p and three-dimensional point q represented by (Equation A1).

$$d(p,q)=(x1-y1)^2+(x2-y2)^2+(x3-y3)^2 \quad \text{(Equation A1)}$$

Figure 51:
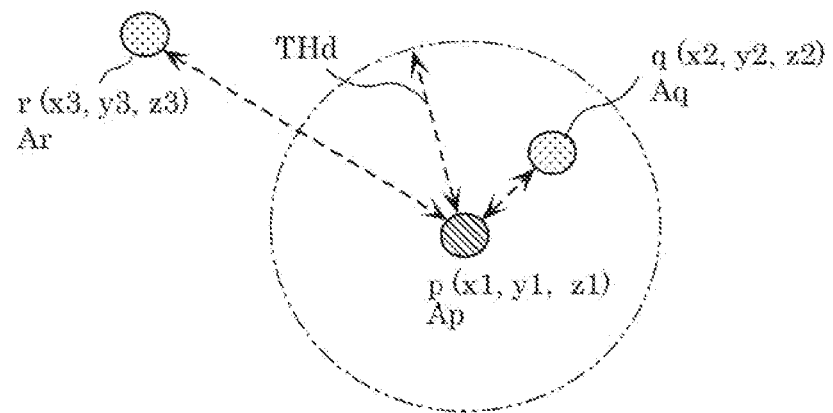
FIG. 51 is a diagram illustrating an example of three-dimensional points according to Embodiment 8.

The three-dimensional data encoding device determines that the position of three-dimensional point q is closer to the position of current three-dimensional point p when Euclidean distance d (p, q) is smaller than predetermined threshold value THd, and determines to use the value of the attribute information of three-dimensional point q to generate a predicted value of the attribute information of current three-dimensional point p. It is to be noted that the method of calculating the distance may be another method, and a Mahalanobis distance or the like may be used. In addition, the three-dimensional data encoding device may determine not to use, in prediction processing, any three-dimensional point outside the predetermined range of distance from the current three-dimensional point. For example, when three-dimensional point r is present, and distance d (p, r) between current three-dimensional point p and three-dimensional point r is larger than or equal to threshold value THd, the three-dimensional data encoding device may determine not to use three-dimensional point r for prediction. It is to be noted that the three-dimensional data encoding device may add the information indicating threshold value THd to, for example, a header of a bitstream;

FIG. 51 is a diagram illustrating an example of three-dimensional points. In this example, distance d (p, q) between current three-dimensional point p and three-dimensional point q is smaller than threshold value THd. Thus, the three-dimensional data encoding device determines that three-dimensional point q is a reference three-dimensional point of current three-dimensional point p, and determines to use the value of attribute information Aq of three-dimensional point q to generate predicted value Pp of attribute information Ap of current three-dimensional point p.

In contrast, distance d (p, r) between current three-dimensional point p and three-dimensional point r is larger than or equal to threshold value THd. Thus, the three-dimensional data encoding device determines that three-dimensional point r is not any reference three-dimensional point of current three-dimensional point p, and determines not to use the value of attribute information Ar of three-dimensional point r to generate predicted value Pp of attribute information Ap of current three-dimensional point p.

In addition, when encoding the attribute information of the current three-dimensional point using a predicted value, the three-dimensional data encoding device uses a three-dimensional point whose attribute information has already been encoded and decoded, as a reference three-dimensional point. Likewise, when decoding the attribute information of a current three-dimensional point to be decoded, the three-dimensional data decoding device uses a three-dimensional point whose attribute information has already been decoded, as a reference three-dimensional point. In this way, it is possible to generate the same predicted value at the time of encoding and decoding. Thus, a bitstream of the three-dimensional point generated by the encoding can be decoded correctly at the decoding side.

Figure 52:
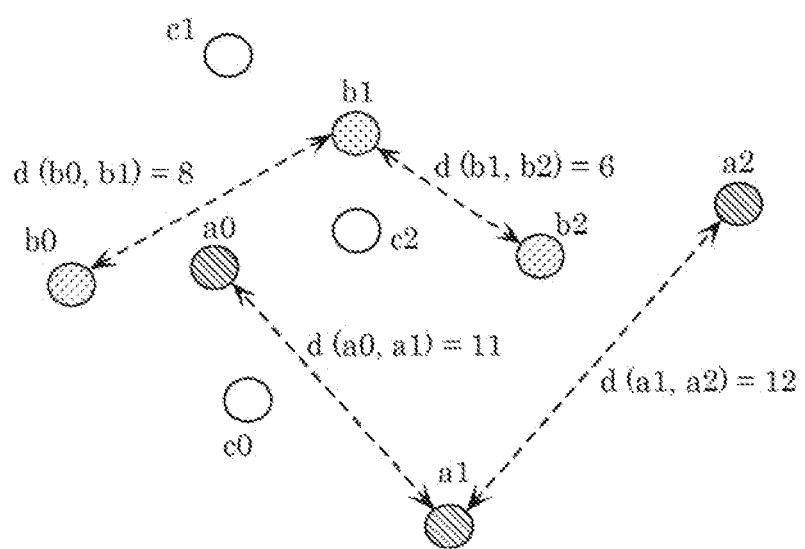
FIG. 52 is a diagram illustrating an example of setting LoDs according to Embodiment 8.

Furthermore, when encoding attribute information of each of three-dimensional points, it is conceivable to classify the three-dimensional point into one of a plurality of layers using geometry information of the three-dimensional point and then encode the attribute information. Here, each of the layers classified is referred to as a Level of Detail (LoD). A method of generating LoDs is explained with reference to FIG. 52.

First, the three-dimensional data encoding device selects initial point a0 and assigns initial point a0 to LoD0. Next, the three-dimensional data encoding device extracts point a1 distant from point a0 more than threshold value Thres_LoD[0] of LoD0 and assigns point a1 to LoD0. Next, the three-dimensional data encoding device extracts point a2 distant from point a1 more than threshold value Thres_LoD[0] of LoD0 and assigns point a2 to LoD0. In this way, the three-dimensional data encoding device configures LoD0 in such a manner that the distance between the points in LoD0 is larger than threshold value Thres_LoD[0].

Next, the three-dimensional data encoding device selects point b0 which has not yet been assigned to any LoD and assigns point b0 to LoD1. Next, the three-dimensional data encoding device extracts point b1 which is distant from point b0 more than threshold value Thres_LoD[1] of LoD1 and which has not yet been assigned to any LoD, and assigns point b1 to LoD1. Next, the three-dimensional data encoding device extracts point b2 which is distant from point b1 more than threshold value Thres_LoD[1] of LoD1 and which has not yet been assigned to any LoD, and assigns point b2 to LoD1. In this way, the three-dimensional data encoding device configures LoD1 in such a manner that the distance between the points in LoD1 is larger than threshold value Thres_LoD[1].

Figure 53:
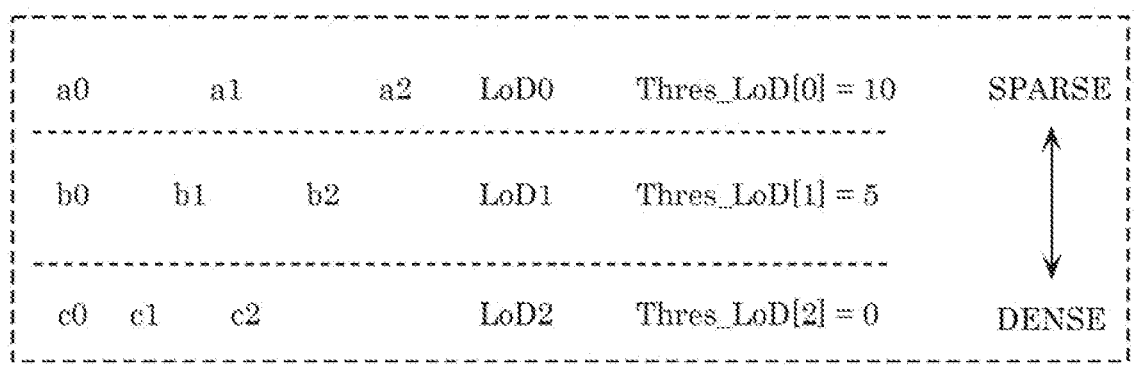
FIG. 53 is a diagram illustrating an example of setting LoDs according to Embodiment 8.

Next, the three-dimensional data encoding device selects point c0 which has not yet been assigned to any LoD and assigns point c0 to LoD2. Next, the three-dimensional data encoding device extracts point c1 which is distant from point c0 more than threshold value Thres_LoD[2] of LoD2 and which has not yet been assigned to any LoD, and assigns point c1 to LoD2. Next, the three-dimensional data encoding device extracts point c2 which is distant from point c1 more than threshold value Thres_LoD[2] of LoD2 and which has not yet been assigned to any LoD, and assigns point c2 to LoD2. In this way, the three-dimensional data encoding device configures LoD2 in such a manner that the distance between the points in LoD2 is larger than threshold value Thres_LoD[2]. For example, as illustrated in FIG. 53, threshold values Thres_LoD[0], Thres_LoD[1], and Thres_LoD[2] of respective LoDs are set.

In addition, the three-dimensional data encoding device may add the information indicating the threshold value of each LoD to, for example, a header of a bitstream. For example, in the case of the example illustrated in FIG. 53, the three-dimensional data encoding device may add threshold values Thres_LoD[0], Thres_LoD[1], and Thres_LoD[2] of respective LoDs to a header.

Alternatively, the three-dimensional data encoding device may assign all three-dimensional points which have not yet been assigned to any LoD in the lowermost-layer LoD. In this case, the three-dimensional data encoding device is capable of reducing the code amount of the header by not assigning the threshold value of the lowermost-layer LoD to the header. For example, in the case of the example illustrated in FIG. 53, the three-dimensional data encoding device assigns threshold values Thres_LoD[0] and Thres_LoD[1] to the header, and does not assign Thres_LoD[2] to the header. In this case, the three-dimensional data encoding device may estimate value 0 of Thres_LoD[2]. In addition, the three-dimensional data encoding device may add the number of LoDs to a header. In this way, the three-dimensional data encoding device is capable of determining the lowermost-layer LoD using the number of LoDs.

In addition, setting threshold values for the respective layers LoDs in such a manner that a larger threshold value is set to a higher layer makes a higher layer (layer closer to LoD0) to have a sparse point cloud (sparse) in which three-dimensional points are more distant and makes a lower layer to have a dense point cloud (dense) in which three-dimensional points are closer. It is to be noted that, in an example illustrated in FIG. 53, LoD0 is the uppermost layer.

In addition, the method of selecting an initial three-dimensional point at the time of setting each LoD may depend on an encoding order at the time of geometry information encoding. For example, the three-dimensional data encoding device configures LoD0 by selecting the three-dimensional point encoded first at the time of the geometry information encoding as initial point a0 of LoD0, and selecting point a1 and point a2 from initial point a0 as the origin. The three-dimensional data encoding device then may select the three-dimensional point whose geometry information has been encoded at the earliest time among three-dimensional points which do not belong to LoD0, as initial point b0 of LoD1. In other words, the three-dimensional data encoding device may select the three-dimensional point whose geometry information has been encoded at the earliest time among three-dimensional points which do not belong to layers (LoD0 to LoDn−1) above LoDn, as initial point n0 of LoDn. In this way, the three-dimensional data encoding device is capable of configuring the same LoD as in encoding by using, in decoding, the initial point selecting method similar to the one used in the encoding, which enables appropriate decoding of a bitstream. More specifically, the three-dimensional data encoding device selects the three-dimensional point whose geometry information has been decoded at the earliest time among three-dimensional points which do not belong to layers above LoDn, as initial point n0 of LoDn.

Hereinafter, a description is given of a method of generating the predicted value of the attribute information of each three-dimensional point using information of LoDs. For example, when encoding three-dimensional points starting with the three-dimensional points included in LoD0, the three-dimensional data encoding device generates current three-dimensional points which are included in LoD1 using encoded and decoded (hereinafter also simply referred to as "encoded") attribute information included in LoD0 and LoD1. In this way, the three-dimensional data encoding device generates a predicted value of attribute information of each three-dimensional point included in LoDn using encoded attribute information included in LoDn' (n'≤n). In other words, the three-dimensional data encoding device does not use attribute information of each of three-dimensional points included in any layer below LoDn to calculate a predicted value of attribute information of each of the three-dimensional points included in LoDn.

For example, the three-dimensional data encoding device calculates an average of attribute information of N or less three dimensional points among encoded three-dimensional points surrounding a current three-dimensional point to be encoded, to generate a predicted value of attribute information of the current three-dimensional point. In addition, the three-dimensional data encoding device may add value N to, for example, a header of a bitstream. It is to be noted that the three-dimensional data encoding device may change value N for each three-dimensional point, and may add value N for each three-dimensional point. This enables selection of appropriate N for each three-dimensional point, which makes it possible to increase the accuracy of the predicted value. Accordingly, it is possible to reduce the prediction residual. Alternatively, the three-dimensional data encoding device may add value N to a header of a bitstream, and may fix the value indicating N in the bitstream. This eliminates the need to encode or decode value N for each three-dimensional point, which makes it possible to reduce the processing amount. In addition, the three-dimensional data encoding device may encode the values of N separately for each LoD. In this way, it is possible to increase the coding efficiency by selecting appropriate N for each LoD.

Alternatively, the three-dimensional data encoding device may calculate a predicted value of attribute information of three-dimensional point based on weighted average values of attribute information of encoded N neighbor three-dimensional points. For example, the three-dimensional data encoding device calculates weights using distance information between a current three-dimensional point and each of N neighbor three-dimensional points.

Figure 54:
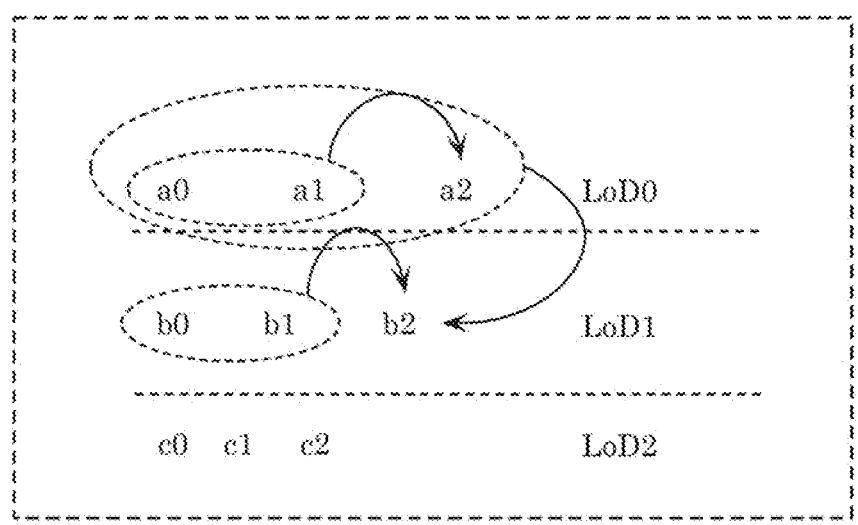
FIG. 54 is a diagram illustrating an example of attribute information to be used for predicted values according to Embodiment 8.

When encoding value N for each LoD, for example, the three-dimensional data encoding device sets larger value N to a higher layer LoD, and sets smaller value N to a lower layer LoD. The distance between three-dimensional points belonging to a higher layer LoD is large, there is a possibility that it is possible to increase the prediction accuracy by setting large value N, selecting a plurality of neighbor three-dimensional points, and averaging the values. Furthermore, the distance between three-dimensional points belonging to a lower layer LoD is small, it is possible to perform efficient prediction while reducing the processing amount of averaging by setting smaller value N;

FIG. 54 is a diagram illustrating an example of attribute information to be used for predicted values. As described above, the predicted value of point P included in LoDN is generated using encoded neighbor point P' included in LoDN' (N'≤N). Here, neighbor point P' is selected based on the distance from point P. For example, the predicted value of attribute information of point b2 illustrated in FIG. 54 is generated using attribute information of each of points a0, a1, b0, and hi.

Neighbor points to be selected vary depending on the values of N described above. For example, in the case of N=5, a0, a1, a2, b0, and b1 are selected as neighbor points. In the case of N=4, a0, a1, a2, and b1 are selected based on distance information.

The predicted value is calculated by distance-dependent weighted averaging. For example, in the example illustrated in FIG. 54, predicted value a2p of point a2 is calculated by weighted averaging of attribute information of each of point a0 and a1, as represented by (Equation A2) and (Equation A3). It is to be noted that $A_i$ is an attribute information value of ai.

$$a2p = \sum_{i=0}^{1} w_i \times A_i \quad \text{(Equation A2)}$$

$$w_i = \frac{\frac{1}{d(a2, ai)}}{\sum_{j=0}^{1} \frac{1}{d(a2, aj)}} \quad \text{(Equation A3)}$$

In addition, predicted value b2p of point b2 is calculated by weighted averaging of attribute information of each of point a0, a1, a2, b0, and b1, as represented by (Equation A4) and (Equation A6). It is to be noted that $B_i$ is an attribute information value of bi.

$$b2p = \sum_{i=0}^{2} wa_i \times A_i + \sum_{i=0}^{1} wb_i \times B_i \quad \text{(Equation A4)}$$

$$wa_i = \frac{\frac{1}{d(b2, ai)}}{\sum_{j=0}^{2} \frac{1}{d(b2, aj)} + \sum_{j=0}^{1} \frac{1}{d(b2, bj)}} \quad \text{(Equation A5)}$$

$$wb_i = \frac{\frac{1}{d(b2, bi)}}{\sum_{j=0}^{2} \frac{1}{d(b2, aj)} + \sum_{j=0}^{1} \frac{1}{d(b2, bj)}} \quad \text{(Equation A6)}$$

In addition, the three-dimensional data encoding device may calculate a difference value (prediction residual) generated from the value of attribute information of a three-dimensional point and neighbor points, and may quantize the calculated prediction residual. For example, the three-dimensional data encoding device performs quantization by dividing the prediction residual by a quantization scale (also referred to as a quantization step). In this case, an error (quantization error) which may be generated by quantization reduces as the quantization scale is smaller. In the other case where the quantization scale is larger, the resulting quantization error is larger.

It is to be noted that the three-dimensional data encoding device may change the quantization scale to be used for each LoD. For example, the three-dimensional data encoding device reduces the quantization scale more for a higher layer, and increases the quantization scale more for a lower layer. The value of attribute information of a three-dimensional point belonging to a higher layer may be used as a predicted value of attribute information of a three-dimensional point belonging to a lower layer. Thus, it is possible to increase the coding efficiency by reducing the quantization scale for the higher layer to reduce the quantization error that can be generated in the higher layer and to increase the prediction accuracy of the predicted value. It is to be noted that the three-dimensional data encoding device may add the quantization scale to be used for each LoD to, for example, a header. In this way, the three-dimensional data encoding device can decode the quantization scale correctly, thereby appropriately decoding the bitstream.

In addition, the three-dimensional data encoding device may convert a signed integer value (signed quantized value) which is a quantized prediction residual into an unsigned integer value (unsigned quantized value). This eliminates the need to consider occurrence of a negative integer when entropy encoding the prediction residual. It is to be noted that the three-dimensional data encoding device does not always need to convert a signed integer value into an unsigned integer value, and, for example, that the three-dimensional data encoding device may entropy encode a sign bit separately.

The prediction residual is calculated by subtracting a prediction value from the original value. For example, as represented by (Equation A7), prediction residual a2r of point a2 is calculated by subtracting predicted value a2p of point a2 from value $A_2$ of attribute information of point a2. As represented by (Equation A8), prediction residual b2r of point b2 is calculated by subtracting predicted value b2p of point b2 from value $B_2$ of attribute information of point b2.

$$a2r=A_2-a2p \quad \text{(Equation A7)}$$

$$b2r=B_2-b2p \quad \text{(Equation A8)}$$

In addition, the prediction residual is quantized by being divided by a Quantization Step (QS). For example, quantized value a2q of point a2 is calculated according to (Equation A9). Quantized value b2q of point b2 is calculated according to (Equation A10). Here, QS_LoD0 is a QS for LoD0, and QS_LoD1 is a QS for LoD1. In other words, a QS may be changed according to an LoD.

$$a2q=a2r/QS\_LoD0 \quad \text{(Equation A9)}$$

$$b2q=b2r/QS\_LoD1 \quad \text{(Equation A10)}$$

In addition, the three-dimensional data encoding device converts signed integer values which are quantized values as indicated below into unsigned integer values as indicated below. When signed integer value a2q is smaller than 0, the three-dimensional data encoding device sets unsigned integer value a2u to −1−(2×a2q). When signed integer value a2q is 0 or more, the three-dimensional data encoding device sets unsigned integer value a2u to 2×a2q.

Likewise, when signed integer value b2q is smaller than 0, the three-dimensional data encoding device sets unsigned integer value b2u to −1−(2×b2q). When signed integer value b2q is 0 or more, the three-dimensional data encoding device sets unsigned integer value b2u to 2×b2q.

In addition, the three-dimensional data encoding device may encode the quantized prediction residual (unsigned integer value) by entropy encoding. For example, the three-dimensional data encoding device may binarize the unsigned integer value and then apply binary arithmetic encoding to the binary value.

It is to be noted that, in this case, the three-dimensional data encoding device may switch binarization methods according to the value of a prediction residual. For example, when prediction residual pu is smaller than threshold value R_TH, the three-dimensional data encoding device binarizes prediction residual pu using a fixed bit count required for representing threshold value R_TH. In addition, when prediction residual pu is larger than or equal to threshold value R_TH, the three-dimensional data encoding device binarizes the binary data of threshold value R_TH and the value of (pu−R_TH), using exponential-Golomb coding, or the like.

For example, when threshold value R_TH is 63 and prediction residual pu is smaller than 63, the three-dimensional data encoding device binarizes prediction residual pu using 6 bits. When prediction residual pu is larger than or equal to 63, the three-dimensional data encoding device performs arithmetic encoding by binarizing the binary data (111111) of threshold value R_TH and (pu−63) using exponential-Golomb coding.

In a more specific example, when prediction residual pu is 32, the three-dimensional data encoding device generates 6-bit binary data (100000), and arithmetic encodes the bit sequence. In addition, when prediction residual pu is 66, the three-dimensional data encoding device generates binary data (111111) of threshold value R_TH and a bit sequence (00100) representing value 3 (66-63) using exponential-Golomb coding, and arithmetic encodes the bit sequence (111111+00100).

In this way, the three-dimensional data encoding device can perform encoding while preventing a binary bit count from increasing abruptly in the case where a prediction residual becomes large by switching binarization methods according to the magnitude of the prediction residual. It is to be noted that the three-dimensional data encoding device may add threshold value R_TH to, for example, a header of a bitstream.

For example, in the case where encoding is performed at a high bit rate, that is, when a quantization scale is small, a small quantization error and a high prediction accuracy are obtained. As a result, a prediction residual may not be large. Thus, in this case, the three-dimensional data encoding device sets large threshold value R_TH. This reduces the possibility that the binary data of threshold value R_TH is encoded, which increases the coding efficiency. In the opposite case where encoding is performed at a low bit rate, that is, when a quantization scale is large, a large quantization error and a low prediction accuracy are obtained. As a result, a prediction residual may be large. Thus, in this case, the three-dimensional data encoding device sets small threshold value R_TH. In this way, it is possible to prevent abrupt increase in bit length of binary data.

In addition, the three-dimensional data encoding device may switch threshold value R_TH for each LoD, and may add threshold value R_TH for each LoD to, for example, a header. In other words, the three-dimensional data encoding device may switch binarization methods for each LoD. For example, since distances between three-dimensional points are large in a higher layer, a prediction accuracy is low, which may increase a prediction residual. Thus, the three-dimensional data encoding device prevents abrupt increase in bit length of binary data by setting small threshold value R_TH to the higher layer. In addition, since distances between three-dimensional points are small in a lower layer, a prediction accuracy is high, which may reduce a prediction residual. Thus, the three-dimensional data encoding device increases the coding efficiency by setting large threshold value R_TH to the lower layer;

FIG. 55 is a diagram indicating examples of exponential-Golomb codes. The diagram indicates the relationships between pre-binarization values (non-binary values) and post-binarization bits (codes). It is to be noted that 0 and 1 indicated in FIG. 55 may be inverted.

The three-dimensional data encoding device applies arithmetic encoding to the binary data of prediction residuals. In this way, the coding efficiency can be increased. It is to be noted that, in the application of the arithmetic encoding, there is a possibility that occurrence probability tendencies of 0 and 1 in each bit vary, in binary data, between an n-bit code which is a part binarized by n bits and a remaining code which is a part binarized using exponential-Golomb coding. Thus, the three-dimensional data encoding device may switch methods of applying arithmetic encoding between the n-bit code and the remaining code.

For example, the three-dimensional data encoding device performs arithmetic encoding on the n-bit code using one or more coding tables (probability tables) different for each bit. At this time, the three-dimensional data encoding device may change the number of coding tables to be used for each bit. For example, the three-dimensional data encoding device performs arithmetic encoding using one coding table for first bit b0 in an n-bit code. The three-dimensional data encoding device uses two coding tables for the next bit M.

The three-dimensional data encoding device switches coding tables to be used for arithmetic encoding of bit b1 according to the value (0 or 1) of b0. Likewise, the three-dimensional data encoding device uses four coding tables for the next bit b2. The three-dimensional data encoding device switches coding tables to be used for arithmetic encoding of bit b2 according to the values (in a range from 0 to 3) of b0 and b1.

In this way, the three-dimensional data encoding device uses $2^{n-1}$ coding tables when arithmetic encoding each bit bn−1 in n-bit code. The three-dimensional data encoding device switches coding tables to be used according to the values (occurrence patterns) of bits before bn−1. In this way, the three-dimensional data encoding device can use coding tables appropriate for each bit, and thus can increase the coding efficiency.

It is to be noted that the three-dimensional data encoding device may reduce the number of coding tables to be used for each bit. For example, the three-dimensional data encoding device may switch $2^m$ coding tables according to the values (occurrence patterns) of m bits (m<n−1) before bn−1 when arithmetic encoding each bit bn−1. In this way, it is possible to increase the coding efficiency while reducing the number of coding tables to be used for each bit. It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, ..., bn−1, the coding table for b0 is one table (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used are switched according to the values (in the range from 0 to 3) of b0 and b1. Coding tables for bn−1 are $2^n-1$ tables (CTbn0, CTbn1, ..., CTbn ($2^{n-1}-1$)). Coding tables to be used are switched according to the values (in a range from 0 to $2^{n-1}-1$) of b0, b1, ..., bn−2.

It is to be noted that the three-dimensional data encoding device may apply, to an n-bit code, arithmetic encoding (m=$2^n$) by m-ary that sets the value in the range from 0 to $2^n-1$ without binarization. When the three-dimensional data encoding device arithmetic encodes an n-bit code by an m-ary, the three-dimensional data decoding device may reconstruct the n-bit code by arithmetic decoding the m-ary;

FIG. 56 is a diagram for illustrating processing in the case where remaining codes are exponential-Golomb codes. As indicated in FIG. 56, each remaining code which is a part binarized using exponential-Golomb coding includes a prefix and a suffix. For example, the three-dimensional data encoding device switches coding tables between the prefix and the suffix. In other words, the three-dimensional data encoding device arithmetic encodes each of bits included in the prefix using coding tables for the prefix, and arithmetic encodes each of bits included in the suffix using coding tables for the suffix.

It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in one of coding tables. In this way, it is possible to reduce the number of updates of occurrence probabilities, and thus to reduce the processing amount. For example, the three-dimensional data encoding device may update the occurrence probabilities for the prefix, and may fix the occurrence probabilities for the suffix.

In addition, the three-dimensional data encoding device decodes a quantized prediction residual by inverse quantization and reconstruction, and uses a decoded value which is the decoded prediction residual for prediction of a current three-dimensional point to be encoded and the following three-dimensional point(s). More specifically, the three-dimensional data encoding device calculates an inverse quantized value by multiplying the quantized prediction residual (quantized value) with a quantization scale, and adds the inverse quantized value and a prediction value to obtain the decoded value (reconstructed value).

For example, quantized value a2iq of point a2 is calculated using quantized value a2q of point a2 according to (Equation A11). Inverse quantized value b2iq of point b2q is calculated using quantized value b2q of point b2 according to (Equation A12). Here, QS_LoD0 is a QS for LoD0, and QS_LoD1 is a QS for LoD1. In other words, a QS may be changed according to an LoD.

$$a2iq = a2q \times QS\_LoD0 \qquad \text{(Equation A11)}$$

$$b2iq = b2q \times QS\_LoD1 \qquad \text{(Equation A12)}$$

For example, as represented by (Equation A13), decoded value a2rec of point a2 is calculated by adding inverse quantization value a2iq of point a2 to predicted value a2p of point a2. As represented by (Equation A14), decoded value b2rec of point b2 is calculated by adding inverse quantized value b2iq of point b2 to predicted value b2p of point b2.

$$a2rec = a2iq + a2p \qquad \text{(Equation A13)}$$

$$b2rec = b2iq + b2p \qquad \text{(Equation A14)}$$

Hereinafter, a syntax example of a bitstream according to the present embodiment is described. FIG. 57 is a diagram indicating the syntax example of an attribute header (attribute header) according to the present embodiment. The attribute header is header information of attribute information. As indicated in FIG. 57, the attribute header includes the number of layers information (NumLoD), the number of three-dimensional points information (NumOfPoint[i]), a layer threshold value (Thres_LoD[i]), the number of neighbor points information (NumNeighborPoint[i]), a prediction threshold value (THd[i]), a quantization scale (QS[i]), and a binarization threshold value (R_TH[i]).

The number of layers information (NumLoD) indicates the number of LoDs to be used.

The number of three-dimensional points information (NumOfPoint[i]) indicates the number of three-dimensional points belonging to layer i. It is to be noted that the three-dimensional data encoding device may add, to another header, the number of three-dimensional points information indicating the total number of three-dimensional points. In this case, the three-dimensional data encoding device does not need to add, to a header, NumOfPoint [NumLoD−1] indicating the number of three-dimensional points belonging to the lowermost layer. In this case, the three-dimensional data decoding device is capable of calculating NumOfPoint [NumLoD−1] according to (Equation A15). In this case, it is possible to reduce the code amount of the header.

$$\text{Num Of Point } [NumLoD - 1] = \quad \text{(Equation A15)}$$
$$\text{All Num Of Point} - \sum_{j=0}^{NumLoD-2} \text{Num Of Point } [j]$$

The layer threshold value (Thres_LoD[i]) is a threshold value to be used to set layer i. The three-dimensional data encoding device and the three-dimensional data decoding device configure LoDi in such a manner that the distance between points in LoDi becomes larger than threshold value Thres_LoD[i]. The three-dimensional data encoding device does not need to add the value of Thres_LoD [NumLoD−1] (lowermost layer) to a header. In this case, the three-dimensional data decoding device may estimate 0 as the value of Thres_LoD [NumLoD−1]. In this case, it is possible to reduce the code amount of the header.

The number of neighbor points information (NumNeighborPoint[i]) indicates the upper limit value of the number of neighbor points to be used to generate a predicted value of a three-dimensional point belonging to layer i. The three-dimensional data encoding device may calculate a predicted value using the number of neighbor points M when the number of neighbor points M is smaller than NumNeighborPoint[i] (M<NumNeighborPoint[i]). Furthermore, when there is no need to differentiate the values of NumNeighborPoint[i] for respective LoDs, the three-dimensional data encoding device may add a piece of the number of neighbor points information (NumNeighborPoint) to be used in all LoDs to a header.

The prediction threshold value (THd[i]) indicates the upper limit value of the distance between a current three-dimensional point to be encoded or decoded in layer i and each of neighbor three-dimensional points to be used to predict the current three-dimensional point. The three-dimensional data encoding device and the three-dimensional data decoding device do not use, for prediction, any three-dimensional point distant from the current three-dimensional point over THd[i]. It is to be noted that, when there is no need to differentiate the values of THd[i] for respective LoDs, the three-dimensional data encoding device may add a single prediction threshold value (THd) to be used in all LoDs to a header.

The quantization scale (QS[i]) indicates a quantization scale to be used for quantization and inverse quantization in layer i.

The binarization threshold value (R_TH[i]) is a threshold value for switching binarization methods of prediction residuals of three-dimensional points belonging to layer i. For example, the three-dimensional data encoding device binarizes prediction residual pu using a fixed bit count when a prediction residual is smaller than threshold value R_TH, and binarizes the binary data of threshold value R_TH and the value of (pu−R_TH) using exponential-Golomb coding when a prediction residual is larger than or equal to threshold value R_TH. It is to be noted that, when there is no need to switch the values of R_TH[i] between LoDs, the three-dimensional data encoding device may add a single binarization threshold value (R_TH) to be used in all LoDs to a header.

It is to be noted that R_TH[i] may be the maximum value which can be represented by n bits. For example, R_TH is 63 in the case of 6 bits, and R_TH is 255 in the case of 8 bits. Alternatively, the three-dimensional data encoding device may encode a bit count instead of encoding the maximum value which can be represented by n bits as a binarization threshold value. For example, the three-dimensional data encoding device may add value 6 in the case of R_TH[i]=63 to a header, and may add value 8 in the case of R_TH[i]=255 to a header. Alternatively, the three-dimensional data encoding device may define the minimum value (minimum bit count) representing R_TH[i], and add a relative bit count from the minimum value to a header. For example, the three-dimensional data encoding device may add value 0 to a header when R_TH[i]=63 is satisfied and the minimum bit count is 6, and may add value 2 to a header when R_TH[i]=255 is satisfied and the minimum bit count is 6.

Alternatively, the three-dimensional data encoding device may entropy encode at least one of NumLoD, Thres_LoD[i], NumNeighborPoint[i], THd[i], QS[i], and R_TH[i], and add the entropy encoded one to a header. For example, the three-dimensional data encoding device may binarize each value and perform arithmetic encoding on the binary value. In addition, the three-dimensional data encoding device may encode each value using a fixed length in order to reduce the processing amount.

Alternatively, the three-dimensional data encoding device does not always need to add at least one of NumLoD, Thres_LoD[i], NumNeighborPoint[i], THd[i], QS[i], and R_TH[i] to a header. For example, at least one of these values may be defined by a profile or a level in a standard, or the like. In this way, it is possible to reduce the bit amount of the header;

FIG. 58 is a diagram indicating the syntax example of attribute data (attribute data) according to the present embodiment. The attribute data includes encoded data of the attribute information of a plurality of three-dimensional points. As indicated in FIG. 58, the attribute data includes an n-bit code and a remaining code.

The n-bit code is encoded data of a prediction residual of a value of attribute information or a part of the encoded data. The bit length of the n-bit code depends on value R_TH[i]. For example, the bit length of the n-bit code is 6 bits when the value indicated by R_TH[i] is 63, the bit length of the n-bit code is 8 bits when the value indicated by R_TH[i] is 255.

The remaining code is encoded data encoded using exponential-Golomb coding among encoded data of the prediction residual of the value of the attribute information. The remaining code is encoded or decoded when the value of the n-bit code is equal to R_TH[i]. The three-dimensional data decoding device decodes the prediction residual by adding the value of the n-bit code and the value of the remaining code. It is to be noted that the remaining code does not always need to be encoded or decoded when the value of the n-bit code is not equal to R_TH[i].

Hereinafter, a description is given of a flow of processing in the three-dimensional data encoding device. FIG. 59 is a flowchart of a three-dimensional data encoding process performed by the three-dimensional data encoding device.

First, the three-dimensional data encoding device encodes geometry information (geometry) (S3001). For example, the three-dimensional data encoding is performed using octree representation.

When the positions of three-dimensional points changed by quantization, etc, after the encoding of the geometry information, the three-dimensional data encoding device re-assigns attribute information of the original three-dimensional points to the post-change three-dimensional points (S3002). For example, the three-dimensional data encoding device interpolates values of attribute information according to the amounts of change in position to re-assign the attribute information. For example, the three-dimensional data encoding device detects pre-change N three-dimensional points closer to the post-change three-dimensional positions, and performs weighted averaging of the values of attribute information of the N three-dimensional points. For example, the three-dimensional data encoding device determines weights based on distances from the post-change three-dimensional positions to the respective N three-dimensional positions in weighted averaging. The three-dimensional data encoding device then determines the values obtained through the weighted averaging to be the values of the attribute information of the post-change three-dimensional points. When two or more of the three-dimensional points are changed to the same three-dimensional position through quantization, etc., the three-dimensional data encoding device may assign the average value of the attribute information of the pre-change two or more three-dimensional points as the values of the attribute information of the post-change three-dimensional points.

Next, the three-dimensional data encoding device encodes the attribute information (attribute) re-assigned (S3003). For example, when encoding a plurality of kinds of attribute information, the three-dimensional data encoding device may encode the plurality of kinds of attribute information in order. For example, when encoding colors and reflectances as attribute information, the three-dimensional data encoding device may generate a bitstream added with the color encoding results and the reflectance encoding results after the color encoding results. It is to be noted that the order of the plurality of encoding results of attribute information to be added to a bitstream is not limited to the order, and may be any order.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. Alternatively, the three-dimensional data encoding device may encode a plurality of kinds of attribute information in parallel, and may integrate the encoding results into a single bitstream. In this way, the three-dimensional data encoding device is capable of encoding the plurality of kinds of attribute information at high speed;

FIG. 60 is a flowchart of an attribute information encoding process (S3003). First, the three-dimensional data encoding device sets LoDs (S3011). In other words, the three-dimensional data encoding device assigns each of three-dimensional points to any one of the plurality of LoDs.

Next, the three-dimensional data encoding device starts a loop for each LoD (S3012). In other words, the three-dimensional data encoding device iteratively performs the processes of Steps from S3013 to S3021 for each LoD.

Next, the three-dimensional data encoding device starts a loop for each three-dimensional point (S3013). In other words, the three-dimensional data encoding device iteratively performs the processes of Steps from S3014 to S3020 for each three-dimensional point.

First, the three-dimensional data encoding device searches a plurality of neighbor points which are three-dimensional points present in the neighborhood of a current three-dimensional point to be processed and are to be used to calculate a predicted value of the current three-dimensional point (S3014). Next, the three-dimensional data encoding device calculates the weighted average of the values of attribute information of the plurality of neighbor points, and sets the resulting value to predicted value P (S3015). Next, the three-dimensional data encoding device calculates a prediction residual which is the difference between the attribute information of the current three-dimensional point and the predicted value (S3016). Next, the three-dimensional data encoding device quantizes the prediction residual to calculate a quantized value (S3017). Next, the three-dimensional data encoding device arithmetic encodes the quantized value (S3018).

Next, the three-dimensional data encoding device inverse quantizes the quantized value to calculate an inverse quantized value (S3019). Next, the three-dimensional data encoding device adds a prediction value to the inverse quantized value to generate a decoded value (S3020). Next, the three-dimensional data encoding device ends the loop for each three-dimensional point (S3021). Next, the three-dimensional data encoding device ends the loop for each LoD (S3022).

Hereinafter, a description is given of a three-dimensional data decoding process in the three-dimensional data decoding device which decodes a bitstream generated by the three-dimensional data encoding device.

The three-dimensional data decoding device generates decoded binary data by arithmetic decoding the binary data of the attribute information in the bitstream generated by the three-dimensional data encoding device, according to the method similar to the one performed by the three-dimensional data encoding device. It is to be noted that when methods of applying arithmetic encoding are switched between the part (n-bit code) binarized using n bits and the part (remaining code) binarized using exponential-Golomb coding in the three-dimensional data encoding device, the three-dimensional data decoding device performs decoding in conformity with the arithmetic encoding, when applying arithmetic decoding.

For example, the three-dimensional data decoding device performs arithmetic decoding using coding tables (decoding tables) different for each bit in the arithmetic decoding of the n-bit code. At this time, the three-dimensional data decoding device may change the number of coding tables to be used for each bit. For example, the three-dimensional data decoding device performs arithmetic decoding using one coding table for first bit b0 in the n-bit code. The three-dimensional data decoding device uses two coding tables for the next bit b1. The three-dimensional data decoding device switches coding tables to be used for arithmetic decoding of bit b1 according to the value (0 or 1) of b0. Likewise, the three-dimensional data decoding device uses four coding tables for the next bit b2. The three-dimensional data decoding device switches coding tables to be used for arithmetic decoding of bit b2 according to the values (in the range from 0 to 3) of b0 and b1.

In this way, the three-dimensional data decoding device uses 2n−1 coding tables when arithmetic decoding each bit bn−1 in the n-bit code. The three-dimensional data decoding device switches coding tables to be used according to the values (occurrence patterns) of bits before bn−1. In this way, the three-dimensional data decoding device is capable of appropriately decoding a bitstream encoded at an increased coding efficiency using the coding tables appropriate for each bit.

It is to be noted that the three-dimensional data decoding device may reduce the number of coding tables to be used for each bit. For example, the three-dimensional data decoding device may switch $2^m$ coding tables according to the values (occurrence patterns) of m bits (m<n−1) before bn−1 when arithmetic decoding each bit bn−1. In this way, the three-dimensional data decoding device is capable of appropriately decoding the bitstream encoded at the increased coding efficiency while reducing the number of coding tables to be used for each bit. It is to be noted that the three-dimensional data decoding device may update the occurrence probabilities of 0 and 1 in each coding table according to the values of binary data occurred actually. In addition, the three-dimensional data decoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, bn−1, the coding table for b0 is one (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used according to the values (in the range from 0 to 3) of b0 and b1. Coding tables for bn−1 are $2^{n-1}$ tables (CTbn0, CTbn1, Tbn ($2^{n-1}$-1)). Coding tables to be used are switched according to the values (in the range from 0 to $2^{n-1}$-1) of b0, b1, bn−2;

FIG. 61 is a diagram for illustrating processing in the case where remaining codes are exponential-Golomb codes. As indicated in FIG. 61, the part (remaining part) binarized and encoded by the three-dimensional data encoding device using exponential-Golomb coding includes a prefix and a suffix. For example, the three-dimensional data decoding device switches coding tables between the prefix and the suffix. In other words, the three-dimensional data decoding device arithmetic decodes each of bits included in the prefix using coding tables for the prefix, and arithmetic decodes each of bits included in the suffix using coding tables for the suffix.

It is to be noted that the three-dimensional data decoding device may update the occurrence probabilities of 0 and 1 in each coding table according to the values of binary data occurred at the time of decoding. In addition, the three-dimensional data decoding device may fix the occurrence probabilities of 0 and 1 in one of coding tables. In this way, it is possible to reduce the number of updates of occurrence probabilities, and thus to reduce the processing amount. For example, the three-dimensional data decoding device may update the occurrence probabilities for the prefix, and may fix the occurrence probabilities for the suffix.

Furthermore, the three-dimensional data decoding device decodes the quantized prediction residual (unsigned integer value) by debinarizing the binary data of the prediction residual arithmetic decoded according to a method in conformity with the encoding method used by the three-dimensional data encoding device. The three-dimensional data decoding device first arithmetic decodes the binary data of an n-bit code to calculate a value of the n-bit code. Next, the three-dimensional data decoding device compares the value of the n-bit code with threshold value R_TH.

In the case where the value of the n-bit code and threshold value R_TH match, the three-dimensional data decoding device determines that a bit encoded using exponential-Golomb coding is present next, and arithmetic decodes the remaining code which is the binary data encoded using exponential-Golomb coding. The three-dimensional data decoding device then calculates, from the decoded remaining code, a value of the remaining code using a reverse lookup table indicating the relationship between the remaining code and the value. FIG. 62 is a diagram indicating an example of a reverse lookup table indicating relationships between remaining codes and the values thereof. Next, the three-dimensional data decoding device adds the obtained value of the remaining code to R_TH, thereby obtaining a debinarized quantized prediction residual.

In the opposite case where the value of the n-bit code and threshold value R_TH do not match (the value of the n-bit code is smaller than value R_TH), the three-dimensional data decoding device determines the value of the n-bit code to be the debinarized quantized prediction residual as it is. In this way, the three-dimensional data decoding device is capable of appropriately decoding the bitstream generated while switching the binarization methods according to the values of the prediction residuals by the three-dimensional data encoding device.

It is to be noted that, when threshold value R_TH is added to, for example, a header of a bitstream, the three-dimensional data decoding device may decode threshold value R_TH from the header, and may switch decoding methods using decoded threshold value R_TH. When threshold value R_TH is added to, for example, a header for each LoD, the three-dimensional data decoding device switch decoding methods using threshold value R_TH decoded for each LoD.

For example, when threshold value R_TH is 63 and the value of the decoded n-bit code is 63, the three-dimensional data decoding device decodes the remaining code using exponential-Golomb coding, thereby obtaining the value of the remaining code. For example, in the example indicated in FIG. 62, the remaining code is 00100, and 3 is obtained as the value of the remaining code. Next, the three-dimensional data decoding device adds 63 that is threshold value R_TH and 3 that is the value of the remaining code, thereby obtaining 66 that is the value of the prediction residual.

In addition, when the value of the decoded n-bit code is 32, the three-dimensional data decoding device sets 32 that is the value of the n-bit code to the value of the prediction residual.

In addition, the three-dimensional data decoding device converts the decoded quantized prediction residual, for example, from an unsigned integer value to a signed integer value, through processing inverse to the processing in the three-dimensional data encoding device. In this way, when entropy decoding the prediction residual, the three-dimensional data decoding device is capable of appropriately decoding the bitstream generated without considering occurrence of a negative integer. It is to be noted that the three-dimensional data decoding device does not always need to convert an unsigned integer value to a signed integer value, and that, for example, the three-dimensional data decoding device may decode a sign bit when decoding a bitstream generated by separately entropy encoding the sign bit.

The three-dimensional data decoding device performs decoding by inverse quantizing and reconstructing the quantized prediction residual after being converted to the signed integer value, to obtain a decoded value. The three-dimensional data decoding device uses the generated decoded value for prediction of a current three-dimensional point to be decoded and the following three-dimensional point(s). More specifically, the three-dimensional data decoding device multiplies the quantized prediction residual by a decoded quantization scale to calculate an inverse quantized value and adds the inverse quantized value and the predicted value to obtain the decoded value.

The decoded unsigned integer value (unsigned quantized value) is converted into a signed integer value through the processing indicated below. When the least significant bit (LSB) of decoded unsigned integer value a2u is 1, the three-dimensional data decoding device sets signed integer value a2q to −((a2u+1)»1). When the LSB of unsigned integer value a2u is not 1, the three-dimensional data decoding device sets signed integer value a2q to ((a2u »1).

Likewise, when an LSB of decoded unsigned integer value b2u is 1, the three-dimensional data decoding device sets signed integer value b2q to −((b2u+1)»1). When the LSB of decoded unsigned integer value n2u is not 1, the three-dimensional data decoding device sets signed integer value b2q to ((b2u»1).

Details of the inverse quantization and reconstruction processing by the three-dimensional data decoding device are similar to the inverse quantization and reconstruction processing in the three-dimensional data encoding device.

Figure 63:
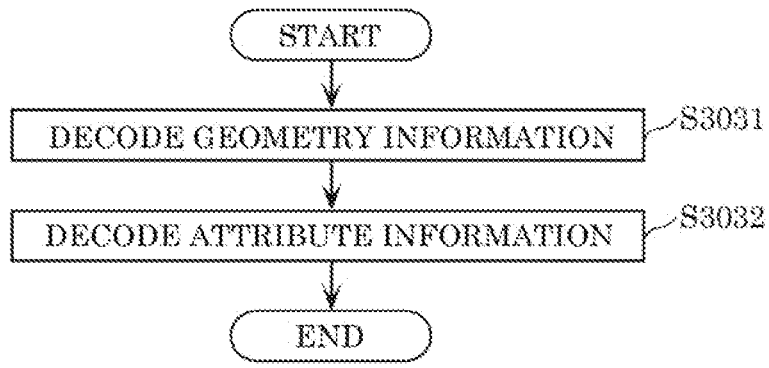
FIG. 63 is a flowchart of a three-dimensional data decoding process according to Embodiment 8.

Hereinafter, a description is given of a flow of processing in the three-dimensional data decoding device. FIG. 63 is a flowchart of a three-dimensional data decoding process performed by the three-dimensional data decoding device. First, the three-dimensional data decoding device decodes geometry information (geometry) from a bitstream (S3031). For example, the three-dimensional data decoding device performs decoding using octree representation.

Next, the three-dimensional data decoding device decodes attribute information (attribute) from the bitstream (S3032). For example, when decoding a plurality of kinds of attribute information, the three-dimensional data decoding device may decode the plurality of kinds of attribute information in order. For example, when decoding colors and reflectances as attribute information, the three-dimensional data decoding device decodes the color encoding results and the reflectance encoding results in order of assignment in the bitstream. For example, when the reflectance encoding results are added after the color encoding results in a bitstream, the three-dimensional data decoding device decodes the color encoding results, and then decodes the reflectance encoding results. It is to be noted that the three-dimensional data decoding device may decode, in any order, the encoding results of the attribute information added to the bitstream.

Figure 64:
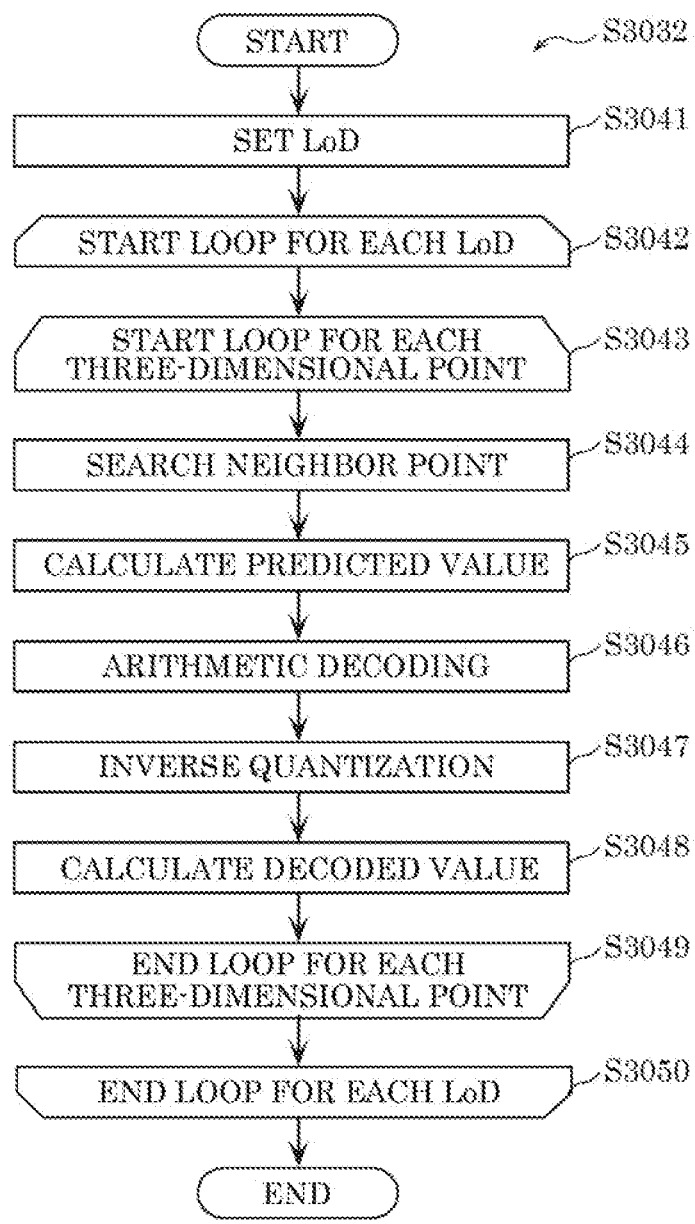
FIG. 64 is a flowchart of an attribute information decoding process according to Embodiment 8.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. In addition, the three-dimensional data decoding device may decode a plurality of kinds of attribute information in parallel, and may integrate the decoding results into a single three-dimensional point cloud. In this way, the three-dimensional data decoding device is capable of decoding the plurality of kinds of attribute information at high speed;

FIG. 64 is a flowchart of an attribute information decoding process (S3032). First, the three-dimensional data decoding device sets LoDs (S3041). In other words, the three-dimensional data decoding device assigns each of three-dimensional points having the decoded geometry information to any one of the plurality of LoDs. For example, this assignment method is the same as the assignment method used in the three-dimensional data encoding device.

Next, the three-dimensional data decoding device starts a loop for each LoD (S3042). In other words, the three-dimensional data decoding device iteratively performs the processes of Steps from S3043 to S3049 for each LoD.

Next, the three-dimensional data decoding device starts a loop for each three-dimensional point (S3043). In other words, the three-dimensional data decoding device iteratively performs the processes of Steps from S3044 to S3048 for each three-dimensional point.

First, the three-dimensional data decoding device searches a plurality of neighbor points which are three-dimensional points present in the neighborhood of a current three-dimensional point to be processed and are to be used to calculate a predicted value of the current three-dimensional point to be processed (S3044). Next, the three-dimensional data decoding device calculates the weighted average of the values of attribute information of the plurality of neighbor points, and sets the resulting value to predicted value P (S3045). It is to be noted that these processes are similar to the processes in the three-dimensional data encoding device.

Next, the three-dimensional data decoding device arithmetic decodes the quantized value from the bitstream (S3046). The three-dimensional data decoding device inverse quantizes the decoded quantized value to calculate an inverse quantized value (S3047). Next, the three-dimensional data decoding device adds a predicted value to the inverse quantized value to generate a decoded value (S3048). Next, the three-dimensional data decoding device ends the loop for each three-dimensional point (S3049). Next, the three-dimensional data encoding device ends the loop for each LoD (S3050).

Figure 65:
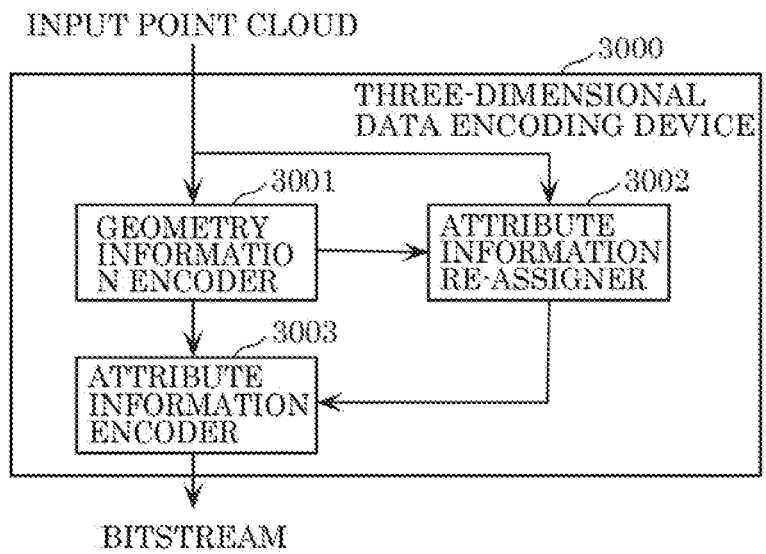
FIG. 65 is a block diagram of a three-dimensional data encoding device according to Embodiment 8.

The following describes configurations of the three-dimensional data encoding device and three-dimensional data decoding device according to the present embodiment. FIG. 65 is a block diagram illustrating a configuration of three-dimensional data encoding device 3000 according to the present embodiment. Three-dimensional data encoding device 3000 includes geometry information encoder 3001, attribute information re-assigner 3002, and attribute information encoder 3003.

Figure 66:
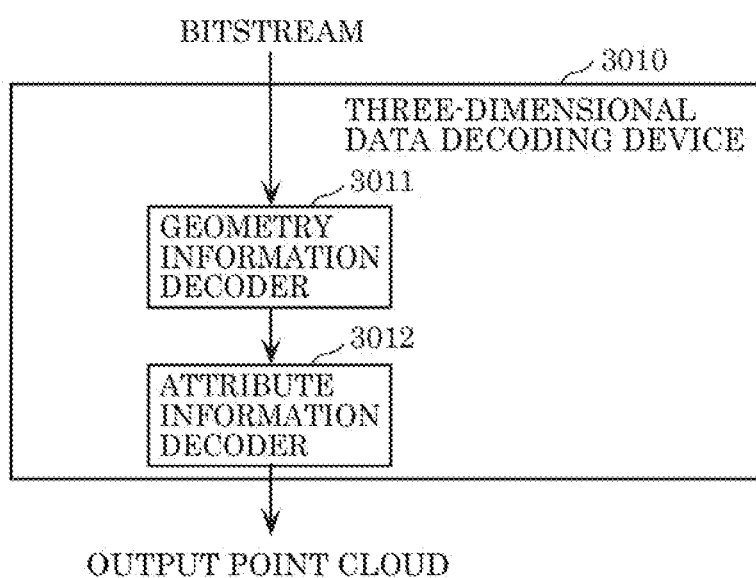
FIG. 66 is a block diagram of a three-dimensional data decoding device according to Embodiment 8.

Attribute information encoder 3003 encodes geometry information (geometry) of a plurality of three-dimensional points included in an input point cloud. Attribute information re-assigner 3002 re-assigns the values of attribute information of the plurality of three-dimensional points included in the input point cloud, using the encoding and decoding results of the geometry information. Attribute information encoder 3003 encodes the re-assigned attribute information (attribute). Furthermore, three-dimensional data encoding device 3000 generates a bitstream including the encoded geometry information and the encoded attribute information;

FIG. 66 is a block diagram illustrating a configuration of three-dimensional data decoding device 3010 according to the present embodiment. Three-dimensional data decoding device 3010 includes geometry information decoder 3011 and attribute information decoder 3012.

Geometry information decoder 3011 decodes the geometry information (geometry) of a plurality of three-dimensional points from a bitstream. Attribute information decoder 3012 decodes the attribute information (attribute) of the plurality of three-dimensional points from the bitstream. Furthermore, three-dimensional data decoding device 3010 integrates the decoded geometry information and the decoded attribute information to generate an output point cloud.

Figure 67:
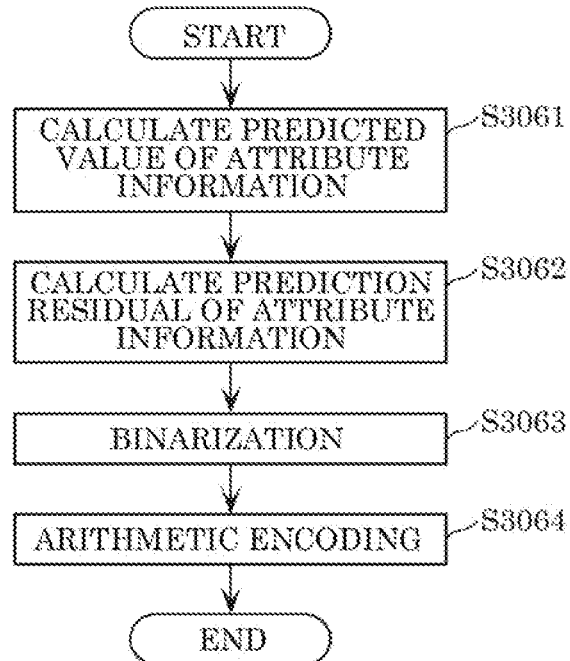
FIG. 67 is a flowchart of a three-dimensional data encoding process according to Embodiment 8.

As described above, the three-dimensional data encoding device according to the present embodiment performs the process illustrated in FIG. 67. The three-dimensional data encoding device encodes a three-dimensional point having attribute information. First, the three-dimensional data encoding device calculates a predicted value of the attribute information of the three-dimensional point (S3061). Next, the three-dimensional data encoding device calculates a prediction residual which is the difference between the attribute information of the three-dimensional point and the predicted value (S3062). Next, the three-dimensional data encoding device binarizes the prediction residual to generate binary data (S3063). Next, the three-dimensional data encoding device arithmetic encodes the binary data (S3064).

In this way, the three-dimensional data encoding device is capable of reducing the code amount of the to-be-coded data of the attribute information by calculating the prediction residual of the attribute information, and binarizing and arithmetic encoding the prediction residual.

For example, in arithmetic encoding (S3064), the three-dimensional data encoding device uses coding tables different for each of bits of binary data. By doing so, the three-dimensional data encoding device can increase the coding efficiency.

For example, in arithmetic encoding (S3064), the number of coding tables to be used is larger for a lower-order bit of the binary data.

For example, in arithmetic encoding (S3064), the three-dimensional data encoding device selects coding tables to be used to arithmetic encode a current bit included in binary data, according to the value of a higher-order bit with respect to the current bit. By doing so, since the three-dimensional data encoding device can select coding tables to be used according to the value of the higher-order bit, the three-dimensional data encoding device can increase the coding efficiency.

For example, in binarization (S3063), the three-dimensional data encoding device: binarizes a prediction residual using a fixed bit count to generate binary data when the prediction residual is smaller than a threshold value (R_TH); and generates binary data including a first code (n-bit code) and a second code (remaining code) when the prediction residual is larger than or equal to the threshold value (R_TH). The first code is of a fixed bit count indicating the threshold value (R_TH), and the second code (remaining code) is obtained by binarizing, using exponential-Golomb coding, the value obtained by subtracting the threshold value (R_TH) from the prediction residual. In arithmetic encoding (S3064), the three-dimensional data encoding device uses arithmetic encoding methods different between the first code and the second code.

With this, for example, since it is possible to arithmetic encode the first code and the second code using arithmetic encoding methods respectively suitable for the first code and the second code, it is possible to increase coding efficiency.

For example, the three-dimensional data encoding device quantizes the prediction residual, and, in binarization (S3063), binarizes the quantized prediction residual. The threshold value (R_TH) is changed according to a quantization scale in quantization. With this, since the three-dimensional data encoding device can use the threshold value suitably according to the quantization scale, it is possible to increase the coding efficiency.

For example, the second code includes a prefix and a suffix. In arithmetic encoding (S3064), the three-dimensional data encoding device uses different coding tables between the prefix and the suffix. In this way, the three-dimensional data encoding device can increase the coding efficiency.

For example, the three-dimensional data encoding device includes a processor and memory, and the processor performs the above process using the memory.

Figure 68:
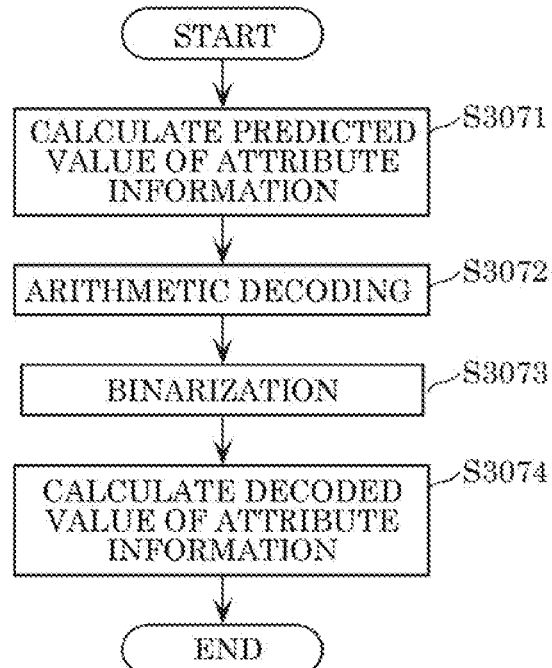
FIG. 68 is a flowchart of a three-dimensional data decoding process according to Embodiment 8.

The three-dimensional data decoding device according to the present embodiment performs the process illustrated in FIG. 68. The three-dimensional data decoding device decodes a three-dimensional point having attribute information. First, the three-dimensional data decoding device calculates a predicted value of the attribute information of a three-dimensional point (S3071). Next, the three-dimensional data decoding device arithmetic decodes encoded data included in a bitstream to generate binary data (S3072). Next, the three-dimensional data decoding device debinarizes the binary data to generate a prediction residual (S3073). Next, the three-dimensional data decoding device calculates a decoded value of the attribute information of the three-dimensional point by adding the predicted value and the prediction residual (S3074).

In this way, the three-dimensional data decoding device is capable of appropriately decoding the bitstream of the attribute information generated by calculating the prediction residual of the attribute information and binarizing and arithmetic decoding the prediction residual.

For example, in arithmetic decoding (S3072), the three-dimensional data decoding device uses coding tables different for each of bits of binary data. With this, the three-dimensional data decoding device is capable of appropriately decoding the bitstream encoded at an increased coding efficiency.

For example, in arithmetic decoding (S3072), the number of coding tables to be used is larger for a lower bit of the binary data.

For example, in arithmetic decoding (S3072), the three-dimensional data decoding device selects coding tables to be used to arithmetic decode a current bit included in binary data, according to the value of a higher-order bit with respect to the current bit. With this, the three-dimensional data decoding device is capable of appropriately decoding the bitstream encoded at an increased coding efficiency.

For example, in debinarization (S3073), the three-dimensional data decoding device debinarizes the first code (n-bit code) of a fixed bit count included in the binary data to generate a first value. The three-dimensional data decoding device: determines the first value to be the prediction residual when the first value is smaller than the threshold value (R_TH); and, when the first value is larger than or equal to the threshold value (R_YH), generates a second value by debinarizing the second code (remaining code) which is an exponential-Golomb code included in the binary data and adds the first value and the second value, thereby generating a prediction residual. In the arithmetic decoding (S3072), the three-dimensional data decoding device uses arithmetic decoding methods different between the first code and the second code.

With this, the three-dimensional data decoding device is capable of appropriately decoding the bitstream encoded at an increased coding efficiency.

For example, the three dimensional data decoding device inverse quantizes the prediction residual, and, in addition (S3074), adds the predicted value and the inverse quantized prediction residual. The threshold value (R_TH) is changed according to a quantization scale in inverse quantization. With this, the three-dimensional data decoding device is capable of appropriately decoding the bitstream encoded at an increased coding efficiency.

For example, the second code includes a prefix and a suffix. In arithmetic decoding (S3072), the three-dimensional data decoding device uses different coding tables between the prefix and the suffix. With this, the three-dimensional data decoding device is capable of appropriately decoding the bitstream encoded at an increased coding efficiency.

For example, the three-dimensional data decoding device includes a processor and memory, and the processor performs the above-described process using the memory.

Embodiment 9

Predicted values may be generated by a method different from that in Embodiment 8. Hereinafter, a three-dimensional point to be encoded is referred to as a first three-dimensional point, and one or more three-dimensional points in the vicinity of the first three-dimensional point is referred to as one or more second three-dimensional points in some cases.

Figures 69, 70:
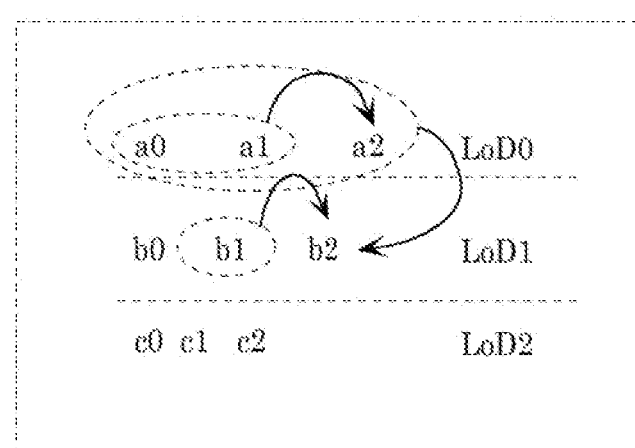
FIG. 69 is a diagram showing a first example of a table representing predicted values calculated in prediction modes according to Embodiment 9.
FIG. 70 is a diagram showing examples of attribute information items (pieces of attribute information) used as the predicted values according to Embodiment 9.

For example, in generating of a predicted value of an attribute information item (attribute information) of a three-dimensional point, an attribute value as it is of a closest three-dimensional point among encoded and decoded three-dimensional points in the vicinity of a three-dimensional point to be encoded may be generated as a predicted value. In the generating of the predicted value, prediction mode information (PredMode) may be appended for each three-dimensional point, and one predicted value may be selected from a plurality of predicted values to allow generation of a predicted value. Specifically, for example, it is conceivable that, for total number M of prediction modes, an average value is assigned to prediction mode 0, an attribute value of three-dimensional point A is assigned to prediction mode 1, . . . , and an attribute value of three-dimensional point Z is assigned to prediction mode M−1, and the prediction mode used for prediction is appended to a bitstream for each three-dimensional point. As such, a first prediction mode value indicating a first prediction mode for calculating, as a predicted value, an average of attribute information items of the surrounding three-dimensional points may be smaller than a second prediction mode value indicating a second prediction mode for calculating, as a predicted value, an attribute information item as it is of a surrounding three-dimensional point. Here, the "average value" as the predicted value calculated in prediction mode 0 is an average value of the attribute values of the three-dimensional points in the vicinity of the three-dimensional point to be encoded;

FIG. 69 is a diagram showing a first example of a table representing predicted values calculated in the prediction modes according to the present embodiment. FIG. 70 is a diagram showing examples of attribute information items used as the predicted values according to the present embodiment. FIG. 71 is a diagram showing a second example of a table representing predicted values calculated in the prediction modes according to the present embodiment.

Number M of prediction modes may be appended to a bitstream. Number M of prediction modes may be defined by a profile or a level of standards rather than appended to the bitstream. Number M of prediction modes may be also calculated from number N of three-dimensional points used for prediction. For example, number M of prediction modes may be calculated by M=N+1.

The table in FIG. 69 is an example of a case with number N of three-dimensional points used for prediction being 4 and number M of prediction modes being 5. A predicted value of an attribute information item of point b2 can be generated by using attribute information items of points a0, a1, a2, b1. In selecting one prediction mode from a plurality of prediction modes, a prediction mode for generating, as a predicted value, an attribute value of each of points a0, a1, a2, b1 may be selected in accordance with distance information from point b2 to each of points a0, a1, a2, b1. The prediction mode is appended for each three-dimensional point to be encoded. The predicted value is calculated in accordance with a value corresponding to the appended prediction mode.

The table in FIG. 71 is, as in FIG. 69, an example of a case with number N of three-dimensional points used for prediction being 4 and number M of prediction modes being 5. A predicted value of an attribute information item of point a2 can be generated by using attribute information items of points a0, a1. In selecting one prediction mode from a plurality of prediction modes, a prediction mode for generating, as a predicted value, an attribute value of each of points a0 and a1 may be selected in accordance with distance information from point a2 to each of points a0, a1. The prediction mode is appended for each three-dimensional point to be encoded. The predicted value is calculated in accordance with a value corresponding to the appended prediction mode.

When the number of neighboring points, that is, number N of surrounding three-dimensional points is smaller than four such as at point a2 above, a prediction mode to which a predicted value is not assigned may be written as "not available" in the table.

Assignment of values of the prediction modes may be determined in accordance with the distance from the three-dimensional point to be encoded. For example, prediction mode values indicating a plurality of prediction modes decrease with decreasing distance from the three-dimensional point to be encoded to the surrounding three-dimensional points having the attribute information items used as the predicted values. The example in FIG. 69 shows that points 131, a2, a1, a0 are sequentially located closer to point b2 as the three-dimensional point to be encoded. For example, in the calculating of the predicted value, the attribute information item of point b1 is calculated as the predicted value in a prediction mode indicated by a prediction mode value of "1" among two or more prediction modes, and the attribute information item of point a2 is calculated as the predicted value in a prediction mode indicated by a prediction mode value of "2". As such, the prediction mode value indicating the prediction mode for calculating, as the predicted value, the attribute information item of point b1 is smaller than the prediction mode value indicating the prediction mode for calculating, as the predicted value, the attribute information item of point a2 farther from point b2 than point b1.

Thus, a small prediction mode value can be assigned to a point that is more likely to be predicted and selected due to a short distance, thereby reducing a bit number for encoding the prediction mode value. Also, a small prediction mode value may be preferentially assigned to a three-dimensional point belonging to the same LoD as the three-dimensional point to be encoded;

FIG. 72 is a diagram showing a third example of a table representing predicted values calculated in the prediction modes according to the present embodiment. Specifically, the third example is an example of a case where an attribute information item used as a predicted value is a value of color information (YUV) of a surrounding three-dimensional point. As such, the attribute information item used as the predicted value may be color information indicating a color of the three-dimensional point.

As shown in FIG. 72, a predicted value calculated in a prediction mode indicated by a prediction mode value of "0" is an average of Y, U, and V components defining a YUV color space. Specifically, the predicted value includes a weighted average Yave of Y component values Yb1, Ya2, Ya1, Ya0 corresponding to points b1, a2, a1, a0, respectively, a weighted average Uave of U component values Ub1, Ua2, Ua1, Ua0 corresponding to points b1, a2, a1, a0, respectively, and a weighted average Vave of V component values Vb1, Va2, Va1, Va0 corresponding to points b1, a2, a1, a0, respectively. Predicted values calculated in prediction modes indicated by prediction mode values of "1" to "4" include color information of the surrounding three-dimensional points b1, a2, a1, a0. The color information is indicated by combinations of the Y, U, and V component values.

In FIG. 72, the color information is indicated by a value defined by the YUV color space, but not limited to the YUV color space. The color information may be indicated by a value defined by an RGB color space or a value defined by any other color space.

As such, in the calculating of the predicted value, two or more averages or two or more attribute information items may be calculated as the predicted values of the prediction modes. The two or more averages or the two or more attribute information items may indicate two or more component values each defining a color space.

For example, when a prediction mode indicated by a prediction mode value of "2" in the table in FIG. 72 is selected, a Y component, a U component, and a V component as attribute values of the three-dimensional point to be encoded may be encoded as predicted values Ya2, Ua2, Va2. In this case, the prediction mode value of "2" is appended to the bitstream;

FIG. 73 is a diagram showing a fourth example of a table representing predicted values calculated in the prediction modes according to the present embodiment. Specifically, the fourth example is an example of a case where an attribute information item used as a predicted value is a value of reflectance information of a surrounding three-dimensional point. The reflectance information is, for example, information indicating reflectance R.

As shown in FIG. 73, a predicted value calculated in a prediction mode indicated by a prediction mode value of "0" is weighted average Rave of reflectances Rb1, Ra2, Ra1, Ra0 corresponding to points b1, a2, a1, a0, respectively. Predicted values calculated in prediction modes indicated by prediction mode values of "1" to "4" are reflectances Rb1, Ra2, Ra1, Ra0 of surrounding three-dimensional points b1, a2, a1, a0, respectively.

For example, when a prediction mode indicated by a prediction mode value of "3" in the table in FIG. 73 is selected, a reflectance as an attribute value of a three-dimensional point to be encoded may be encoded as predicted value Ra1. In this case, the prediction mode value of "3" is appended to the bitstream.

As shown in FIGS. 72 and 73, the attribute information item may include a first attribute information item and a second attribute information item different from the first attribute information item. The first attribute information item is, for example, color information. The second attribute information item is, for example, reflectance information. In the calculating of the predicted value, a first predicted value may be calculated by using the first attribute information item, and a second predicted value may be calculated by using the second attribute information item.

Embodiment 10

Figure 74:
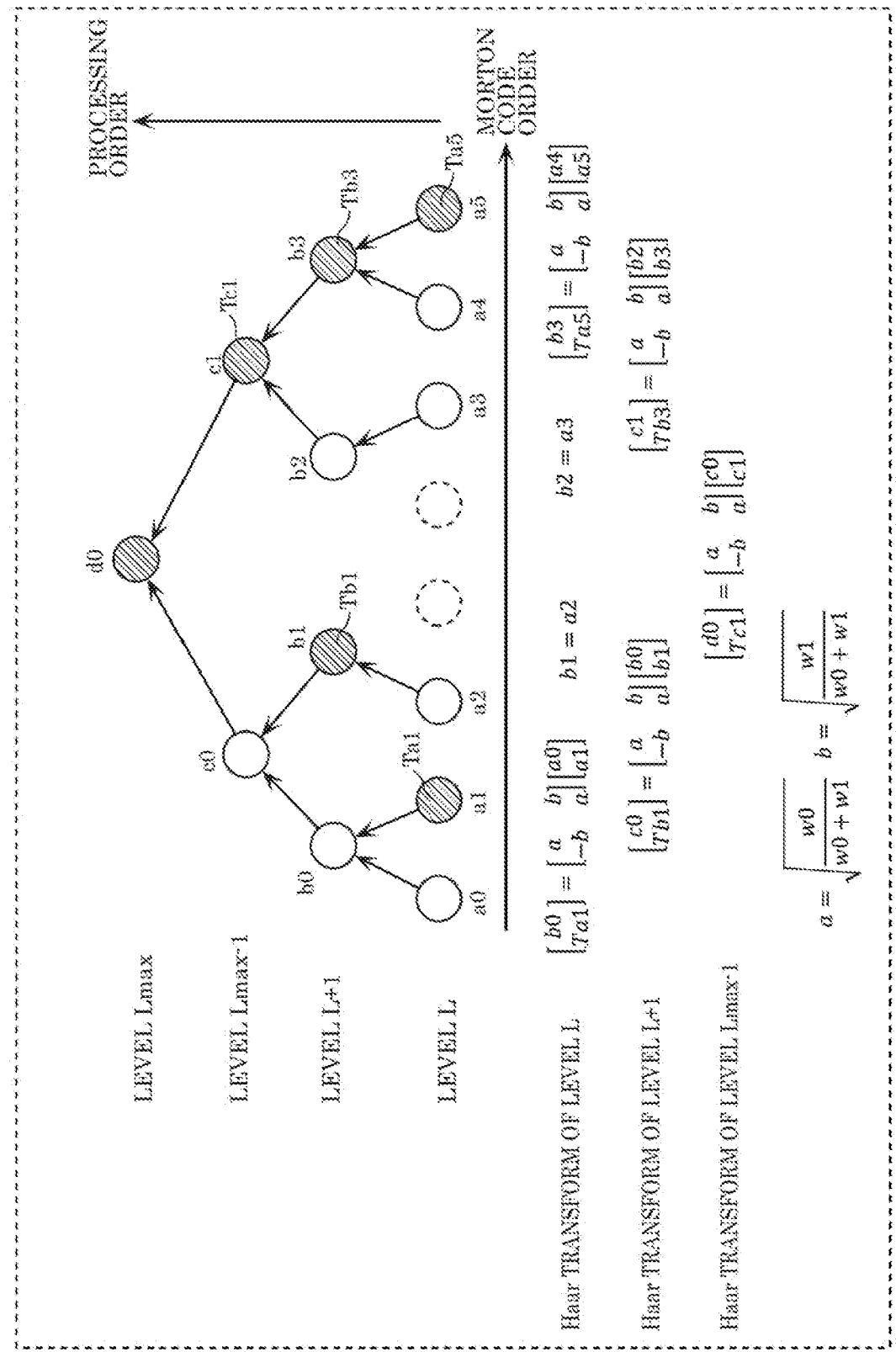
FIG. 74 is a diagram for describing the encoding of the attribute information by using a Region Adaptive Hierarchical Transform (RAHT) according to Embodiment 10.

Hereinafter, a method using a Region Adaptive Hierarchical Transform (RAHT) will be described as another method of encoding the attribute information of a three-dimensional point. FIG. 74 is a diagram for describing the encoding of the attribute information by using a RAHT.

First, the three-dimensional data encoding device generates Morton codes based on the geometry information of three-dimensional points, and sorts the attribute information of the three-dimensional points in the order of the Morton codes. For example, the three-dimensional data encoding device may perform sorting in the ascending order of the Morton codes. Note that the sorting order is not limited to the order of the Morton codes, and other orders may be used.

Next, the three-dimensional data encoding device generates a high-frequency component and a low-frequency component of the layer L by applying the Haar conversion to the attribute information of two adjacent three-dimensional points in the order of the Morton codes. For example, the three-dimensional data encoding device may use the Haar conversion of 2×2 matrices. The generated high-frequency component is included in a coding coefficient as the high-frequency component of the layer L, and the generated low-frequency component is used as the input value for the higher layer L+1 of the layer L.

After generating the high-frequency component of the layer L by using the attribute information of the layer L, the three-dimensional data encoding device subsequently performs processing of the layer L+1. In the processing of the layer L+1, the three-dimensional data encoding device generates a high-frequency component and a low-frequency component of the layer L+1 by applying the Haar conversion to two low-frequency components obtained by the Haar conversion of the attribute information of the layer L. The generated high-frequency component is included in a coding coefficient as the high-frequency component of the layer L+1, and the generated low-frequency component is used as the input value for the higher layer L+2 of the layer L+1.

The three-dimensional data encoding device repeats such layer processing, and determines that the highest layer Lmax has been reached at the time when a low-frequency component that is input to a layer becomes one. The three-dimensional data encoding device includes the low-frequency component of the layer Lmax-1 that is input to the Layer Lmax in a coding coefficient. Then, the value of the low-frequency component or high-frequency component included in the coding coefficient is quantized, and is encoded by using entropy encoding or the like.

Note that, when only one three-dimensional point exists as two adjacent three-dimensional points at the time of application of the Haar conversion, the three-dimensional data encoding device may use the value of the attribute information of the existing one three-dimensional point as the input value for a higher layer.

In this manner, the three-dimensional data encoding device hierarchically applies the Haar conversion to the input attribute information, generates a high-frequency component and a low-frequency component of the attribute information, and performs encoding by applying quantization described later or the like. Accordingly, the coding efficiency can be improved.

When the attribute information is N dimensional, the three-dimensional data encoding device may independently apply the Haar conversion for each dimension, and may calculate each coding coefficient. For example, when the attribute information is color information (RGB, YUV, or the like), the three-dimensional data encoding device applies the Haar conversion for each component, and calculates each coding coefficient.

The three-dimensional data encoding device may apply the Haar conversion in the order of the layers L, L+1, ..., Lmax. The closer to the layer Lmax, a coding coefficient including the more low-frequency components of the input attribute information is generated.

w0 and w1 shown in FIG. 74 are the weights assigned to each three-dimensional point. For example, the three-dimensional data encoding device may calculate the weight based on the distance information between two adjacent three-dimensional points to which the Haar conversion is applied, or the like. For example, the three-dimensional data encoding device may improve the coding efficiency such that the closer the distance, the greater the weight. Note that the three-dimensional data encoding device may calculate this weight with another technique, or need not use the weight.

In the example shown in FIG. 74, the pieces of the input attribute information are a0, a1, a2, a3, a4, and a5. Additionally, Ta1, Ta5, Tb1, Tb3, Tc1, and d0 are encoded among the coding coefficients after the Haar conversion. The other coding coefficients (b0, b2, c0 and the like) are medians, and are not encoded.

Specifically, in the example shown in FIG. 74, the high-frequency component Ta1 and the low-frequency component b0 are generated by performing the Haar conversion on a0 and a1. Here, when the weights w0 and w1 are equal, the low-frequency component b0 is the average value of a0 and a1, and the high-frequency component Ta1 is the difference between a0 and a1.

Since there is no attribute information to be paired with a2, a2 is used as b1 as is. Similarly, since there is no attribute information to be paired with a3, a3 is used as b2 as is. Additionally, the high-frequency component Ta5 and the low-frequency component b3 are generated by performing the Haar conversion on a4 and a5.

In the layer L+1, the high-frequency component Tb1 and the low-frequency component c0 are generated by performing the Haar conversion on b0 and b1. Similarly, the high-frequency component Tb3 and the low-frequency component c1 are generated by performing the Haar conversion on b2 and b3.

In the layer Lmax-1, the High-frequency component Tc1 and the low-frequency component d0 are generated by performing the Haar conversion on c0 and e1.

The three-dimensional data encoding device may encode the coding coefficients to which the Haar conversion has been applied, after quantizing the coding coefficients. For example, the three-dimensional data encoding device performs quantization by dividing the coding coefficient by the quantization scale (also called the quantization step (QS)). In this case, the smaller the quantization scale, the smaller the error (quantization error) that may occur due to quantization. Conversely, the larger the quantization scale, the larger the quantization error.

Figure 75:
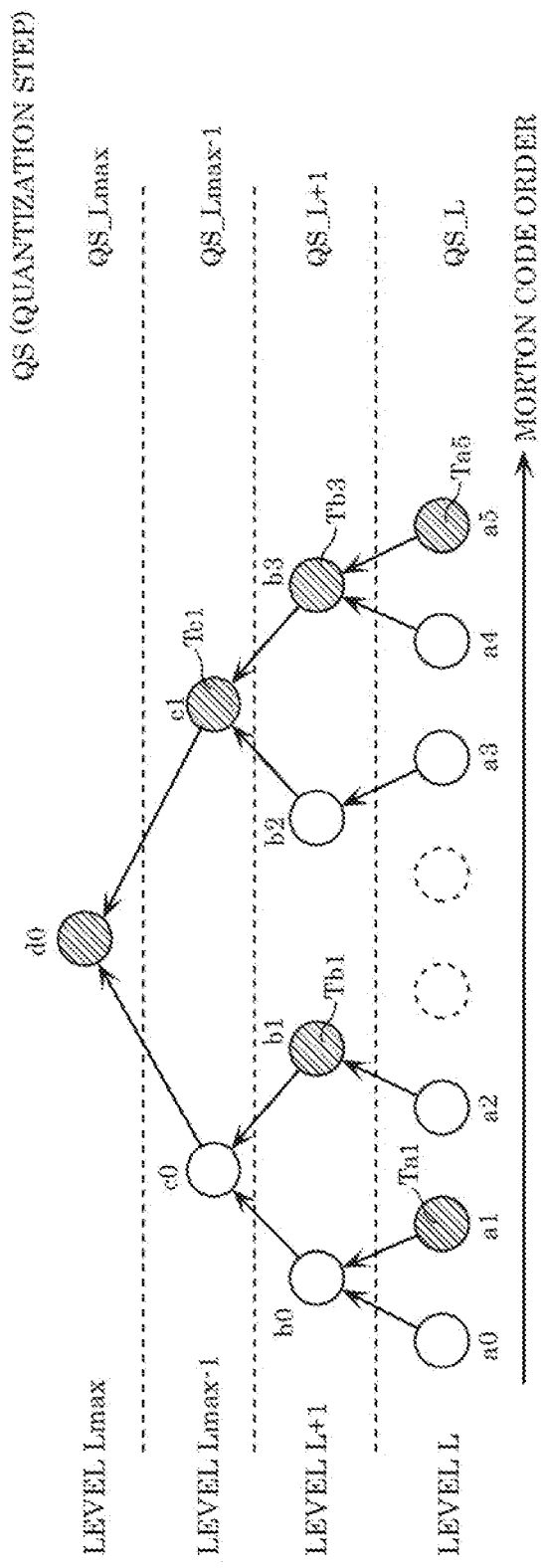
FIG. 75 is a diagram showing an example of setting a quantization scale for each hierarchy according to Embodiment 10.

Note that the three-dimensional data encoding device may change the value of the quantization scale for each layer. FIG. 75 is a diagram showing an example of setting the quantization scale for each layer. For example, the three-dimensional data encoding device sets smaller quantization scales to the higher layers, and larger quantization scales to the lower layers. Since the coding coefficients of the three-dimensional points belonging to the higher layers include more low-frequency components than the lower layers, there is a high possibility that the coding coefficients are important components in human visual characteristics and the like. Therefore, by suppressing the quantization error that may occur in the higher layers by making the quantization scales for the higher layers small, visual deterioration can be suppressed, and the coding efficiency can be improved.

Note that the three-dimensional data encoding device may add the quantization scale for each layer to a header or the like. Accordingly, the three-dimensional decoding device can correctly decode the quantization scale, and can appropriately decode a bitstream.

Additionally, the three-dimensional data encoding device may adaptively switch the value of the quantization scale according to the importance of a current three-dimensional point to be encoded. For example, the three-dimensional data encoding device uses a small quantization scale for a three-dimensional point with high importance, and uses a large quantization scale for a three-dimensional point with low importance. For example, the three-dimensional data encoding device may calculate the importance from the weight at the time of the Haar conversion, or the like. For example, the three-dimensional data encoding device may calculate the quantization scale by using the sum of w0 and w1. In this manner, by making the quantization scale of a three-dimensional point with high importance small, the quantization error becomes small, and the coding efficiency can be improved.

Additionally, the value of the QS may be made smaller for the higher layers. Accordingly, the higher the layer, the larger the value of the QW, and the prediction efficiency can be improved by suppressing the quantization error of the three-dimensional point.

Here, a coding coefficient Ta1q after quantization of the coding coefficient Ta1 of the attribute information a1 is represented by Ta1/QS_L. Note that QS may be the same value in all the layers or a part of the layers.

The QW (Quantization Weight) is the value that represents the importance of a current three-dimensional point to be encoded. For example, the above-described sum of w0 and w1 may be used as the QW. Accordingly, the higher the layer, the larger the value of the QW, and the prediction efficiency can be improved by suppressing the quantization error of the three-dimensional point.

For example, the three-dimensional data encoding device may first initialize the values of the QWs of all the three-dimensional points with 1, and may update the QW of each three-dimensional point by using the values of w0 and w1 at the time of the Haar conversion. Alternatively, the three-dimensional data encoding device may change the initial value according to the layers, without initializing the values of the QWs of all the three-dimensional points with a value of 1. For example, the quantization scales for the higher layers becomes small by setting larger QW initial values for the higher layers. Accordingly, since the prediction error in the higher layers can be suppressed, the prediction accuracy of the lower layers can be increased, and the coding efficiency can be improved. Note that the three-dimensional data encoding device need not necessarily use the QW.

When using the QW, the quantized value Ta1q of Ta1 is calculated by (Equation K1) and (Equation K2).

$$Ta1q = \frac{Ta1 + \frac{QS\_L}{2}}{QS\_LoD1} \times QWTa1 \quad \text{(Equation K1)}$$

-continued $$QWTa1 = 1 + \sum_{i=0}^{1} w_i \quad \text{(Equation K2)}$$

Additionally, the three-dimensional data encoding device scans and encodes the coding coefficients (unsigned integer values) after quantization in a certain order. For example, the three-dimensional data encoding device encodes a plurality of three-dimensional points from the three-dimensional points included in the higher layers toward the lower layers in order.

For example, in the example shown in FIG. 74, the three-dimensional data encoding device encodes a plurality of three-dimensional points in the order of Tc1q Tb1q, Tb3q, Ta1q, and Ta5q from d0q included in the higher layer Lmax. Here, there is a tendency that the lower the layer L, the more likely it is that the coding coefficient after quantization becomes 0. This can be due to the following and the like.

Since the coding coefficient of the lower layer L shows a higher frequency component than the higher layers, there is a tendency that the coding coefficient becomes 0 depending on a current three-dimensional point. Additionally, by switching the quantization scale according to the above-described importance or the like, the lower the layer, the larger the quantization scales, and the more likely it is that the coding coefficient after quantization becomes 0.

Figures 76, 77:
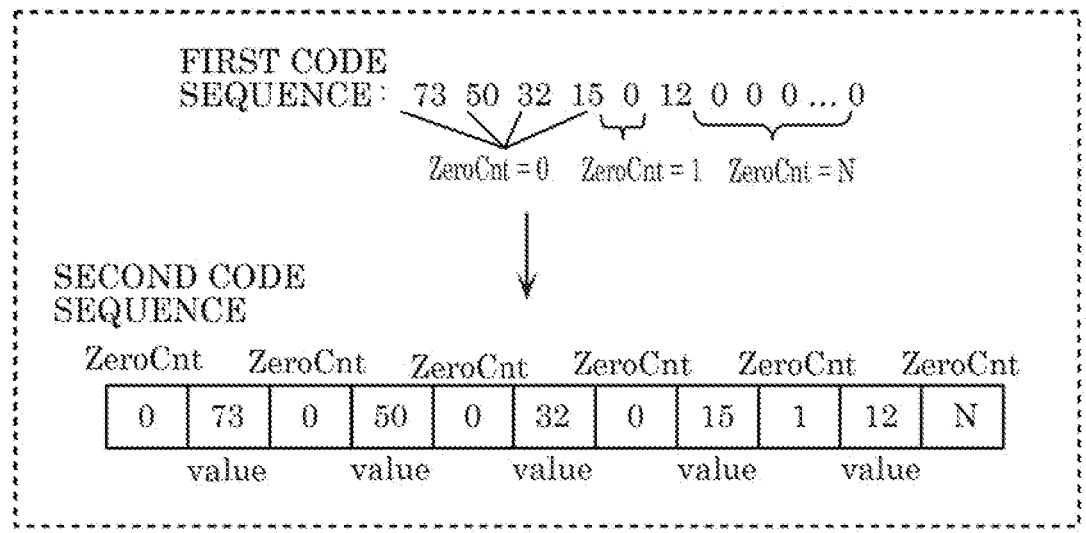
FIG. 76 is a diagram showing an example of a first code sequence and a second code sequence according to Embodiment 10.
FIG. 77 is a diagram showing an example of a truncated unary code according to Embodiment 10.

In this manner, the lower the layer, the more likely it is that the coding coefficient after quantization becomes 0, and the value 0 consecutively occurs in the first code sequence. FIG. 76 is a diagram showing an example of the first code sequence and the second code sequence.

The three-dimensional data encoding device counts the number of times that the value 0 occurs in the first code sequence, and encodes the number of times that the value 0 consecutively occurs, instead of the consecutive values 0. That is, the three-dimensional data encoding device generates a second code sequence by replacing the coding coefficient of the consecutive values 0 in the first code sequence with the number of consecutive times (ZeroCnt) of 0. Accordingly, when there are consecutive values 0 of the coding coefficients after quantization, the coding efficiency can be improved by encoding the number of consecutive times of 0, rather than encoding a lot of 0s.

Additionally, the three-dimensional data encoding device may entropy encode the value of ZeroCnt. For example, the three-dimensional data encoding device binarizes the value of ZeroCnt with the truncated unary code of the total number T of the encoded three-dimensional points, and arithmetically encodes each bit after the binarization. FIG. 77 is a diagram showing an example of the truncated unary code in the case where the total number of encoded three-dimensional points is T. At this time, the three-dimensional data encoding device may improve the coding efficiency by using a different coding table for each bit. For example, the three-dimensional data encoding device uses coding table 1 for the first bit, uses coding table 2 for the second bit, and coding table 3 for the subsequent bits. In this manner, the three-dimensional data encoding device can improve the coding efficiency by switching the coding table for each bit.

Additionally, the three-dimensional data encoding device may arithmetically encode ZeroCnt after binarizing ZeroCnt with an Exponential-Golomb. Accordingly, when the value of ZeroCnt easily becomes large, the efficiency can be more improved than the binarized arithmetic encoding with the truncated unary code. Note that the three-dimensional data encoding device may add a flag for switching between using the truncated unary code and using the Exponential-Golomb to a header. Accordingly, the three-dimensional data encoding device can improve the coding efficiency by selecting the optimum binarization method. Additionally, the three-dimensional data decoding device can correctly decode a bitstream by referring to the flag included in the header to switch the binarization method.

The three-dimensional decoding device may convert the decoded coding coefficient after the quantization from an unsigned integer value to a signed integer value with a method contrary to the method performed by the three-dimensional data encoding device. Accordingly, when the coding coefficient is entropy encoded, the three-dimensional decoding device can appropriately decode a bitstream generated without considering the occurrence of a negative integer. Note that the three-dimensional decoding device does not necessarily need to convert the coding coefficient from an unsigned integer value to a signed integer value. For example, when decoding a bitstream including an encoded bit that has been separately entropy encoded, the three-dimensional decoding device may decode the sign bit.

The three-dimensional decoding device decodes the coding coefficient after the quantization converted to the signed integer value, by the inverse quantization and the inverse Haar conversion. Additionally, the three-dimensional decoding device utilizes the coding coefficient after the decoding for the prediction after the current three-dimensional point to be decoded. Specifically, the three-dimensional decoding device calculates the inverse quantized value by multiplying the coding coefficient after the quantization by the decoded quantization scale. Next, the three-dimensional decoding device obtains the decoded value by applying the inverse Haar conversion described later to the inverse quantized value.

For example, the three-dimensional decoding device converts the decoded unsigned integer value to a signed integer value with the following method. When the LSB (least significant bit) of the decoded unsigned integer value a2u is 1, the signed integer value Ta1q is set to $-((a2u+1)\gg1)$. When the LSB of the decoded unsigned integer value a2u is not 1 (when it is 0), the signed integer value Ta1q is set to $(a2u\gg1)$.

Additionally, the inverse quantized value of Ta1 is represented by Ta1q×QS_L. Here, Ta1q is the quantized value of Ta1. In addition, QS_L is the quantization step for the layer L.

Additionally, the QS may be the same value for all the layers or a part of the layers. In addition, the three-dimensional data encoding device may add the information indicating the QS to a header or the like. Accordingly, the three-dimensional decoding device can correctly perform inverse quantization by using the same QS as the QS used by the three-dimensional data encoding device.

Figure 78:
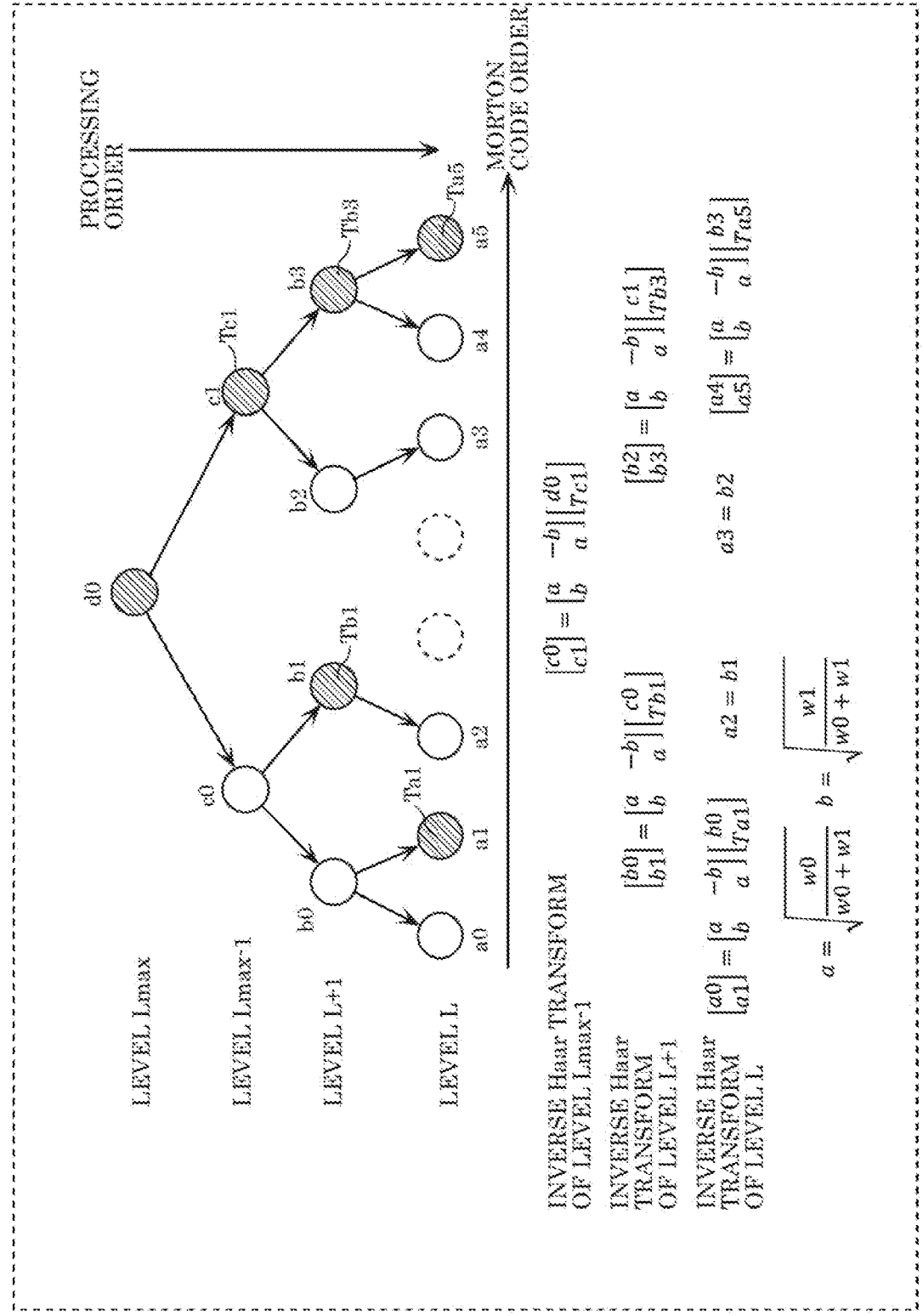
FIG. 78 is a diagram for describing the inverse Haar conversion according to Embodiment 10.

Next, the inverse Haar conversion will be described. FIG. 78 is a diagram for describing the inverse Haar conversion. The three-dimensional decoding device decodes the attribute value of a three-dimensional point by applying the inverse Haar conversion to the coding coefficient after the inverse quantization.

First, the three-dimensional decoding device generates the Morton codes based on the geometry information of three-dimensional points, and sorts the three-dimensional points in the order of the Morton codes. For example, the three-dimensional decoding device may perform the sorting in ascending order of the Morton codes. Note that the sorting order is not limited to the order of the Morton codes, and the other order may be used.

Next, the three-dimensional decoding device restores the attribute information of three-dimensional points that are adjacent to each other in the order of the Morton codes in the layer L, by applying the inverse Haar conversion to the coding coefficient including the low-frequency component of the layer L+1, and the coding coefficient including the high-frequency component of the layer L. For example, the three-dimensional decoding device may use the inverse Haar conversion of a 2×2 matrix. The attribute information of the restored layer L is used as the input value for the lower layer L−1.

The three-dimensional decoding device repeats such layer processing, and ends the processing when all the attribute information of the bottom layer is decoded. Note that, when only one three-dimensional point exists as two three-dimensional points that are adjacent to each other in the layer L−1 at the time of application of the inverse Haar conversion, the three-dimensional decoding device may assign the value of the encoding component of the layer L to the attribute value of the one existing three-dimensional point. Accordingly, the three-dimensional decoding device can correctly decode a bitstream with improved coding efficiency by applying the Haar conversion to all the values of the input attribute information.

When the attribute information is N dimensional, the three-dimensional decoding device may independently apply the inverse Haar conversion for each dimension, and may decode each coding coefficient. For example, when the attribute information is color information (RGB, YUV, or the like), the three-dimensional data decoding device applies the inverse Haar conversion to the coding coefficient for each component, and decodes each attribute value.

The three-dimensional decoding device may apply the inverse Haar conversion in the order of Layers Lmax, L+1, . . . , L. Additionally, w0 and w1 shown in FIG. 78 are the weights assigned to each three-dimensional point. For example, the three-dimensional data decoding device may calculate the weight based on the distance information between two adjacent three-dimensional points to which the inverse Haar conversion is applied, or the like. For example, the three-dimensional data encoding device may decode a bitstream with improved coding efficiency such that the closer the distance, the greater the weight.

In the example shown in FIG. 78, the coding coefficients after the inverse quantization are Ta1, Ta5, Tb1, Tb3, Tc1, and d0, and a0, a1, a2, a3, a4, and a5 are obtained as the decoded values.

FIG. 79 is a diagram showing a syntax example of the attribute information (attribute data). The attribute information (attribute data) includes the number of consecutive zeros (ZeroCnt), the number of attribute dimensions (attribute_dimension), and the coding coefficient (value [j] [i]).

The number of consecutive zeros (ZeroCnt) indicates the number of times that the value 0 continues in the coding coefficient after quantization. Note that the three-dimensional data encoding device may arithmetically encode ZeroCnt after binarizing ZeroCnt.

Additionally, as shown in FIG. 79, the three-dimensional data encoding device may determine whether or not the layer L (layerL) to which the coding coefficient belongs is equal to or more than a predefined threshold value TH_layer, and may switch the information added to a bitstream according to the determination result. For example, when the determination result is true, the three-dimensional data encoding device adds all the coding coefficients of the attribute information to a bitstream. In addition, when the determination result is false, the three-dimensional data encoding device may add a part of the coding coefficients to a bitstream.

Specifically, when the determination result is true, the three-dimensional data encoding device adds the encoded result of the three-dimensional information of the color information RGB or YUV to a bitstream. When the determination result is false, the three-dimensional data encoding device may add a part of information such as G or Y of the color information to a bitstream, and need not to add the other components to the bitstream. In this manner, the three-dimensional data encoding device can improve the coding efficiency by not adding a part of the coding coefficients of the layer (the layer smaller than TH_layer) including the coding coefficients indicating the high-frequency component with less visually noticeable degradation to a bitstream.

The number of attribute dimensions (attribute_dimension) indicates the number of dimensions of the attribute information. For example, when the attribute information is the color information (RGB, YUV, or the like) of a three-dimensional point, since the color information is three-dimensional, the number of attribute dimensions is set to a value 3. When the attribute information is the reflectance, since the reflectance is one-dimensional, the number of attribute dimensions is set to a value 1. Note that the number of attribute dimensions may be added to the header of the attribute information of a bit stream or the like.

The coding coefficient (value [j] [i]) indicates the coding coefficient after quantization of the attribute information of the j-th dimension of the i-th three-dimensional point. For example, when the attribute information is color information, value [1] indicates the coding coefficient of the second dimension (for example, the G value) of the 100th three-dimensional point. Additionally, when the attribute information is reflectance information, value [0] indicates the coding coefficient of the first dimension (for example, the reflectance) of the 120th three-dimensional point.

Note that, when the following conditions are satisfied, the three-dimensional data encoding device may subtract the value 1 from value [j] [i], and may entropy encode the obtained value. In this case, the three-dimensional data decoding device restores the coding coefficient by adding the value 1 to value [j] [i] after entropy decoding.

The above-described conditions are (1) when attribute_dimension=1, or (2) when attribute_dimension is 1 or more, and when the values of all the dimensions are equal. For example, when the attribute information is the reflectance, since attribute_dimension=1, the three-dimensional data encoding device subtracts the value 1 from the coding coefficient to calculate value, and encodes the calculated value. The three-dimensional decoding device calculates the coding coefficient by adding the value 1 to the value after decoding.

More specifically, for example, when the coding coefficient of the reflectance is 10, the three-dimensional data encoding device encodes the value 9 obtained by subtracting the value 1 from the value 10 of the coding coefficient. The three-dimensional data decoding device adds the value 1 to the decoded value 9 to calculate the value 10 of the coding coefficient.

Additionally, since attribute_dimension=3 when the attribute information is the color, for example, when the coding coefficient after quantization of each of the components R, G, and B is the same, the three-dimensional data encoding device subtracts the value 1 from each coding coefficient, and encodes the obtained value. The three-dimensional data decoding device adds the value 1 to the value after decoding. More specifically, for example, when the coding coefficient of R, G, and B=(1, 1, 1), the three-dimensional data encoding device encodes (0, 0, 0). The three-dimensional data decoding device adds 1 to each component of (0, 0, 0) to calculate (1, 1, 1). Additionally, when the coding coefficients of R, G, and B=(2, 1, 2), the three-dimensional data encoding device encodes (2, 1, 2) as is. The three-dimensional data decoding device uses the decoded (2, 1, 2) as is as the coding coefficients.

In this manner, by providing ZeroCnt, since the pattern in which all the dimensions are 0 as value is not generated, the value obtained by subtracting 1 from the value indicated by value can be encoded. Therefore, the coding efficiency can be improved.

Additionally, value [0] [i] shown in FIG. 79 indicates the coding coefficient after quantization of the attribute information of the first dimension of the i-th three-dimensional point. As shown in FIG. 79, when the layer L (layerL) to which the coding coefficient belongs is smaller than the threshold value TH_layer, the code amount may be reduced by adding the attribute information of the first dimension to a bitstream (not adding the attribute information of the second and following dimensions to the bitstream).

The three-dimensional data encoding device may switch the calculation method of the value of ZeroCnt depending on the value of attribute_dimension. For example, when attribute_dimension=3, the three-dimensional data encoding device may count the number of times that the values of the coding coefficients of all the components (dimensions) become 0. FIG. 80 is a diagram showing an example of the coding coefficient and ZeroCnt in this case. For example, in the case of the color information shown in FIG. 80, the three-dimensional data encoding device counts the number of the consecutive coding coefficients having 0 for all of the R, G, and B components, and adds the counted number to a bitstream as ZeroCnt. Accordingly, it becomes unnecessary to encode ZeroCnt for each component, and the overhead can be reduced. Therefore, the coding efficiency can be improved. Note that the three-dimensional data encoding device may calculate ZeroCnt for each dimension even when attribute_dimension is two or more, and may add the calculated ZeroCnt to a bitstream.

Figure 81:
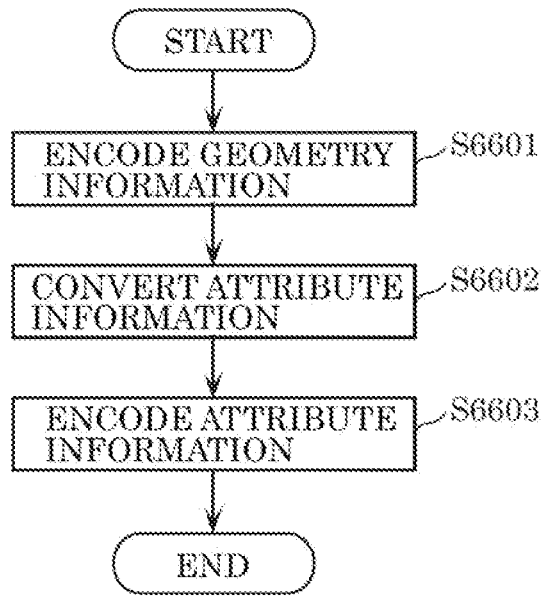
FIG. 81 is a flowchart of the three-dimensional data encoding processing according to Embodiment 10.

FIG. 81 is a flowchart of the three-dimensional data encoding processing according to the present embodiment. First, the three-dimensional data encoding device encodes geometry information (geometry) (S6601). For example, the three-dimensional data encoding device performs encoding by using an octree representation.

Next, the three-dimensional data encoding device converts the attribute information (S6602). For example, after the encoding of the geometry information, when the position of a three-dimensional point is changed due to quantization or the like, the three-dimensional data encoding device reassigns the attribute information of the original three-dimensional point to the three-dimensional point after the change. Note that the three-dimensional data encoding device may interpolate the value of the attribute information according to the amount of change of the position to perform the reassignment. For example, the three-dimensional data encoding device detects N three-dimensional points before the change near the three dimensional position after the change, performs the weighted averaging of the value of the attribute information of the N three-dimensional points based on the distance from the three-dimensional position after the change to each of the N three-dimensional points, and sets the obtained value as the value of the attribute information of the three-dimensional point after the change. Additionally, when two or more three-dimensional points are changed to the same three-dimensional position due to quantization or the like, the three-dimensional data encoding device may assign the average value of the attribute information in the two or more three-dimensional points before the change as the value of the attribute information after the change.

Next, the three-dimensional data encoding device encodes the attribute information (S6603). For example, when encoding a plurality of pieces of attribute information, the three-dimensional data encoding device may encode the plurality of pieces of attribute information in order. For example, when encoding the color and the reflectance as the attribute information, the three-dimensional data encoding device generates a bitstream to which the encoding result of the reflectance is added after the encoding result of the color. Note that a plurality of encoding results of the attribute information added to a bitstream may be in any order.

Additionally, the three-dimensional data encoding device may add the information indicating the start location of the encoded data of each attribute information in a bitstream to a header or the like. Accordingly, since the three-dimensional data decoding device can selectively decode the attribute information that needs to be decoded, the decoding processing of the attribute information that does not need to be decoded can be omitted. Therefore, the processing amount for the three-dimensional data decoding device can be reduced. Additionally, the three-dimensional data encoding device may encode a plurality of pieces of attribute information in parallel, and may integrate the encoding results into one bitstream. Accordingly, the three-dimensional data encoding device can encode a plurality of pieces of attribute information at high speed.

Figure 82:
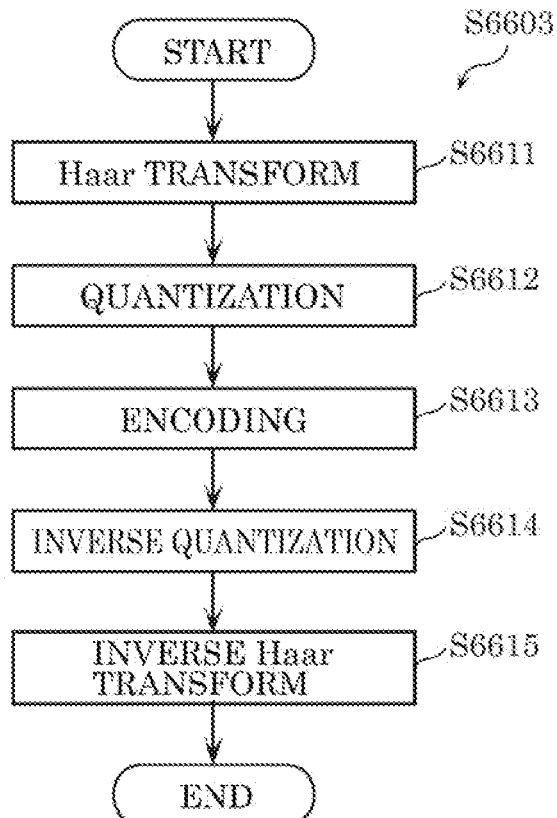
FIG. 82 is a flowchart of the attribute information encoding processing according to Embodiment 10.

FIG. 82 is a flowchart of the attribute information encoding processing (S6603). First, the three-dimensional data encoding device generates a coding coefficient from attribute information by the Haar conversion (S6611). Next, the three-dimensional data encoding device applies quantization to the coding coefficient (S6612). Next, the three-dimensional data encoding device generates encoded attribute information (bitstream) by encoding the coding coefficient after the quantization (S6613).

Additionally, the three-dimensional data encoding device applies inverse quantization to the coding coefficient after the quantization (S6614). Next, the three-dimensional decoding device decodes the attribute information by applying the inverse Haar conversion to the coding coefficient after the inverse quantization (S6615). For example, the decoded attribute information is referred to in the following encoding.

Figure 83:
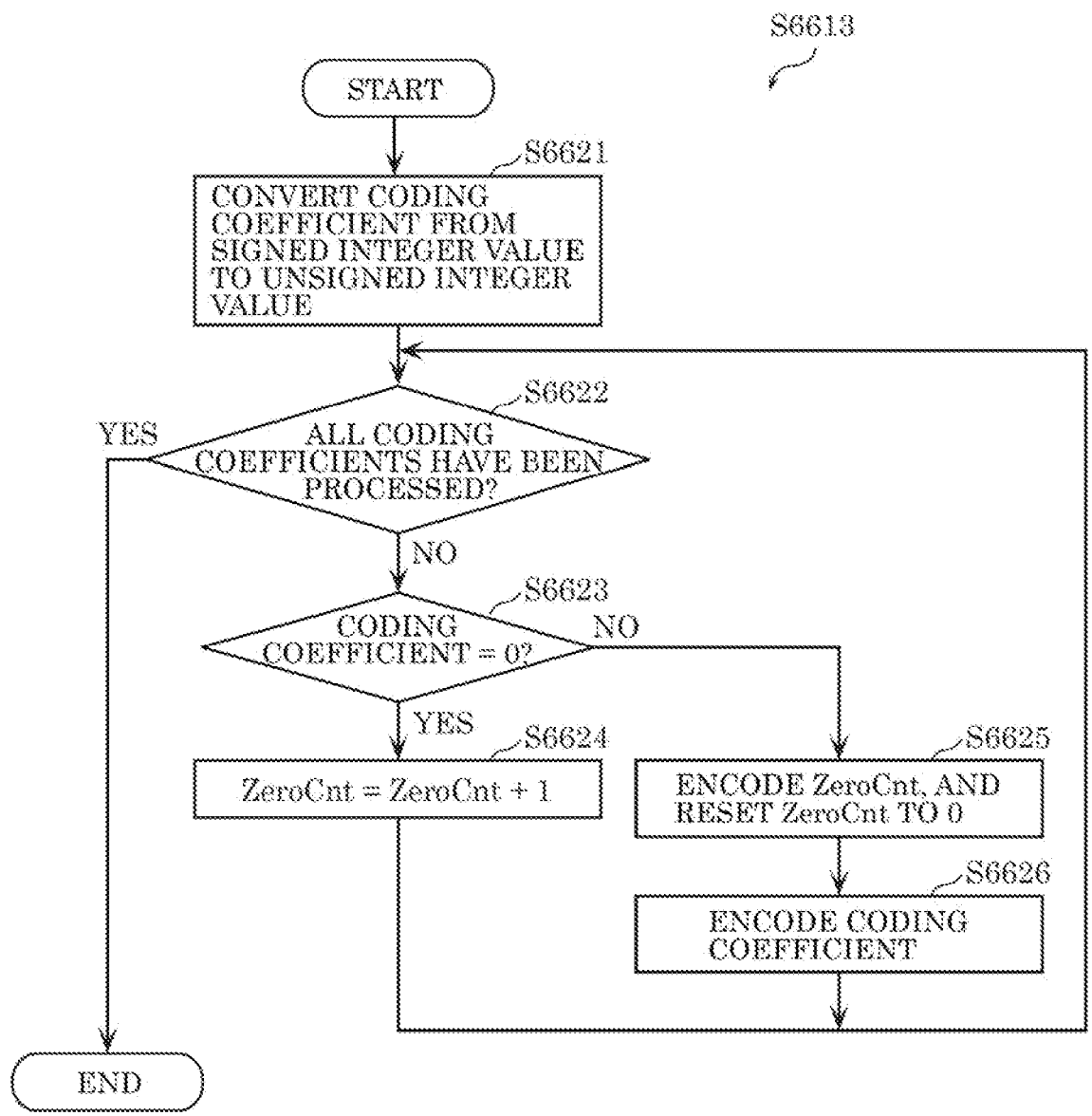
FIG. 83 is a flowchart of the coding coefficient encoding processing according to Embodiment 10.

FIG. 83 is a flowchart of the coding coefficient encoding processing (S6613). First, the three-dimensional data encoding device converts a coding coefficient from a signed integer value to an unsigned integer value (S6621). For example, the three-dimensional data encoding device converts a signed integer value to an unsigned integer value as follows. When signed integer value Ta1q is smaller than 0, the unsigned integer value is set to $-1-(2 \times Ta1q)$. When the signed integer value Ta1q is equal to or more than 0, the unsigned integer value is set to $2 \times Ta1q$. Note that, when the coding coefficient does not become a negative value, the three-dimensional data encoding device may encode the coding coefficient as the unsigned integer value as is.

When not all coding coefficients have been processed (No in S6622), the three-dimensional data encoding device determines whether the value of the coding coefficient to be processed is zero (S6623). When the value of the coding coefficient to be processed is zero (Yes in S6623), the three-dimensional data encoding device increments ZeroCnt by 1 (S6624), and returns to step S6622.

When the value of the coding coefficient to be processed is not zero (No in S6623), the three-dimensional data encoding device encodes ZeroCnt, and resets ZeroCnt to zero (S6625). Additionally, the three-dimensional data encoding device arithmetically encodes the coding coefficient to be processed (S6626), and returns to step S6622. For example, the three-dimensional data encoding device performs binary arithmetic encoding. In addition, the three-dimensional data encoding device may subtract the value 1 from the coding coefficient, and may encode the obtained value.

Additionally, the processing of steps S6623 to S6626 is repeatedly performed for each coding coefficient. In addition, when all the coding coefficients have been processed (Yes in S6622), the three-dimensional data encoding device ends the processing.

Figure 84:
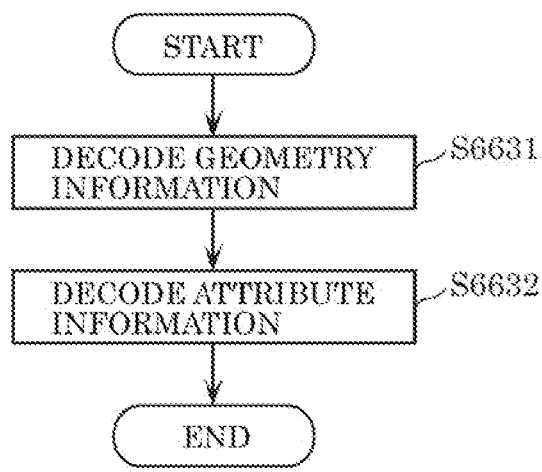
FIG. 84 is a flowchart of the three-dimensional data decoding processing according to Embodiment 10.

FIG. 84 is a flowchart of the three-dimensional data decoding processing according to the present embodiment. First, the three-dimensional decoding device decodes geometry information (geometry) from a bitstream (S6631). For example, the three-dimensional data decoding device performs decoding by using an octree representation.

Next, the three-dimensional decoding device decodes the attribute information from the bitstream (S6632). For example, when decoding a plurality of pieces of attribute information, the three-dimensional decoding device may decode the plurality of pieces of attribute information in order. For example, when decoding the color and the reflectance as the attribute information, the three-dimensional data decoding device decodes the encoding result of the color and the encoding result of the reflectance according to the order in which they are added to the bitstream. For example, when the encoding result of the reflectance is added after the encoding result of the color in a bitstream, the three-dimensional data decoding device decodes the encoding result of the color, and thereafter decodes the encoding result of the reflectance. Note that the three-dimensional data decoding device may decode the encoding results of the attribute information added to a bitstream in any order.

Additionally, the three-dimensional decoding device may obtain the information indicating the start location of the encoded data of each attribute information in a bitstream by decoding a header or the like. Accordingly, since the three-dimensional data decoding device can selectively decode the attribute information that needs to be decoded, the decoding processing of the attribute information that does not need to be decoded can be omitted. Therefore, the processing amount of the three-dimensional decoding device can be reduced. Additionally, the three-dimensional data decoding device may decode a plurality of pieces of attribute information in parallel, and may integrate the decoding results into one three-dimensional point cloud. Accordingly, the three-dimensional data decoding device can decode a plurality of pieces of attribute information at high speed.

Figure 85:
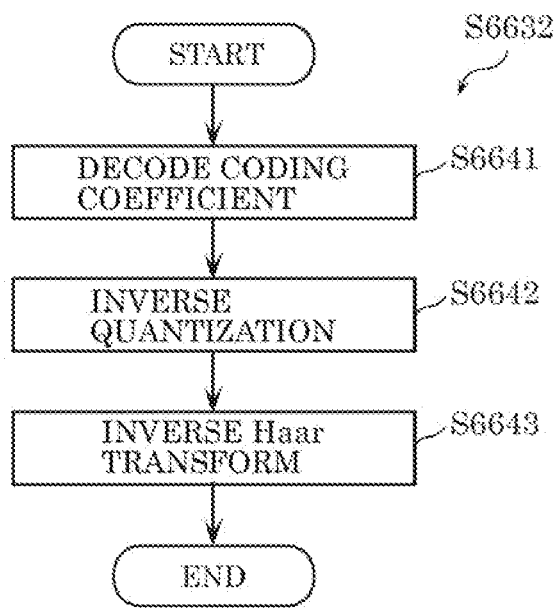
FIG. 85 is a flowchart of the attribute information decoding processing according to Embodiment 10.

FIG. 85 is a flowchart of the attribute information decoding processing (S6632). First, the three-dimensional decoding device decodes a coding coefficient from a bitstream (S6641). Next, the three-dimensional decoding device applies the inverse quantization to the coding coefficient (S6642). Next, the three-dimensional decoding device decodes the attribute information by applying the inverse Haar conversion to the coding coefficient after the inverse quantization (S6643).

Figure 86:
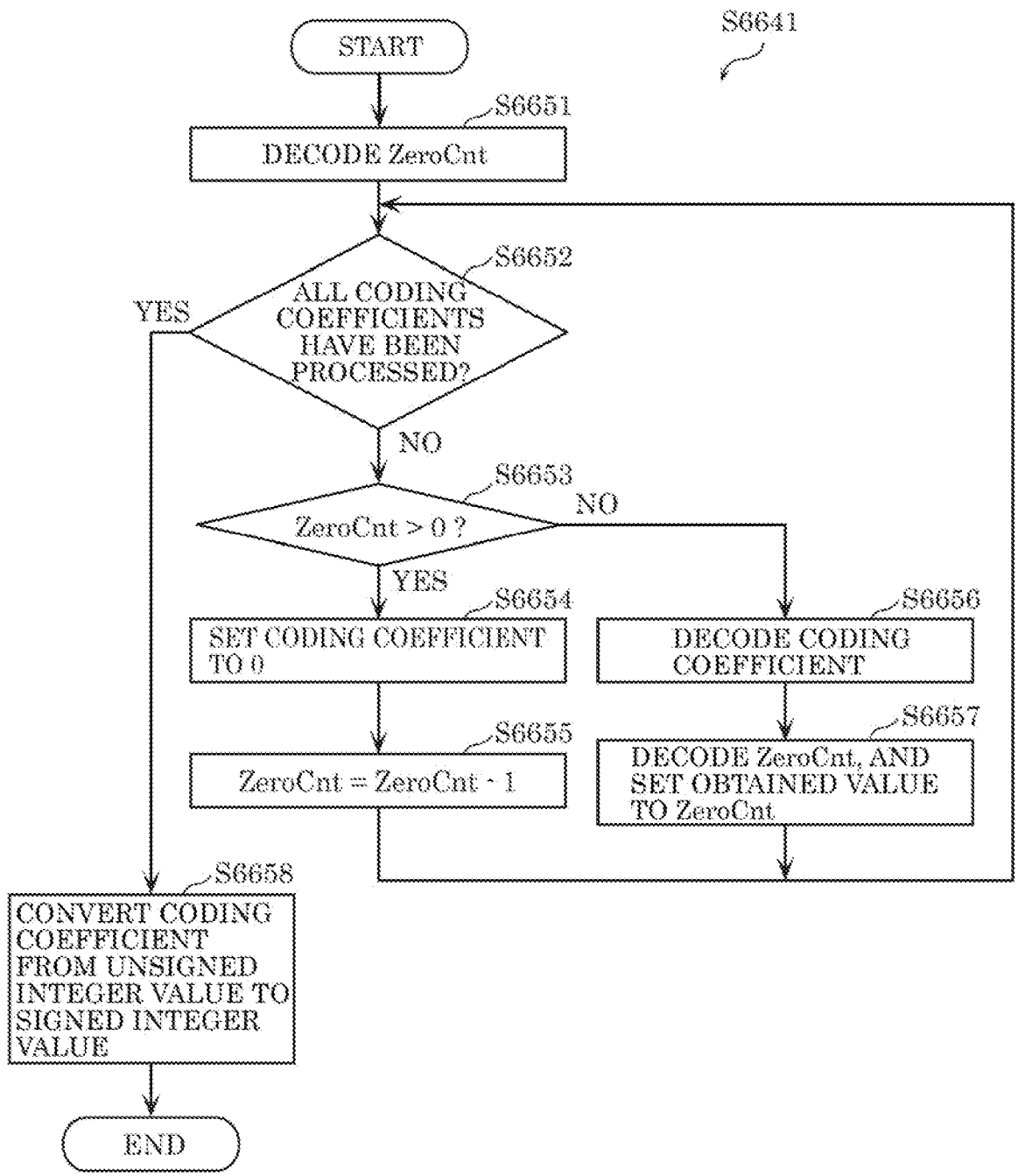
FIG. 86 is a flowchart the coding coefficient decoding processing according to Embodiment 10.

FIG. 86 is a flowchart of the coding coefficient decoding processing (S6641). First, the three-dimensional decoding device decodes ZeroCnt from a bitstream (S6651). When not all coding coefficients have been processed (No in S6652), the three-dimensional decoding device determines whether ZeroCnt is larger than 0 (S6653).

When ZeroCnt is larger than zero (Yes in S6653), the three-dimensional decoding device sets the coding coefficient to be processed to 0 (S6654). Next, the three-dimensional decoding device subtracts 1 from ZeroCnt (S6655), and returns to step S6652.

When ZeroCnt is zero (No in S6653), the three-dimensional decoding device decodes the coding coefficient to be processed (S6656). For example, the three-dimensional decoding device uses binary arithmetic decoding. Additionally, the three-dimensional decoding device may add the value 1 to the decoded coding coefficient.

Next, the three-dimensional decoding device decodes ZeroCnt, sets the obtained value to ZeroCnt (S6657), and returns to step S6652.

Additionally, the processing of steps S6653 to S6657 is repeatedly performed for each coding coefficient. In addition, when all the coding coefficients have been processed (Yes in S6652), the three-dimensional data encoding device converts a plurality of decoded coding coefficients from unsigned integer values to signed integer values (S6658). For example, the three-dimensional data decoding device may convert the decoded coding coefficients from unsigned integer values to signed integer values as follows. When the LSB (least significant bit) of the decoded unsigned integer value Talu is 1, the signed integer value Talq is set to $-((Talu+1)\gg 1)$. When the LSB of the decoded unsigned integer value Talu is not 1 (when it is 0), the signed integer value Talq is set to $(Talu\gg 1)$. Note that, when the coding coefficient does not become a negative value, the three-dimensional data decoding device may use the decoded coding coefficient as is as the signed integer value.

Figure 87:
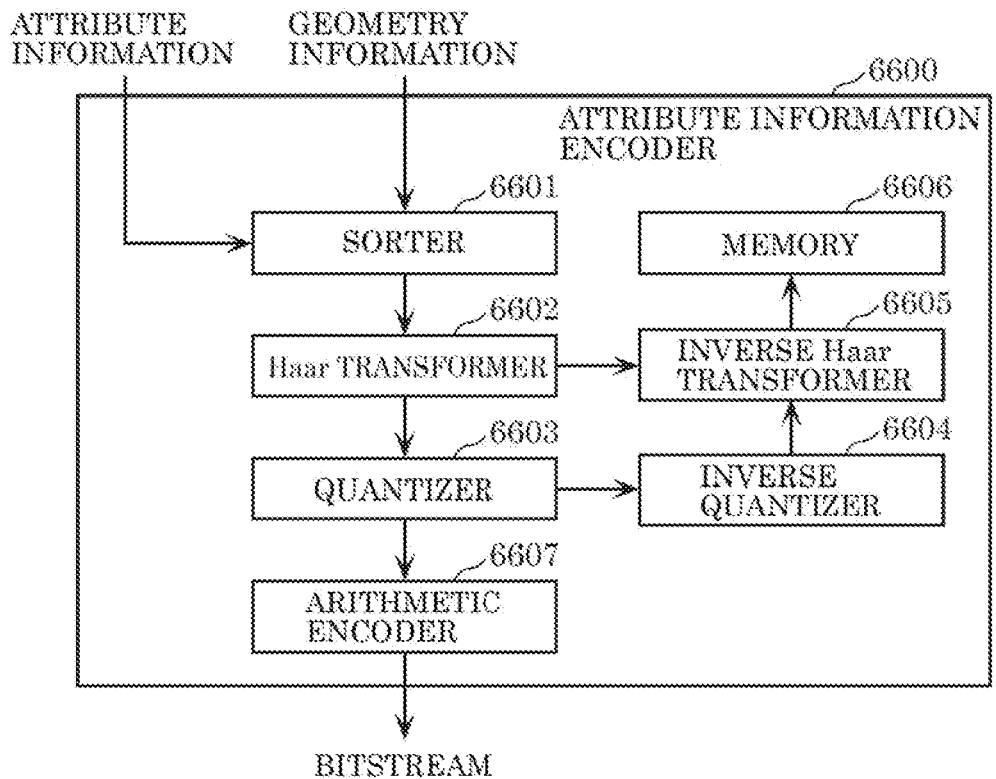
FIG. 87 is a block diagram of an attribute information encoder according to Embodiment 10.

FIG. 87 is a block diagram of attribute information encoder 6600 included in the three-dimensional data encoding device. Attribute information encoder 6600 includes sorter 6601, Haar transformer 6602, quantizer 6603, inverse quantizer 6604, inverse Haar converter 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar conversion to the attribute information. Quantizer 6603 quantizes the coding coefficient of the attribute information.

Inverse quantizer 6604 inverse quantizes the coding coefficient after the quantization. Inverse Haar converter 6605 applies the inverse Haar conversion to the coding coefficient. Memory 6606 stores the values of pieces of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 88:
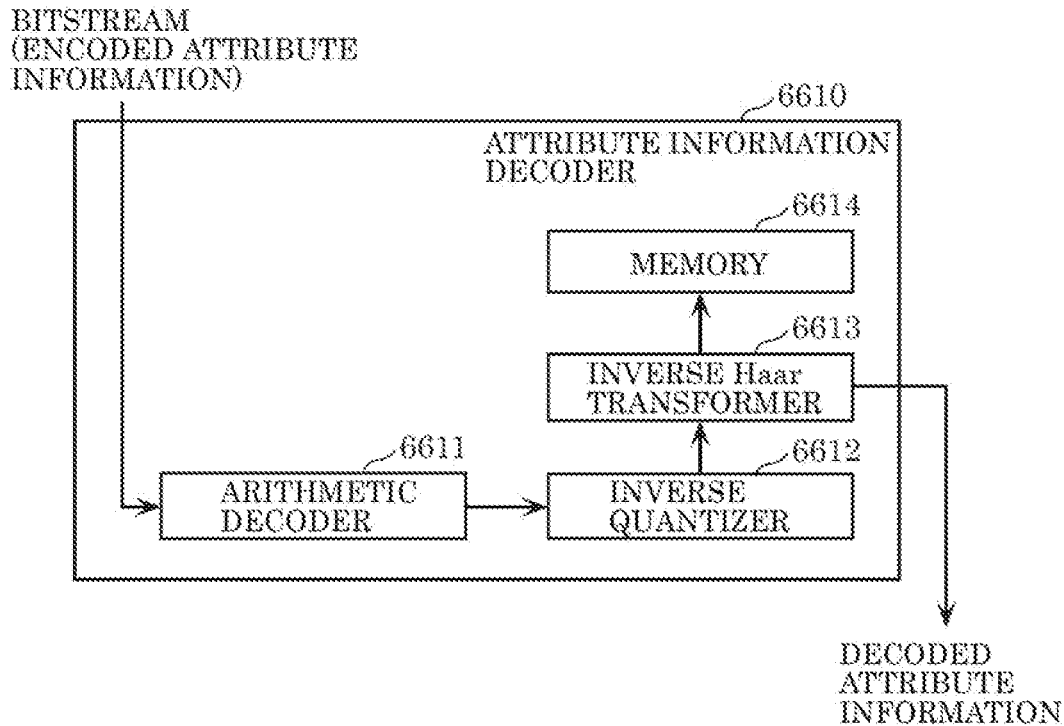
FIG. 88 is a block diagram of an attribute information decoder according to Embodiment 10.

FIG. 88 is a block diagram of attribute information decoder 6610 included in the three-dimensional decoding device. Attribute information decoder 6610 includes arithmetic decoder 6611, inverse quantizer 6612, inverse Haar converter 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar converter 6613 applies the inverse Haar conversion to the coding coefficient after the inverse quantization. Memory 6614 stores the values of pieces of attribute information of a plurality of decoded three-dimensional points. For example, the attribute information of the decoded three-dimensional points stored in memory 6614 may be utilized for prediction of an uncoded three-dimensional point.

Note that, in the above-described embodiment, although the example has been shown in which the three-dimensional points are encoded in the order of the lower layers to the higher layers as the encoding order, it is not necessarily limit to this. For example, a method may be used that scans the coding coefficients after the Haar conversion in the order of the higher layers to the lower layers. Note that, also in this case, the three-dimensional data encoding device may encode the number of consecutive times of the value 0 as ZeroCnt.

Additionally, the three-dimensional data encoding device may switch whether or not to use the encoding method using ZeroCnt described in the present embodiment per WLD, SPC, or volume. In this case, the three-dimensional data encoding device may add the information indicating whether or not the encoding method using ZeroCnt has been applied to the header information. Accordingly, the three-dimensional decoding device can appropriately perform decoding. As an example of the switching method, for example, the three-dimensional data encoding device counts the number of times of occurrence of the coding coefficient having a value of 0 with respect to one volume. When the count value exceeds a predefined threshold value, the three-dimensional data encoding device applies the method using ZeroCnt to the next volume, and when the count value is equal to or less than the threshold value, the three-dimensional data encoding device does not apply the method using ZeroCnt to the next volume. Accordingly, since the three-dimensional data encoding device can appropriately switch whether or not to apply the encoding method using ZeroCnt according to the characteristic of a current three-dimensional point to be encoded, the coding efficiency can be improved.

Embodiment 11

Next, a quantization parameter will be described.

In order to divide point cloud data based on characteristics and positions concerning the point cloud data, a slice and a tile are used. Here, a different quality may be required for each of the pieces of divisional point cloud data, because of hardware restrictions or requirements for real-time processing, for example. For example, when encoding point cloud data by dividing the point cloud data into slices on an object basis, slice data including a plant is less important, so that the resolution (quality) of the slice data can be decreased by quantization. On the other hand, the resolution (quality) of important slice data can be increased by setting the quantization value at a lower value. A quantization parameter is used to enable such a control of quantization value.

Here, data to be quantized, a scale used for the quantization, and quantized data, which is the result of calculation by the quantization, are expressed by Equations G1 and G2 below.

$$\text{quantized data} = \text{data/scale} \quad \text{(Equation G1)}$$

$$\text{data} = \text{quantized data} * \text{scale} \quad \text{(Equation G2)}$$

Figure 89:
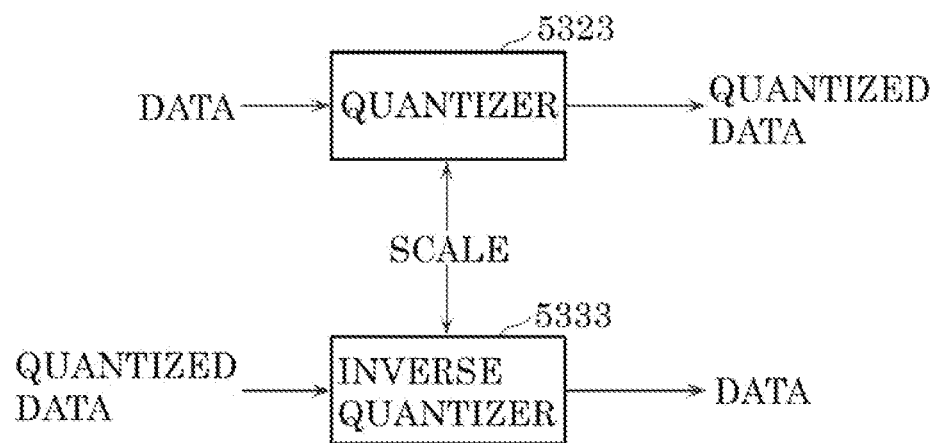
FIG. 89 is a diagram for describing a process performed by a quantizer and an inverse quantizer according to Embodiment 11.

FIG. 89 is a diagram for describing a process performed by quantizer 5323 that quantizes data and inverse quantizer 5333 that inverse-quantizes quantized data.

Quantizer 5323 quantizes data using a scale. That is, quantizer 5323 calculates quantized data, which is data quantized, by performing a process according to Equation G1.

Inverse quantizer 5333 inverse-quantizes quantized data using the scale. That is, inverse quantizer calculates inverse-quantized quantized data by performing a process according to Equation G2.

The scale and the quantization value (quantization parameter (QP) value) are expressed by Equation G3 below.

$$\text{quantization value(QP value)} = \log(\text{scale}) \quad \text{(Equation G3)}$$

$$\text{quantization value(QP value)} = \text{default value(reference value)} + \text{quantization delta(difference information)} \quad \text{(Equation G4)}$$

These parameters are generically referred to as a quantization parameter.

Figure 90:
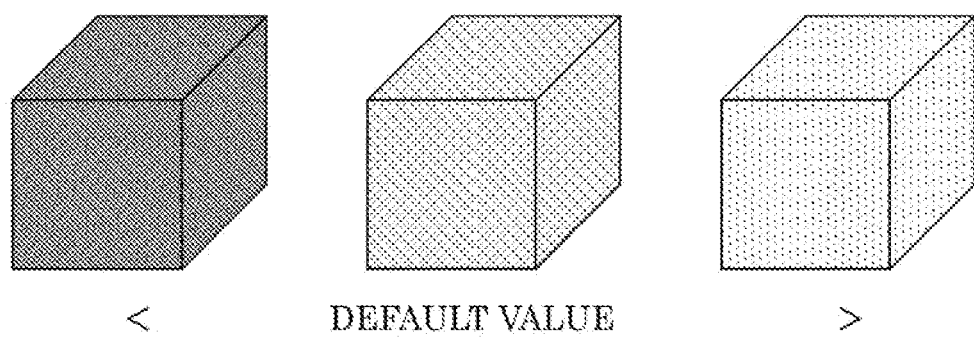
FIG. 90 is a diagram for describing a default value and a quantization delta of a quantization value according to Embodiment 11.

For example, as illustrated in FIG. 90, a quantization value is a value with respect to a default value, and is calculated by adding a quantization delta to the default value. If the quantization value is smaller than the default value, the quantization delta is a negative value. If the quantization value is greater than the default value, the quantization delta is a positive value. If the quantization value is equal to the default value, the quantization delta is 0. When the quantization delta is 0, the quantization delta can be omitted.

Figure 91:
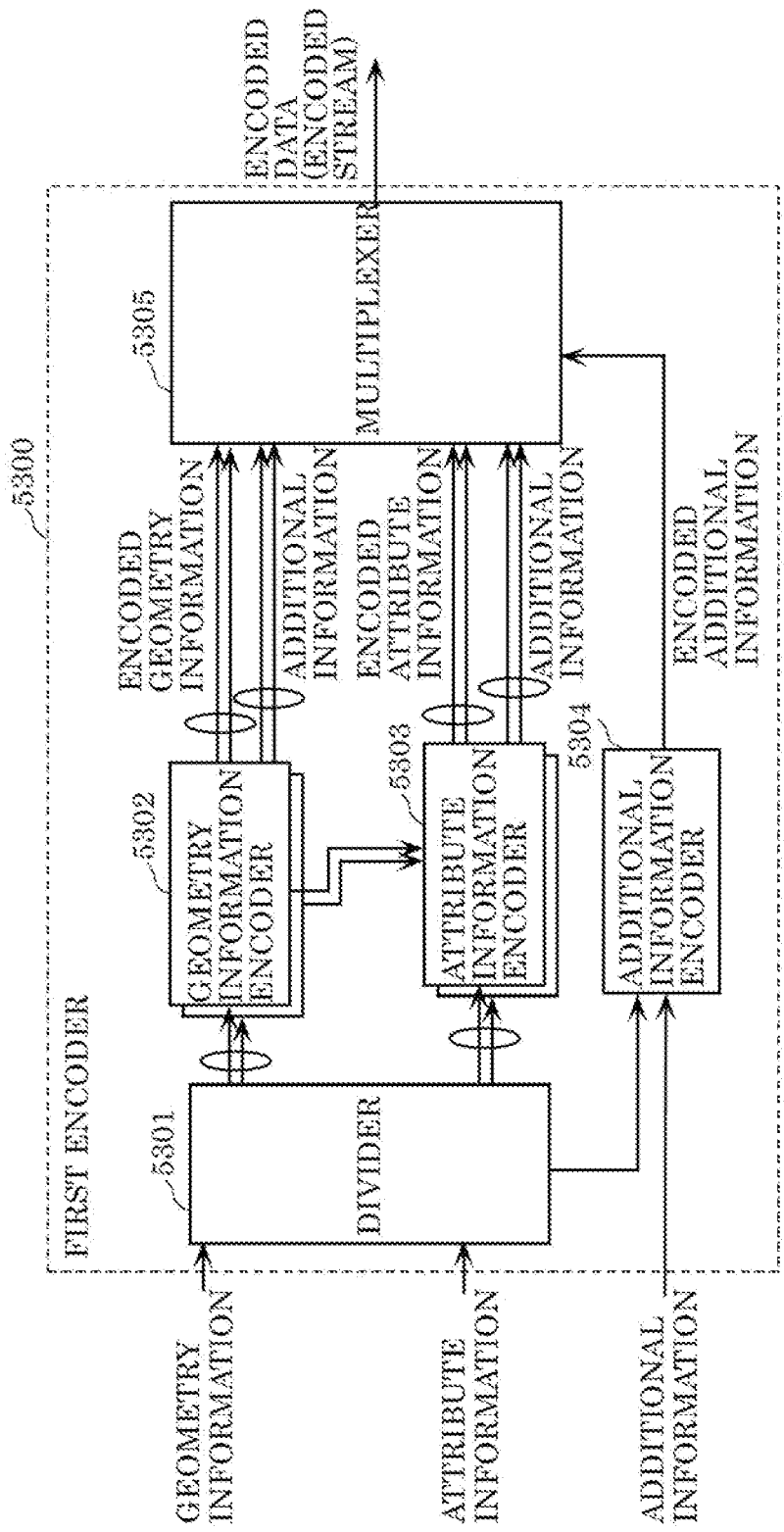
FIG. 91 is a block diagram illustrating a configuration of a first encoder included in a three-dimensional data encoding device according to Embodiment 11.
Figure 92:
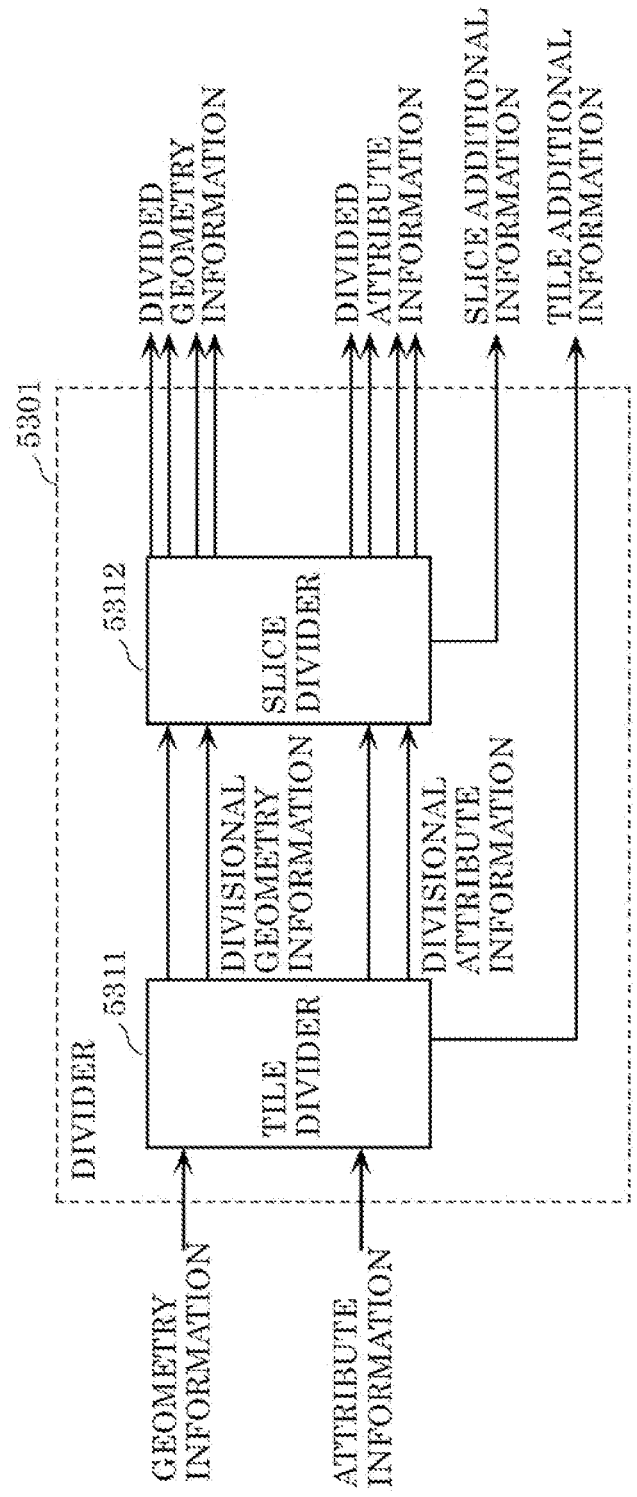
FIG. 92 is a block diagram illustrating a configuration of a divider according to Embodiment 11.
Figure 93:
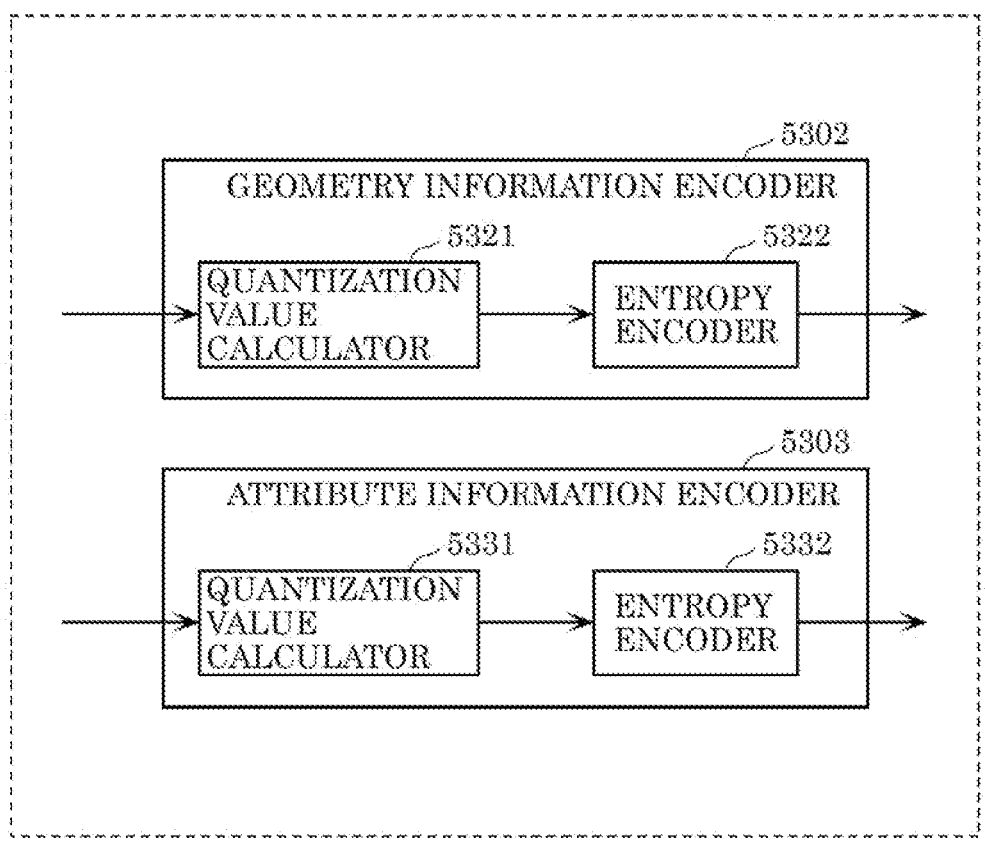
FIG. 93 is a block diagram illustrating a configuration of a geometry information encoder and an attribute information encoder according to Embodiment 11.

An encoding process will be described. FIG. 91 is a block diagram illustrating a configuration of first encoder 5300 included in the three-dimensional data encoding device according to the present embodiment. FIG. 92 is a block diagram illustrating a configuration of divider 5301 according to the present embodiment. FIG. 93 is a block diagram illustrating a configuration of geometry information encoder 5302 and attribute information encoder 5303 according to the present embodiment.

First encoder 5300 generates encoded data (encoded stream) by encoding point cloud data in a first encoding method (geometry-based PCC (GPCC)). First encoder 5300 includes divider 5301, a plurality of geometry information encoders 5302, a plurality of attribute information encoders 5303, additional information encoder 5304, and multiplexer 5305.

Divider 5301 generates a plurality of pieces of divisional data by dividing point cloud data. Specifically, divider 5301 generates a plurality of pieces of divisional data by dividing a space of point cloud data into a plurality of subspaces. Here, a subspace is a combination of tiles or slices, or a combination of tiles and slices. More specifically, point cloud data includes geometry information, attribute information, and additional information. Divider 5301 divides geometry information into a plurality of pieces of divisional geometry information, and divides attribute information into a plurality of pieces of divisional attribute information. Divider 5301 also generates additional information concerning the division.

As illustrated in FIG. 92, divider 5301 includes tile divider 5311 and slice divider 5312. For example, tile divider 5311 divides a point cloud into tiles. Tile divider 5311 may determine a quantization value used for each divisional tile as tile additional information.

Slice divider 5312 further divides a tile obtained by tile divider 5311 into slices. Slice divider 5312 may determine a quantization value used for each divisional slice as slice additional information.

The plurality of geometry information encoders 5302 generate a plurality of pieces of encoded geometry information by encoding a plurality of pieces of divisional geometry information. For example, the plurality of geometry information encoders 5302 process a plurality of pieces of divisional geometry information in parallel.

As illustrated in FIG. 93, geometry information encoder 5302 includes quantization value calculator 5321 and entropy encoder 5322. Quantization value calculator 5321 generates a quantization value (quantization parameter) of divisional geometry information to be encoded. Entropy encoder 5322 calculates quantized geometry information by quantizing the divisional geometry information using the quantization value (quantization parameter) generated by quantization value calculator 5321.

The plurality of attribute information encoders 5303 generate a plurality of pieces of encoded attribute information by encoding a plurality of pieces of divisional attribute information. For example, the plurality of attribute information encoders 5303 process a plurality of pieces of divisional attribute information in parallel.

As illustrated in FIG. 93, attribute information encoder 5303 includes quantization value calculator 5331 and entropy encoder 5332. Quantization value calculator 5321 generates a quantization value (quantization parameter) of divisional attribute information to be encoded. Entropy encoder 5332 calculates quantized attribute information by quantizing the divisional attribute information using the quantization value (quantization parameter) generated by quantization value calculator 5331.

Additional information encoder 5304 generates encoded additional information by encoding additional information included in the point cloud data and additional information concerning the data division generated in the division by divider 5301.

Multiplexer 5305 generates encoded data (encoded stream) by multiplexing a plurality of pieces of encoded geometry information, a plurality of pieces of encoded attribute information, and encoded additional information, and transmits the generated encoded data. The encoded additional information is used for decoding.

Note that, although FIG. 91 shows an example in which there are two geometry information encoders 5302 and two attribute information encoders 5303, the number of geometry information encoders 5302 and the number of attribute information encoders 5303 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

Figure 94:
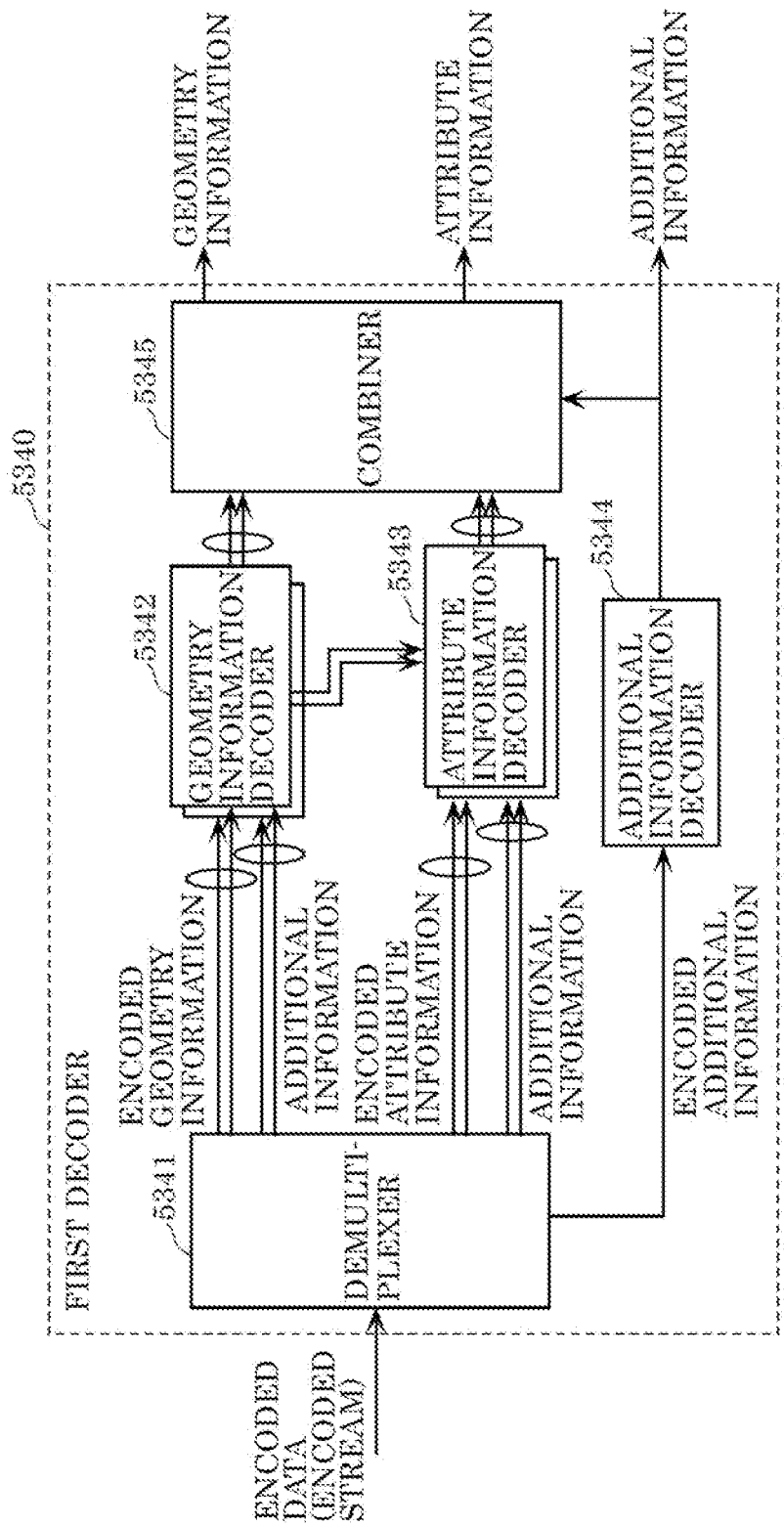
FIG. 94 is a block diagram illustrating a configuration of a first decoder according to Embodiment 11.
Figure 95:
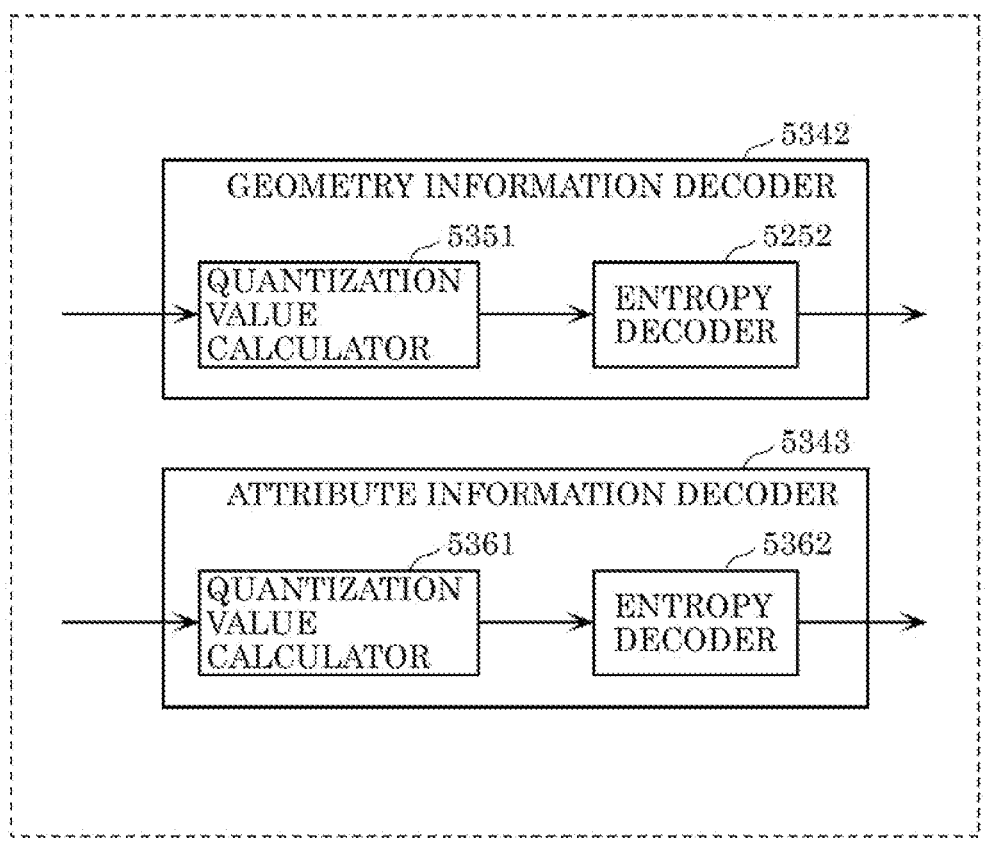
FIG. 95 is a block diagram illustrating a configuration of a geometry information decoder and an attribute information decoder according to Embodiment 11.

Next, a decoding process will be described. FIG. 94 is a block diagram illustrating a configuration of first decoder 5340. FIG. 95 is a block diagram illustrating a configuration of geometry information decoder 5342 and attribute information decoder 5343.

First decoder 5340 reproduces point cloud data by decoding encoded data (encoded stream) generated by encoding the point cloud data in the first encoding method (GPCC). First decoder 5340 includes demultiplexer 5341, a plurality of geometry information decoders 5342, a plurality of attribute information decoders 5343, additional information decoder 5344, and combiner 5345.

Demultiplexer 5341 generates a plurality of pieces of encoded geometry information, a plurality of pieces of encoded attribute information, and encoded additional information by demultiplexing encoded data (encoded stream).

The plurality of geometry information decoders 5342 generate a plurality of pieces of quantized geometry information by decoding a plurality of pieces of encoded geometry information. For example, the plurality of geometry information decoders 5342 process a plurality of pieces of encoded geometry information in parallel.

As illustrated in FIG. 95, geometry information decoder 5342 includes quantization value calculator 5351 and entropy decoder 5352. Quantization value calculator 5351 generates a quantization value of quantized geometry information. Entropy decoder 5352 calculates geometry information by inverse-quantizing the quantized geometry information using the quantization value generated by quantization value calculator 5351.

The plurality of attribute information decoders 5343 generate a plurality of pieces of divisional attribute information by decoding a plurality of pieces of encoded attribute information. For example, the plurality of attribute information decoders 5343 process a plurality of pieces of encoded attribute information in parallel.

As illustrated in FIG. 95, attribute information decoder 5343 includes quantization value calculator 5361 and entropy decoder 5362. Quantization value calculator 5361 generates a quantization value of quantized attribute information. Entropy decoder 5362 calculates attribute information by inverse-quantizing the quantized attribute information using the quantization value generated by quantization value calculator 5361.

The plurality of additional information decoders 5344 generate additional information by decoding encoded additional information.

Combiner 5345 generates geometry information by combining a plurality of pieces of divisional geometry information using additional information. Combiner 5345 generates attribute information by combining a plurality of pieces of divisional attribute information using additional information. For example, combiner 5345 first generates point cloud data associated with a tile by combining decoded point cloud data associated with slices using slice additional information. Combiner 5345 then reproduces the original point cloud data by combining point cloud data associated with tiles using tile additional information.

Note that, although FIG. 94 shows an example in which there are two geometry information decoders 5342 and two attribute information decoders 5343, the number of geometry information decoders 5342 and the number of attribute information decoders 5343 may be one, or three or more. The plurality of pieces of divisional data may be processed in parallel in the same chip, such as by a plurality of cores of a CPU, processed in parallel by cores of a plurality of chips, or processed in parallel by a plurality of cores of a plurality of chips.

[Method of Determining Quantization Parameter]

Figure 96:
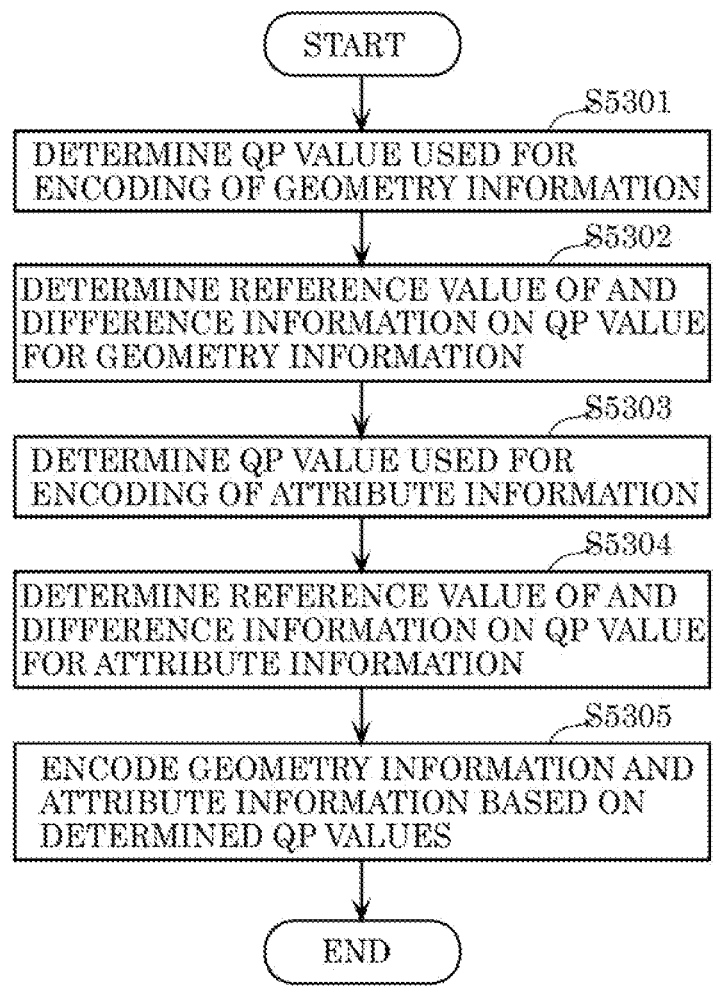
FIG. 96 is a flowchart illustrating an example of a process concerning determination of a quantization value in the encoding of geometry information or the encoding of attribute information according to Embodiment 11.

FIG. 96 is a flowchart illustrating an example of a process concerning determination of a quantization value (quantization parameter value: QP value) in the encoding of geometry information (geometry) or the encoding of attribute information (attribute).

A QP value is determined by considering the coding efficiency on a basis of data units of geometry information or attribute information forming a PCC frame, for example. When the data unit is a tile or slice resulting from division, the QP value is determined on a basis of divisional data units by considering the coding efficiency of the divisional data units. The QP value may be determined on a basis of data units before division.

As illustrated in FIG. 96, the three-dimensional data encoding device determines a QP value used for the encoding of geometry information (S5301). The three-dimensional data encoding device may determine the QP value for each of a plurality of divisional slices in a predetermined manner. Specifically, the three-dimensional data encoding device determines the QP value based on the characteristics or quality of the data of the geometry information. For example, the three-dimensional data encoding device may determine the density of point cloud data for each data unit, that is, the number of points per unit area belonging to each slice, and determine a value corresponding to the density of point cloud data as the QP value. Alternatively, the three-dimensional data encoding device may determine, as the QP value, any of the following values corresponding to geometry information: the number of points of point cloud data, the distribution of points of point cloud data, the imbalance of points of point cloud data, a feature quantity obtained from information on points, the number of feature points, or a recognized object. The three-dimensional data encoding device may also determine an object associated with geometry information of a map and determine the QP value based on the object based on the geometry information, or may determine the QP value based on information or a feature quantity obtained by projecting three-dimensional point cloud onto a two-dimensional plane. The corresponding QP value may be stored in a memory in advance in the form of a table that associates the QP value with the density, the number of points, the distribution of points, or the imbalance of points of point cloud data. The corresponding QP value may also be stored in a memory in advance in the form of a table that associates the QP value with a feature quantity or the number of feature points obtained from information on points or an object recognized based on the information on points. The corresponding QP value may be determined based on a result of simulation of the coding efficiency or the like using various QP values in the encoding of the geometry information concerning point cloud data.

The three-dimensional data encoding device then determines a reference value (default value) and difference information (quantization delta) on the QP value for geometry information (S5302). Specifically, the three-dimensional data encoding device determines a reference value and difference information to be transmitted using the determined QP value in a predetermined manner, and sets (adds) the determined reference value and difference information in at least one of the additional information or the header of the data.

The three-dimensional data encoding device then determines a QP value used for the encoding of attribute information (S5303). The three-dimensional data encoding device may determine the QP value for each of a plurality of divisional slices in a predetermined manner. Specifically, the three-dimensional data encoding device determines the QP value based on the characteristics or quality of the data of the attribute information. For example, the three-dimensional data encoding device may determine the QP value on a basis of data units based on the characteristics of the attribute information. Color characteristics include luminance, chromaticity, and chroma, a histogram thereof, and color continuity, for example. When the attribute information is reflectance, the QP value may be determined based on information based on the reflectance. For example, when a face is detected as an object from point cloud data, the three-dimensional data encoding device may determine a high-quality QP value for the point cloud data forming the object detected as a face. In this way, the three-dimensional data encoding device may determine the QP value for the point cloud data forming an object depending on the type of the object.

When a three-dimensional point has a plurality of pieces of attribute information, the three-dimensional data encoding device may determine a different QP value for each piece of attribute information based on the piece of attribute information. Alternatively, the three-dimensional data encoding device may determine a QP value for the plurality of pieces of attribute information based on any one of the pieces of attribute information, or determine a QP value for the plurality of pieces of attribute information based on a plurality of pieces of attribute information.

The three-dimensional data encoding device then determines a reference value (default value) and difference information (quantization delta) on the QP value for attribute information (S5304). Specifically, the three-dimensional data encoding device determines a reference value and difference information to be transmitted using the determined QP value in a predetermined manner, and sets (adds) the determined reference value and difference information in at least one of the additional information or the header of the data.

The three-dimensional data encoding device then quantizes and encodes the geometry information and the attribute information based on the determined QP values for geometry information and attribute information, respectively (S5305).

Note that although an example has been described in which the QP value for geometry information is determined based on the geometry information, and the QP value for attribute information is determined based on the attribute information, the present disclosure is not limited thereto. For example, the QP values for geometry information and attribute information may be determined based on the geometry information, based on the attribute information, or based on the geometry information and the attribute information.

Note that the QP values for geometry information and attribute information may be adjusted by considering the balance between the quality of the geometry information and the quality of the attribute information in the point cloud data. For example, the QP values for geometry information and attribute information may be set in such a manner that the quality of the geometry information is high, and the quality of the attribute information is lower than the quality of the geometry information. For example, the QP value for attribute information may be determined under a restriction that the QP value for attribute information is equal to or higher than the QP value for geometry information.

The QP value may be adjusted so that encoded data is generated within a predetermined range of rate. For example, when the code amount of the encoding of the preceding data unit is expected to exceed a predetermined rate, that is, when the difference from a predetermined rate is less than a first difference, the QP value may be adjusted to decrease the coding quality so that the difference between the predetermined rate and the code amount of the data unit is less than the first difference. On the other hand, when the difference from the predetermined rate is greater than a second difference, which is greater than the first difference, and there is a substantial difference, the QP value may be adjusted to improve the coding quality of the data unit. The adjustment between data units may be made between PCC frames or between tiles or slices. The adjustment of the QP value for attribute information may be made based on the rate of encoding of geometry information.

Note that, in the flowchart of FIG. 96, the processing concerning geometry information and the processing concerning attribute information may be performed in reverse order or in parallel.

Note that, although the flowchart of FIG. 96 shows a slice-based process as an example, a tile-based process or a process on a basis of other data units can be performed in the same manner as the slice-based process. That is, slice in the flowchart of FIG. 96 can be replaced with tile or other data units.

Figure 97:
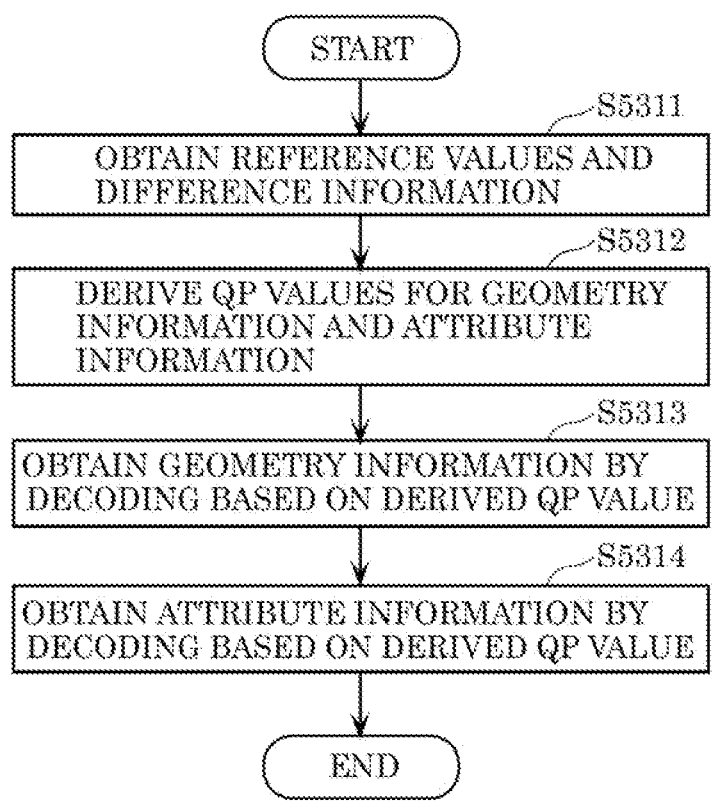
FIG. 97 is a flowchart illustrating an example of a process of decoding geometry information and attribute information according to Embodiment 11.

FIG. 97 is a flowchart illustrating an example of a process of decoding geometry information and attribute information.

As illustrated in FIG. 97, the three-dimensional data decoding device obtains a reference value and difference information that indicate a QP value for geometry information, and a reference value and difference information that indicate a QP value for attribute information (S5311). Specifically, the three-dimensional data decoding device analyzes one or both of the transmitted metadata or the header of the transmitted encoded data, and obtains reference values and difference information for deriving the QP values.

The three-dimensional data decoding device then derives the QP values using the obtained reference values and difference information in a predetermined manner.

The three-dimensional data decoding device then obtains quantized geometry information, and obtains geometry information by inverse-quantizing the quantized geometry information using the derived QP value (S5313).

The three-dimensional data decoding device then obtains quantized attribute information, and obtains attribute information by inverse-quantizing the quantized attribute information using the derived QP value (S5314).

Next, a method of transmitting a quantization parameter will be described.

Figure 98:
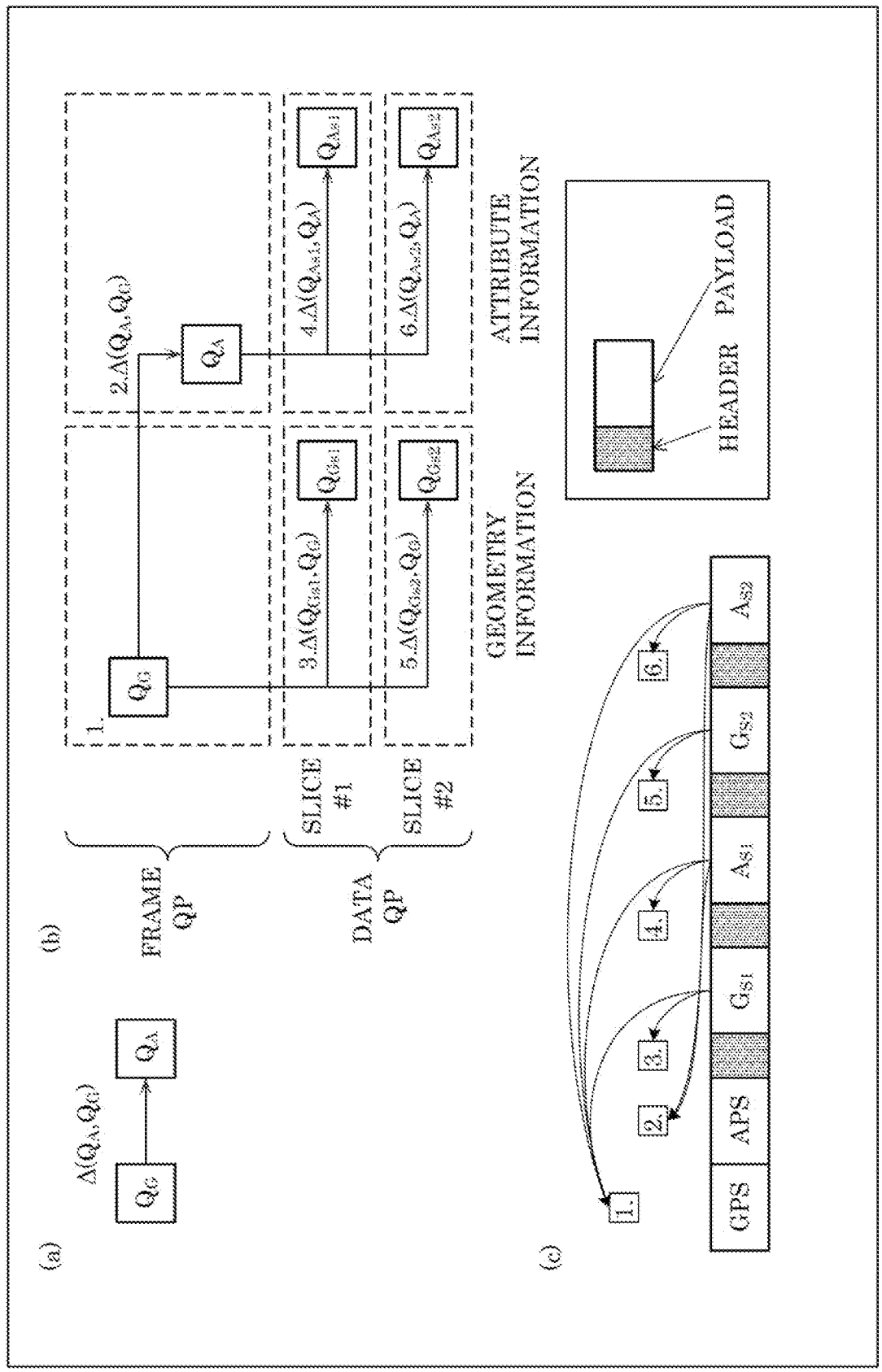
FIG. 98 is a diagram for describing a first example of a method of transmitting a quantization parameter according to Embodiment 11.

FIG. 98 is a diagram for describing a first example of the method of transmitting a quantization parameter. Part (a) of FIG. 98 shows an example of a relationship between QP values.

In FIG. 98, $Q_G$ and $Q_A$ denote an absolute value of a QP value used for the encoding of geometry information and an absolute value of a QP value used for the encoding of attribute information, respectively. $Q_G$ is an example of a first quantization parameter used for quantizing geometry information on each of a plurality of three-dimensional points. $\Delta(Q_A, Q_G)$ denotes difference information that indicates a difference between $Q_A$ and $Q_G$ used for deriving $Q_A$. That is, $Q_A$ is derived using $Q_G$ and $\Delta(Q_A, Q_G)$. In this way, a QP value is separated into a reference value (absolute value) and difference information (relative value) for transmission. In the decoding, a desired QP value is derived from the transmitted reference value and difference information.

For example, in part (a) of FIG. 98, the absolute value $Q_G$ and the difference information $\Delta(Q_A, Q_G)$ are transmitted, and in the decoding, $Q_A$ is derived by adding $\Delta(Q_A, Q_G)$ to $Q_G$ as shown by Equation G5 below.

$$Q_A = Q_G + \Delta(Q_A, Q_G) \quad \text{(Equation G5)}$$

With reference to parts (b) and (c) of FIG. 98, a method of transmitting QP values in a case where point cloud data including geometry information and attribute information is divided into slices will be described. Part (b) of FIG. 98 shows a first example of a relationship between a reference value and difference information for each QP value. Part (c) of FIG. 98 shows a first example of an order of transmission of QP values, geometry information, and attribute information.

For each piece of geometry information and each piece of attribute information, QP values are classified into QP values (frame QPs) in units of PCC frames and QP values (data QPs) in units of data units. The QP value used for the encoding determined in step S5301 in FIG. 96 is a QP value in units of data units.

Here, $Q_G$, which is a QP value used for the encoding of geometry information in units of PCC frames, is used as a reference value, and a QP value in units of data units is generated and transmitted as difference information that indicates the difference from $Q_G$.

$Q_G$: a QP value for the encoding of geometry information for a PCC frame, which is transmitted as a reference value "1." using GPS.

$Q_A$: a QP value for the encoding of attribute information for a PCC frame, which is transmitted as difference information "2." using APS.

$Q_{Gs1}$, $Q_{Gs2}$: QP values for the encoding of geometry information of slice data, which are transmitted as difference information "3." and "5." indicating a difference from $Q_G$, respectively, using the header of the encoded data of the geometry information.

$Q_{As1}$, $Q_{As2}$: QP values for the encoding of attribute information of slice data, which are transmitted as difference information "4." and "6." indicating a difference from $Q_A$, respectively, using the header of the encoded data of the attribute information.

Note that information used for deriving a frame QP is described in metadata (GPS, APS) associated with the frame, and information used for deriving a data QP is described in metadata (header of encoded data) associated with the data.

In this way, the data QP is generated and transmitted as difference information indicating a difference from the frame QP. Therefore, the data amount of the data QP can be reduced.

In each piece of encoded data, first decoder 5340 refers to metadata indicated by an arrow in part (c) of FIG. 98, and obtains a reference value and difference information associated with the encoded data. First decoder 5340 then derives a QP value corresponding to the encoded data to be decoded based on the obtained reference value and difference information.

For example, first decoder 5340 obtains the reference information "1." and the difference information "2." and "6." indicated by arrows in part (c) of FIG. 98 from the metadata or the header, and derives the QP value of $A_{s2}$ by adding the difference information "2." and "6." to the reference information "1." as shown by Equation G6 below.

$$Q_{As2} = Q_G + \Delta(Q_A, Q_G) + \Delta(Q_{As2}, Q_A) \quad \text{(Equation G6)}$$

Point cloud data includes geometry information and zero or more pieces of attribute information. That is, point cloud data may include no attribute information or a plurality of pieces of attribute information.

For example, one three-dimensional point may have, as attribute information, color information, color information and reflectance information, or one or more pieces of color information linked to one or more pieces of point-of-view information.

Figure 99:
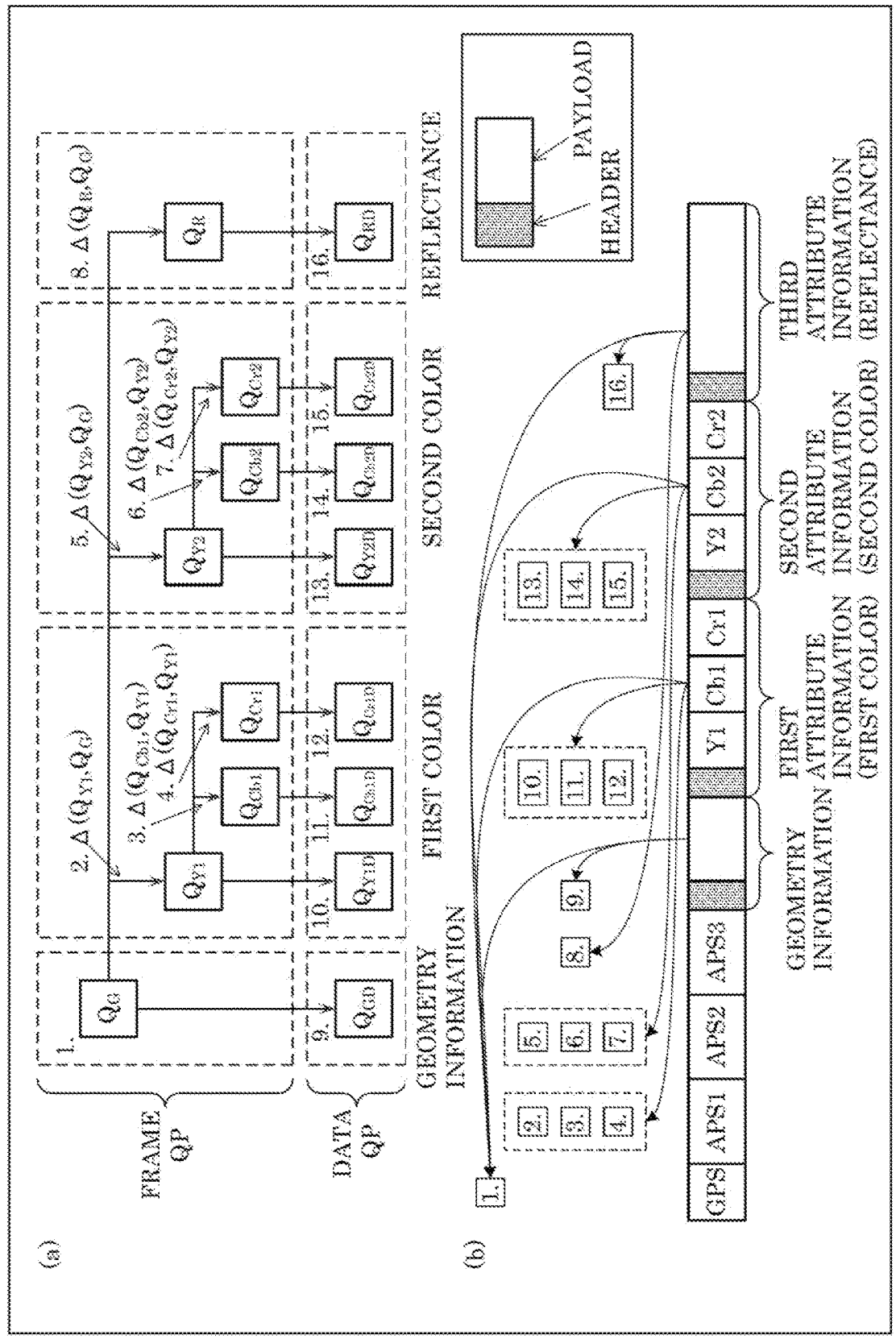
FIG. 99 is a diagram for describing a second example of the method of transmitting a quantization parameter according to Embodiment 11.

Here, an example of a case where one three-dimensional point has two pieces of color information and reflectance information will be described with reference to FIG. 99. FIG. 99 is a diagram for describing a second example of the method of transmitting a quantization parameter. Part (a) of FIG. 99 is a diagram illustrating a second example of the relationship between a reference value and difference information for each QP value. Part (b) of FIG. 99 is a diagram illustrating a second example of the order of transmission of QP values, geometry information, and attribute information.

$Q_G$ is an example of the first quantization parameter as in FIG. 98. Two pieces of color information are indicated by luminance (luma) Y and chrominances (chroma) Cb, Cr, respectively. $Q_{Y1}$, which a QP value used for the encoding of luminance Y1 of a first color, is derived from $Q_G$, which is a reference value, and $\Delta(Q_{Y1}, Q_G)$, which indicates the difference between $Q_{Y1}$ and $Q_G$. Luminance Y1 is an example of a first luminance, and $Q_{Y1}$ is an example of a second quantization parameter used for quantizing luminance Y1 as the first luminance. $\Delta(Q_{Y1}, Q_G)$ is difference information "2.".

$Q_{Cb1}$ and $Q_{Cr1}$, which are QP values used for the encoding of chrominances Cb1 and Cr1 of the first color, are derived from $Q_{Y1}$ and $\Delta(Q_{Cb1}, Q_{Y1})$ and $\Delta(Q_{Cr1}, Q_{Y1})$, which indicate the difference between $Q_{Cb1}$ and $Q_{Y1}$ and the difference between $Q_{Cr1}$ and $Q_{Y1}$, respectively. Chrominances Cb1 and Cr1 are examples of a first chrominance, and $Q_{Cb1}$ and $Q_{Cr1}$ are examples of a third quantization parameter used for quantizing chrominances Cb1 and Cr1 as the first chrominance. $\Delta(Q_{Cb1}, Q_{Y1})$ is difference information "3.", and $\Delta(Q_{Cr1}, Q_{Y1})$ is difference information "4.". $\Delta(Q_{Cb1}, Q_{Y1})$ and $\Delta(Q_{Cr1}, Q_{Y1})$ are examples of a first difference.

Note that $Q_{Cb1}$ and $Q_{Cr1}$ may be identical values or a common value. When a common value is used, one of $Q_{Cb1}$ and $Q_{Cr1}$ can be used, and the other can be omitted.

$Q_{Y1D}$, which is a QP value used for the encoding of luminance Y1D of the first color in the slice data, is derived from $Q_{Y1}$ and $\Delta(Q_{Y1D}, Q_{Y1})$ indicating the difference between $Q_{Y1D}$ and $Q_{Y1}$. Luminance Y1D of the first color in the slice data is an example of the first luminance of one or more three-dimensional points included in the subspace, and $Q_{Y1D}$ is an example of a fifth quantization parameter used for quantizing luminance Y1D. $\Delta(Q_{Y1D}, Q_{Y1})$ is difference information "10.", and an example of a second difference.

Similarly, $Q_{Cb1D}$ and $Q_{Cr1D}$, which are QP values used for the encoding of chrominances Cb1D and Cr1D of the first color in the slice data, are derived from $Q_{Cb1}$ and $\Delta(Q_{Cb1D}, Q_{Cb1})$ indicating the difference between $Q_{Cb1D}$ and $Q_{Cb1}$ and $Q_{Cr1}$ and $\Delta(Q_{Cr1D}, Q_{Cr1})$ indicating the difference between $Q_{Cr1D}$ and $Q_{Cr1}$, respectively. Chrominances Cb1D and Cr1D of the first color in the slice data are examples of the first chrominance of one or more three-dimensional points included in the subspace, and $Q_{Cb1D}$ and $Q_{Cr1D}$ are examples of a sixth quantization parameter used for quantizing chrominances Cb1D and Cr1D. $\Delta(Q_{Cb1D}, Q_{Cb1})$ is difference information "11.", and $\Delta(Q_{Cr1D}, Q_{Cr1})$ is difference information "12.". $\Delta(Q_{Cb1D}, Q_{Cb1})$ and $\Delta(Q_{Cr1D}, Q_{Cr1})$ are examples of a third difference.

The relationship between QP values for the first color holds for a second color, so that redundant descriptions will be omitted.

$Q_R$, which is a QP value used for the encoding of reflectance R, is derived from $Q_G$, which is a reference value, and $\Delta(Q_R, Q_G)$, which indicates the difference between $Q_R$ and $Q_G$. $Q_R$ is an example of a fourth quantization parameter used for quantizing reflectance R. $\Delta(Q_R, Q_G)$ is difference information "8.".

$Q_{RD}$, which is a QP value used for the encoding of reflectance RD in the slice data, is derived from $Q_R$ and $\Delta(Q_{RD}, Q_R)$, which indicates the difference between $Q_{RD}$ and $Q_R$. $\Delta(Q_{RD}, Q_R)$ is difference information "16.".

As described above, difference information "9." to "16." indicates the difference between a data QP and a frame QP.

Note that when the values of the data QP and the frame QP are the same, for example, the difference information may be set at 0, or may not be transmitted, and the absence of the transmission may be regarded as difference information of 0.

When obtaining chrominance Cr2 of the second color by decoding, for example, first decoder 5340 obtains reference information "1." and difference information "5.", "7.", and "15." indicated by arrows in part (b) of FIG. 99 from the metadata or the header, and derives the QP value of chrominance Cr2 by adding difference information "5.", "7.", and "15." to reference information "1." as shown by Equation G7 below.

$$Q_{Cr2D} = Q_G + \Delta(Q_{Y2}, Q_G) + \Delta(Q_{Cr2}, Q_{Y2}) + \Delta(Q_{Cr2D}, Q_{Cr2}) \quad \text{(Equation G7)}$$

Figure 100:
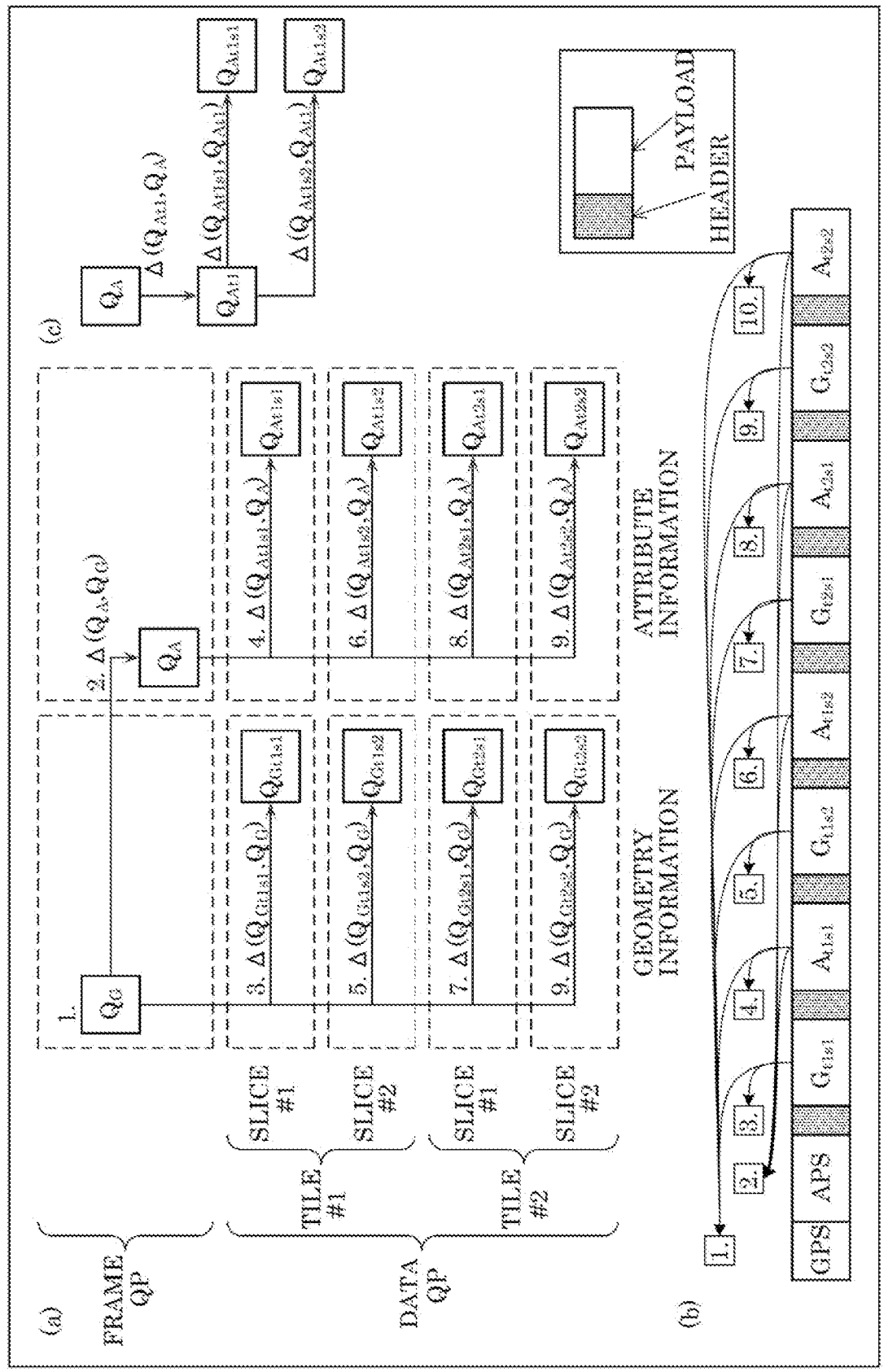
FIG. 100 is a diagram for describing a third example of the method of transmitting a quantization parameter according to Embodiment 11.

Next, an example of a case where geometry information and attribute information are divided into two tiles and then divided into two slices will be described with reference to FIG. 100. FIG. 100 is a diagram for describing a third example of the method of transmitting a quantization parameter. Part (a) of FIG. 100 shows a third example of the relationship between a reference value and difference information for each QP value. Part (b) of FIG. 100 shows a third example of the order of transmission of QP values, geometry information, and attribute information. Part (c) of FIG. 100 describes an intermediate generated value for difference information in the third example.

When geometry information and attribute information are divided into a plurality of tiles and then further divided into a plurality of slices, as illustrated in part (c) of FIG. 100, after the attribute information is divided into tiles, a QP value ($Q_{At1}$) and difference information $\Delta(Q_{At1}, Q_A)$ for each tile are generated as intermediate generated values. After the tile is divided into slices, QP values ($Q_{At1s1}$, $Q_{At1s2}$) and difference information ($\Delta(Q_{At1s1}, Q_{At1})$, $\Delta(Q_{At1s2}, Q_{At1})$) are generated for each slice.

In this case, difference information "4." in part (a) of FIG. 100 is derived according to Equation G8 below.

$$\Delta(Q_{At1s1}, Q_A) = \Delta(Q_{At1}, Q_A) + \Delta(Q_{At1s1}, Q_{At1}) \quad \text{(Equation G8)}$$

When obtaining attribute information At2s1 for slice 1 in tile 2 by decoding, for example, first decoder 5340 obtains reference information "1." and difference information "2." and "8." indicated by arrows in part (b) of FIG. 100 from the metadata or the header, and derives the QP value of attribute information $A_{t2s1}$ by adding difference information "2." and "8." to reference information "1." as shown by Equation G9 below.

$$Q_{At2s1} = Q_G + \Delta(Q_{At2s1}, Q_A) + \Delta(Q_A, Q_G) \quad \text{(Equation G9)}$$

Figure 101:
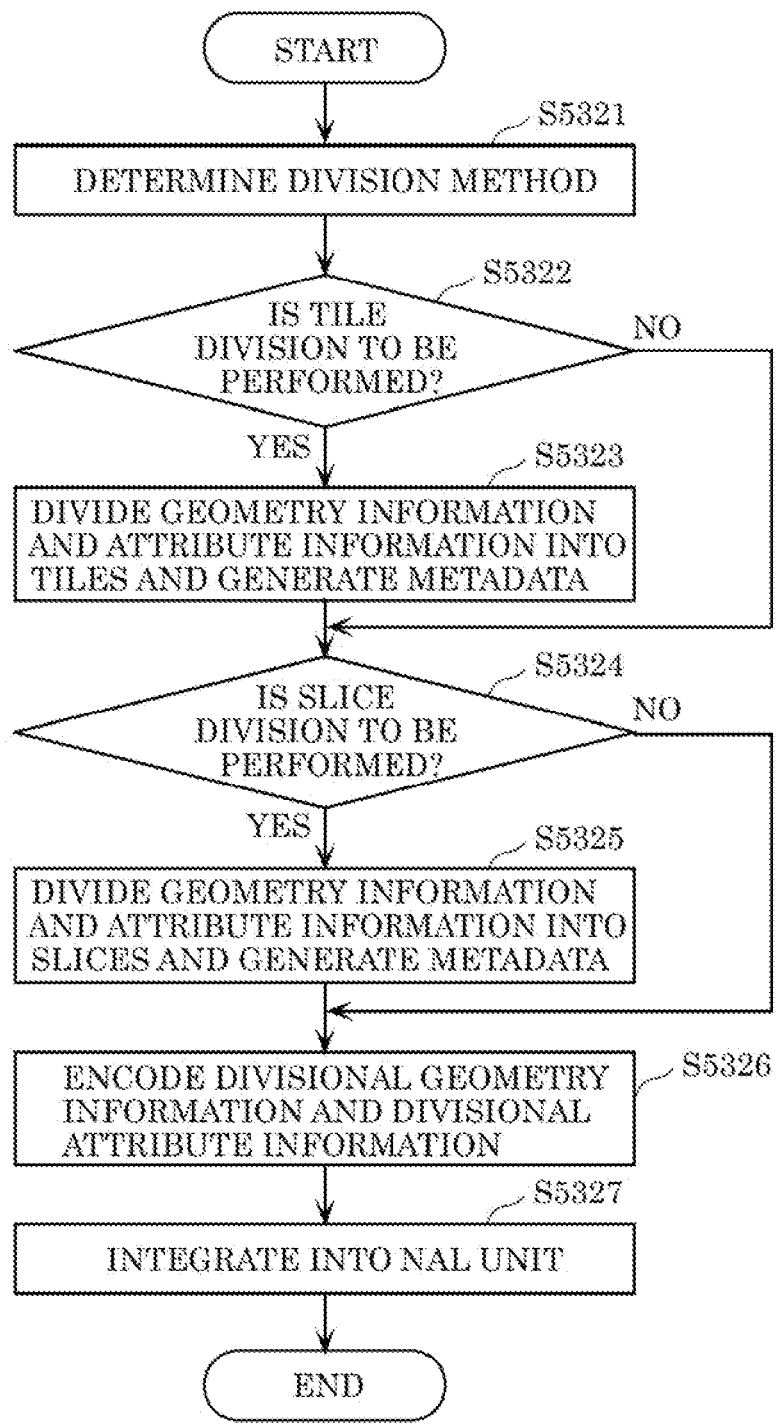
FIG. 101 is a flowchart of a process of encoding point cloud data according to Embodiment 11.

Next, a flow of a process of encoding point cloud data and a flow of a process of decoding point cloud data according to the present embodiment will be described. FIG. 101 is a flowchart of a process of encoding point cloud data according to the present embodiment.

First, the three-dimensional data encoding device determines a division method to be used (S5321). The division method includes a determination of whether to perform tile division or not and a determination of whether to perform slice division or not. The division method may include the number of tiles or slices in the case where tile division or slice division is performed, and the type of division, for example. The type of division is a scheme based on an object shape, a scheme based on map information or geometry information, or a scheme based on a data amount or processing amount, for example. Note that the division method may be determined in advance.

When tile division is to be performed (if Yes in S5322), the three-dimensional data encoding device generates a plurality of pieces of tile geometry information and a plurality of pieces of tile attribute information by dividing the geometry information and the attribute information on a tile basis (S5323). The three-dimensional data encoding device also generates tile additional information concerning the tile division.

When slice division is to be performed (if Yes in S5324), the three-dimensional data encoding device generates a plurality of pieces of divisional geometry information and a plurality of pieces of divisional attribute information by dividing the plurality of pieces of tile geometry information and the plurality of pieces of tile attribute information (or the geometry information and the attribute information) (S5325). The three-dimensional data encoding device also generates geometry slice additional information and attribute slice additional information concerning the slice division.

The three-dimensional data encoding device then generates a plurality of pieces of encoded geometry information and a plurality of pieces of encoded attribute information by encoding each of the plurality of pieces of divisional geometry information and the plurality of pieces of divisional attribute information (S5326). The three-dimensional data encoding device also generates dependency information.

The three-dimensional data encoding device then generates encoded data (encoded stream) by integrating (multiplexing) the plurality of pieces of encoded geometry information, the plurality of pieces of encoded attribute information and the additional information into a NAL unit (S5327). The three-dimensional data encoding device also transmits the generated encoded data.

Figure 102:
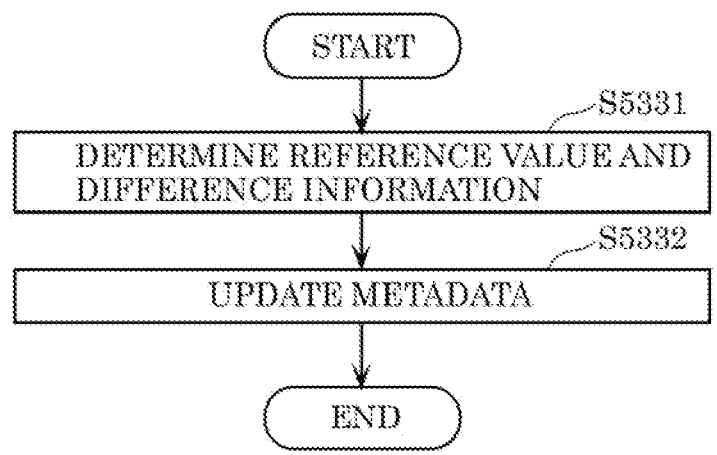
FIG. 102 is a flowchart illustrating an example of a process of determining a QP value and updating additional information according to Embodiment 11.

FIG. 102 is a flowchart illustrating an example of a process of determining a QP value and updating additional information in the tile division (S5323) and the slice division (S5325).

In steps S5323 and S5325, tile geometry information and tile attribute information and/or slice geometry information and slice attribute information may be independently divided in respective manners, or may be collectively divided in a common manner. In this way, additional information divided on a tile basis and/or on a slice basis is generated.

In these steps, the three-dimensional data encoding device determines a reference value and difference information for a QP value on a divisional tile basis and/or on a divisional slice basis (S5331). Specifically, the three-dimensional data encoding device determines reference value and difference information such as those illustrated in FIGS. 98 to 100.

The three-dimensional data encoding device then updates the additional information to include the determined reference value and difference information (S5332).

Figure 103:
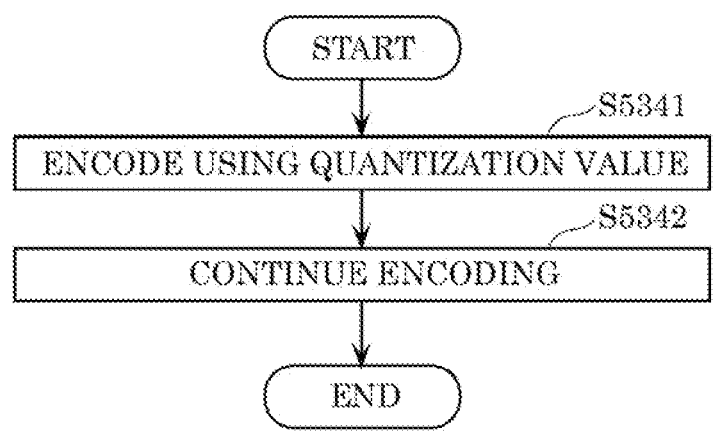
FIG. 103 is a flowchart illustrating an example of a process of encoding according to Embodiment 11.

FIG. 103 is a flowchart illustrating an example of a process in encoding (S5326).

The three-dimensional data encoding device encodes each of the plurality of pieces of divisional geometry information and the plurality of pieces of divisional attribute information (S5341). Specifically, the three-dimensional data encoding device encodes each of the plurality of pieces of divisional geometry information and the plurality of pieces of divisional attribute information using the determined QP value.

The three-dimensional data encoding device then continues the encoding process until a condition for stopping the encoding process is satisfied, such as until there is no data to be encoded (S5342).

Figure 104:
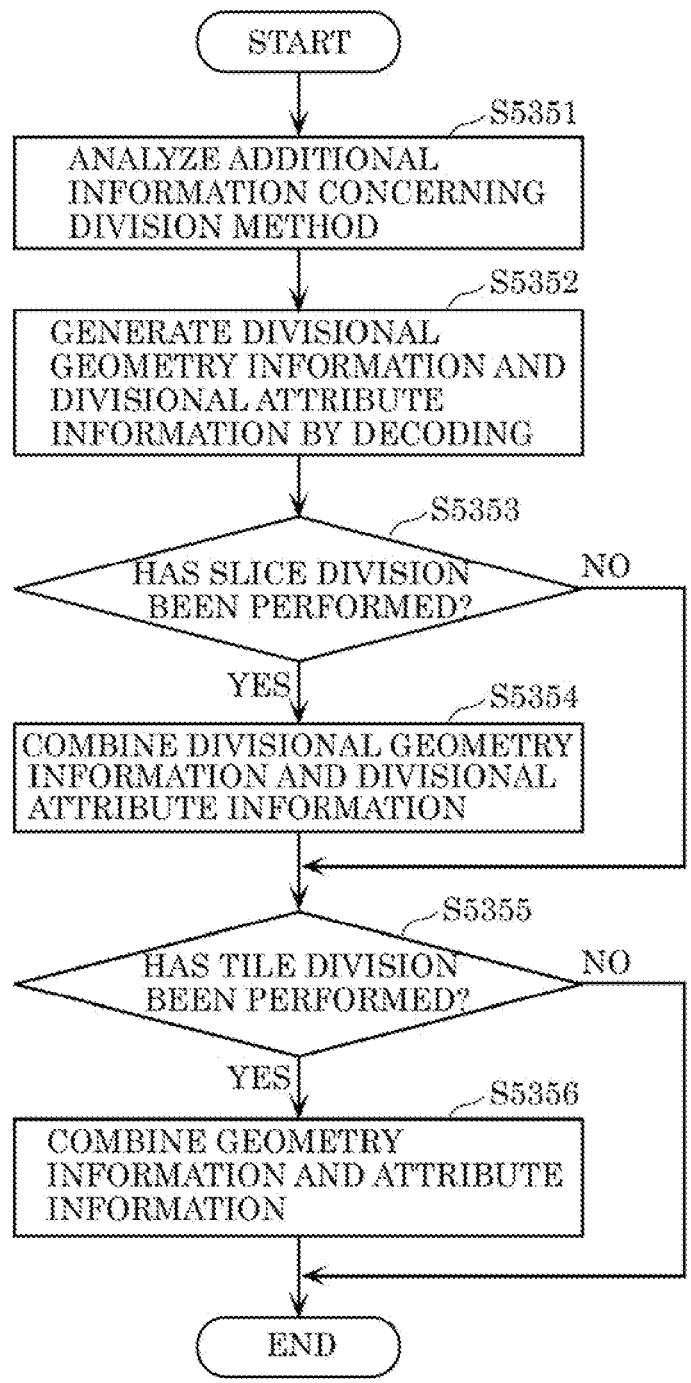
FIG. 104 is a flowchart illustrating a process of decoding point cloud data according to Embodiment 11.

FIG. 104 is a flowchart illustrating a process of decoding point cloud data according to the present embodiment. First, the three-dimensional data decoding device determines the division method by analyzing additional information (tile additional information, geometry slice additional information, and attribute slice additional information) concerning the division method included in encoded data (encoded stream) (S5351). The division method includes a determination of whether to perform tile division or not and a determination of whether to perform slice division or not. The division method may include the number of tiles or slices in the case where tile division or slice division is performed, and the type of division, for example.

The three-dimensional data decoding device then generates divisional geometry information and divisional attribute information by decoding a plurality of pieces of encoded geometry information and a plurality of pieces of encoded attribute information included in the encoded data using dependency information included in the encoded data (S5352).

If the additional information indicates that slice division has been performed (if Yes in S5353), the three-dimensional data decoding device generates a plurality of pieces of tile geometry information and a plurality of pieces of tile attribute information by combining the plurality of pieces of divisional geometry information and the plurality of pieces of divisional attribute information based on the geometry slice additional information and the attribute slice additional information (S5354).

If the additional information indicates that tile division has been performed if Yes in S5355), the three-dimensional data decoding device generates geometry information and attribute information by combining the plurality of pieces of tile geometry information and the plurality of pieces of tile attribute information (the plurality of pieces of divisional geometry information and the plurality of pieces of divisional attribute information) based on the tile additional information (S5356).

Figures 105, 106:
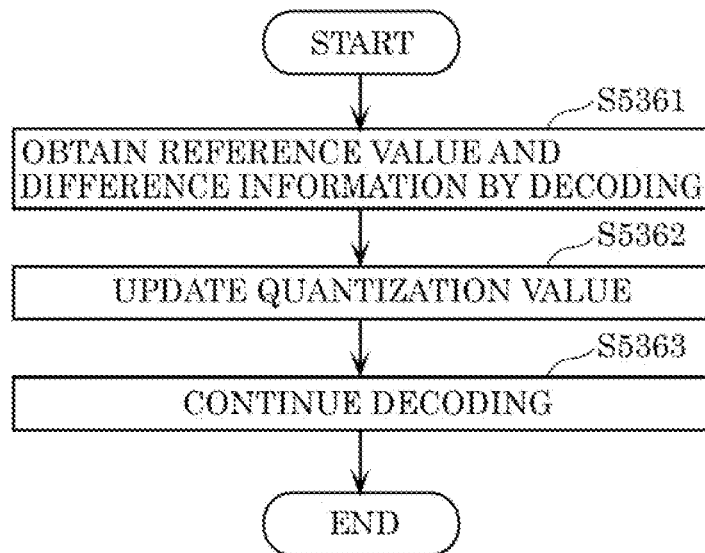
FIG. 105 is a flowchart illustrating an example of a process of obtaining QP values and decoding a QP value for a slice or tile according to Embodiment 11.
FIG. 106 is a diagram illustrating a syntax example of GPS according to Embodiment 11.

FIG. 105 is a flowchart illustrating an example of a process of obtaining QP values and decoding a QP value for a slice or tile in the combining of information divided into slices (S5354) and the combining of information divided into tiles (S5356).

Pieces of slice geometry information and pieces of slice attribute information or pieces of tile geometry information or pieces of tile attribute information may be combined in respective manners or in the same manner.

The three-dimensional data decoding device obtains the reference value and the difference information by decoding the additional information in the encoded stream (S5361).

The three-dimensional data decoding device then calculates a quantization value using the decoded reference value and difference information, and updates the QP value used for inverse quantization to the calculated QP value (S5362). In this way, a QP value for inverse quantization of quantized attribute information for each tile or slice can be derived.

The three-dimensional data decoding device then continues the decoding process until a condition for stopping the decoding process is satisfied, such as until there is no data to be decoded (S5363).

FIG. 106 is a diagram illustrating a syntax example of GPS. FIG. 107 is a diagram illustrating a syntax example of APS. FIG. 108 is a diagram illustrating a syntax example of a header of geometry information. FIG. 109 is a diagram illustrating a syntax example of a header of attribute information.

As illustrated in FIG. 106, for example, GPS, which is additional information of geometry information, includes QP_value, which indicates an absolute value used as a reference for deriving a QP value. QP_value corresponds to $Q_G$ illustrated in FIGS. 98 to 100.

As illustrated in FIG. 107, for example, when a three-dimensional point has a plurality of pieces of color information associated with a plurality of points of view, APS, which is additional information of attribute information, may define a default point of view, and a 0-th piece of attribute information may always describe information on the default point of view. For example, when decoding or displaying a single piece of color information, the three-dimensional data encoding device can decode or display the 0-th piece of attribute information.

APS includes QP_delta_Attribute_to_Geometry. QP_delta_Attribute_to_Geometry is difference information indicating the difference from the reference value (QP_value) described in GPS. The difference information indicates a difference in luminance when the attribute information is color information, for example.

GPS may include a flag that indicates whether or not Geometry header (header of the geometry information) includes difference information used for calculating a QP value. APS may include a flag that indicates whether or not Attribute header (header of the attribute information) includes difference information used for calculating a QP value. The flag may indicate whether or not the attribute information includes difference information indicating the difference of a data QP from a frame QP, which is used for calculating the data QP.

When a first color of attribute information is indicated by a first luminance and a first chrominance, in the quantization of the first luminance using a second quantization parameter and the quantization of the first chrominance using a third quantization parameter, if the quantizations are performed using a fifth quantization parameter and a sixth quantization parameter, the encoded stream may include identification information (flag) that indicates that the quantizations are performed using the fifth quantization parameter and the sixth quantization parameter.

As illustrated in FIG. 108, the header of the geometry information may include QP_delta_data_to_frame, which is difference information indicating the difference from the reference value (QP_value) described in GPS. The header of the geometry information may be divided into pieces of information associated with tiles and/or slices, and a QP value corresponding to each tile and/or slice may be indicated.

As illustrated in FIG. 109, the header of the attribute information may include QP_delta_data_to_frame, which is difference information indicating the difference from the QP value described in APS.

Although the reference value of a QP value has been described as being a QP value of geometry information for a PCC frame with reference to FIGS. 98 to 100, the present disclosure is not limited thereto, and other values may be used as a reference value.

Figure 110:
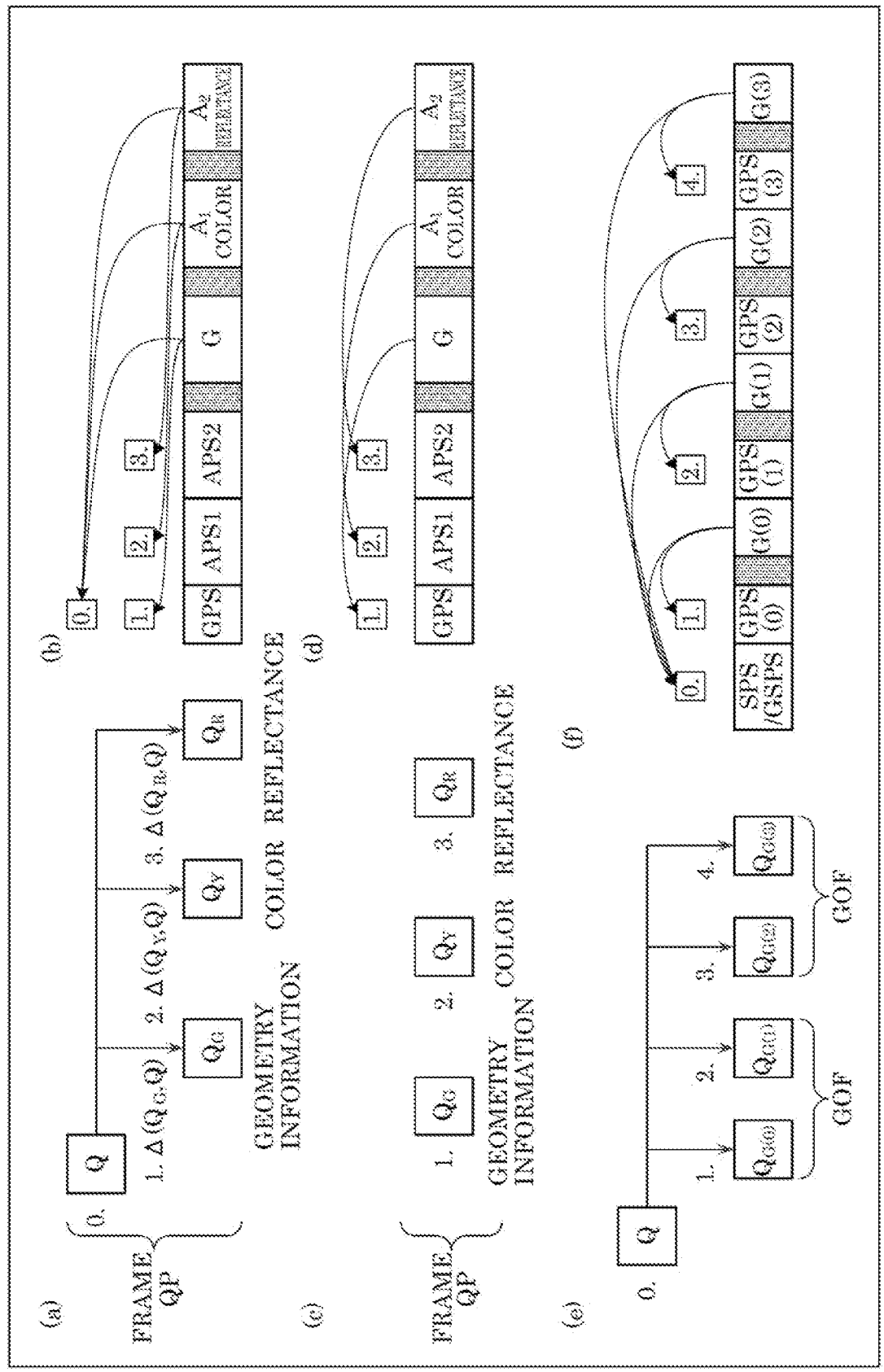
FIG. 110 is a diagram for describing another example of the method of transmitting a quantization parameter according to Embodiment 11.

FIG. 110 is a diagram for describing another example of the method of transmitting a quantization parameter.

Parts (a) and (b) of FIG. 110 illustrate a fourth example, in which common reference value Q is set based on QP values of geometry information and attribute information for a PCC frame. In the fourth example, reference value Q is stored in GPS, difference information indicating the difference of a QP value ($Q_G$) of geometry information from reference value Q is stored in GPS, and difference information indicating the differences of QP values ($Q_Y$ and $Q_R$) of attribute information from reference value Q is stored in APS. Note that reference value Q may be stored in SPS.

Parts (c) and (d) of FIG. 110 illustrate a fifth example, in which a different reference value is set for each of geometry information and attribute information. In the fifth example, reference QP values (absolute values) of geometry information and attribute information are stored in GPS and APS, respectively. That is, reference value $Q_G$ is set in geometry information, reference value $Q_Y$ is set in color information of attribute information, and reference value $Q_R$ is set as reflectance of attribute information. In this way, a reference value of a QP value may be set for each of geometry information and a plurality of kinds of attribute information. Note that the fifth example may be combined with another example. That is, $Q_A$ in the first example, or $Q_{Y1}$, $Q_{Y2}$, and $Q_R$ in the second example may be a reference value of a QP value.

Parts (e) and (f) of FIG. 110 illustrate a sixth example, in which when there is a plurality of PCC frames, a common reference value Q is set for the plurality of PCC frames. In the sixth example, reference value Q is stored in SPS or GPS, and difference information indicating the difference between the QP value of the geometry information and the reference value for each PCC frame is stored in GPS. Note that, within the range of a random access unit, such as GOF, for example, the leading frame of the random access unit may be designated as a reference value, and difference information $\Delta(Q_{G(1)}, Q_{G(0)})$ indicating the differences between the PCC frames may be transmitted.

Note that, even when a tile or a slice is further divided, difference information indicating the difference from the QP value of the unit of division is stored in the data header and transmitted in the same manner.

Figure 111:
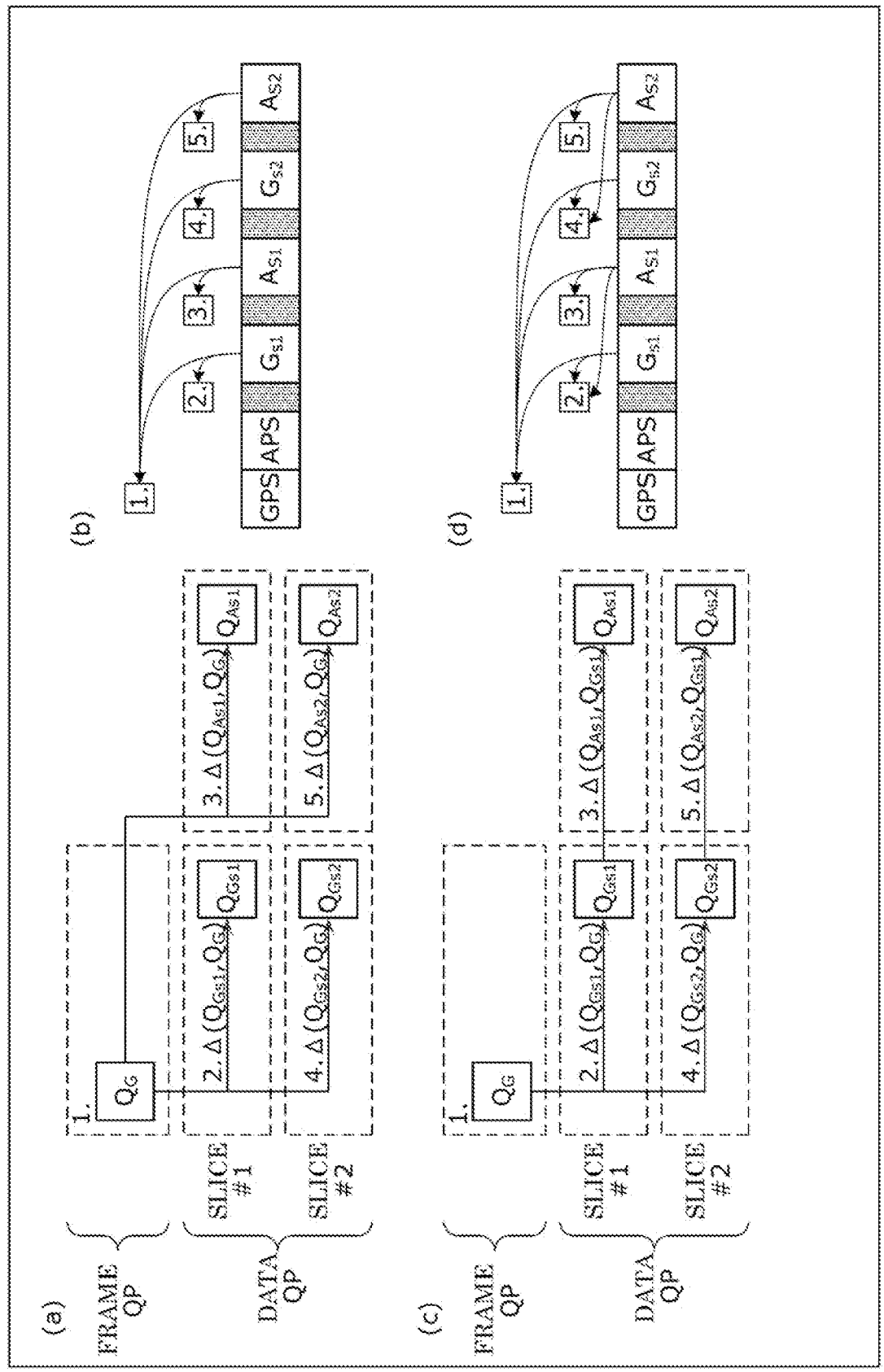
FIG. 111 is a diagram for describing another example of the method of transmitting a quantization parameter according to Embodiment 11.

FIG. 111 is a diagram for describing another example of the method of transmitting a quantization parameter.

Parts (a) and (b) of FIG. 111 illustrate a seventh example, in which common reference value $Q_G$ is set for geometry information and attribute information of a PCC frame. In the seventh example, reference value $Q_G$ is stored in GPS, and difference information indicating the differences from the geometry information or the attribute information is stored in the respective data headers. Reference value $Q_G$ may be stored in SPS.

Parts (c) and (d) of FIG. 111 shows an eighth example, in which a QP value of attribute information is indicated by difference information indicating the difference from a QP value of geometry information belonging to the same slice and tile. In the eighth example, reference value $Q_G$ may be stored in SPS.

Figure 112:
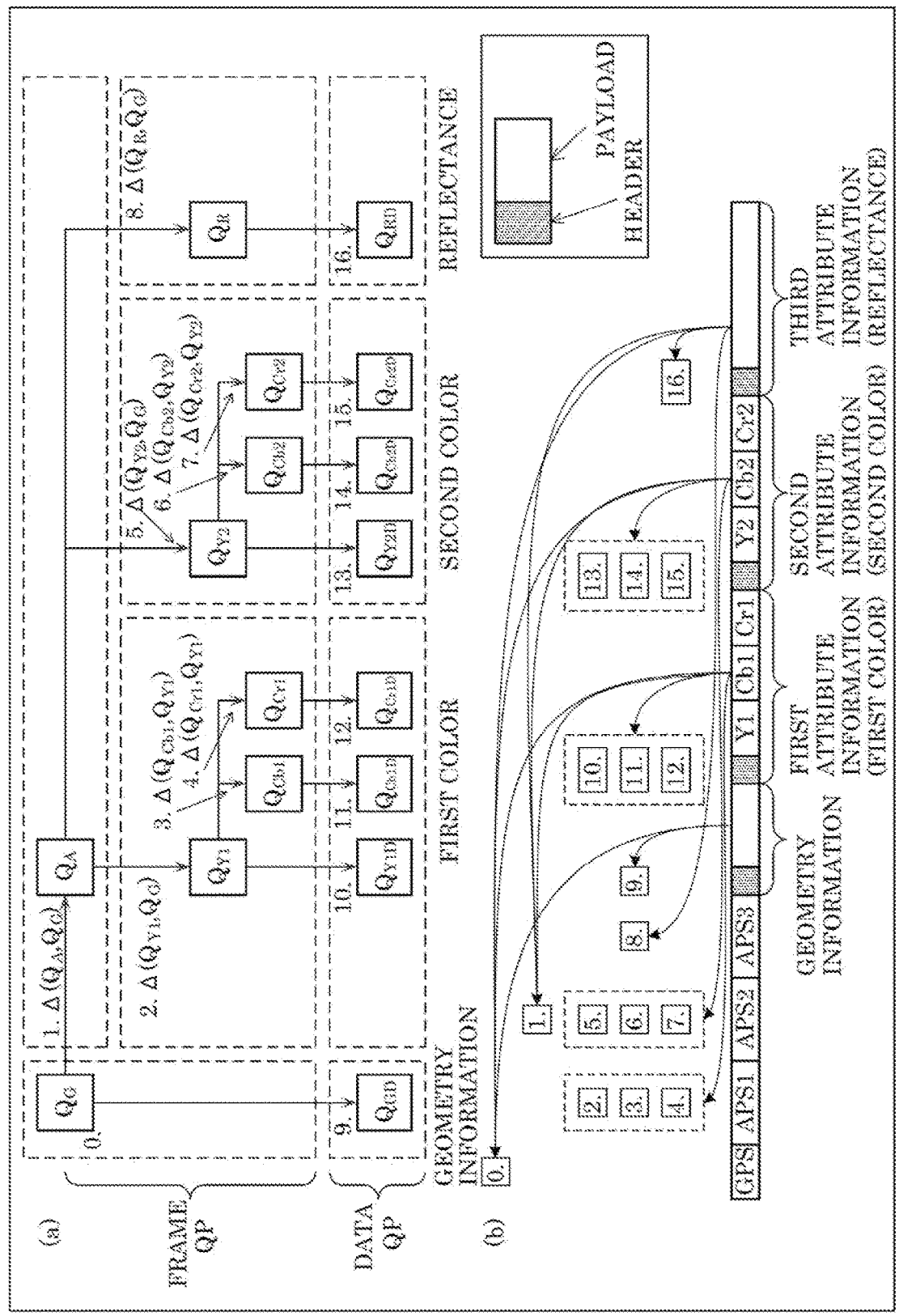
FIG. 112 is a diagram for describing a ninth example of the method of transmitting a quantization parameter according to Embodiment 11.

FIG. 112 is a diagram for describing a ninth example of the method of transmitting a quantization parameter.

Parts (a) and (b) illustrate the ninth example, in which a plurality of pieces of attribute information has a common QP value, and each piece of attribute information indicates difference information indicating the difference between the common QP value and the QP value of geometry information and difference information indicating the difference from the value of the attribute information and the common QP value.

Figure 113:
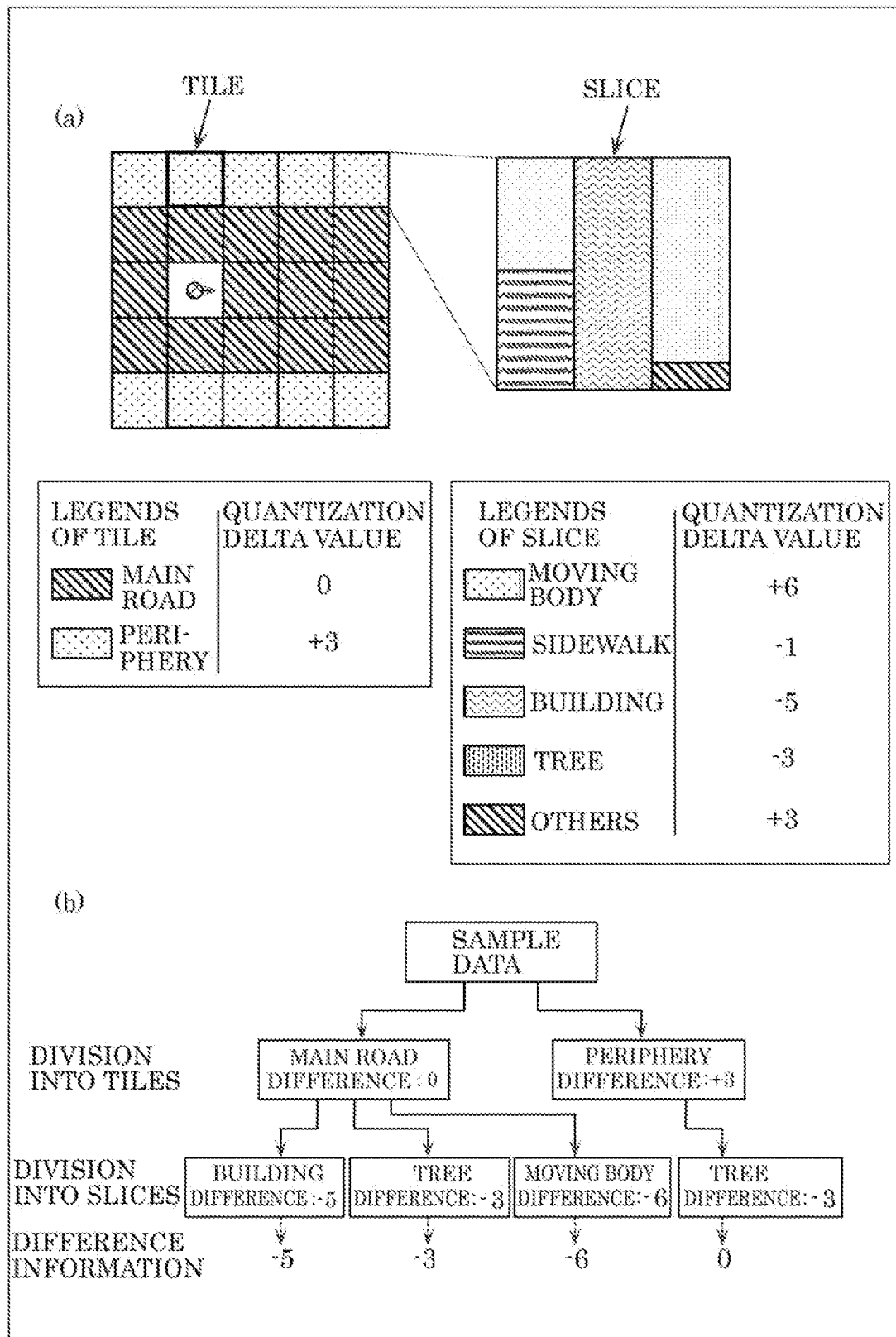
FIG. 113 is a diagram for describing an example of control of a QP value according to Embodiment 11.

FIG. 113 is a diagram for describing an example of control of a QP value.

As the value of the quantization parameter decreases, the quality improves, while the coding efficiency decreases because more bits are required.

For example, when encoding three-dimensional point cloud data by dividing the three-dimensional point cloud data into tiles, if point cloud data included in a tile is a main road, the point cloud data is encoded using a previously defined QP value of attribute information. On the other hand, peripheral tiles do not include important information, and therefore, the coding efficiency may be able to be improved by setting the difference information of the QP value at a positive value to reduce the quality of the data.

Furthermore, when encoding the three-dimensional point cloud data divided into tiles by dividing the tiles into slices, a sidewalk, a tree, and a building are important for positional estimation (localization and mapping) in automatic driving, so that the QP value is set at a negative value. On the other hand, a moving body and other objects are less important, so that the QP value is set at a positive value.

Part (b) of FIG. 113 shows an example in which difference information is derived in a case where a quantization delta value is set in advance based on the object included in a tile or slice. For example, when divisional data is slice data on a "building" included in a tile of a "main road", the difference information is −5, which is derived by summing the quantization delta value of 0 of the tile of a "main road" and the quantization delta value of −5 of the slice data on a "building".

Figure 114:
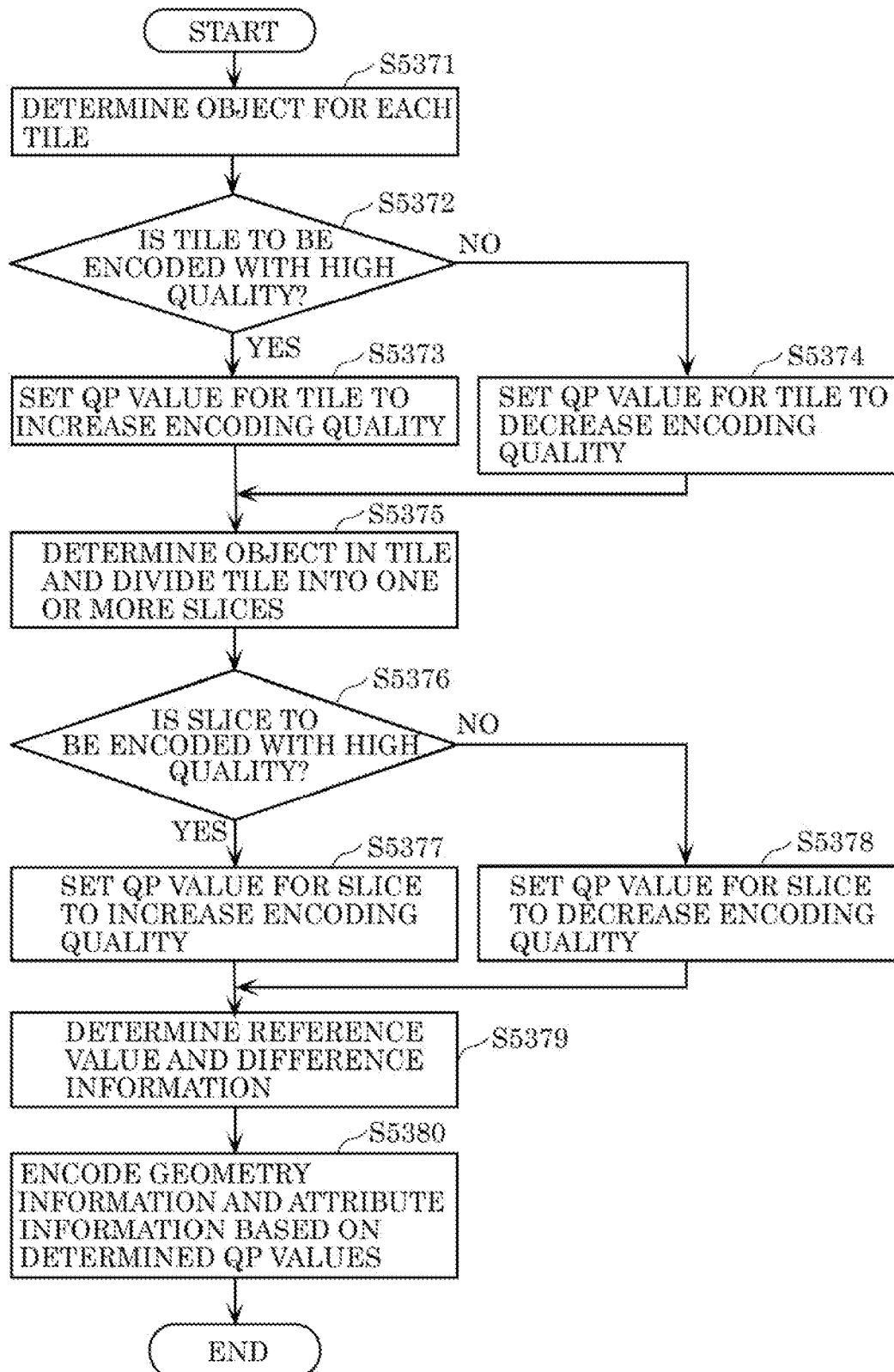
FIG. 114 is a flowchart illustrating an example of a method of determining a QP value based on the quality of an object according to Embodiment 11.

FIG. 114 is a flowchart illustrating an example of a method of determining a QP value based on the quality of an object.

The three-dimensional data encoding device divides point cloud data into one or more tiles based on map information, and determines an object included in the one or more tiles (S5371). Specifically, the three-dimensional data encoding device performs an object recognition process for recognizing what an object is using a leaning model obtained by machine learning, for example.

The three-dimensional data encoding device then determines whether to encode a tile to be processed with high quality or not (S5372). To encode with high quality means encoding at a bitrate higher than a predetermined rate, for example.

When the tile to be processed is to be encoded with high quality (if Yes in S5372), the three-dimensional data encoding device then sets the QP value of the tile so that the coding efficiency is high (S5373).

On the other hand, when the tile to be processed is not to be encoded with high quality (if No in S5372), the three-dimensional data encoding device sets the QP value of the tile so that the coding efficiency is low (S5374).

Following step S5373 or S5374, the three-dimensional data encoding device determines the object in the tile, and divides the tile into one or more slices (S5375).

The three-dimensional data encoding device then determines whether to encode a slice to be processed with high quality or not (S5376).

When the slice to be processed is to be encoded with high quality (if Yes in S5376), the three-dimensional data encoding device then sets the QP value of the slice so that the coding efficiency is high (S5377).

On the other hand, when the slice to be processed is not to be encoded with high quality (if No in S5376), the three-dimensional data encoding device sets the QP value of the slice so that the coding efficiency is low (S5378).

The three-dimensional data encoding device then determines a reference value and difference information to be transmitted based on the set QP value in a predetermined manner, and stores the determined reference value and difference information in at least one of the additional information and the header of the data (S5379).

The three-dimensional data encoding device then quantizes and encodes the geometry information and the attribute information based on the determined QP value (S5380).

Figure 115:
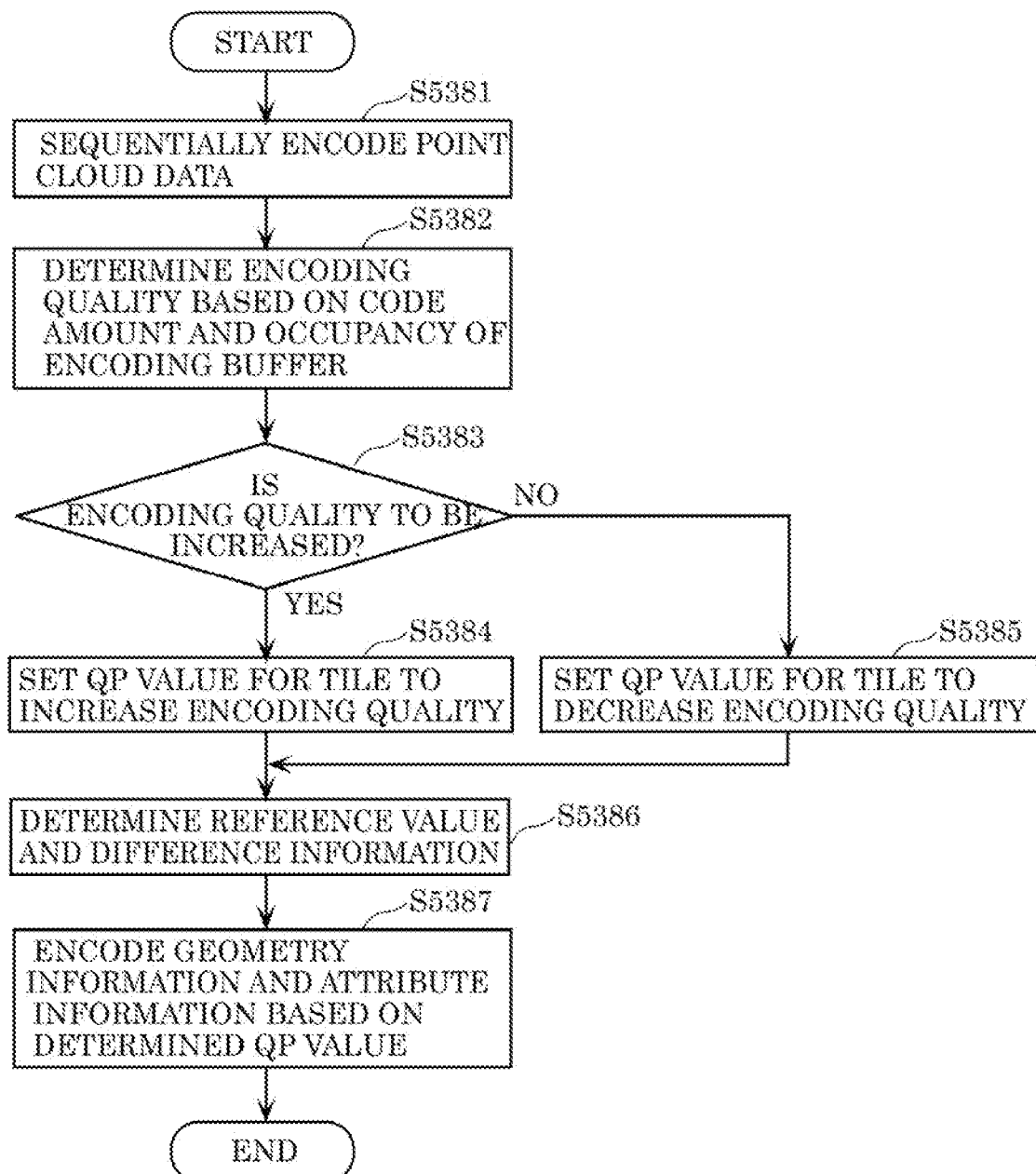
FIG. 115 is a flowchart illustrating an example of a method of determining a QP value based on a rate control according to Embodiment 11.

FIG. 115 is a flowchart illustrating an example of a method of determining a QP value based on a rate control.

The three-dimensional data encoding device sequentially encodes point cloud data (S5381).

The three-dimensional data encoding device then determines a rate control status concerning the encoding process from the code amount of the encoded data and the occupancy of an encoding buffer, and determines the quality of the subsequent encoding (S5382).

The three-dimensional data encoding device then determines whether or not to increase the encoding quality (S5383).

When the encoding quality is to be increased (if Yes in S5383), the three-dimensional data encoding device sets the QP value of the tile so that the encoding quality is higher (S5384).

On the other hand, when the encoding quality is not to be increased (if No in S5383), the three-dimensional data encoding device sets the QP value of the tile so that the encoding quality is lower (S5385).

The three-dimensional data encoding device then determines a reference value and difference information to be transmitted based on the set QP value in a predetermined manner, and stores the determined reference value and difference information in at least one of the additional information and the header of the data (S5386).

The three-dimensional data encoding device then quantizes and encodes the geometry information and the attribute information based on the determined QP value (S5387).

Figure 116:
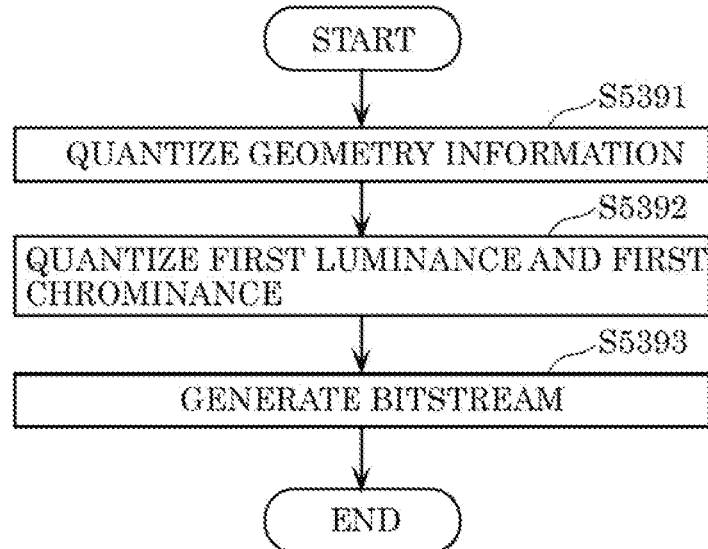
FIG. 116 is a flowchart illustrating an encoding process according to Embodiment 11.

As described above, the three-dimensional data encoding device according to the present embodiment performs the process illustrated in FIG. 116. First, the three-dimensional data encoding device quantizes geometry information on each of a plurality of three-dimensional points using a first quantization parameter (S5391). The three-dimensional data encoding device quantizes a first luminance using a second quantization parameter and quantizes a first chrominance using a third quantization parameter, the first luminance and the first chrominance indicating a first color among attribute information on each of the plurality of three-dimensional points (S5392). The three-dimensional data encoding device generates a bitstream including the quantized geometry information, the quantized first luminance, the quantized first chrominance, the first quantization parameter, the second quantization parameter, and a first difference between the second quantization parameter and the third quantization parameter (S5393).

With such a configuration, since the third quantization parameter is indicated by the first difference from the second quantization parameter in the bitstream, the coding efficiency can be improved.

For example, the three-dimensional data encoding device further quantizes a reflectance among the attribute information on each of the plurality of three-dimensional points using a fourth quantization parameter. Furthermore, in the generation described above, the bitstream generated further includes the quantized reflectance and the fourth quantization parameter.

For example, in the quantization using the second quantization parameter, for each of a plurality of subspaces obtained by dividing a current space including the plurality of three-dimensional points, the first luminance of one or more three-dimensional points included in the subspace is quantized further using a fifth quantization parameter. In the quantization using the third quantization parameter, the first chrominance of the one or more three-dimensional points is quantized further using a sixth quantization parameter. In the generation described above, the bitstream generated further includes a second difference between the second quantization parameter and the fifth quantization parameter and a third difference between the third quantization parameter and the sixth quantization parameter.

With such a configuration, since the fifth quantization parameter is indicated by the second difference from the second quantization parameter and the sixth quantization parameter is indicated by the third difference from the third quantization parameter in the bitstream, the coding efficiency can be improved.

For example, in the generating described above, the bitstream generated further includes identification information indicating that the fifth quantization parameter and the sixth quantization parameter have been used in the quantization using the second quantization parameter and the quantization using the third quantization parameter, respectively.

With such a configuration, the three-dimensional data decoding device having obtained the bitstream can determine from the identification information that the quantization using the fifth quantization parameter and the quantization using the sixth quantization parameter have been performed, so that the processing load of the decoding process can be reduced.

For example, the three-dimensional data encoding device further quantizes a second luminance using a seventh quantization parameter and quantizes a second chrominance using an eighth quantization parameter, the second luminance and the second chrominance indicating a second color among the attribute information of each of the plurality of three-dimensional points. In the generation described above, the bitstream generated further includes the quantized second luminance, the quantized second chrominance, the seventh quantization parameter, and a fourth difference between the seventh quantization parameter and the eighth quantization parameter.

With such a configuration, since the eighth quantization parameter is indicated by the fourth difference from the seventh quantization parameter in the bitstream, the coding efficiency can be improved. In addition, two types of color information can be included in the attribute information on a three-dimensional point.

For example, the three-dimensional data encoding device includes a processor and memory, and the processor performs the process described above using the memory.

Figure 117:
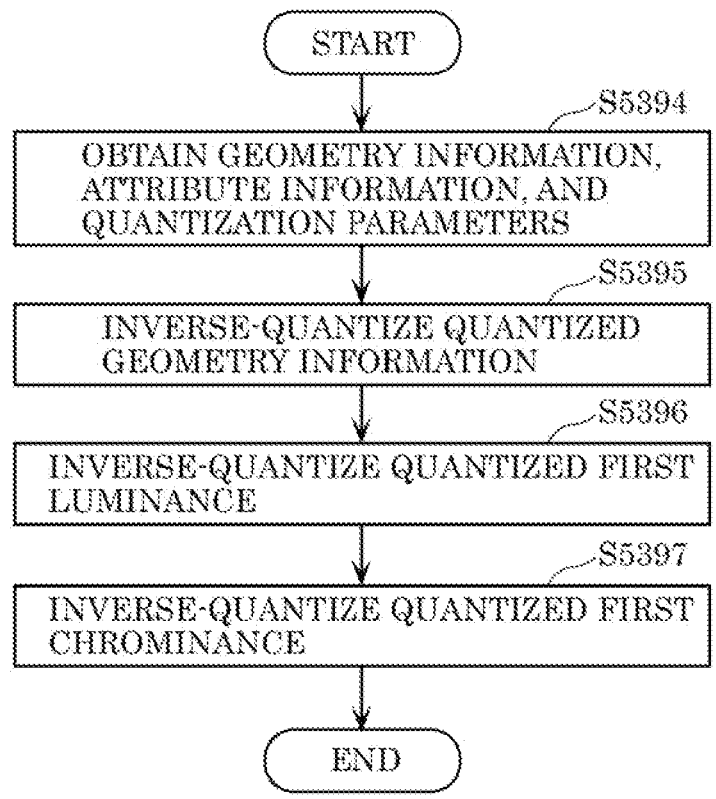
FIG. 117 is a flowchart illustrating a decoding process according to Embodiment 11.

The three-dimensional data decoding device according to the present embodiment performs the process illustrated in FIG. 117. First, the three-dimensional data decoding device obtains quantized geometry information, a quantized first luminance, a quantized first chrominance, a first quantization parameter, a second quantization parameter, and a first difference between the second quantization parameter and a third quantization parameter, by obtaining a bitstream (S5394). The three-dimensional data decoding device calculates geometry information on a plurality of three-dimensional points by inverse-quantizing the quantized geometry information using the first quantization information (S5395). Of a first luminance and a first chrominance indicating a first color of the plurality of three-dimensional points, the three-dimensional data decoding device calculates the first luminance by inverse-quantizing the quantized first luminance using the second quantization parameter (S5396). The three-dimensional data decoding device calculates the first chrominance by quantization parameter obtained from the second quantization parameter and the first difference (S5397).

In this way, the three-dimensional data decoding device can correctly decode geometry information and attribute information on a three-dimensional point.

For example, in the obtaining, a quantized reflectance and a fourth quantization parameter are further obtained by obtaining the bitstream. The three-dimensional data decoding device further calculates a reflectance of the plurality of three-dimensional points by inverse-quantizing the quantized reflectance using the fourth quantization parameter.

Therefore, the three-dimensional data decoding device can correctly decode the reflectance of a three-dimensional point.

For example, in the obtaining, a second difference between the second quantization parameter and a fifth quantization parameter and a third difference between the third quantization parameter and a sixth quantization parameter are further obtained by obtaining the bitstream. In the calculating of the first luminance, a first luminance of one or more three-dimensional points is calculated by inverse-quantizing the quantized first luminance using the second quantization parameter and the fifth quantization parameter obtained from the second difference, the one or more three-dimensional points being included in each subspace obtained by dividing a current space including the plurality of three-dimensional points, the quantized first luminance being the luminance obtained by quantizing the first luminance of the one or more three-dimensional points using the second quantization parameter and the fifth quantization parameter. In the calculation of the first chrominance, a first chrominance of the one or more three-dimensional points is calculated by quantization parameter and the sixth quantization parameter obtained from the third difference, the quantized first chrominance being the chrominance obtained by quantizing the first chrominance of the at least one three-dimensional point using the third quantization parameter and the sixth quantization parameter.

For example, in the obtaining, identification information indicating that the quantization using the fifth quantization parameter and the quantization using the sixth quantization parameter have been performed is further obtained by obtaining the bitstream. In the calculation of the first luminance, when the identification information indicates that the quantization using the fifth quantization parameter and the quantization using the sixth quantization parameter have been performed, the quantized first luminance is determined to be a luminance obtained by quantizing the first luminance of the one or more three-dimensional points. In the calculation of the first chrominance, when the identification information indicates that the quantization using the fifth quantization parameter and the quantization using the sixth quantization parameter have been performed, the quantized first chrominance is determined to be a chrominance obtained by quantizing the first chrominance of the one or more three-dimensional points.

With such a configuration, the three-dimensional data decoding device can determine from the identification information that the quantization using the fifth quantization parameter and the quantization using the sixth quantization parameter have been performed, so that the processing load of the decoding process can be reduced.

For example, in the obtaining, a quantized second luminance, a quantized second chrominance, a seventh quantization parameter, and a fourth difference between the seventh quantization parameter and an eighth quantization parameter is further obtained by obtaining the bitstream. Of a second luminance and a second chrominance that indicate a second color of the plurality of three-dimensional points, the three-dimensional data decoding device further calculates the second luminance by inverse-quantizing the quantized second luminance using the seventh quantization parameter. The three-dimensional data decoding device further calculates the second chrominance by inverse-quantizing the quantized second chrominance using the eighth quantization parameter obtained from the seventh quantization parameter and the fourth difference.

In this way, the three-dimensional data decoding device can correctly decode the second color of a three-dimensional point.

For example, the three-dimensional data decoding device includes a processor and memory, and the processor performs the process described above using the memory.

Embodiment 12

With the three-dimensional data encoding method, the three-dimensional data decoding method, the three-dimensional data encoding device, and the three-dimensional data decoding device described with regard to Embodiment 8, the processes according to this embodiment described below are also possible.

Figure 118:
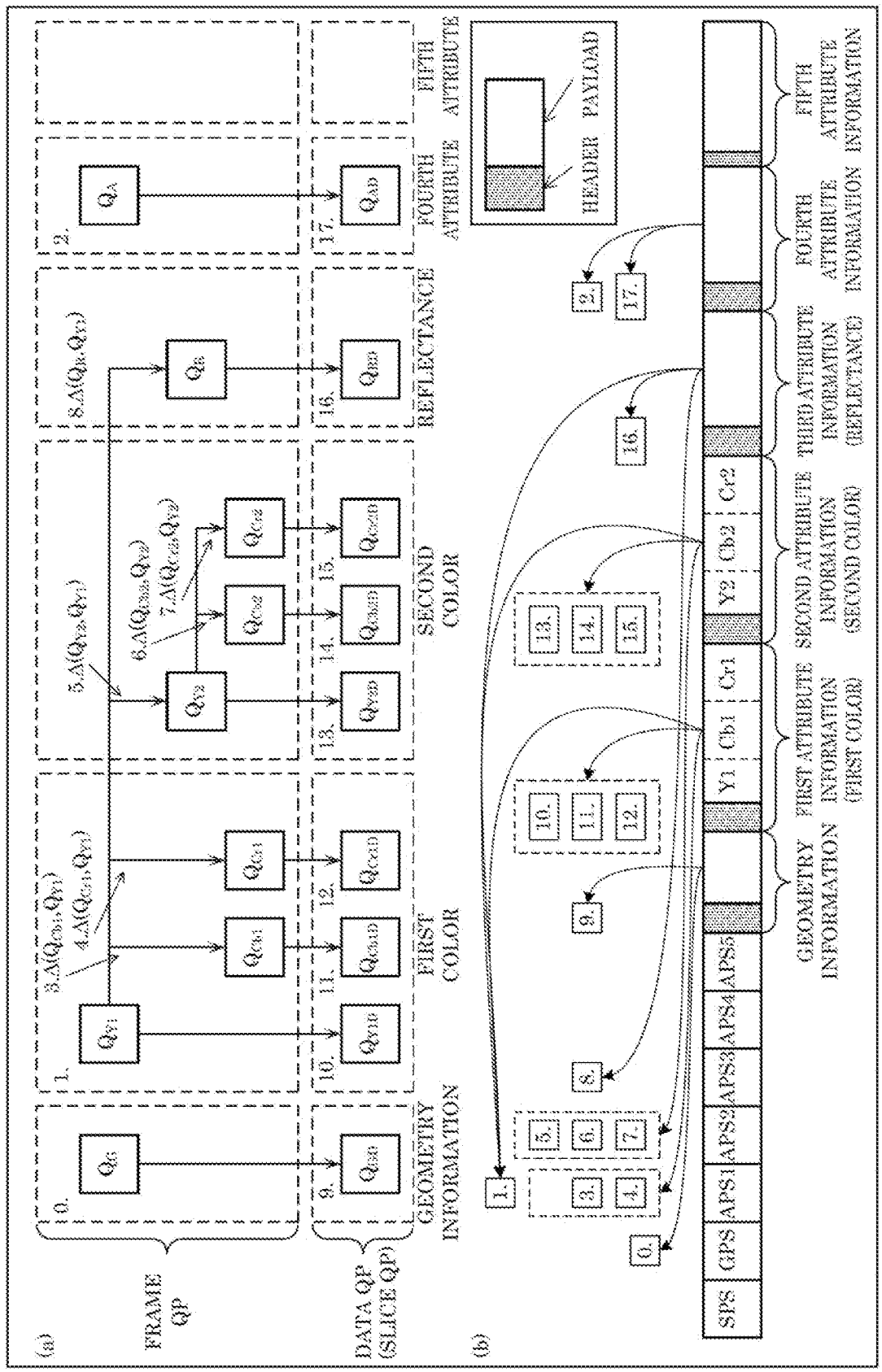
FIG. 118 is a diagram for illustrating an example of a quantization parameter transmission method according to Embodiment 12.

FIG. 118 is a diagram for illustrating an example of a quantization parameter transmission method according to the present embodiment. Part (a) of FIG. 118 shows an example in which a reference value for the QP value is set for each of geometry information and attribute information. FIG. 118 mainly differs from FIG. 105 showing Embodiment 8 in that a reference value for the QP value is set not only for geometry information but also for attribute information. That is, a QP value for at least one of a plurality of pieces of attribute information including a first color, a second color, and a reflectance is designated as a reference value, and QP values for other attribute information are indicates as difference information with respect to the common reference value.

In FIG. 118, $Q_{Y1}$, which is a QP value used for encoding of luminance Y1 of the first color, is set as a common reference value for a plurality of pieces of attribute information including the first color, the second color, and the reflectance. $Q_{Y2}$, which is a reference value for the second color, is derived using common reference value $Q_{Y1}$ and $\Delta(Q_{Y2}, Q_{Y1})$, which is difference information "5." with respect to $Q_{Y1}$. $Q_R$, which is a reference value for reflectance, is derived using common reference value $Q_{Y1}$ and $\Delta(Q_R, Q_{Y1})$, which is difference information "8." with respect to $Q_{Y1}$. In this case, common reference value $Q_{Y1}$ is included in APS1, which is APS for the first color.

For a fourth attribute, a different reference value than common reference value $Q_{Y1}$ may be set. A fifth attribute may have no QP value. That is, the attribute information may include both attribute information that is quantized using a common reference value for deriving a plurality of QP values used for quantization of a plurality of pieces of attribute information and attribute information that is quantized using a different reference value than the common reference value. The attribute information may further include attribute information that is encoded without using a QP value.

Note that, although an example where the QP value used for quantization of the attribute information of the first color is a common reference value for deriving QP values used for quantization of a plurality of pieces of attribute information has been described with reference to FIG. 118, the common reference value may be determined according to the rules described below. For example, when all attribute information is described in control information such as SPS, the QP value included in the first attribute information indicated in SPS among all the attribute information may be designated as a common reference value. Alternatively, the control information such as SPS may indicate attribute information that is to be quantized using a QP value designated as a common reference value. Alternatively, in the control information such as SPS, the attribute information that is to be quantized using a QP value designated as a common reference value may be indicated first among the plurality of pieces of attribute information. In any case, by representing the QP value used for quantization of each of the plurality of pieces of attribute information as a combination of a reference value and difference information, the amount of encoded data can be reduced.

Note that different reference values $Q_{Y1}$, $Q_{Y2}$, and $Q_R$ for different pieces of attribute information may be indicated in APS, $Q_{Y1}$ may be used as a reference value for the QP value for the first color, $Q_{Y2}$ may be used as a reference value for the QP value for the second color, and $Q_R$ may be used as a reference value for the QP value for the reflectance. In that case, $Q_{Y2}$ and $Q_R$ are represented by an absolute value, as with $Q_{Y1}$.

A first example is a method of indicating a QP value for a plurality of pieces of attribute information when metadata for the plurality of pieces of attribute information is collectively described in one APS.

FIG. 119 is a diagram showing a first example of a syntax of APS and a syntax of a header of attribute information.

First, a syntax example of APS will be described.

aps_idx denotes an index number of APS. aps_idx indicates a correspondence between APS and a header of attribute information.

sps_idx denotes an index number of SPS to which APS corresponds.

num_of_attribute denotes the number of pieces of attribute information. Note that, when APS is set for each piece of attribute information, a field or loop of num_of_attribute need not be included in APS.

attribute_type denotes the type of attribute information or, in other words, the kind of attribute information. Note that, when the type of attribute information is described in corresponding SPS, information that allows reference to the type of attribute information described in SPS may be included in APS instead of attribute_type.

In FIG. 119, the if sentence enclosed by dashed line 6701 indicates a QP value depending on attribute_type. For example, when the type of attribute information is color, the QP value for the luminance (luma) represented by an absolute value is indicated as a reference value, and the QP values for the chrominance (chroma: Cb, Cr) are indicated as difference information with respect to the QP value for the luminance.

On the other hand, when the type of attribute information is reflectance, the QP value for the reflectance represented by an absolute value is indicated. As another example, when the type of attribute information has no QP value, no QP value is indicated.

When there are two or more pieces of attribute information, the reference value (QP_value_Luma or QP_value in this example) for a piece of attribute information may be indicated by the difference from the reference value for another piece of attribute information. For example, in the loop of num_of_attribute, a reference value for common attribute information may be indicated when i=0, and a difference value with respect to the common attribute information may be indicated when i=>1.

data_QP_delata_present_flag is a flag that indicates whether a QP value for each piece of data (slice) is present in the header of the attribute information. When the flag is 1, a QP value for each piece of data (slice) is indicated in the header of the attribute information.

Next, a syntax example of the header of the attribute information will be described.

The header of the attribute information also includes aps_idx. Therefore, a correspondence between APS and the header of the attribute information is indicated by APS and aps_idx included in the header of the attribute information. That is, the fact that APS and the header of the attribute information shares aps_idx indicates that there is a correspondence between APS and the header of the attribute information.

attribute_type indicates the type of attribute information (kind of attribute information). Note that when the type of attribute information is described in the corresponding APS or SPS, information that allows reference to the type of attribute information described in APS or SPS may be included in the header of the attribute information, instead of attribute_type.

The QP values for the fields in the if sentence enclosed by dashed line 6702, specifically, QP_delata_data_to_frame, QP_delta1_to_frame, and QP_delta2_to_frame, are QP values for data corresponding to attribute_type. Each QP value indicates difference information with respect to the value described in APS.

A second example is a method of indicating a QP value for attribute information when metadata for one piece of attribute information is independently described in one APS. In the second example, various types (kinds) of attribute information have a common header structure, and therefore, a change of the syntax structure with the attribute information can be advantageously avoided.

FIG. 120 is a diagram showing a second example of the syntax of APS. FIG. 121 is a diagram showing a second example of the syntax of the header of attribute information.

APS includes a reference value and a difference value for a QP value of a frame. When data_QP_delta_present_flag of APS is 1, the header of the attribute information includes difference information with respect to the reference value for APS.

Here, the fields relating to QP values are always present, whether the type of attribute information is color, reflectance, or frame number, for example. APS has a first number of fields for storing N QP values (N is 2 or greater), regardless of the type of attribute information. Here, N is 3, for example.

When the type of attribute information is color, for example, QP_value in APS stores information that indicates a QP value for luma, and QP_delta1 and QP_delta2 store information that indicates QP values for chroma. For example, QP_value is a reference value, and QP_delta1 and QP_delta2 are difference information with respect to QP_value. That is, the QP_value for luma is indicated by QP_value, and the QP values for chroma are indicated by a value obtained by adding QP_delta1 to QP_value and a value obtained by adding QP_delta2 to QP_value. In this way, APS includes a reference value for a quantization parameter for quantizing corresponding attribute information.

Similarly, QP_delta_data_to_frame in the header of attribute information stores difference information on the QP_value for luma with respect to QP_value in corresponding APS. QP_delta1_to_frame and QP_delta2_to_frame may store difference information on QP values for chroma with respect to QP_delta1 and QP_delta2 in corresponding APS, respectively.

When the type of attribute information is reflectance, for example, QP_value in APS may store information that indicates a QP_value for reflectance, and QP_delta1 and QP_delta2 may store information that always indicates 0 or invalidity. Similarly, QP_delta_data_to_frame in the header of attribute information may store information that indicates a QP_value for reflectance, and QP_delta1_to_frame and QP_delta2_to_frame may store information that always indicates 0 or invalidity. In that case, the three-dimensional data decoding device need not use for decoding and may ignore the information stored in QP_delta1 and QP_delta2 storing information that indicates 0 or invalidity and QP_delta1_to_frame and QP_delta2_to_frame, regardless of the information.

As another example, when the type of attribute information has no QP value, all the fields in APS may store information that indicates 0 or invalidity. In that case, data_AP_delta_present_flag is also set at 0. In that case, the three-dimensional data decoding device need not use for decoding and may ignore the information stored in QP_delta1 and QP_delta2 storing information that indicates 0 or invalidity and QP_delta1_to_frame and QP_delta2_to_frame, regardless of the information. In this way, the three-dimensional data decoding device may ignore a parameter stored in a particular field of a plurality of fields in a header of particular attribute information that corresponds to a particular kind of attribute in the headers of a plurality of pieces of attribute information.

With such a configuration, QP values for different types of attribute information can be indicated by combinations of a reference value and difference information in a common syntax structure, so that the coding efficiency can be improved.

Note that when attribute information corresponding to one piece of geometry information includes two or more pieces of color information, the way of indicating the attribute information may be changed depending on the type of the attribute information. For example, the color information may be indicated by a common QP reference value and difference information, and a QP reference value for reflectance may be separately indicated in APS.

The present disclosure is not limited to the methods described with regard to Embodiments 8 and the present embodiment, and the reference value may be signaled separately from the difference information, or the difference information may be independently signaled as a reference value. For example, the combination of a reference value and difference information may be adaptively changed depending on the properties of data. For example, at least one reference value may be transmitted for a unit that need to be independently decoded, and difference information may be transmitted for a unit that need not be independently decoded. In this way, the functionality can be improved, and at the same time the code amount can be reduced.

Alternatively, the amount of information may be calculated for combinations of a reference value and difference information, and a combination of a reference value and difference information that has the minimum amount of information may be generated and delivered based on the result of the calculation. When adaptively changing the combination of a reference value and difference information, the meaning (semantics) of the field that indicates the reference value and the field that indicates the difference information may be adaptively changed. For example, the meaning of each field may be changed, such as by determining whether to set each field to be invalid or not according to the rules described above, or a flag that indicates to change the meaning of each field may be added. Alternatively, the reference destination for the reference value may be adaptively changed. In that case, a flag that indicates that the reference destination has been changed, or an Id or the like that allows identification of the reference destination may be indicated.

Figure 122:
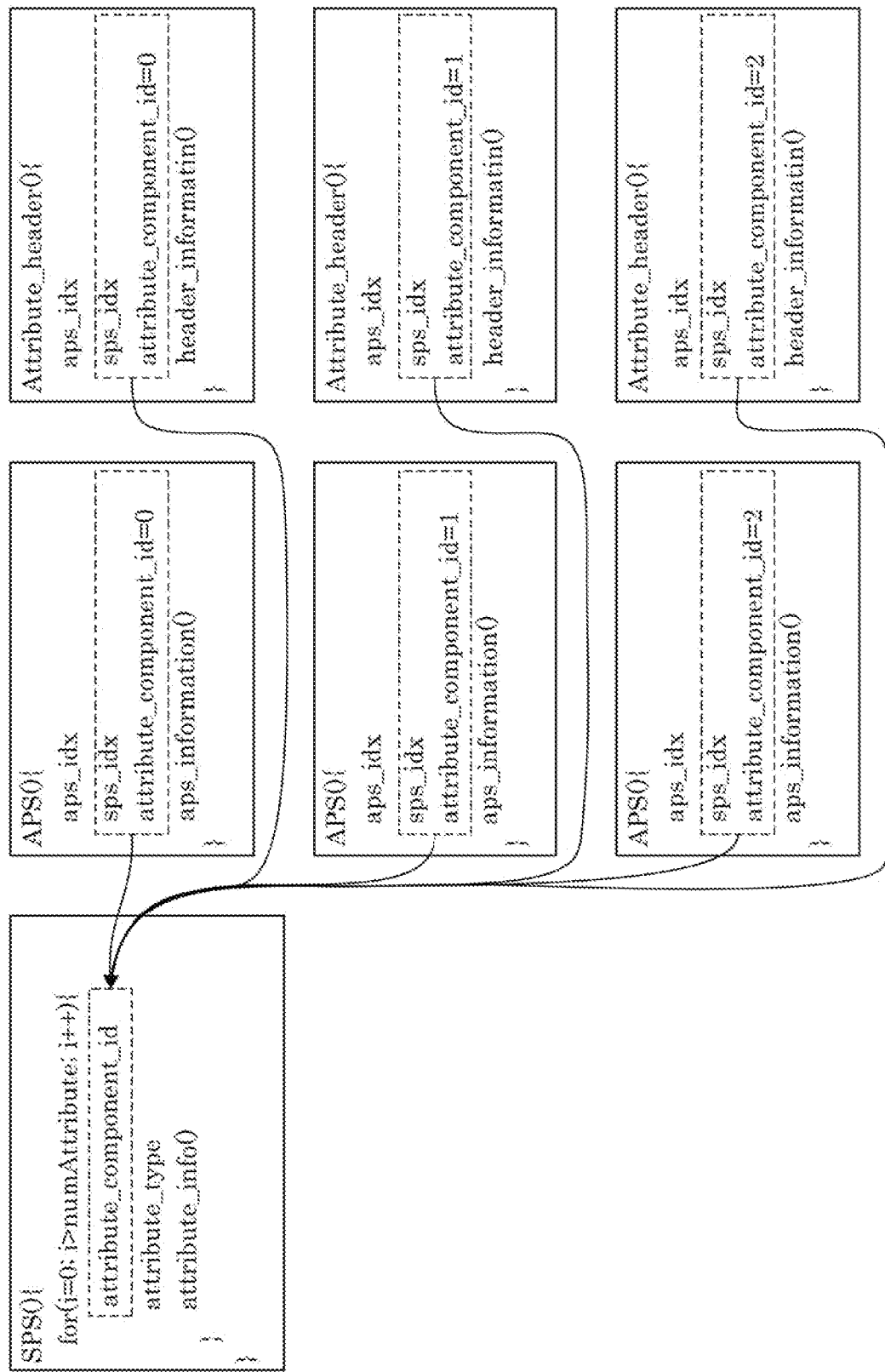

Next, with reference to FIG. 122, a method of indicating a relationship between attribute information described in SPS, APS, and Attribute header (header of attribute information) by using attribute_component_id will be described. FIG. 122 is a diagram showing a relationship between SPS, APS, and a header of attribute information. Note that the destination of the arrows in FIG. 122 indicates the reference destination.

SPS includes information concerning the types of a plurality of pieces of attribute information. That is, SPS may correspond to a plurality of pieces of attribute information and include a plurality of pieces of information attribute_type each of which indicates a different kind of attribute information. SPS also includes, for each type of attribute information, attribute_component_id that indicates a number that allows identification of the type of attribute information. Note that SPS is an example of control information. attribute_type is an example of type information. attribute_component_id included in SPS is an example of first identification information that indicates that first attribute control information is associated with one of a plurality of pieces of type information.

APS or Attribute header includes attribute_component_id that corresponds to attribute_component_id included in SPS. Note that APS is an example of second attribute control information. Attribute header is an example of first attribute control information. attribute_component_id included in APS is an example of second identification information that indicates that first attribute control information is associated with one of a plurality of pieces of type information.

The three-dimensional data decoding device refers to SPS indicated by sps_idx included in APS or Attribute header. The three-dimensional data decoding device then obtains the type of attribute information corresponding to attribute_component_id included in the APS or Attribute header from the referred SPS as the type of attribute information to which the information included in the APS or Attribute header corresponds. Note that one APS corresponds to one type of attribute information. The header of one piece of attribute information corresponds to one type of attribute information. Each of a plurality of APSs corresponds to the header(s) of one or more pieces of attribute information. That is, one APS corresponds to the header(s) of one or more pieces of attribute information other than the header(s) of one or more pieces of attribute information that correspond to another APS.

When attribute_component_id=0, for example, the three-dimensional data decoding device can obtain attribute information (such as attribute_type) that corresponds to attribute_component_id having the same value, that is, a value of 0, from SPS.

Note that, instead of attribute_component_id, the sequence of the pieces of attribute information described in SPS may be described in SPS. That is, type information that indicates a plurality of kinds of attribute information may be stored (described) in SPS in a predetermined sequence. In that case, attribute_component_id included in APS or Attribute header indicates that the APS or Attribute header including attribute_component_id is associated with type information at a position in the predetermined sequence.

Alternatively, the sequence of transmitted APSs or attribute information may be made to agree with the sequence of attribute information described in SPS, thereby allowing the three-dimensional data decoding device to derive the sequence of arrival of APSs or attribute information and refer to attribute information corresponding to the sequence of arrival. When point cloud data includes both attribute information whose APS or Attribute header may or may not be present depending on the frame and attribute information whose APS or Attribute header is always present regardless of the frame, the attribute information whose APS or Attribute header is always present regardless of the frame may be first transmitted, and then the attribute information whose APS or Attribute header may or may not be present depending on the frame may be transmitted.

Note that, although a plurality of APSs each of which corresponds to a plurality of pieces of attribute information is shown in one frame in FIGS. 118 and 122, one APS may be used, instead of the plurality of APSs. In that case, one APS includes attribute information-related information that corresponds to a plurality of pieces of attribute information.

aps_idx may include a sequence number that corresponds to a frame number. A correspondence between APS and Attribute header may be indicated in this way. Note that aps_idx may have a function of attribute_component_id. This allows information on the whole sequence concerning one or more kinds of APSs or attribute information to be stored in SPS and to be referred to from each APS or Attribute header.

Note that in order to allow determination of the kind (attribute_type) of the attribute information of APS or Attribute header, attribute_type may be directly included in APS or Attribute header, or may be included in a NAL unit header as a kind of the NAL unit.

In any case, the attribute information of APS or Attribute header can be obtained, and the kind of the attribute of the attribute information can be determined.

Figure 123:
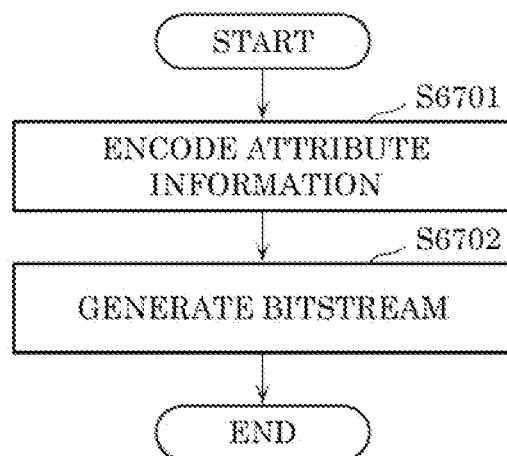

As stated above, the three-dimensional data encoding device according to the present embodiment performs the process shown by FIG. 123. First, the three-dimensional data encoding device encodes pieces of attribute information of respective three-dimensional points, using parameters (S6701). The three-dimensional data encoding device generates a bitstream including the pieces of attribute information encoded, control information, and pieces of first attribute control information (S6702). The control information corresponds to the pieces of attribute information and includes pieces of type information each indicating a type of different attribute information. Moreover, the pieces of first attribute control information correspond one-to-one with the pieces of attribute information. Each of the pieces of first attribute control information includes first identification information indicating that the first attribute control information is associated with one of the pieces of type information.

With such a configuration, since a bitstream including the first identification information for identifying the type of the attribute information to which the first attribute control information corresponds is generated, the three-dimensional data decoding device having received the bitstream can correctly and efficiently decode attribute information on a three-dimensional point.

For example, the pieces of type information are stored in the control information in a predetermined sequence. The first identification information indicates that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream further includes pieces of second attribute control information corresponding to the pieces of attribute information. Each of the pieces of second attribute control information includes a reference value of a parameter used for encoding a corresponding one of the pieces of attribute information.

With such a configuration, since each of a plurality of pieces of second attribute control information includes a reference value of a parameter, the attribute information to which the second attribute control information corresponds can be encoded using the reference value. With such a configuration, since the three-dimensional data decoding device having received the bitstream can identify the type of the second attribute information using the second identification information, the three-dimensional data decoding device can correctly and efficiently decode attribute information on a three-dimensional point.

For example, each of the pieces of first attribute control information includes difference information that is a difference from the reference value of the parameter. With such a configuration, the coding efficiency can be improved.

For example, the bitstream further includes pieces of second attribute control information corresponding to the pieces of attribute information. Each of the pieces of second attribute control information includes second identification information indicating that the second attribute control information is associated with one of the pieces of type information.

With such a configuration, since a bitstream including the second identification information for identifying the type of the attribute information to which the second attribute control information corresponds is generated, it is possible to generate the bitstream that can correctly and efficiently decode attribute information on a three-dimensional point.

For example, each of the pieces of first attribute control information includes N fields in which N parameters are stored, N being greater than or equal to 2. In specific first attribute control information among the pieces of first attribute control information, one of the N fields includes a value indicating invalidity, the specific first attribute control information corresponding to a specific type of an attribute.

With such a configuration, since the three-dimensional data decoding device having received the bitstream can identify the type of the first attribute information using the first identification information and omit the decoding process in the case of specific first attribute control information, the three-dimensional data decoding device can correctly and efficiently decode attribute information on a three-dimensional point.

For example, in the encoding, the pieces of attribute information are quantized using quantization parameters as the parameters.

With such a configuration, since a parameter is expressed using a difference from a reference value, it is possible to improve coding efficiency for quantization.

For example, the three-dimensional data encoding device includes a processor and memory, and the processor performs the above process using the memory.

Figure 124:
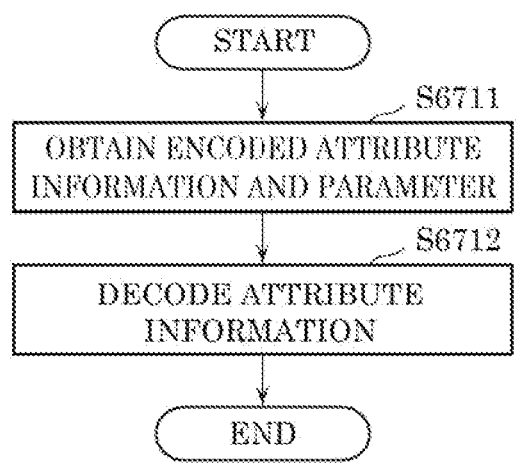

The three-dimensional data decoding device according to the present embodiment performs the process shown by FIG. 124. First, the three-dimensional data decoding device obtains pieces of attribute information encoded and parameters from a bitstream (S6711). The three-dimensional data decoding device decodes the pieces of attribute information encoded using the parameters, to generate pieces of attribute information of respective three-dimensional points (S6712). The bitstream includes control information and pieces of first attribute control information. The control information corresponds to the pieces of attribute information and includes pieces of type information each indicating a type of different attribute information. The pieces of first attribute control information correspond one-to-one with the pieces of attribute information. Each of the pieces of first attribute control information includes first identification information indicating that the first attribute control information is associated with one of the pieces of type information.

With such a configuration, since the three-dimensional data decoding device can identify the type of the attribute information corresponding to the first attribute control information using the first identification information, the three-dimensional data decoding device can correctly and efficiently decode attribute information on a three-dimensional point.

For example, the pieces of type information are stored in the control information in a predetermined sequence. The first identification information indicates that first attribute control information including the first identification information is associated with one of the pieces of type information that has an order in the predetermined sequence.

With such a configuration, since type information is indicated in a predetermined sequence without information indicating the type information, the amount of data of the bitstream can be reduced, and the amount of the transmitted bitstream can be reduced.

For example, the bitstream further includes pieces of second attribute control information corresponding to the pieces of attribute information. Each of the pieces of second attribute control information includes a reference value of a parameter used for encoding a corresponding one of the pieces of attribute information.

With such a configuration, since the three-dimensional data decoding device can decode the attribute information corresponding to the second attribute control information using a reference value, the three-dimensional data decoding device can correctly and efficiently decode attribute information on a three-dimensional point.

For example, each of the pieces of first attribute control information includes difference information that is a difference from the reference value of the parameter. With such a configuration, since it is possible to decode attribute information using a reference value and difference information, it is possible to correctly and efficiently decode attribute information on a three-dimensional point.

For example, the bitstream further includes pieces of second attribute control information corresponding to the pieces of attribute information. Each of the pieces of second attribute control information includes second identification information indicating that the second attribute control information is associated with one of the pieces of type information. With such a configuration, since it is possible to identify the type of the attribute information corresponding to the second attribute control information using the second identification information, it is possible to correctly and efficiently decode attribute information on a three-dimensional point.

Each of the pieces of first attribute control information includes fields in which parameters are stored. In the decoding, a parameter stored in a specific field among the fields of specific first attribute control information among the pieces of first attribute control information is ignored, the specific first attribute control information corresponding to a specific type of an attribute.

With such a configuration, since the three-dimensional data decoding device can identify the type of the first attribute information using the first identification information, the three-dimensional data decoding device can correctly and efficiently decode attribute information on a three-dimensional point.

For example, in the decoding, the pieces of attribute information encoded are inverse quantized using quantization parameters as the parameters.

With such a configuration, it is possible to correctly decode attribute information on a three-dimensional point.

For example, the three-dimensional data decoding device includes a processor and memory, and the processor performs the above process using the memory.

Embodiment 13

To achieve high compression, attribute information included in Point Cloud Compression (PCC) data is transformed in a plurality of methods, such as Lifting, Region Adaptive Hierarchical Transform (RAHT) and other transformation methods. Here, Lifting is one of transformation methods using Level of Detail (LoD).

Important signal information tends to be included in a low frequency component, and therefore the code amount is reduced by quantizing a high frequency component. That is, the transformation process has strong energy compression characteristics. In addition, the precision is reduced by the quantization according to the magnitude of the quantization parameter.

Figure 125:
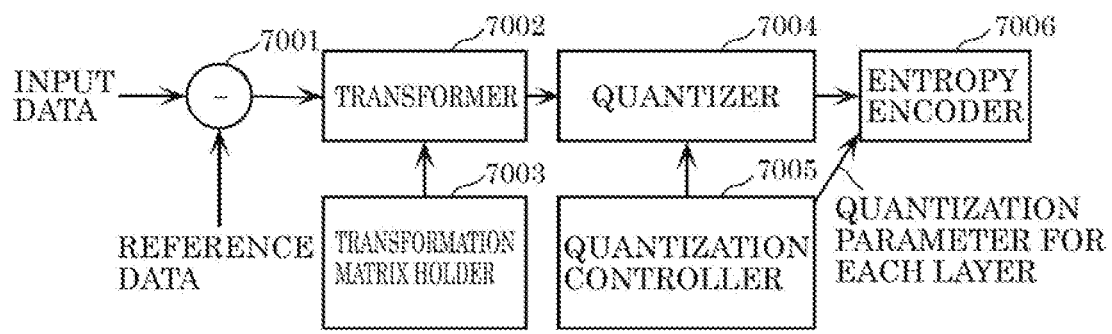

FIG. 125 is a block diagram showing a configuration of a three-dimensional data encoding device according to this embodiment. The three-dimensional data encoding device includes subtractor 7001, transformer 7002, transformation matrix holder 7003, quantizer 7004, quantization controller 7005, and entropy encoder 7006.

Subtractor 7001 calculates a coefficient value that is the difference between input data and reference data. For example, the input data is attribute information included in point cloud data, and the reference data is a predicted value of the attribute information.

Transformer 7002 performs a transformation process on the coefficient value. For example, the transformation process is a process of classifying a plurality of pieces of attribute information into LoDs. Note that the transformation process may be Haar transformation or the like. Transformation matrix holder 7003 holds a transformation matrix used for the transformation process by transformer 7002.

For example, the transformation matrix is a Haar transformation matrix. Note that although an example is shown here in which the three-dimensional data encoding device has both a function of performing a transformation process using LoDs and a function of performing a transformation process such as Haar transformation, the three-dimensional data encoding device may have only any one of the functions. Alternatively, the three-dimensional data encoding device may selectively use any of these two kinds of transformation processes. Alternatively, the three-dimensional data encoding device may change the transformation process to be used for each predetermined processing unit.

Quantizer 7004 quantizes the coefficient value to generate a quantized value. Quantization controller 7005 controls a quantization parameter used for the quantization by quantizer 7004. For example, quantization controller 7005 may change the quantization parameter (or quantization step) according to the hierarchical structure for the encoding. In this way, an appropriate quantization parameter can be selected for each layer of the hierarchical structure, so that the amount of codes occurring in each layer can be controlled. Quantization controller 7005 also sets quantization parameters for a certain layer and the layers lower than the certain layer that include a frequency component that has a small effect on the subjective image quality at a maximum value, and sets quantization coefficients for the certain layer and the layers lower than the certain layer at 0, for example. In this way, the occurring code amount can be reduced while reducing the deterioration of the subjective image quality. Quantization controller 7005 can also finely control the subjective image quality and the occurring code amount. The "layer" herein refers to a layer (at a depth in a tree structure) in LoD or RAHT (Haar transformation).

Entropy encoder 7006 entropy-encodes (arithmetically encodes, for example) the quantization coefficient to generate a bitstream. Entropy encoder 7006 also encodes the quantization parameter for each layer set by quantization controller 7005.

Figure 126:
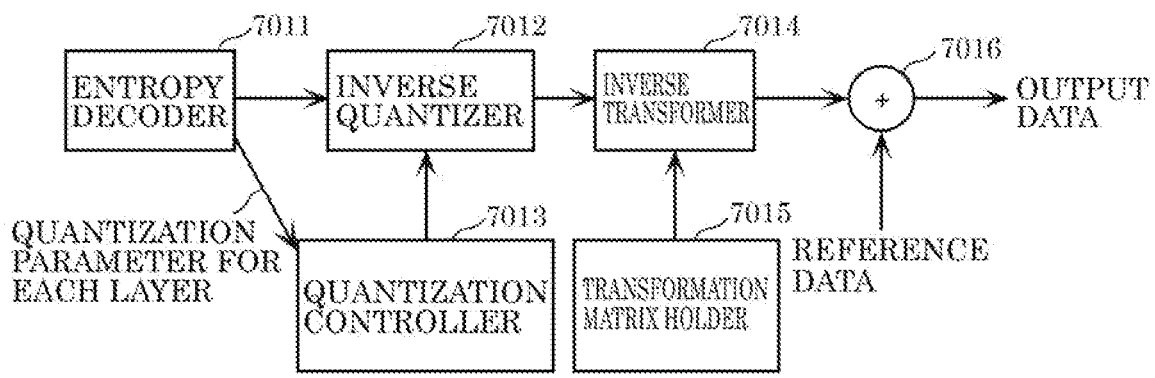

FIG. 126 is a block diagram showing a configuration of a three-dimensional data decoding device according to this embodiment. The three-dimensional data decoding device includes entropy decoder 7011, inverse quantizer 7012, quantization controller 7013, inverse transformer 7014, transformation matrix holder 7015, and adder 7016.

Entropy decoder 7011 decodes the quantization coefficient and the quantization parameter for each layer from the bitstream. Inverse quantizer 7012 inverse-quantizes the quantization coefficient to generate the coefficient value. Quantization controller 7013 controls the quantization parameter used for the inverse quantization by inverse quantizer 7012 based on the quantization parameter for each layer obtained in entropy decoder 7011.

Inverse transformer 7014 inverse-transforms the coefficient value. For example, inverse transformer 7014 performs inverse Haar transformation on the coefficient value. Transformation matrix holder 7015 holds a transformation matrix used for the inverse transformation process by inverse transformer 7014. For example, the transformation matrix is inverse Haar transformation matrix.

Adder 7016 adds the reference data to the coefficient value to generate output data. For example, the output data is attribute information included in point cloud data, and the reference data is a predicted value of the attribute information.

Next, the setting of a quantization parameter for each layer will be described. In the encoding of attribute information, such as Predicting/Lifting, a different quantization parameter is used for each LoD layer. For example, quantization parameters for lower layers are set to be smaller to increase the precision for the lower layers. In this way, the prediction precision for higher layers can be improved. Quantization parameters for higher layers can be set to be greater, thereby reducing the data amount. In this way, a quantization tree value (Qt) can be separately set for each LoD, according to the use plan of the user. Here, the quantization tree value is the quantization parameter, for example.

Figure 127:
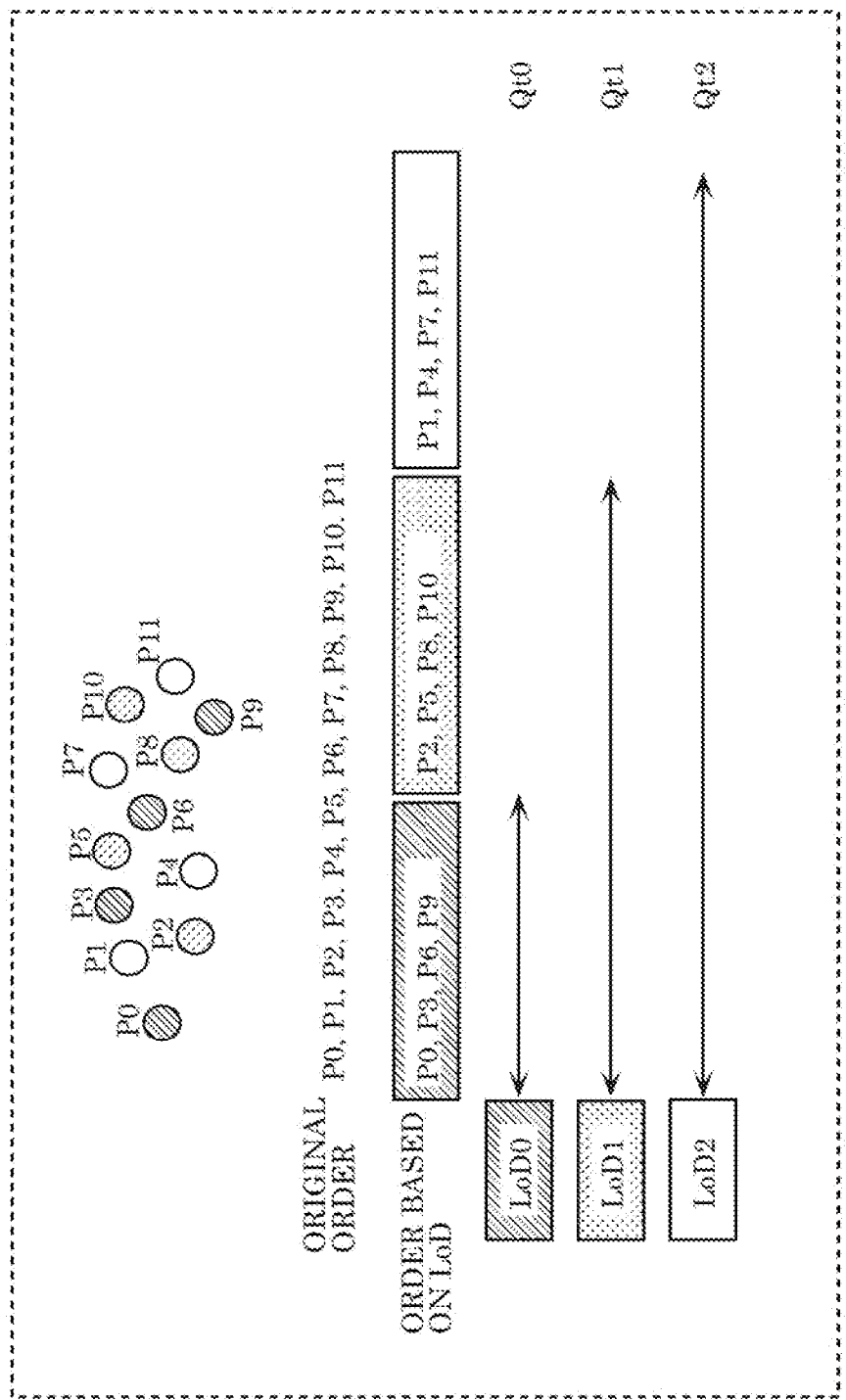

FIG. 127 is a diagram showing an example of the setting of LoDs. As shown in FIG. 127, for example, independent Qt0 to Qt2 are set for LoD0 to LoD2.

In the encoding of the attribute information using RAHT, different quantization parameters are used according to the depth in the tree structure. For example, quantization parameters for lower layers are set to be smaller to increase the precision for the lower layers. In this way, the prediction precision for higher layers can be improved. Quantization parameters for higher layers can be set to be greater, thereby reducing the data amount. In this way, a quantization tree value (Qt) can be separately set for each depth in the tree structure, according to the use plan of the user.

Figure 128:
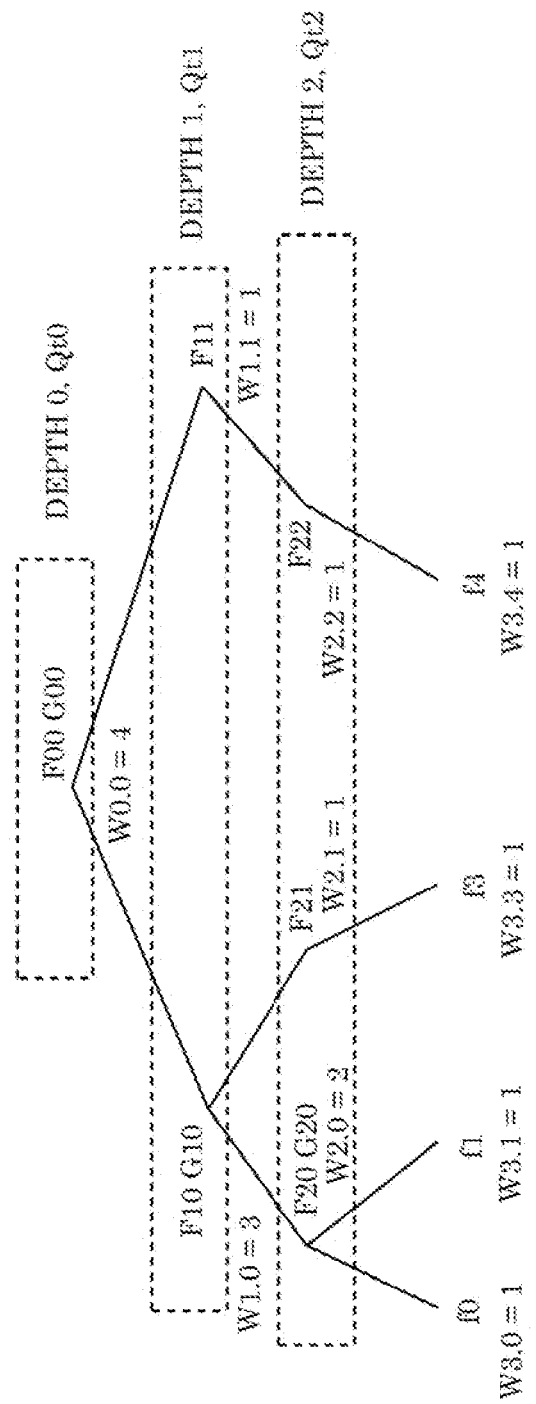

FIG. 128 is a diagram showing an example of a hierarchical structure (tree structure) of RAHT. As shown in FIG. 128, for example, independent Qt0 to Qt2 are set for depths in the tree structure.

Figure 129:
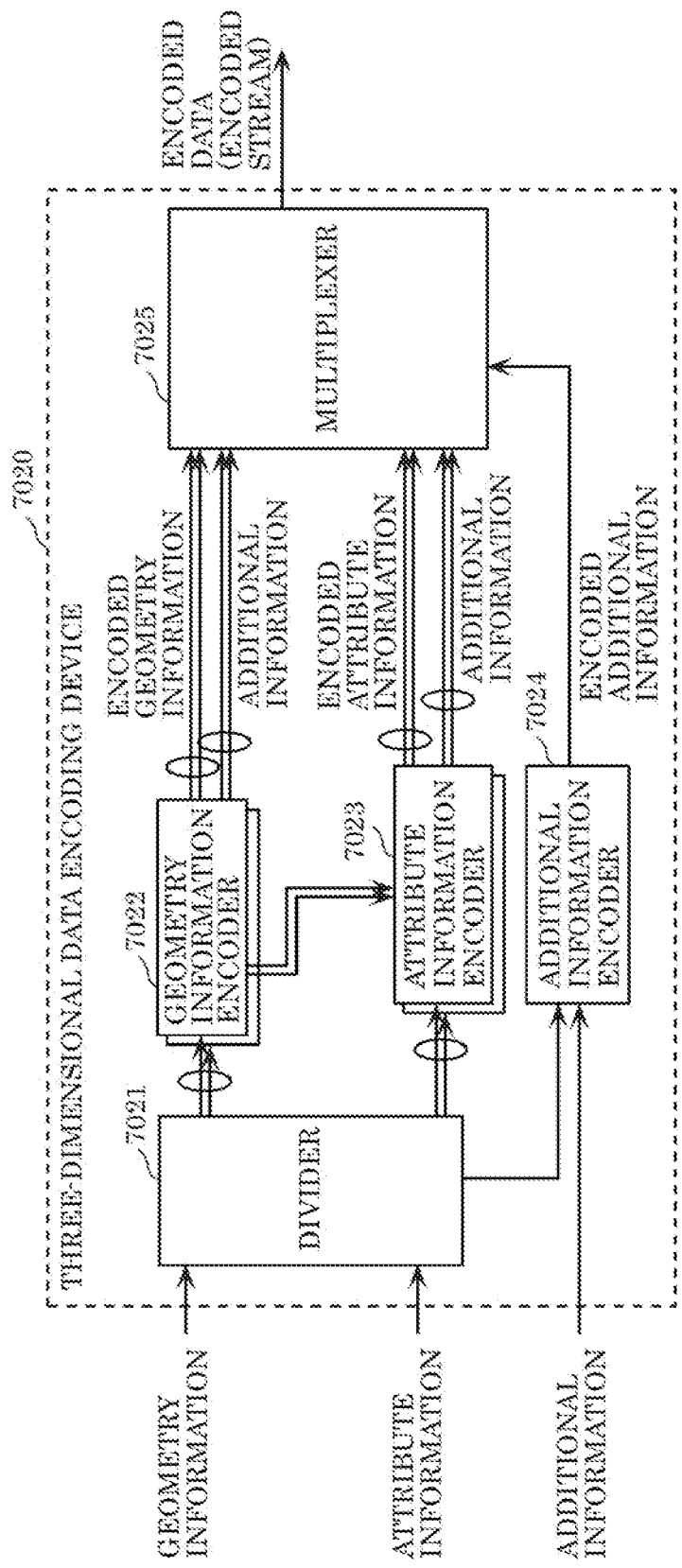

In the following, a configuration of a three-dimensional data encoding device according to this embodiment will be described. FIG. 129 is a block diagram showing a configuration of three-dimensional data encoding device 7020 according to this embodiment. Three-dimensional data encoding device 7020 encodes point cloud data (point cloud) to generate encoded data (encoded stream). Three-dimensional data encoding device 7020 includes divider 7021, a plurality of geometry information encoders 7022, a plurality of attribute information encoders 7023, additional information encoder 7024, and multiplexer 7025.

Divider 7021 generates a plurality of pieces of divisional data by dividing point cloud data. Specifically, divider 7021 generates a plurality of pieces of divisional data by dividing a space of point cloud data into a plurality of subspaces. Here, a subspace is a combination of tiles or slices or a combination of tiles and slices. More specifically, point cloud data includes geometry information, attribute information (such as color or reflectance), and additional information. Divider 7021 divides geometry information into a plurality of pieces of divisional geometry information, and divides attribute information into a plurality of pieces of divisional attribute information. Divider 7021 also generates additional information concerning the division.

Divider 7021 first divides a point cloud into tiles, for example. Divider 7021 then further divides the resulting tiles into slices.

The plurality of geometry information encoders 7022 generate a plurality of pieces of encoded geometry information by encoding a plurality of pieces of divisional geometry information. For example, geometry information encoders 7022 encode divisional geometry information using an N-ary tree structure, such as an octree. Specifically, in the case of an octree, a current space is divided into eight nodes (subspaces), and 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined layer is reached or the number of the point clouds included in each node becomes equal to or less than a threshold. For example, the plurality of geometry information encoders 7022 process a plurality of pieces of divisional geometry information in parallel.

Attribute information encoder 7023 generates encoded attribute information, which is encoded data, by encoding attribute information using configuration information generated by geometry information encoder 7022. For example, attribute information encoder 7023 determines a reference point (reference node) that is to be referred to in encoding a current point (current node) to be processed based on the octree structure generated by geometry information encoder 7022. For example, attribute information encoder 7023 refers to a node whose parent node in the octree is the same as the parent node of the current node, of peripheral nodes or neighboring nodes. Note that the method of determining a reference relationship is not limited to this method.

The process of encoding geometry information or attribute information may include at least one of a quantization process, a prediction process, and an arithmetic encoding process. In this case, "refer to" means using a reference node for calculation of a predicted value of attribute information or using a state of a reference node (occupancy information that indicates whether a reference node includes a point cloud or not, for example) for determination of a parameter of encoding. For example, the parameter of encoding is a quantization parameter in the quantization process or a context or the like in the arithmetic encoding.

Additional information encoder 7024 generates encoded additional information by encoding the additional information included in the point cloud data and the additional information concerning the data division generated in the division by divider 7021.

Multiplexer 7025 generates encoded stream (encoded stream) by multiplexing the plurality of pieces of encoded geometry information, the plurality of pieces of encoded attribute information, and the encoded additional information, and transmits the generated encoded data. The encoded additional information is used in the decoding.

Figure 130:
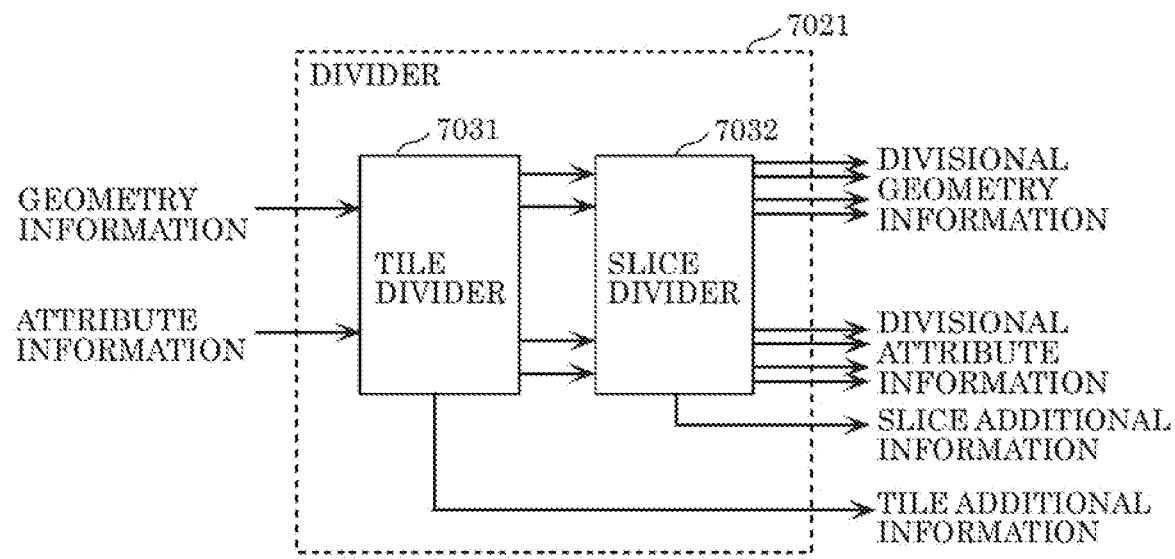

FIG. 130 is a block diagram of divider 7021. Divider 7021 includes tile divider 7031 and slice divider 7032.

Tile divider 7031 generates a plurality of pieces of tile geometry information by dividing geometry information (position (geometry)) into tiles. Tile divider 7031 generates a plurality of pieces of tile attribute information by dividing attribute information (attribute) into tiles. Tile divider 7031 also outputs tile additional information (Tile MetaData) including information concerning the tile division and information generated in the tile division.

Slice divider 7032 generates a plurality of pieces of divisional geometry information (a plurality of pieces of slice geometry information) by dividing a plurality of pieces of tile geometry information into slices. Slice divider 7032 generates a plurality of pieces of divisional attribute information (a plurality of pieces of slice attribute information) by dividing a plurality of pieces of tile attribute information into slices. Slice divider 7032 also outputs slice additional information (Slice MetaData) including information concerning the slice division and information generated in the slice division.

Tile divider 7031 and slice divider 7032 also determine a quantization tree value (quantization parameter) based on the generated additional information.

FIG. 131 is a block diagram of attribute information encoder 7023. Attribute information encoder 7023 includes transformer 7035, quantizer 7036, and entropy encoder 7037.

Transformer 7035 classifies the divisional attribute information into layers, such as LoDs, and generates a coefficient value (difference value) by calculating the difference between the divisional attribute information and the predicted value. Note that transformer 7035 may generate the coefficient value by performing the Haar transformation on the divisional attribute information.

Quantizer 7036 generates a quantized value by quantizing the coefficient value. Specifically, quantizer 7036 divides the coefficient by a quantization step based on the quantization parameter. Entropy encoder 7037 generates encoded attribute information by entropy-encoding the quantized value.

In the following, a configuration of a three-dimensional data decoding device according to this embodiment will be described. FIG. 132 is a block diagram showing a configuration of three-dimensional data decoding device 7040. Three-dimensional data decoding device 7040 reproduces point cloud data by decoding encoded data (encoded stream) generated by encoding the point cloud data. Three-dimensional data decoding device 7040 includes demultiplexer 7041, a plurality of geometry information decoders 7042, a plurality of attribute information decoders 7043, additional information decoder 7044, and combiner 7045.

Demultiplexer 7041 generates a plurality of pieces of encoded geometry information, a plurality of pieces of encoded attribute information, and encoded additional information by demultiplexing encoded data (encoded stream).

The plurality of geometry information decoders 7042 generates a plurality of pieces of divisional geometry information by decoding a plurality of pieces of encoded geometry information. For example, the plurality of geometry information decoders 7042 process a plurality of pieces of encoded geometry information in parallel.

The plurality of attribute information decoders 7043 generate a plurality of pieces of divisional attribute information by decoding a plurality of pieces of encoded attribute information. For example, the plurality of attribute information decoders 7043 process a plurality of pieces of encoded attribute information in parallel.

A plurality of additional information decoders 7044 generate additional information by decoding encoded additional information.

Combiner 7045 generates geometry information by combining a plurality of pieces of divisional geometry information using additional information. Combiner 7045 generates attribute information by combining a plurality of pieces of divisional attribute information using additional information.

FIG. 133 is a block diagram of attribute information decoder 7043. Attribute information decoder 7043 includes entropy decoder 7051, inverse quantizer 7052, and inverse transformer 7053. Entropy decoder 7051 generates a quantized value by entropy-decoding encoded attribute information. Inverse quantizer 7052 generates a coefficient value by inverse-quantizing the quantized value. Specifically, inverse quantizer 7052 multiplies the coefficient value by a quantization step based on the quantization tree value (quantization parameter) obtained from the bitstream. Inverse transformer 7053 generates divisional attribute information by inverse-transforming the coefficient value. Here, the inverse transformation is a process of adding the predicted value to the coefficient value, for example. Alternatively, the inverse transformation is the inverse Haar transformation.

In the following, an example of a method of determining a quantization parameter will be described. FIG. 134 is a diagram showing an example of the setting of a quantization parameter in the tile division and the slice division.

When the value of the quantization parameter is small, the original information is likely to be maintained. For example, a default value of the quantization parameter is 1. For example, in the encoding process using tiles of PCC data, a quantization parameter for a tile of a main road is set to be a small value, in order to maintain the data quality. On the other hand, a quantization parameter for a tile of a peripheral area is set to be a great value. In this way, the coding efficiency can be improved, while the data quality of the peripheral area decreases.

Similarly, in the encoding process using slices of PCC data, a sidewalk, a tree, and a building are important in the self-position estimation and mapping, and a quantization parameter for a slice of a sidewalk, a tree, or a building is set to be a small value. On the other hand, a moving body or other objects is less important, so that a quantization parameter for a slice of a moving body or other objects is set to be a great value.

When $\Delta QP$ (DeltaQP) described later is used, in the encoding of a three-dimensional point belonging to an important area, such as a main road, the three-dimensional data encoding device may perform the encoding by setting the value of $\Delta QP$ to be a negative value to reduce the quantization error, in order to decrease the quantization parameter. In this way, the decoded attribute value of the three-dimensional point belonging to the important area can be brought close to the value before the encoding. In the encoding of a three-dimensional point belonging to an area that is not important, such as a peripheral area, the three-dimensional data encoding device may set the value of $\Delta QP$ to be a positive value to reduce the information amount, in order to increase the quantization parameter. In this way, the total code amount can be reduced, while maintaining the amount of information on the important area.

In the following, an example of information that indicates a quantization parameter for each layer will be described. In encoding attribute information on a three-dimensional point by quantization, a scheme for controlling quantization parameters on a finer unit basis is introduced in addition to quantization parameter QPbase for a frame, a slice, a tile, or the like. For example, when encoding attribute information using LoDs, the three-dimensional data encoding device perform the encoding by changing the value of the quantization parameter for each LoD by providing Delta_Layer for each LoD and adding Delta_Layer to the value of QPbase for each LoD. The three-dimensional data encoding device also adds Delta_Layer used for the encoding to a header or the like of the bitstream. In this way, the three-dimensional data encoding device can encode attribute information on a three-dimensional point by changing the quantization parameter for each LoD according to a desired code amount and an actual code amount, for example, and therefore can finally generate a bitstream having a code amount close to the desired code amount. The three-dimensional data decoding device can properly decode the bitstream by decoding QPbase and Delta_Layer included in the header to generate the quantization parameters used by the three-dimensional data encoding device.

FIG. 135 is a diagram showing an example in which attribute information on all three-dimensional points are encoded using quantization parameter QPbase. FIG. 136 is a diagram showing an example in which encoding is performed by changing the quantization parameter for each LoD layer. In the example shown in FIG. 136, the quantization parameter for the leading LoD is calculated by adding Delta_Layer of the leading LoD to QPbase. For the second and following LoDs, the quantization parameter for the LoD being processed is calculated by adding Delta_Layer of the LoD being processed to the quantization parameter for the immediately preceding LoD. For example, quantization parameter QP3 of at the head of LoD3 is calculated according to QP3=QP2+Delta_Layer[3].

Note that Delta_Layer[i] for each LoD may indicate the difference value with respect to QPbase. That is, quantization parameter QPi of i-th LoDi is indicated by QPi=QPbase+Delta_Layer[i]. For example, QP1=QPbase+Delta_Layer[1], and QP2=QPbase+Delta_Layer[2].

FIG. 137 is a diagram showing a syntax example of an attribute information header (attribute header information). Here, the attribute information header is a header on a frame, slice or tile basis, for example, and is a header of attribute information. As shown in FIG. 137, the attribute information header includes QPbase (reference quantization parameter), NumLayer (number of layers), and Delta_Layer[i] (differential quantization parameter).

QPbase indicates the value of a reference quantization parameter for a frame, a slice, a tile, or the like. NumLayer indicates the number of layers of LoD or RAHT. In other words, NumLayer indicates the number of all Delta_Layer[i] included in the attribute information header.

Delta_Layer[i] indicates the value of ΔQP for layer i. Here, ΔQP is a value obtained by subtracting the quantization parameter for layer i from the quantization parameter for layer i−1. Note that ΔQP may be a value obtained by subtracting the quantization parameter for layer i from QPbase. ΔQP can assume a positive or negative value. Note that Delta_Layer[0] need not be added to the header. In that case, the quantization parameter for layer 0 is equal to QPbase. In this way, the code amount of the header can be reduced.

FIG. 138 is a diagram showing another syntax example of an attribute information header (attribute header information). The attribute information header shown in FIG. 138 differs from the attribute information header shown in FIG. 137 in that the attribute information header further includes delta_Layer_present_flag.

delta_Layer_present_flag is a flag that indicates whether Delta_Layer is included in the bitstream or not. For example, a value of 1 indicates that Delta_Layer is included in the bitstream, and a value of 0 indicates that Delta_Layer is not included in the bitstream. When delta_Layer_present_flag is 0, the three-dimensional data decoding device performs the following decoding process by setting Delta_Layer to be 0, for example.

Note that although examples have been described here in which the quantization parameter is indicated by QPbase and Delta_Layer, a quantization step may be indicated by QPbase and Delta_Layer. The quantization step is calculated from the quantization parameter using a formula, a table or the like determined in advance. In the quantization process, the three-dimensional data encoding device divides the coefficient value by the quantization step. In the inverse quantization process, the three-dimensional data decoding device reproduces the coefficient value by multiplying the quantized value by the quantization step.

Next, an example in which the quantization parameters are controlled on a finer unit basis will be described. FIG. 139 is a diagram showing an example in which the quantization parameters are controlled on a basis of a unit finer than LoD.

For example, when encoding attribute information using LoD, the three-dimensional data encoding device defines ADelta_QP and NumPointADelta, which represents the geometry information on a three-dimensional point to which ADelta_QP is to be added, in addition to Delta_Layer for each LoD layer. The three-dimensional data encoding device performs the encoding by changing the value of the quantization parameter based on Delta_Layer, ADelta_QP, and NumPointADelta.

The three-dimensional data encoding device may add ADelta and NumPointADelta used for the encoding to the header or the like of the bitstream. This allows the three-dimensional data encoding device to encode attribute information on a plurality of three-dimensional points by changing the quantization parameter for each three-dimensional point according to the desired code amount and the actual code amount, for example. In this way, the three-dimensional data encoding device can finally generate a bitstream having a code amount close to the desired code amount. The three-dimensional data decoding device can properly decode the bitstream by decoding QPbase, Delta_Layer, and ADelta included in the header to generate the quantization parameters used by the three-dimensional data encoding device.

For example, as shown in FIG. 139, quantized value QP4 of N0-th attribute information is calculated according to QP4=QP3+ADelta_QP[0].

An encoding/decoding order reverse to the encoding/decoding order shown in FIG. 139 can also be used. For example, encoding/decoding can also be performed in the order of LoD3, LoD2, LoD1, and then LoD0.

FIG. 140 is a diagram showing a syntax example of an attribute information header (attribute header information) in the case where the example shown in FIG. 139 is used. The attribute information header shown in FIG. 140 differs from the attribute information header shown in FIG. 137 in that the attribute information header further includes NumADelta, NumPointADelta[i], and ADelta_QP[i].

NumADelta indicates the number of all ADelta_QP included in the bitstream. NumPointADelta[i] indicates an identification number of three-dimensional point A to which ADelta_QP[i] is applied. For example, NumPointADelta[i] indicates the number of the three-dimensional points from the leading three-dimensional point to three-dimensional point A in the encoding/decoding order. NumPointADelta[i] may also indicates the number of the three-dimensional points from the first three-dimensional point to three-dimensional point A in the LoD to which three-dimensional point A belongs.

Alternatively, NumPointADelta[i] may indicate the difference value between the identification number of the three-dimensional point indicated by NumPointADelta[i−1] and the identification number of three-dimensional point A. In this way, the value of NumPointADelta[i] can be reduced, so that the code amount can be reduced.

ADelta_QP[i] indicates the value of ΔQP of the three-dimensional point indicated by NumPointADelta[i]. That is, ADelta_QP[i] indicates the difference between the quantization parameter of the three-dimensional point indicated by NumPointADelta[i] and the quantization parameter of the three-dimensional point immediately preceding that three-dimensional point.

FIG. 141 is a diagram showing another syntax example of an attribute information header (attribute header information) in the case where the example shown in FIG. 139 is used. The attribute information header shown in FIG. 141 differs from the attribute information header shown in FIG. 140 in that the attribute information header further includes delta_Layer_present_flag and additional_delta_QP_present_flag and includes NumADelta_minus1 instead of NumADelta.

delta_Layer_present_flag is the same as that already described with reference to FIG. 138.

additional_delta_QP_present_flag is a flag that indicates whether ADelta_QP is included in the bitstream or not. For example, a value of 1 indicates that ADelta_QP is included in the bitstream, and a value of 0 indicates that ADelta_QP is not included in the bitstream. When additional_delta_QP_present_flag is 0, the three-dimensional data decoding device performs the following decoding process by setting ADelta_QP to be 0, for example.

NumADelta_minus1 indicates the number of all ADelta_QP included in the bitstream minus 1. In this way, by adding the value obtained by subtracting 1 from the number of ADelta_QP to the header, the code amount of the header can be reduced. For example, the three-dimensional data decoding device calculates NumADelta=NumADelta_minus1+1. ADelta_QP[i] indicates the value of i-th ADelta_QP. Note that ADelta_QP[i] can be set to be not only a positive value but also a negative value.

FIG. 142 is a flowchart of a three-dimensional data encoding process according to this embodiment. First, the three-dimensional data encoding device encodes geometry information (geometry) (S7001). For example, the three-dimensional data encoding device performs the encoding using an octree representation.

The three-dimensional data encoding device then transforms attribute information (S7002). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7003). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

FIG. 143 is a flowchart of the attribute information encoding process (S7003). First, the three-dimensional data encoding device sets an LoD (S7011). That is, the three-dimensional data encoding device assigns each three-dimensional point to any of a plurality of LoDs.

The three-dimensional data encoding device then starts a loop on an LoD basis (S7012). That is, the three-dimensional data encoding device repeatedly performs the process from step S7013 to step S7021 for each LoD.

The three-dimensional data encoding device then starts a loop on a basis of a three-dimensional point (S7013). That is, the three-dimensional data encoding device repeatedly performs the process from step S7014 to step S7020 for each three-dimensional point.

First, the three-dimensional data encoding device searches for a plurality of peripheral points, which are three-dimensional points present in the periphery of the current three-dimensional point, that are to be used for calculation of a predicted value of the current three-dimensional point to be processed (S7014). The three-dimensional data encoding device then calculates a weighted average of values of the attribute information on the plurality of peripheral points, and sets the obtained value as predicted value P (S7015). The three-dimensional data encoding device then calculates a prediction residual, which is the difference between the attribute information and the predicted value of the current three-dimensional point (S7016). The three-dimensional data encoding device then calculates a quantized value by quantizing the prediction residual (S7017). The three-dimensional data encoding device then arithmetically encodes the quantized value (S7018). The three-dimensional data encoding device then determines ΔQP (S7019). ΔQP determined here is used for determining a quantization parameter used for quantization of a subsequent prediction residual.

The three-dimensional data encoding device then calculates an inverse-quantized value by inverse-quantizing the quantized value (S7020). The three-dimensional data encoding device then generates a decoded value by adding the predicted value to the inverse-quantized value (S7021). The three-dimensional data encoding device then ends the loop on a basis of a three-dimensional point (S7022). The three-dimensional data encoding device also ends the loop on a LoD basis (S7023).

FIG. 144 is a flowchart of the ΔQP determination process (S7019). First, the three-dimensional data encoding device calculates layer i to which current three-dimensional point A to be encoded next belongs and encoding order N (S7031). Layer i indicates a LoD layer or a RAHT layer, for example.

The three-dimensional data encoding device then adds the actual code amount to a cumulative code amount (S7032). Here, the cumulative code amount refers to a cumulative code amount for one frame, one slice, or one tile of the current three-dimensional point. Note that the cumulative code amount may refer to a cumulative code amount for a plurality of frames, a plurality of slices, or a plurality of tiles. Alternatively, a cumulative code amount of attribute information may be used, or a cumulative code amount of both geometry information and attribute information may be used.

The three-dimensional data encoding device then determines whether the cumulative code amount is greater than the desired code amount×TH1 or not (S7033). Here, the desired code amount refers to a desired code amount for one frame, one slice, or one tile of the current three-dimensional point. Note that the desired code amount may refer to a desired code amount for a plurality of frames, a plurality of slices, or a plurality of tiles. Alternatively, a desired code amount of attribute information may be used, or a desired code amount of both geometry information and attribute information may be used.

When the cumulative code amount is equal to or smaller than the desired code amount×TH1 (if No in S7033), the three-dimensional data encoding device determines whether the cumulative code amount is greater than the desired code amount×TH2 or not (S7036).

Here, as thresholds TH1 and TH2, values from 0.0 to 1.0 are set, for example. In addition, TH1>TH2. For example, when the cumulative code amount is greater than the value of the desired code amount×TH1 (if Yes in S7033), the three-dimensional data encoding device determines that the code amount needs to be reduced as early as possible, and sets ADelta_QP to value $\alpha$ in order to increase the quantization parameter for next three-dimensional point N. The three-dimensional data encoding device also sets NumPointADelta to value N, and increment j by 1 (S7034). The three-dimensional data encoding device then adds ADelta_QP=$\alpha$ and NumPointADelta=N to the header (S7035). Note that value $\alpha$ may be a fixed value or a variable value. For example, the three-dimensional data encoding device may determine value a based on the magnitude of the difference between the cumulative code amount and the desired code amount×TH1. For example, the three-dimensional data encoding device sets value $\alpha$ to be greater as the difference between the cumulative code amount and the desired code amount×TH1 increases. In this way, the three-dimensional data encoding device can control the quantization parameter so that the cumulative code amount does not exceed the desired code amount.

When the cumulative code amount is greater than the desired code amount×TH2 (if Yes in S7036), the three-dimensional data encoding device sets Delta_Layer to value $\beta$ in order to increase the quantization parameter for layer i to which current three-dimensional point A belongs or the subsequent layer i+1 (S7037). For example, the three-dimensional data encoding device sets Delta_Layer[i] of layer i to be value $\beta$ when current three-dimensional point A is at the top of layer i, and sets Delta_Layer[i+1] of layer i+1 to be value $\beta$ when current three-dimensional point A is not at the top of layer i.

The three-dimensional data encoding device adds Delta_Layer=$\beta$ of layer i or layer i+1 to the header (S7038). Note that value $\beta$ may be a fixed value or a variable value. For example, the three-dimensional data encoding device may determine value $\beta$ based on the magnitude of the difference between the cumulative code amount and the desired code amount×TH2. For example, the three-dimensional data encoding device sets value $\beta$ to be greater as the difference between the cumulative code amount and the desired code amount×TH2 increases. In this way, the three-dimensional data encoding device can control the quantization parameter so that the cumulative code amount does not exceed the desired code amount.

If the cumulative code amount exceeds or is about to exceed the desired code amount, the three-dimensional data encoding device may set the value of ADelta_QP or Delta_Layer so that the quantization parameter assumes the maximum value supported by the standard or the like. In this way, the three-dimensional data encoding device can set the quantization coefficient for points subsequent to three-dimensional point A or layers subsequent to layer i to be 0, thereby reducing the increase of the actual code amount and preventing the cumulative code amount from exceeding the desired code amount.

If the cumulative code amount is smaller than the desired code amount×TH3, the three-dimensional data encoding device may decrease the quantization parameter so that the actual code amount increases. For example, the three-dimensional data encoding device may decrease the quantization parameter by setting the value of Delta_Layer or ADelta_QP to be a negative value depending on the difference between the cumulative code amount and the desired code amount. In this way, the three-dimensional data encoding device can generate a bitstream having a code amount close to the desired code amount.

FIG. 145 is a flowchart of a three-dimensional data decoding process according to this embodiment. First, the three-dimensional data decoding device decodes geometry information (geometry) from the bitstream (S7005). For example, the three-dimensional data decoding device performs the decoding using an octree representation.

The three-dimensional data decoding device then decodes attribute information from the bitstream (S7006). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device may decode the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

FIG. 146 is a flowchart of the attribute information decoding process (S7006). First, the three-dimensional data decoding device sets an LoD (S7041). That is, the three-dimensional data decoding device assigns each of a plurality of three-dimensional points having decoded geometry information to any of a plurality of LoDs. For example, the method of the assignment is the same as the method of assignment used in the three-dimensional data encoding device.

The three-dimensional data decoding device then decodes ΔQP from the bitstream (S7042). Specifically, the three-dimensional data decoding device decodes Delta_Layer, ADelta_QP, and NumPointADelta from the header of the bitstream.

The three-dimensional data decoding device then starts a loop on an LoD basis (S7043). That is, the three-dimensional data decoding device repeatedly performs the process from step S7044 to step S7050 for each LoD.

The three-dimensional data decoding device then starts a loop on a basis of a three-dimensional point (S7044). That is, the three-dimensional data decoding device repeatedly performs the process from step S7045 to step S7049 for each three-dimensional point.

First, the three-dimensional data decoding device searches for a plurality of peripheral points, which are three-dimensional points present in the periphery of the current three-dimensional point, that are to be used for calculation of a predicted value of the current three-dimensional point to be processed (S7045). The three-dimensional data decoding device then calculates a weighted average of values of the attribute information on the plurality of peripheral points, and sets the obtained value as predicted value P (S7046). Note that these processings are the same as those in the three-dimensional data encoding device.

The three-dimensional data decoding device then arithmetically decodes the quantized value from the bitstream (S7047). The three-dimensional data decoding device then calculates an inverse-quantized value by inverse-quantizing the decoded quantized value (S7048). In this inverse quantization, a quantization parameter calculated using ΔQP obtained in step S7042 is used.

The three-dimensional data decoding device then generates a decoded value by adding the predicted value to the inverse-quantized value (S7049). The three-dimensional data decoding device then ends the loop on a basis of a three-dimensional point (S7050). The three-dimensional data decoding device also ends the loop on a LoD basis (S7051).

FIG. 147 is a block diagram of attribute information encoder 7023. Attribute information encoder 7023 includes LoD setter 7061, searcher 7062, predictor 7063, subtractor 7064, quantizer 7065, inverse quantizer 7066, reconstructor 7067, memory 7068, and ΔQP calculator 7070.

LoD setter 7061 generates a LoD using geometry information on a three-dimensional point. Searcher 7062 searches for a neighboring three-dimensional point of each three-dimensional point using a LoD generation result and distance information between three-dimensional points. Predictor 7063 generates a predicted value of attribute information of a current three-dimensional point. Predictor 7063 also assigns a predicted value to a plurality of prediction modes 0 to M−1, and selects a prediction mode to be used from the plurality of prediction modes.

Subtractor 7064 generates a prediction residual by subtracting the predicted value from the attribute information. Quantizer 7065 quantizes the prediction residual of the attribute information. Inverse quantizer 7066 inverse-quantizes the quantized prediction residual. Reconstructor 7067 generates a decoded value by summing the predicted value and the inverse-quantized prediction residual. Memory 7068 stores the value (decoded value) of the decoded attribute information on each three-dimensional point. The decoded attribute information on the three-dimensional points stored in memory 7068 is used for prediction of a three-dimensional point yet to be encoded by predictor 7063.

Arithmetic encoder 7069 calculates ZeroCnt from the quantized prediction residual, and arithmetically encodes ZeroCnt. Arithmetic encoder 7069 also arithmetically encodes any quantized prediction residual that is not zero. Arithmetic encoder 7069 may binarize the prediction residual before the arithmetic encoding. Arithmetic encoder 7069 may generate and encode various kinds of head information. Arithmetic encoder 7069 may arithmetically encode prediction mode information (PredMode) that indicates the prediction mode used for the encoding by predictor 7063, and add the information to the bitstream.

ΔQP calculator 7070 determines values of Delta_Layer, ADelta_QP, and NumPointADelta from the actual code amount obtained by arithmetic encoder 7069 and the predetermined desired code amount. The quantization by quantizer 7065 is performed using a quantization parameter based on the determined Delta_Layer, ADelta_QP, and NumPointADelta. Arithmetic encoder 7069 arithmetically encodes Delta_Layer, ADelta_QP, and NumPointADelta and adds these values to the bitstream.

FIG. 148 is a block diagram of attribute information decoder 7043. Attribute information decoder 7043 includes arithmetic decoder 7071, LoD setter 7072, searcher 7073, predictor 7074, inverse quantizer 7075, reconstructor 7076, and memory 7077.

Arithmetic decoder 7071 arithmetically decodes ZeroCnt and the prediction residual included in the bitstream. Arithmetic decoder 7071 also decodes various kinds of header information. Arithmetic decoder 7071 also arithmetically decodes prediction mode information (PredMode) from the bitstream, and outputs the obtained prediction mode information to predictor 7074. Arithmetic decoder 7071 also decodes Delta_Layer, ADelta_QP, and NumPointADelta from the header of the bitstream.

LoD setter 7072 generates a LoD using decoded geometry information on a three-dimensional point. Searcher 7073 searches for a neighboring three-dimensional point of each three-dimensional point using a LoD generation result and distance information between three-dimensional points.

Predictor 7074 generates a predicted value of attribute information of a current three-dimensional point to be decoded. Inverse quantizer 7075 inverse-quantizes the arithmetically decoded prediction residual. Specifically, inverse quantizer 7075 performs inverse quantization using a quantization parameter based on the decoded Delta_Layer, ADelta_QP, and NumPointADelta.

Reconstructor 7076 generates a decoded value by summing the predicted value and the inverse-quantized prediction residual. Memory 7077 stores the value (decoded value) of the decoded attribute information on each three-dimensional point. The decoded attribute information on the three-dimensional points stored in memory 7077 is used for prediction of a three-dimensional point yet to be decoded by predictor 7074.

In the following, an example in which RAHT layers are used instead of the LoD layers will be described. FIG. 149 is a diagram showing an example in which the quantization parameters are controlled on a basis of a finer unit when attribute information is encoded using RAHT. For example, when encoding attribute information using RAHT, the three-dimensional data encoding device defines ADelta_QP and NumPointADelta, which represents the geometry information on a three-dimensional point to which ADelta_QP is to be added, in addition to Delta_Layer for each RAHT layer. The three-dimensional data encoding device performs the encoding by changing the value of the quantization parameter based on Delta_Layer, ADelta_QP, and NumPointADelta.

The three-dimensional data encoding device may add ADelta and NumPointADelta used for the encoding to the header or the like of the bitstream. This allows the three-dimensional data encoding device to encode attribute information on three-dimensional points by changing the quantization parameter for each three-dimensional point according to the desired code amount and the actual code amount, for example. In this way, the three-dimensional data encoding device can finally generate a bitstream having a code amount close to the desired code amount. The three-dimensional data decoding device can properly decode the bitstream by decoding QPbase, Delta_Layer, and ADelta included in the header to generate the quantization parameters used by the three-dimensional data encoding device.

For example, quantized value QP4 of N0-th attribute information is calculated according to QP4=QP3+ADelta_QP[0]. Each ADelta_QP[i] may be the difference value with respect to QPbase, like QP4=QPbase+ADelta_QP[0].

FIG. 150 is a diagram showing a syntax example of an attribute information header (attribute header information) in the case where the example shown in FIG. 149 is used. The attribute information header shown in FIG. 150 is basically the same as the attribute information header shown in FIG. 140 but differs in that RAHT layers are used instead of LoD layers.

NumADelta indicates the number of all ADelta_QP included in the bitstream. NumPointADelta[i] indicates an identification number of three-dimensional point A to which ADelta_QP[i] is applied. For example, NumPointADelta[i] indicates the number of the three-dimensional points from the leading three-dimensional point to three-dimensional point A in the encoding/decoding order. NumPointADelta[i] may also indicates the number of the three-dimensional points from the first three-dimensional point to three-dimensional point A in the layer to which three-dimensional point A belongs.

Alternatively, NumPointADelta[i] may indicate the difference value between the identification number of the three-dimensional point indicated by NumPointADelta[i−1] and the identification number of three-dimensional point A. In this way, the value of NumPointADelta[i] can be reduced, so that the code amount can be reduced.

FIG. 151 is a diagram showing another syntax example of an attribute information header (attribute header information) in the case where the example shown in FIG. 149 is used. Note that the attribute information header shown in FIG. 151 is basically the same as the attribute information header shown in FIG. 141 but differs in that RAHT layers are used instead of LoD layers.

additional_delta_QP_present_flag is a flag that indicates whether ADelta_QP is included in the bitstream or not. For example, a value of 1 indicates that ADelta_QP is included in the bitstream, and a value of 0 indicates that ADelta_QP is not included in the bitstream. When additional_delta_QP_present_flag is 0, the three-dimensional data decoding device performs the following decoding process by setting ADelta_QP to be 0, for example.

NumADelta_minus1 indicates the number of all ADelta_QP included in the bitstream minus 1. In this way, by adding the value obtained by subtracting 1 from the number of ADelta_QP to the header, the code amount of the header can be reduced. For example, the three-dimensional data decoding device calculates NumADelta=NumADelta_minus1+1. ADelta_QP[i] indicates the value of i-th ADelta_QP. Note that ADelta_QP[i] can be set to be not only a positive value but also a negative value.

FIG. 152 is a flowchart of a three-dimensional data encoding process in the case where RAHT is used. First, the three-dimensional data encoding device encodes geometry information (geometry) (S7061). For example, the three-dimensional data encoding device performs the encoding using an octree representation.

The three-dimensional data encoding device then transforms attribute information (S7062). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7063). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

FIG. 153 is a flowchart of the attribute information encoding process (S7063). First, the three-dimensional data encoding device generates a coding coefficient from attribute information by Haar transformation (S7071).

The three-dimensional data encoding device then applies quantization to the coding coefficient (S7072). The three-dimensional data encoding device then generates encoded attribute information (bitstream) by encoding the quantized coding coefficient (S7073).

The three-dimensional data encoding device then determines ΔQP (S7074). Note that the method of determining ΔQP is the same as step S7019 in the case where LoD layers are used. Determined ΔQP is used for determining a quantization parameter used for quantization of a subsequent coding coefficient.

The three-dimensional data encoding device applies inverse quantization to the quantized coding coefficient (S7075). The three-dimensional data encoding device then decodes the attribute information by applying inverse Haar transformation to the inverse-quantized coding coefficient (S7076). For example, the decoded attribute information is referred to in the subsequent encoding.

FIG. 154 is a flowchart of a three-dimensional data decoding process in the case where RAHT is used. First, the three-dimensional data decoding device decodes geometry information (geometry) from the bitstream (S7065). For example, the three-dimensional data decoding device performs the decoding using an octree representation.

The three-dimensional data decoding device then decodes attribute information from the bitstream (S7066). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device decodes the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

FIG. 155 is a flowchart of the attribute information decoding process (S7066). First, the three-dimensional data decoding device decodes the coding coefficient from the bitstream (S7081). The three-dimensional data decoding device then decodes ΔQP from the bitstream (S7082). Specifically, the three-dimensional data decoding device decodes Delta_Layer, ADelta_QP, and NumPointADelta from the header of the bitstream.

The three-dimensional data decoding device then applies inverse quantization to the coding coefficient (S7083). In this inverse quantization, a quantization parameter calculated using ΔQP obtained in step S7082 is used. The three-dimensional data decoding device then decodes the attribute information by applying inverse Haar transformation to the inverse-quantized coding coefficient (S7084).

FIG. 156 is a block diagram of attribute information encoder 7023 in the case where RAHT is used. Attribute information encoder 7023 includes sorter 7081, Haar transformer 7082, quantizer 7083, inverse quantizer 7084, inverse Haar transformer 7085, memory 7086, arithmetic encoder 7087, and ΔQP calculator 7088.

Sorter 7081 generates a Morton code using geometry information on a three-dimensional point, and sorts a plurality of three-dimensional points in the order of Morton codes. Haar transformer 7082 generates a coding coefficient by applying Haar transformation to attribute information. Quantizer 7083 quantizes the coding coefficient of the attribute information.

Inverse quantizer 7084 inverse-quantizes the quantized coding coefficient. Inverse Haar transformer 7085 applies inverse Haar transformation to the coding coefficient. Memory 7086 stores values of the decoded attribute information on the plurality of three-dimensional points. For example, the decoded attribute information on the three-dimensional points stored in memory 7086 may be used for prediction or the like of a three-dimensional point yet to be encoded.

Arithmetic encoder 7087 calculates ZeroCnt from the quantized coding coefficient, and arithmetically encodes ZeroCnt. Arithmetic encoder 7087 also arithmetically encodes any quantized coding coefficient that is not zero. Arithmetic encoder 7087 may binarize the coding coefficient before the arithmetic encoding. Arithmetic encoder 7087 may generate and encode various kinds of head information.

ΔQP calculator 7088 determines values of Delta_Layer, ADelta_QP, and NumPointADelta from the actual code amount obtained by arithmetic encoder 7087 and the predetermined desired code amount. The quantization by quantizer 7083 is performed using a quantization parameter based on the determined Delta_Layer, ADelta_QP, and NumPointADelta. Arithmetic encoder 7087 arithmetically encodes Delta_Layer, ADelta_QP, and NumPointADelta and adds these values to the bitstream.

FIG. 157 is a block diagram of attribute information decoder 7043 in the case where RAHT is used. Attribute information decoder 7043 includes arithmetic decoder 7091, inverse quantizer 7092, inverse Haar transformer 7093, and memory 7094.

Arithmetic decoder 7091 arithmetically decodes ZeroCnt and the coding coefficient included in the bitstream. Arithmetic decoder 7091 may decode various kinds of header information. Arithmetic decoder 7091 also decodes Delta_Layer, ADelta_QP, and NumPointADelta from the header of the bitstream.

Inverse quantizer 7092 inverse-quantizes the arithmetically decoded coding coefficient. Specifically, inverse quantizer 7092 performs the inverse quantization using a quantization parameter based on the decoded Delta_Layer, ADelta_QP, and NumPointADelta.

Inverse Haar transformer 7093 applies inverse Haar transformation to the inverse-quantized coding coefficient. Memory 7094 stores values of the decoded attribute information on the plurality of three-dimensional points. For example, the decoded attribute information on the three-dimensional points stored in memory 7094 may be used for prediction of a three-dimensional point yet to be decoded.

In the following, a variation of this embodiment will be described. The three-dimensional data encoding device may encode a quantization parameter of attribute information on each three-dimensional point as new attribute information.

In the following, an example of a process performed by the three-dimensional data encoding device in this case will be described. The three-dimensional data encoding device encodes attribute information A (such as color) by calculating a quantization parameter according to the flow shown in FIG. 143. In this process, as a new attribute value of each three-dimensional point, the three-dimensional data encoding device encodes the quantization parameter used. In this case, the three-dimensional data encoding device may perform the encoding by changing the value of the quantization parameter for each three-dimensional point. For example, if the cumulative code amount is greater than the value of the desired code amount×TH1, the three-dimensional data encoding device can set the value of the quantization parameter to be greater, in order to reduce the actual code amount. If the cumulative code amount is smaller than the value of the desired code amount×TH3, the three-dimensional data encoding device can set the value of the quantization parameter to be smaller, in order to increase the actual code amount.

After the encoding of attribute information A, the three-dimensional data encoding device encodes the quantization parameter assigned to each three-dimensional point as new attribute information A'. In this process, the three-dimensional data encoding device may apply lossless encoding to prevent losing of the amount of information on the quantization parameters. The three-dimensional data encoding device may add, to the header or the like, information that indicates that the encoded attribute information is a quantization parameter. In this way, the three-dimensional data decoding device can properly decode the quantization parameter used by the three-dimensional data encoding device.

When performing predictive encoding of attribute information using N three-dimensional points in the periphery of a current three-dimensional point, the three-dimensional data encoding device may encode a quantization parameter on the supposition that N=1. In this way, the calculation amount can be reduced.

Next, an example of a process performed by the three-dimensional data decoding device will be described. First, the three-dimensional data decoding device decodes attribute information A' among the attribute information in the bitstream to obtain a quantization parameter used for the decoding of attribute information A. The three-dimensional data decoding device then decodes attribute information A using the decoded quantization parameter.

Note that the three-dimensional data encoding device may encode, as new attribute information A', ΔQP, which is the amount of change of the quantization parameter between three-dimensional points, instead of the quantization parameter described above. When ΔQP assumes a positive or negative value, the three-dimensional data encoding device may transform signed ΔQP into a positive value before encoding ΔQP as described below. When signed ΔQP (deltaQP_s) is smaller than 0, unsigned ΔQP (deltaQP_u) is set to be −1−(2×deltaQP_s). When signed ΔQP (deltaQP_s) is equal to or greater than 0, unsigned ΔQP (deltaQP_u) is set to be 2×deltaQP_s.

The three-dimensional data encoding device may encode, as attribute information, a quantization parameter used for encoding of each attribute information. For example, the three-dimensional data encoding device may encode a quantization parameter of attribute information A on color as attribute information A', and encode a quantization parameter of attribute information B on reflectance as attribute information B'. In this way, the quantization parameter can be changed for each attribute information. For example, if the quantization parameter of attribute information having higher priority is set to be smaller, and the quantization parameter of attribute information having lower priority is set to be greater, the total code amount can be reduced while preserving the attribute information having higher priority.

When quantizing and encoding a prediction residual for attribute information on a three-dimensional point, if delta_Layer_present_flag, additional_delta_QP_present_flag and the like indicate that Delta_Layer and ADelta_QP are set in the header, the three-dimensional data encoding device need not use the value of a quantization weight (QW) that indicates the importance of a three-dimensional point. For example, when QW is used, the quantization parameter is set to be smaller when QW is greater (the importance is higher). In this way, it can be chosen whether to perform the quantization based on the importance determined by an internal process such as prediction or based on a value set in the header by the user, so that the two manners can be selectively used depending on the purpose of the user.

The three-dimensional data encoding device may add, to the header, a flag that indicates whether to use the value of the quantization weight (QW) or not. In this way, it can be chosen whether to perform the quantization by combining the values of Delta_Layer and ADelta_QP and QW or not, the two manners can be selectively used depending on the purpose of the user.

When quantizing and encoding a transformation coefficient for attribute information on a three-dimensional point using RAHT or the like, if delta_Layer_present_flag, additional_delta_QP_present_flag and the like indicate that Delta_Layer and ADelta_QP are set in the header, the three-dimensional data encoding device need not use the value of the quantization weight (QW). In this way, it can be chosen whether to perform the quantization based on the importance determined by an internal process such as prediction or based on a value set in the header by the user, so that the two manners can be selectively used depending on the purpose of the user. Furthermore, the three-dimensional data encoding device may add, to the header, a flag that indicates whether to use the value of quantization weight (QW) or not. In this way, it can be chosen whether to perform the quantization by combining the values of Delta_Layer and ADelta_QP and QW or not, the two manners can be selectively used depending on the purpose of the user.

FIG. 158 is a diagram showing a syntax example of an attribute information header (attribute header information)

in this case. The attribute information header shown in FIG. 158 differs from the attribute information header shown in FIG. 141 in that the attribute information header further includes default_delta_Layer_present_flag, default_delta_Layer_index, default_additional_delta_QP_present_flag, and default_additional_delta_QP_index.

default_delta_Layer_present_flag is a flag that indicates whether to use an initially set value of Delta_Layer defined by a standard or the like or not. For example, a value of 1 indicates that initially set Delta_Layer is to be used. A value of 0 indicates that initially set Delta_Layer is not to be used. In the case of the value of 0, the three-dimensional data decoding device performs the following decoding process by setting Delta_Layer to be 0, for example.

default_delta_Layer_index is information that allows identification of Delta_Layer to be used among one or more initially set values of Delta_Layer defined by a standard or the like. For example, default_delta_Layer_index is defined as described below.

When default_delta_Layer_index=0, Delta_Layer for all layers is set to be 1. That is, the value of the quantization parameter increases by 1 every time a layer is incremented. When default_delta_Layer_index=1, Delta_Layer for all layers is set to be 2. That is, the value of the quantization parameter increases by 2 every time a layer is incremented.

If an initially set Delta_Layer is defined by a standard or the like in this way, the quantization parameter can be changed without adding the value of Delta_Layer to the header, so that the code amount of the header can be reduced.

default_additional_delta_QP_present_flag is a flag that indicates whether to use an initially set value of ADelta_QP defined by a standard or the like or not. For example, a value of 1 indicates that initially set ADelta_QP is to be used. A value of 0 indicates that initially set ADelta_QP is not to be used. In the case of the value of 0, the three-dimensional data decoding device performs the following decoding process by setting ADelta_QP to be 0, for example.

default_additional_delta_QP_index is information that allows identification of ADelta_QP to be used among one or more values of initially set ADelta_QP defined by a standard or the like. For example, default_additional_delta_QP_index is defined as described below.

When default_additional_delta_QP_index=0, ADelta_QP is set to be 1 every N three-dimensional points. That is, the value of the quantization parameter increases by 1 each time N three-dimensional points are encoded or decoded. Note that the three-dimensional data encoding device may additionally add information indicating N to the header.

When default_additional_delta_QP_index=1, ADelta_QP is set to be 2 every N three-dimensional points. That is, the value of the quantization parameter increases by 2 each time N three-dimensional points are encoded or decoded. Note that the three-dimensional data encoding device may additionally add information indicating N to the header.

If an initially set ADelta_QP is defined by a standard or the like in this way, the quantization parameter can be changed without adding the value of ADelta_QP to the header, so that the code amount of the header can be reduced.

As described above, the three-dimensional data encoding device according to this embodiment performs the process shown in FIG. 159. The three-dimensional data encoding device calculates a plurality of coefficient values (such as prediction residuals or coding coefficients) from a plurality of pieces of attribute information on a plurality of three-dimensional points included in point cloud data (S7091). The three-dimensional data encoding device then generates a plurality of quantized values by quantizing each of the plurality of coefficient values (S7092). The three-dimensional data encoding device then generates a bitstream including the plurality of quantized values (S7093). The plurality of coefficient values belong to any of a plurality of layers (such as LoD layers or RAHT layers). In the quantization (S7092), the three-dimensional data encoding device quantizes each of the plurality of coefficient values using a quantization parameter for the layer to which the coefficient value belongs. The bitstream includes first information (such as QPbase) that indicates a reference quantization parameter and a plurality of pieces of second information (such as Delta_Layer[i]) for calculating a plurality of quantization parameters for the plurality of layers from the reference quantization parameter.

With such a configuration, the three-dimensional data encoding device can change the quantization parameter for each layer, and therefore can properly perform the encoding. In addition, since the three-dimensional data encoding device encodes the first information that indicates a reference quantization parameter and the second information for calculating a plurality of quantization parameters from the reference quantization parameter, the coding efficiency can be improved.

For example, each of the plurality of pieces of second information indicates the difference between the reference quantization parameter and the quantization parameter for the layer.

For example, the bitstream further includes a first flag (delta_Layer_present_flag) that indicates whether the plurality of pieces of second information is included in the bitstream or not.

For example, the bitstream further includes third information (such as NumLayer) that indicates the number of the plurality of pieces of second information included in the bitstream.

For example, the plurality of three-dimensional points are classified into any of a plurality of layers (such as LoDs) based on the geometry information on the plurality of three-dimensional points.

For example, the plurality of coefficient values are generated by sorting each of the plurality of pieces of attribute information into a higher frequency component and a lower frequency component to be classified into any of the layers (such as RAHT layers).

For example, the three-dimensional data encoding device includes a processor and a memory, and the processor performs the process described above using the memory.

The three-dimensional data decoding device according to this embodiment performs the process shown in FIG. 160. The three-dimensional data decoding device calculates quantization parameters for a plurality of layers based on (i) first information (such as QPbase) that indicates a reference quantization parameter and (ii) a plurality of pieces of second information (such as Delta_Layer[i]) for calculating a plurality of quantization parameters for a plurality of layers from the reference quantization parameter that are included in the bitstream (S7095).

The three-dimensional data decoding device then generates a plurality of coefficient values (such as prediction residuals or coding coefficients) by inverse-quantizing each of the plurality of quantized values included in the bitstream using the quantization parameter for the layer to which the quantized value belongs among the calculated quantization parameters for the plurality of layers (S7096). The three-dimensional data decoding device then calculates a plurality of pieces of attribute information on a plurality of three-dimensional points included in point cloud data from the plurality of coefficient values (S7097).

With such a configuration, the three-dimensional data decoding device can change the quantization parameter for each layer, and therefore can properly perform the decoding. In addition, the three-dimensional data decoding device can properly decode the bitstream encoded with a coding efficiency improved by using the first information that indicates a reference quantization parameter and the plurality of pieces of second information for calculating a plurality of quantization parameters from the reference quantization parameter.

For example, each of the plurality of pieces of second information indicates the difference between the reference quantization parameter and the quantization parameter for the layer.

For example, the bitstream further includes a first flag (delta_Layer_present_flag) that indicates whether the plurality of pieces of second information is included in the bitstream or not.

For example, the bitstream further includes third information (such as NumLayer) that indicates the number of the plurality of pieces of second information included in the bitstream.

For example, the plurality of three-dimensional points are classified into any of a plurality of layers (such as LoDs) based on the geometry information on the plurality of three-dimensional points.

For example, the plurality of coefficient values are generated by sorting each of the plurality of pieces of attribute information into a higher frequency component and a lower frequency component to be classified into any of the layers (such as RAHT layers).

For example, the three-dimensional data decoding device includes a processor and a memory, and the processor performs the process described above using the memory.

Embodiment 14

In this embodiment, a method of generating LoD layers will be described. FIG. 161 is a diagram showing an example of the generation of LoD layers. FIG. 161 shows a LoD generation method using a binary tree structure in the case where the number N of three-dimensional points is 16. First, the three-dimensional data encoding device divides a plurality of three-dimensional points in node[0] using a value (geometry coordinate) on axis α. Here, axis α is an x-axis, a y-axis, or a z-axis, for example. Specifically, the three-dimensional data encoding device may calculate a median (median[0]) of values on axis α of three-dimensional points, and divide the three-dimensional points using median[0]. For example, the three-dimensional data encoding device divides a plurality of three-dimensional points in node[0] into group A and group B, group A including three-dimensional points whose values on axis a are equal to or smaller than methan[0], group B including three-dimensional points whose values on axis α are greater than methan[0], and assigns group A to node[1] and group B o node[2]. In this way, a plurality of three-dimensional points in node[0] can be substantially evenly divided.

The three-dimensional data encoding device may calculate an average value (mean[0]) of values on axis α of three-dimensional points in node[0], and assign three-dimensional point i having a value on axis α closest to the value of mean[0] to LoD0. In this way, three-dimensional points that are relatively close to the plurality of three-dimensional points in node[0] can be assigned to LoD0, so that the precision of prediction of the attribute value of each three-dimensional point can be improved.

As with node[0], a plurality of three-dimensional points included in each of node[1] and node[2] are divided using a value on axis β. Here, axis α and axis β may be the same or different. The three-dimensional data encoding device calculates a median (median[1]) of values on axis β of three-dimensional points in node[1] and a median (median[2]) on axis β of three-dimensional points in node[2]. The three-dimensional data encoding device divides node[1] into node [3] and node[4] using median[1]. The three-dimensional data encoding device divides node[2] into node[5] and node[6] using methan[2].

The three-dimensional data encoding device calculates average values (mean[1] and mean[2]) of values on axis β of three-dimensional points in node[1] and node[2], respectively, and assign three-dimensional points e and m having values on axis β closest to the respective average values to LoD1.

The three-dimensional data encoding device calculates means of node[3] to node[6] in the same manner as for node[0], node[1], and node[2], and assigns three-dimensional points c, f, j, and n having values closest to the respective mean values to LoD2. The three-dimensional data encoding device assigns three-dimensional points that have not been assigned to any of LoD0 to LoD2 to LoD3. In this way, the three-dimensional data encoding device can assign all three-dimensional points to a LoD.

When each three-dimensional point in a node has geometry information (x, y, z), the three-dimensional data encoding device determines which of axes x, y, and z is to be used for the division of three-dimensional points in the node. For example, the three-dimensional data encoding device calculates a variance on each axis of three-dimensional points in a node, and divides the three-dimensional points using the axis the variance on which is the greatest. In this way, the three-dimensional data encoding device can properly divide three-dimensional points in a node in accordance with the characteristics thereof. Note that the three-dimensional data encoding device can change the axis used for the division for each node. In this way, the three-dimensional data encoding device can properly perform the division in accordance with the characteristics of the three-dimensional points in each node.

According to the method described above, three-dimensional points that are close to each other on average can be assigned to higher LoDs, so that the precision of prediction of attribute information using LoDs can be increased, and the coding efficiency can be improved.

Here, when encoding an attribute value of a three-dimensional point using a binary tree, the three-dimensional data encoding device may calculate value btDepth that indicates up to which layer the division is to be performed from node[0], which is a root node, according to the following formula (Equation L1) or (Equation L2).

$$bt\,Depth = \max\left(0, \log_2\left(\text{round}\left(\frac{N}{2}\right)\right) - \text{up}\right) \quad \text{(Equation L1)}$$

$$bt\,Depth = \max\left(0, \text{round}\left(\log_2\left(\frac{N}{2}\right)\right) - \text{up}\right) \quad \text{(Equation L2)}$$

Here, N represents the number of three-dimensional points, and up represents a control parameter. For example, it is possible that up=1. By changing the value of up, up to which layer in the binary tree the three-dimensional points are to be divided can be controlled. Note that the three-dimensional data encoding device may add the value of up to the bitstream. In this way, the three-dimensional data decoding device can perform the division up to the same layer as in the encoding and therefore can properly decode the bitstream.

Note that round(x) in (Equation L1) is a function that returns a value obtained by rounding off value x. max (x, y) is a function that returns the greater value of values x and y. That is, btDepth is 0 (clipped to a value of 0) when the value of log 2(round(N/2))-up is negative.

FIG. 162 to FIG. 166 are diagrams showing examples of the division of layers. As shown in FIG. 162, when N=8, and up=1, the division is performed up to btDepth=1. As shown in FIG. 163, when N=8, and up=0, the division is performed up to btDepth=2.

By clipping the minimum value of btDepth to 0, the three-dimensional data encoding device can properly generate LoDs even when N is equal to or smaller than 2. As shown in FIG. 164, when N=2, and up=1, the division is performed up to btDepth=0. In the example shown in FIG. 164, node[0] includes two points. The three-dimensional data encoding device may assign one of these two points that is closer to an average value to LoD0, and assign the other point to LoD1.

As shown in FIG. 165, when N=1, and up=0, the division is performed up to btDepth=0. In the example shown in FIG. 165, node[0] includes one point. The three-dimensional data encoding device assigns the one point to LoD0.

Note that although an example in which, by clipping the minimum value of btDepth to 0, three-dimensional points are properly assigned to LoDs even when N is equal to or smaller than 2 has been shown in this embodiment, the present disclosure is not necessarily limited thereto. For example, when N is equal to or smaller than 2, the three-dimensional data encoding device need not apply the LoD generation using a binary tree. Alternatively, when N is equal to or smaller than 2, the three-dimensional data encoding device may assign the two points to LoD0. Alternatively, when N is equal to or smaller than 2, the three-dimensional data encoding device may generate LoDs by assigning one of the three-dimensional points to LoD0 and assigning the other three-dimensional point to LoD1. Alternatively, when N is equal to or smaller than 2, the three-dimensional data encoding device may set the value of btDepth to be 0 by setting up=0.

Although an example in which an example in which three-dimensional points are assigned to LoDs for each btDepth layer has been shown in this embodiment, the present disclosure is not necessarily limited thereto. For example, the three-dimensional data encoding device may assign three-dimensional points to LoDs for a particular btDepth. For example, the three-dimensional data encoding device may assign three-dimensional points to LoDs when the value of btDepth is even, and skip the LoD assignment when the value is odd. Alternatively, the three-dimensional data encoding device may assign three-dimensional points to LoDs when the value of btDepth is odd, and skip the LoD assignment when the value is even. In this way, the three-dimensional data encoding device does not have to determine an average value and search for a three-dimensional point having a value close to the average value for each layer, the processing amount can be reduced.

For example, as shown in FIG. 166, when N=16, and up=1, the division is performed up to btDepth=2. For btDepth=0, btDepth is even, and the three-dimensional data encoding device assigns a three-dimensional point having a value close to the average value for node[0] to LoD0. For btDepth=1, btDepth is odd, and the three-dimensional data encoding device skips the assignment. For btDepth=2, btDepth is even, and the three-dimensional data encoding device assigns a three-dimensional point having a value close to the average value to each node to LoD1. The three-dimensional data encoding device assigns any three-dimensional point that has not been assigned to any of LoD0 and LoD1 to LoD2.

FIG. 167 is a flowchart of a three-dimensional data encoding process according to this embodiment. First, the three-dimensional data encoding device encodes geometry information (geometry) (S7101). For example, the three-dimensional data encoding device performs the encoding using an octree representation.

The three-dimensional data encoding device then transforms attribute information (S7102). For example, after the encoding of the geometry information, if the position of a three-dimensional point is changed because of quantization or the like, the three-dimensional data encoding device reassigns the attribute information on the original three-dimensional point to the three-dimensional point changed in position. Note that the three-dimensional data encoding device may perform the reassignment by interpolation of values of the attribute information according to the amount of change in position. For example, the three-dimensional data encoding device detects N three-dimensional points yet to be changed in position close to the three-dimensional position of the three-dimensional point changed in position, takes a weighted average of the values of the attribute information on the N three-dimensional points based on the distance between the three-dimensional positions of the three-dimensional point changed in position and each of the N three-dimensional points, and determines the resulting value as the value of the attribute information on the three-dimensional point changed in position. If the three-dimensional positions of two or more three-dimensional points are changed to the same three-dimensional position because of quantization or the like, the three-dimensional data encoding device may assign an average value of the attribute information on the two or more three-dimensional points yet to be changed in position as the value of the attribute information on the three-dimensional points changed in position.

The three-dimensional data encoding device then encodes the attribute information (S7103). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

FIG. 168 is a flowchart of the attribute information encoding process (S7103). First, the three-dimensional data encoding device sets an LoD (S7111). That is, the three-dimensional data encoding device assigns each three-dimensional point to any of a plurality of LoDs.

The three-dimensional data encoding device then starts a loop on an LoD basis (S7112). That is, the three-dimensional data encoding device repeatedly performs the process from step S7113 to step S7121 for each LoD.

The three-dimensional data encoding device then starts a loop on a basis of a three-dimensional point (S7113). That is, the three-dimensional data encoding device repeatedly performs the process from step S7114 to step S7120 for each three-dimensional point.

First, the three-dimensional data encoding device searches for a plurality of peripheral points, which are three-dimensional points present in the periphery of the current three-dimensional point, that are to be used for calculation of a predicted value of the current three-dimensional point to be processed (S7114). The three-dimensional data encoding device then calculates a weighted average of values of the attribute information on the plurality of peripheral points, and sets the obtained value as predicted value P (S7115). The three-dimensional data encoding device then calculates a prediction residual, which is the difference between the attribute information and the predicted value of the current three-dimensional point (S7116). The three-dimensional data encoding device then calculates a quantized value by quantizing the prediction residual (S7117). The three-dimensional data encoding device then arithmetically encodes the quantized value (S7118).

The three-dimensional data encoding device then calculates an inverse-quantized value by inverse-quantizing the quantized value (S7119). The three-dimensional data encoding device then generates a decoded value by adding the predicted value to the inverse-quantized value (S7120). The three-dimensional data encoding device then ends the loop on a basis of a three-dimensional point (S7121). The three-dimensional data encoding device also ends the loop on a LoD basis (S7122).

FIG. 169 is a flowchart of the LoD setting process (S7111). First, the three-dimensional data encoding device calculates btDepth from the number N of three-dimensional points (S7131). For example, the three-dimensional data encoding device calculates btDepth according to (Equation L1) or (Equation L2) described above. Note that when the number N of three-dimensional points is equal to or smaller than a certain value, the three-dimensional data encoding device need not perform the LoD generation using a binary tree. For example, when N is equal to or smaller than 2, the three-dimensional data encoding device may assign N three-dimensional points to LoD0. In this way, the speed of the LoD generation process can be increased in the case where N is equal to or smaller than a certain value.

The three-dimensional data encoding device then sets depth=0 (S7132). The three-dimensional data encoding device then sets num_node=1«depth (S7133). The three-dimensional data encoding device then sets n=0 (S7134). The three-dimensional data encoding device then determines n-th node A in a depth-th layer as a node to be processed (S7135).

The three-dimensional data encoding device then determines division axis α for three-dimensional points included in node A (S7136). For example, when three-dimensional points have coordinates on three axes (x, y, z), the three-dimensional data encoding device calculates a variance of the three-dimensional points on each axis, and determines the axis the variance on which is the greatest as division axis α. In this way, three-dimensional points can be efficiently divided.

The three-dimensional data encoding device then calculates an average value of values on axis α of the three-dimensional points included in node A (S7137). The three-dimensional data encoding device then extracts a three-dimensional point having a value on axis α closest to the average value for node A from the three-dimensional points in node A, and adds the extracted three-dimensional point to the LoD corresponding to the depth-th layer (S7138).

The three-dimensional data encoding device then calculates a median of values on axis α of the three-dimensional points included in node A, divides the three-dimensional points in node A using the median, and assigns the divided three-dimensional points to two nodes in the depth+1-th layer (S7139). The three-dimensional data encoding device then sets n=n+1 (S7140).

When the relation n<num_node holds (if Yes in S7141), the three-dimensional data encoding device performs step S7135 and the following process again.

When the relation n<num_node does not hold (if No in S7141), the three-dimensional data encoding device sets depth=depth+1 (S7142). When the relation depth==btDepth does not holds (if No in S7143), the three-dimensional data encoding device performs step S7133 and the following process again.

When the relation depth==btDepth holds (if Yes in S7143), the three-dimensional data encoding device assigns any three-dimensional point that has not been assigned to a LoD of each depth to a LoD in the lowest layer (S7144).

FIG. 170 is a flowchart of a three-dimensional data decoding process according to this embodiment. First, the three-dimensional data decoding device decodes geometry information (geometry) from the bitstream (S7151). For example, the three-dimensional data decoding device performs the decoding using an octree representation.

The three-dimensional data decoding device then decodes attribute information from the bitstream (S7152). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device decodes the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding process for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

FIG. 171 is a flowchart of the attribute information decoding process (S7152). First, the three-dimensional data decoding device sets an LoD (S7161). That is, the three-dimensional data decoding device assigns each of a plurality of three-dimensional points having decoded geometry information to any of a plurality of LoDs. For example, the method of the assignment is the same as the method of assignment used in the three-dimensional data encoding device shown in FIG. 169.

The three-dimensional data decoding device then starts a loop on an LoD basis (S7162). That is, the three-dimensional data decoding device repeatedly performs the process from step S7163 to step S7169 for each LoD.

The three-dimensional data decoding device then starts a loop on a basis of a three-dimensional point (S7163). That is, the three-dimensional data decoding device repeatedly performs the process from step S7164 to step S7168 for each three-dimensional point.

First, the three-dimensional data decoding device searches for a plurality of peripheral points, which are three-dimensional points present in the periphery of the current three-dimensional point, that are to be used for calculation of a predicted value of the current three-dimensional point to be processed (S7164). The three-dimensional data decoding device then calculates a weighted average of values of the attribute information on the plurality of peripheral points, and sets the obtained value as predicted value P (S7165). Note that these processings are the same as those in the three-dimensional data encoding device.

The three-dimensional data decoding device then arithmetically decodes the quantized value from the bitstream (S7166). The three-dimensional data decoding device then calculates an inverse-quantized value by inverse-quantizing the decoded quantized value (S7167). The three-dimensional data decoding device then generates a decoded value by adding the predicted value to the inverse-quantized value (S7168). The three-dimensional data decoding device then ends the loop on a basis of a three-dimensional point (S7169). The three-dimensional data decoding device also ends the loop on a LoD basis (S7170).

FIG. 172 is a block diagram of attribute information encoder 7100 included in the three-dimensional data encoding device. Attribute information encoder 7100 includes LoD setter 7101, searcher 7102, predictor 7103, subtractor 7104, quantizer 7105, inverse quantizer 7106, reconstructor 7107, and memory 7108.

LoD setter 7101 generates a LoD using geometry information on a three-dimensional point. For example, using a flag (switch flag) or the like, LoD setter 7101 can switch between the LoD generation method using distance information on three-dimensional points and the LoD generation method using a binary tree described in this embodiment. Here, the LoD generation method using distance information on three-dimensional points is a method of setting a distance threshold for each layer and generating a hierarchical structure in such a manner that the distances between a plurality of three-dimensional points included in each layer is equal to or greater than the threshold for the layer. Specifically, the lower the layer, the smaller the threshold is. Therefore, the lower the layer, the higher the density of the three-dimensional points arranged are.

Note that the three-dimensional data encoding device may add the switch flag to the header. In this way, the three-dimensional data decoding device can switch the LoD generation method by decoding the switch flag added to the header, and therefore can properly decode the bitstream. Note that the three-dimensional data encoding device need not add the switch flag to the header, and which method is to be used may be prescribed by a profile, a level or the like of a standard. In that case, the code amount of the header can be reduced.

Searcher 7102 searches for a neighboring three-dimensional point of each three-dimensional point using a LoD generation result and distance information between three-dimensional points. Predictor 7103 generates a predicted value of attribute information of a current three-dimensional point. Predictor 7103 also assigns a predicted value to a plurality of prediction modes 0 to M−1, and selects a prediction mode to be used from the plurality of prediction modes.

Subtractor 7104 generates a prediction residual by subtracting the predicted value from the attribute information. Quantizer 7105 quantizes the prediction residual of the attribute information. Inverse quantizer 7106 inverse-quantizes the quantized prediction residual. Reconstructor 7107 generates a decoded value by summing the predicted value and the inverse-quantized prediction residual. Memory 7108 stores the value (decoded value) of the decoded attribute information on each three-dimensional point. The decoded attribute information on the three-dimensional points stored in memory 7108 is used for prediction of a three-dimensional point yet to be encoded by predictor 7103.

Arithmetic encoder 7109 calculates ZeroCnt from the quantized prediction residual, and arithmetically encodes ZeroCnt. Arithmetic encoder 7109 also arithmetically encodes any quantized prediction residual that is not zero. Arithmetic encoder 7109 may binarize the prediction residual before the arithmetic encoding. Arithmetic encoder 7069 may generate and encode various kinds of head information. Arithmetic encoder 7109 may arithmetically encode prediction mode information (PredMode) that indicates the prediction mode used for the encoding by predictor 7103, and add the information to the bitstream.

FIG. 173 is a block diagram of attribute information decoder 7110 included in the three-dimensional data decoding device. Attribute information decoder 7110 includes arithmetic decoder 7111, LoD setter 7112, searcher 7113, predictor 7114, inverse quantizer 7115, reconstructor 7116, and memory 7117.

Arithmetic decoder 7111 arithmetically decodes ZeroCnt and the prediction residual included in the bitstream. Arithmetic decoder 7111 also decodes various kinds of header information. Arithmetic decoder 7111 also arithmetically decodes prediction mode information (PredMode) from the bitstream, and outputs the obtained prediction mode information to predictor 7114.

LoD setter 7112 generates a LoD using decoded geometry information on a three-dimensional point. For example, LoD setter 7112 may decode the flag (switch flag) or the like that indicates which of the LoD generation method using distance information on three-dimensional points and the LoD generation method using a binary tree described in this embodiment has been used, generate a LoD in the method indicated by the switch flag. Note that the three-dimensional data decoding device may use a LoD generation method prescribed by a profile, a level or the like of a standard.

Searcher 7113 searches for a neighboring three-dimensional point of each three-dimensional point using a LoD generation result and distance information between three-dimensional points. Predictor 7114 generates a predicted value of attribute information of a current three-dimensional point to be decoded. Inverse quantizer 7115 inverse-quantizes the arithmetically decoded prediction residual. Reconstructor 7116 generates a decoded value by summing the predicted value and the inverse-quantized prediction residual. Memory 7117 stores the value (decoded value) of the decoded attribute information on each three-dimensional point. The decoded attribute information on the three-dimensional points stored in memory 7117 is used for prediction of a three-dimensional point yet to be decoded by predictor 7114.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
calculating coefficient values from pieces of attribute information of three-dimensional points included in point cloud data, the attribute information including information related to a vector;
quantizing the coefficient values individually to generate quantized values; and
generating a bitstream including the quantized values, wherein
each of the coefficient values belongs to any one of layers,
in the quantizing, each of the coefficient values is quantized using a quantization parameter for a corresponding layer to which the coefficient value belongs among the layers,
the three-dimensional data encoding method further comprises calculating the quantization parameter for each of the layers, and
the bitstream includes pieces of first information, the pieces of first information being for the calculating of the quantization parameter for each of the layers.

2. The three-dimensional data encoding method according to claim 1, wherein each of the pieces of first information indicates a difference between a reference quantization parameter and a quantization parameter for a corresponding one of the layers among the quantization parameters.

3. The three-dimensional data encoding method according to claim 1, wherein the bitstream further includes a first flag indicating whether or not the pieces of first information are included in the bitstream.

4. The three-dimensional data encoding method according to claim 1, wherein the bitstream further includes third information indicating a total number of the pieces of first information included in the bitstream.

5. The three-dimensional data encoding method according to claim 1, wherein each of the three-dimensional points is classified into any one of the layers in accordance with geometry information of the three-dimensional point.

6. The three-dimensional data encoding method according to claim 1, wherein the coefficient values are generated by sorting each of the pieces of attribute information to one of a higher frequency component and a lower frequency component to be classified into the layers.

7. A three-dimensional data decoding method, comprising:
calculating a quantization parameter for each of a plurality of layers using pieces of first information, the pieces of first information being included in a bitstream;
inverse-quantizing each of quantized values included in the bitstream, using a quantization parameter for a corresponding layer of the plurality of layers to which the quantized value belongs among the quantization parameters calculated in the calculating, to generate coefficient values; and calculating, from the coefficient values generated in the inverse-quantizing, pieces of attribute information of three-dimensional points included in point cloud data, the attribute information including information related to a vector.

8. The three-dimensional data decoding method according to claim 7, wherein each of the pieces of first information indicates a difference between a reference quantization parameter and a quantization parameter for a corresponding one of the layers among the quantization parameters.

9. The three-dimensional data decoding method according to claim 7, wherein the bitstream further includes a first flag indicating whether or not the pieces of first information are included in the bitstream.

10. The three-dimensional data decoding method according to claim 7, wherein the bitstream further includes third information indicating a total number of the pieces of first information included in the bitstream.

11. The three-dimensional data decoding method according to claim 7, wherein each of the three-dimensional points is classified into any one of the layers in accordance with geometry information of the three-dimensional point.

12. The three-dimensional data decoding method according to claim 7, wherein the coefficient values are generated by sorting each of the pieces of attribute information to one of a higher frequency component and a lower frequency component to be classified into the layers.

13. A three-dimensional data encoding device, comprising:
a processor; and
memory,
wherein using the memory, the processor:
calculates coefficient values from pieces of attribute information of three-dimensional points included in point cloud data, the attribute information including information related to a vector;
quantizes the coefficient values individually to generate quantized values; and
generates a bitstream including the quantized values, wherein
each of the coefficient values belongs to any one of layers,
in the quantizing, each of the coefficient values is quantized using a quantization parameter for a corresponding layer to which the coefficient value belongs among the layers,
the three-dimensional data encoding method further comprises calculating the quantization parameter for each of the layers, and
the bitstream includes pieces of first information, the pieces of first information being for the calculating of the quantization parameter for each of the layers.

14. A three-dimensional data decoding device, comprising:
a processor; and
memory,
wherein using the memory, the processor:
calculates a quantization parameter for each of a plurality of layers using pieces of first information, the pieces of first information being included in a bitstream;
inverse-quantizes each of quantized values included in the bitstream, using a quantization parameter for a corresponding layer of the plurality of layers to which the quantized value belongs among the quantization parameters calculated in the calculating, to generate coefficient values; and
calculates, from the coefficient values generated in the inverse-quantizing, pieces of attribute information of three-dimensional points included in point cloud data, the attribute information including information related to a vector.

15. The three-dimensional data encoding method according to claim 1, wherein each of the layers is a Level of Detail (LoD) layer or a Region Adaptive Hierarchical Transform (RAHT) layer.

16. The three-dimensional data encoding method according to claim 1, wherein
the bitstream further includes second information, the second information indicating a reference quantization parameter, and
the quantization parameters for the layers are calculated from the reference quantization parameter.

17. The three-dimensional data encoding method according to claim 1, wherein a total number of the pieces of first information included in the bitstream is equal to a total number of the layers.

18. The three-dimensional data decoding method according to claim 7, wherein each of the layers is a Level of Detail (LoD) layer or a Region Adaptive Hierarchical Transform (RAHT) layer.

19. The three-dimensional data decoding method according to claim 7, wherein
the bitstream further includes second information, the second information indicating a reference quantization parameter, and
the quantization parameters for the layers are calculated from the reference quantization parameter.

20. The three-dimensional data decoding method according to claim 7, wherein a total number of the pieces of first information included in the bitstream is equal to a total number of the layers.

* * * * *